(12) United States Patent
Roth et al.

(10) Patent No.: US 7,225,130 B2
(45) Date of Patent: May 29, 2007

(54) METHODS, SYSTEMS, AND PROGRAMMING FOR PERFORMING SPEECH RECOGNITION

(75) Inventors: Daniel L. Roth, Brookline, MA (US); Jordan R. Cohen, Gloucester, MA (US); David F. Johnston, Arlington, MA (US); Manfred G. Grabherr, Medford, MA (US)

(73) Assignee: Voice Signal Technologies, Inc., Woburn, MA (US)

( * ) Notice: Subject to any disclaimer, the term of this patent is extended or adjusted under 35 U.S.C. 154(b) by 903 days.

(21) Appl. No.: 10/227,653

(22) Filed: Sep. 6, 2002

(65) Prior Publication Data

US 2004/0049388 A1 Mar. 11, 2004
US 2004/0267528 A9 Dec. 30, 2004

Related U.S. Application Data

(63) Continuation-in-part of application No. 10/302,053, filed on Sep. 5, 2002, now abandoned.

(60) Provisional application No. 60/317,333, filed on Sep. 5, 2001, provisional application No. 60/317,433, filed on Sep. 5, 2001, provisional application No. 60/317,431, filed on Sep. 5, 2001, provisional application No. 60/317,329, filed on Sep. 5, 2001, provisional application No. 60/317,330, filed on Sep. 5, 2001, provisional application No. 60/317,331, filed on Sep. 5, 2001, provisional application No. 60/317,423, filed on Sep. 5, 2001, provisional application No. 60/317,422, filed on Sep. 5, 2001, provisional application No. 60/317,421, filed on Sep. 5, 2001, provisional application No. 60/317,430, filed on Sep. 5, 2001, provisional application No. 60/317,432, filed on Sep. 5, 2001, provisional application No. 60/317,435, filed on Sep. 5, 2001, provisional application No. 60/317,434, filed on Sep. 5, 2001.

(51) Int. Cl.
*G10L 11/00* (2006.01)
*G10L 15/28* (2006.01)
*G10L 15/04* (2006.01)
*G06F 3/00* (2006.01)

(52) U.S. Cl. ............... 704/270; 704/255; 704/253; 715/727

(58) Field of Classification Search .............. None
See application file for complete search history.

(56) References Cited

U.S. PATENT DOCUMENTS 4,610,023 A 9/1986 Noso et al.

(Continued)

FOREIGN PATENT DOCUMENTS

WO WO 2004/023455 A3 3/2006

OTHER PUBLICATIONS

Dan Newman, Dragon Naturally Speaking 6 User's Guide, Nov. 2001, pp. 82-83, L&H Holdings USA, Inc.

*Primary Examiner*—David Hudspeth
*Assistant Examiner*—Brian L. Albertalli
(74) *Attorney, Agent, or Firm*—Edward W. Porter

(57) ABSTRACT

The present invention relates to: speech recognition using selectable recognition modes; using choice lists in large-vocabulary speech recognition; enabling users to select word transformations; speech recognition that automatically turns recognition off in one or more specified ways; phone key control of large-vocabulary speech recognition; speech recognition using phone key alphabetic filtering and spelling: speech recognition that enables a user to perform re-utterance recognition; the combination of speech recognition and text-to-speech (TTS) generation; the combination of speech recognition with handwriting and/or character recognition; and the combination of large-vocabulary speech recognition with audio recording and playback.

18 Claims, 96 Drawing Sheets

U.S. PATENT DOCUMENTS

| | | | |
|---|---|---|---|
| 4,829,576 A | 5/1989 | Porter | |
| 5,208,897 A | 5/1993 | Hutchins | |
| 5,596,676 A | 1/1997 | Swaminathan et al. | |
| 5,632,002 A | 5/1997 | Hashimoto et al. | |
| 5,754,972 A * | 5/1998 | Baker et al. | 704/200 |
| 5,819,225 A * | 10/1998 | Eastwood et al. | 704/275 |
| 5,903,864 A | 5/1999 | Gadbois et al. | |
| 5,920,837 A * | 7/1999 | Gould et al. | 704/251 |
| 5,974,413 A | 10/1999 | Beauregard et al. | |
| 5,983,179 A | 11/1999 | Gould | |
| 5,987,410 A | 11/1999 | Kellner et al. | |
| 6,092,043 A | 7/2000 | Squires et al. | |
| 6,224,383 B1 | 5/2001 | Shannon | |
| 6,266,642 B1 | 7/2001 | Franz et al. | |
| 6,285,980 B1 | 9/2001 | Gandhi et al. | |
| 6,324,510 B1 | 11/2001 | Waibel et al. | |
| 6,342,903 B1 * | 1/2002 | Fado et al. | 715/716 |
| 6,374,219 B1 * | 4/2002 | Jiang | 704/255 |
| 6,434,523 B1 | 8/2002 | Monaco | |
| 6,581,033 B1 | 6/2003 | Reynar et al. | |
| 6,694,296 B1 * | 2/2004 | Alleva et al. | 704/255 |
| 6,925,154 B2 * | 8/2005 | Gao et al. | 379/88.03 |
| 2003/0028382 A1 | 2/2003 | Chambers et al. | |
| 2003/0088410 A1 | 5/2003 | Geidl et al. | |
| 2004/0002867 A1 | 1/2004 | Nakagawa et al. | |
| 2004/0049388 A1 | 3/2004 | Roth et al. | |
| 2004/0102971 A1 | 5/2004 | Lipscher et al. | |
| 2005/0038653 A1 | 2/2005 | Roth et al. | |
| 2005/0038657 A1 | 2/2005 | Roth et al. | |
| 2005/0043947 A1 | 2/2005 | Roth et al. | |
| 2005/0043949 A1 | 2/2005 | Roth et al. | |
| 2005/0043954 A1 | 2/2005 | Roth et al. | |
| 2005/0049880 A1 | 3/2005 | Roth et al. | |
| 2005/0159948 A1 | 7/2005 | Roth et al. | |
| 2005/0159950 A1 | 7/2005 | Roth et al. | |
| 2005/0159957 A1 | 7/2005 | Roth et al. | |

* cited by examiner

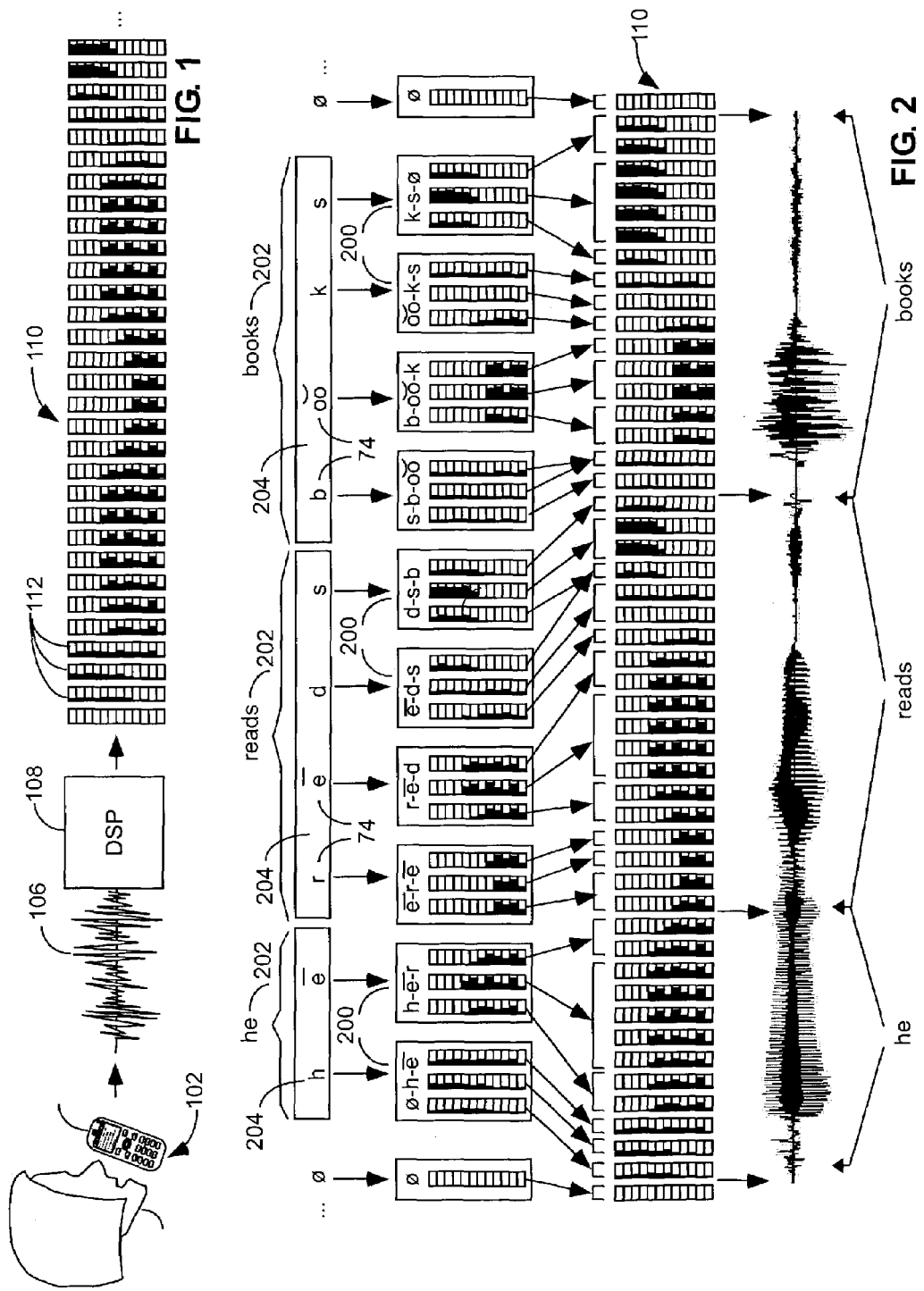

main loop~1300

-If following input is received~1301
        -Talk~1302
            -If there is text in SIP buffer, clear it~1304
            -if in correction mode, exit it removing the correction window~1306
            -Start SIP buffer recognition according to current recognition duration mode, with no prior current language context~1308
        -Clear~1310
            -if there is a correction window, exit it~1312
            -Clears SIP buffer without sending any deletions to OS text input~1314
        -Cont.~1316
            -if there is a correction window, exit it~1318
            -if cursor has language context in SIP buffer, use that as current language context~1322
            -else if the SIP buffer has no text, use last words in prior SIP buffer as current language context~1326
            -Start SIP buffer recognition according to current recognition duration mode, using current language context ~1330
        -Backspace~1332
            -if in correction mode, enter backspace into filter editor~1334
            -else enter back space into SIP buffer and OS text input~1336
        -New Paragraph~1338
            -if in correction mode, exit it~1340
            -Enter new paragraph character into SIP buffer and OS text input~1342
        -Space~1344
            -if in correction mode, enter space into filter editor~1346
            -else enter space into SIP buffer and OS text input~1348
        -Names recognition~1350
            -Set mode's recognition vocabulary to name vocabulary and start recognition according to current recognition duration mode and settings~1356
        -Punctuation recognition~1364
            -Set mode's recognition vocab. to punctuation vocab. and start mode recognition according to current recognition duration mode and settings~1370
        -Number recognition~1378
            -Set mode's recognition vocab. to number vocab. and start mode recognition according to current recognition duration mode and settings~1370

-FIG. 13

-Alphabravo recognition~1402
    -If display_alpha_on_double_click is not set or if double-click~1404
        -Display list of ICA words for duration of key press~1406
    -Set mode's recognition vocab. to alphabravo vocab. and start mode recognition according to current recognition duration mode and settings~1408
-Abc recognition~1410
    -Set mode's recognition vocab. to abc vocab. and start mode recognition according to current recognition duration mode and settings~1412
-Large Vocabulary recognition~1414
    -Set mode's recognition vocab. to large vocab. and start mode recognition according to current recognition duration mode and settings~1416
-Continuous/discrete toggle~1418
    -toggle between a continuous recognition mode using continuous-speech acoustic models and a discrete recognition mode using discrete-recognition acoustic models~1420
    -Start mode recognition according to current recognition duration mode and settings~1422
-Function~1424
    -call function menu~1426
-drag on Function~1428
    -call function menu in drag mode~1430
-Help~1432
    -call help mode~1434
-tap on word in buffer~1436
    -select word~1437
    -call displayChoiceList with word tapped on as selection, and with acoustic data associated with selection as first entry in the utterance list ~1438
-double tap on selection in buffer~1440
    -escape correction window~1442
    -Start SIP buffer recognition according to current recognition duration mode and settings, using current language context ~1444
-tap other than any word in SIP buffer~1446
    -plant cursor at location of tap~1448
    -if double tap~1450
        -Start SIP buffer recognition according to current recognition duration mode and settings, using current language contextA~1452
-drag across all of one word in buffer~1454
    -call displayChoiceList with dragged word as selection, and with acoustic data associated with selection as first entry in the utterance list~1456

-FIG. 14

-drag across parts of one or more words in buffer~1502
    -call displayChoiceList with all of dragged words as selection, and with acoustic data associated with selection as first entry in the utterance list~1504
-drag across initial part of individual word in buffer~1506
    -call displayChoiceList with partially dragged word as selection, with selection added to notChoiceList, with dragged initial portion of word as filter string, and with acoustic data associated with selection as first entry in the utterance list~1508
-drag across ending of individual word in buffer~1510
    -call displayChoiceList with partially dragged word as selection, with selection added to notChoiceList, with undragged initial portion of word as filter string, and with acoustic data associated with selection as first entry in the utterance list~1512
-...
-indication SIP buffer is full to warning level~1514
    -Display warning that buffer is close to full~1516
-indication that SIP buffer has received text input~1518
    -If cursor is not at end of SIP buffer~1520
        -output to OS a number of backspaces equal to distance from last letter of SIP buffer to cursor~1522
    -enter text input into SIP buffer at cursor~1526
    -output text to OS text input~1527
    -output any text following insertion into SIP buffer to OS Text input~1528
    -if in ~1534-if text input is from speech recognition~1536
        -call displayChoiceList for recognized text~1537
        -turn off correction mode~1538
    -...
-if in OneAtATime mode and a correction window is shown, but not in correction mode ~1539
    -if any of the above inputs are received, confirm recognition of first choice in correction window for text output, language context updating, language model updating, and acoustic model updating purposes~1540
-...
-if in correction window and following input is received~1542
    -Esc~1544
        -Exit correction window without changing selection~1546
    -del~1548
        -delete highlighted text in SIP buffer and send output causing corresponding deletion to OS~1550
    -new~1552
        -delete highlighted text in SIP buffer and send output causing corresponding deletion to OS~1553
        -set recognition modes to new utterance default~1554
        -Start SIP buffer recognition, independently of selection, current recognition duration mode and settings, using current language context~1556

-FIG. 15

-rUt~1602
    -if not in correction mode, enter it~1603
    -set recognition modes to reUtterance default~1604
    -Start receiving one or more re-utterance utterances according to current re-utterance recognition duration mode and settings~1606
    -add utterance (s) received to utterance for selection, along with an indication of the vocabulary and continuous or discrete recognition setting in effect for the re-utterance~1608
    -call displayChoiceList~1610
-filter~1612
    -if not in correction mode, enter it~1613
    -if current filter entry mode is a speech recogntion mode~1614
        -Start filter recognition according to current filter recognition duration mode and settings~1616
    -if current filter entry mode is an entry window mode~1618
        -call appropriate entry window~1620
-s~1622
    -if not in correction mode, enter it~1623
    -call WordFormList for first choice~1624
-Aa~1626
    -if not in correction mode, enter it~1627
    -call CapitalizeCycle for first choice~1628
-play~1630
    -play audio of selection's first utterance, if any~1632
-+W~1634
    -calls dialog box for entering current first choice into either active or backup vocabulary~1636
-check~1638
    -remove correction window~1642
    -output first choice to SIP buffer and feed characters to make corresponding change to OS~1648
-a choice~1650
    -remove correction window~1652
    -output selected choice to SIP buffer and feed characters to OS to make corresponding change~1653
-a choice's edit button~1654
    -if not in correction mode, enter it~1656
    -make that button's associated choice the first choice and the current filter string~1656
    -call displayChoiceList for selection with the new filter string~1658
-drag across initial part of choice (including first choice) ~1664
    -if not in correction mode, enter it~1665
    -call displayChoiceList for selection with choice added to notChoiceList, and with dragged initial portion of choice as filter string~1666

-FIG. 16

-drag across ending of choice (including first choice)~1702
    -if not in correction mode, enter it~1702
    -call displayChoiceList for selection with choice added to notChoiceList, and with undragged initial portion of word as filter string~1704

-drag across two choices~1706
    -if not in correction mode, enter it~1705
    -call displayChoiceList for selection with two choices added to notChoiceList, and with two choices as beginning and end of filterRange~1708

-tap between characters on first choice~1710
    -if not in correction mode, enter it~1711
    -move filter cursor to tapped location~1712

-backspace~1714
    -call filterEdit with input as backspace~1718
    -call displayChoiceList for selection with the new filter string~1720

-filtering input~1722
    -if in OneAtATime mode and filter input is produced by speech recognition~1724
        -if a filter character choice window is displayed~1726
            -close filter choice window~1728
            -call FilterEdit for change to filter string with the selected value for the selected filter character as the input~1730
    -call filterEdit with input~1732
    -call displayChoiceList for selection with the new filter string~1734
    -if in OneAtATime mode~1736
        -call filterCharacterChoice for the filter input~1738

-a selection of a filter character choice in a filter character choice window~1740
    -close filter choice window~1742
    -call FilterEdit for change to filter string with the selected value for the selected filter character as the input~1744
    -call displayChoiceList with new filter~1746

-drag up from a character of the filter string~1747
    -call filterCharacterChoice for the character~1748
    -if drag is release over a filter character choice, generate a select of filter character choice for that character~1749
    -else if drag is released elsewhere, close filter choice window~1750

-re-utterance(s) ~1752
    -add new utterance to selection's utteranceList~1754
    -call displayChoiceList for selection ~1756

-FIG. 17

-recognition duration logic~1800
    -if recognition duration type is~1802
        -Press Only~1804
            -if speech button pressed~1806
                -recognize during press~1808
        - Press & Click To Utt. End~1810
            -if speech button pressed~1812
                -recognize during press~1814
            -if speech button clicked~1816
                -recognize until next end of utterance~1818
        -Press Contin, Click Discrete To Utt. End~1820
            -if speech button clicked~1822
                -perform discrete recognition until next end of utterance~1824
            -if speech button pressed~1826
                -perform continuous recognize during press~1828
        -Click To Timeout~1830
            -if speech button clicked~1832
                -if recognition is on and press does not cause a change of vocabulary, turn recognition off~1834
                -if recognition is off, turn it on until time out~1836
            -if speech button pressed~1838
                -recognize during speech button press and then turn recognition off~1840

-FIG. 18

-Help Mode~1900
    -Display help window with info for help mode~1902
    -If user touches portion of SIP~1904
        -display help window with info for that portion as long as user keeps touching that portion~1906
    -if user d-clicks on portion of display~1908
        -keep help window with info for that portion up until user presses other portion of SIP~1910
    -If user clicks help button again~1912
        -remove help window and return from help mode~1914

-FIG. 19

-displayChoiceList (selection, filterString, FilterRange, wordType, notChoiceList)~2200
    -call getChoices with filterString, FilterRange and selection's utteranceList~2202
    -if there is no filter, no reutterance, and selection is not in notChoiceList~2204
        -make selection first choice~2206
    -remove any strings in notChoiceList from candidate list~2210
    -if a first choice has not been selected, make best scoring candidate first choice~2212
    -indicate letters of first choice corresponding to filter~2218
    -place filter cursor before first character of first choice not corresponding to filter~2220
    -if getChoice returns any non-first-choice candidates~2222
        -create a first character ordered choice list from a set of the best scoring such candidates that fit on one screen~2224
        -if more candidates~2226
            -create a second character ordered choice list of upto multiple screens from a set of the best scoring such candidates~2228
    -display correction window with first choice, showing a filter indication, if any, and the filter cursor, and with a first choice list, if any~2230

-FIG. 22

-getChoices(utteranceList, filterString, filterRange, wordType)~2300
   -if there has been a prior recognition for selection with current utterance list and filter values~2302
      -return with choices from prior recognition~2304
   -if a filterRange is non-null~2306
      -if filterRange is more specific than current filterString~2308
         -change filter string to common letters of filterRange~2310
      -else, null filterRange~2312
   -if utterance list is not empty~2314
      -if there are any candidates from a prior recognition of the current utterance list~2316
         -for each such candidate call filterMatch with word's recognition score and current filter definitions~2318
         -delete those candidate with return scores below a given threshold level~2320
      -if the number of prior recognition candidates is below a desired number ~2322
         -perform recognition on each entry in the utterance list including: ~2324
            -if there are both continuous and discrete entries in the utterance list~2326
               -limit the number of possible word candidates in recognition of the continuous entries to a number corresponding to the number of individual utterances detected in one or more of the discrete entries ~2328
            -recognizing each entry with either continuous or discrete recognition, depending upon the respective mode in effect when each such entry was received~2330
            -using filterMatch to aid in scoring and using language model, with polygram scores if there is a prior context for word, to produce list of scored acceptable candidates for each entry ~2332
         -if there was more than one entry in the utterance list~2334
            -pick list of best scoring candidates based on combination of scores from different recognitions~2336
   -if number of candidates is less than a desired amount and if there is a non-null filter definition~2338
      -use filterMatch to select a desired number of additional choices from the appropriate vocabulary~2340
   -if there are no candidates~2342
      -use best scoring character sequences matching filter string as choices, upto desired number~2344

-FIG. 23

-filterMatch(candidate, score, filterString, filterRange, wordType)~2600
    -If wordType is non-null~2602
        -If candidate is not of wordType~2604
            - return with score of zero~2606
    -if a filterRange is non-null~2608
        -if character ordering of word is between start and end of filterRange~2610
            -return with an unchanged score~2612
        -else return with score of zero~2614
    -else if there is a non-null filterString~2616
        -set current candidate character to first character in candidate~2618
        -until end of filter string~2620
            -if next element in filter string is ~2622
                -an unambiguous character~2624
                    -if current candidate character does not match filter character~2626
                        -return with score of zero~2628
                  -else increment position of current candidate character~2630
                -an ambiguous character~2632
                  -if current candidate character does not match one of recognized values of filter character~2634
                      -return with score of zero~2636
                  -else~2638
                      -alter word's score as a function of the probability the matching recognized value of the filter character~2640
                      -increment position of current candidate character~2642
                -an ambiguous length set of ambiguous character sequences~2644
                  -for each of character sequences of the set~2646
                      -if there is a matching sequence of characters starting at current candidate character~2648
                          -alter word's score as a function of the probability of the recognized matching sequence~2649
                          -increment current position of current candidate character by number of characters in the matching sequence~2650
                    -else~2651
                      -return with score of zero~2652
    -return with word's score~2653
-else return with unchanged score~2654

-FIG. 26

-wordFormList(selection)~2700
    -if correction window is already displayed~2702
        -treat current best choice as selection~2704
    -if selection is one word~2706
        -if word has any homonyms, place them at start of a choice list~2708
        -find root form of selection word~2710
        -create list of alternate grammatical forms for word~2712
        -alphabetically order alternate grammatical forms in choice list after homonyms~2714
    -else if selection is multiple words~2716
        -if selection has spaces between words~2718
            -add copy of selection with no spaces to choice list~2720
            -add copy of selection with hypens instead of spaces to choice list~2722
        -if selection has multiple elements subject to same or spelled/non-spelled form transformation~2724
            -add copy of selection, and all prior choices, with that transformation to choice list~2726
        -alphabetically order choice list~2728
-display correction window showing selection as first choice, filter cursor at the start of the first choice, and a scrollable choice list ~2730

-FIG. 27

-filterEdit(choice, filterString, filterCursor, input)~2800
    -if there are any characters in choice before filter cursor~2802
        -set old filter string equal to filter string~2804
        -make characters in choice before filter cursor a new filter string of unambiguous ~2806
    -if input is a backspace~2807
        -if cursor is a non-selection cursor~2808
            -delete the last character from new filter string~2810
        -clear old filter string and return~2812
    -else if input is unambiguous character(s) ~2814
        -add character(s) to filter string at a position corresponding to filter cursor~2816
    -in input is a sequence of one or more ambiguous characters of fixed lenght~2818
        -place a element representing each ambiguous character of the sequence at end of new filter~2820
    -if input is ambiguous length ambiguous input~2822
        -select best scoring sequence of letters returned by recognizer which, when added to prior unambiguous part of filter, correspond to all or initial part of a vocabulary word~2824
        -if there are no such sequence above a certain score ~2826
            -select best scoring letter sequences independent of vocabulary~2828
        -associate selected character sequence with a new ambiguous filter element~2830
        -add the new ambiguous filter element to end of new filter string~2832
    -for each filter elements in old filter string~2834
        -if old element is an ambiguous fixed-length element that extends beyond new fixed length element(s) ~2836
            -add old element that extends beyond new elements to end of new filter~2838
        -if old element is an ambiguous fixed length element that extends beyond some sequences in new ambig length element~2840
            -for each sequence in new ambig. length element, ~2842
                -for each sequence in current old ambiguous fixed length element~2844
                    -if sequence from old element, matches and extends beyond sequence in new element~2846
                        -associate with the new ambiguous length element a new character sequence corresponding to current sequence from new element plus extension from old element~2848
                        -indicate sequence from new element is to be deleted~2850

-FIG. 28

-if old element is an ambig. length element that extends beyond new fixed length element(s)~2900
    -for each sequence in old ambig. length element~2902
        -if sequence matches and extends beyond sequence in new element~2904
            -create a new sequence corresponding extension from old element~2906
    -if any such new sequences have been created~2908
        -add a new ambiguous length element to end of filter corresponding to such new sequences~2910
-if old element is an ambig. length element that extends beyond some sequences in new ambig length element~2912
    -for each sequence in new ambig length element, ~2914
        -for each sequence in old ambig length element~2916
            -if sequence from old element, matches and extends beyond sequence from new element~2918
                -associate with the new ambiguous length element a new character sequence corresponding to current sequence from new element plus extension from old element~2920
-return with new filter string~2924

-FIG. 29

-filterCharacterChoice(choice, filterString, selectedFilterChar)~3000

-if selected filter character corresponds to an ambiguous character or an unambiguous character in filter string having multiple best choice characters associated with it ~3002
        -set a filter character choice list equal to all characters associated with character ~3004
    -else if selected filter character corresponds to a character of ambiguous length filter string element~3006
        -if selected filter character is first character of ambiguous element~3008
            -set filter character choice list equal to all first characters in any of the ambiguous element's associated character sequences~3010
        -else~3012
            -set filter character choice list equal to all characters in any character sequence of the ambiguous element's that are preceded by the same characters as the selected filter character is in the current choice ~3014
-display filter character choice window with these choices~3016

-FIG. 30

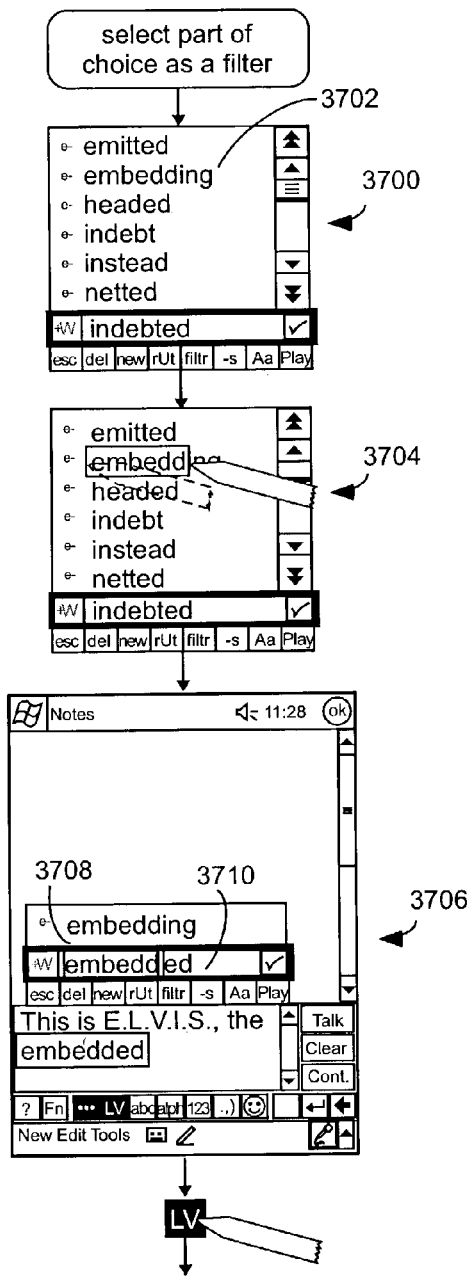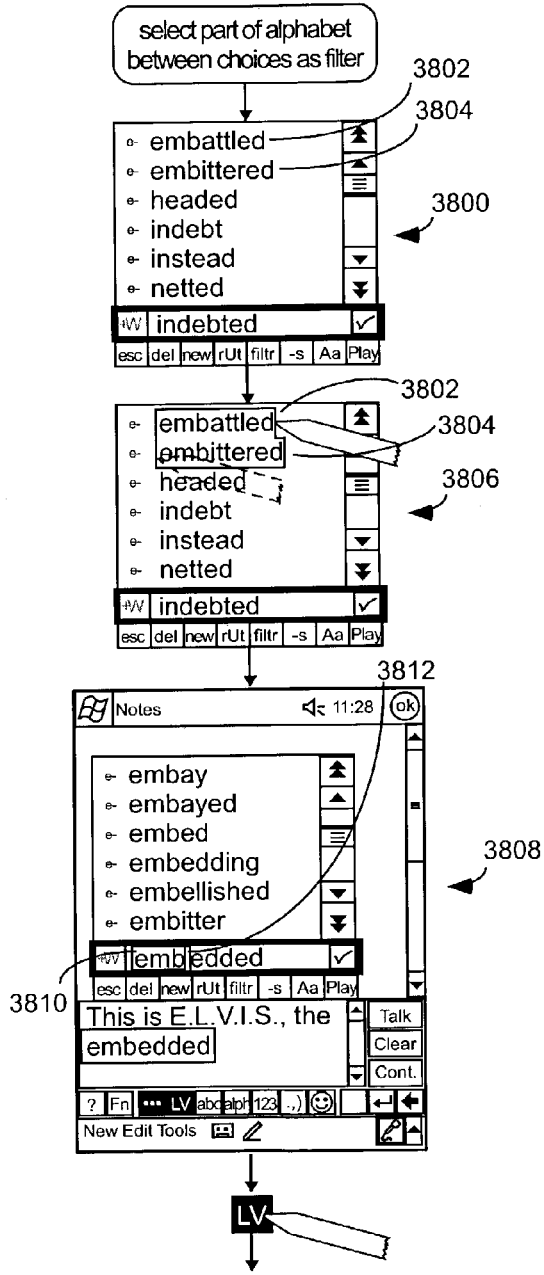
FIG. 37
FIG. 38

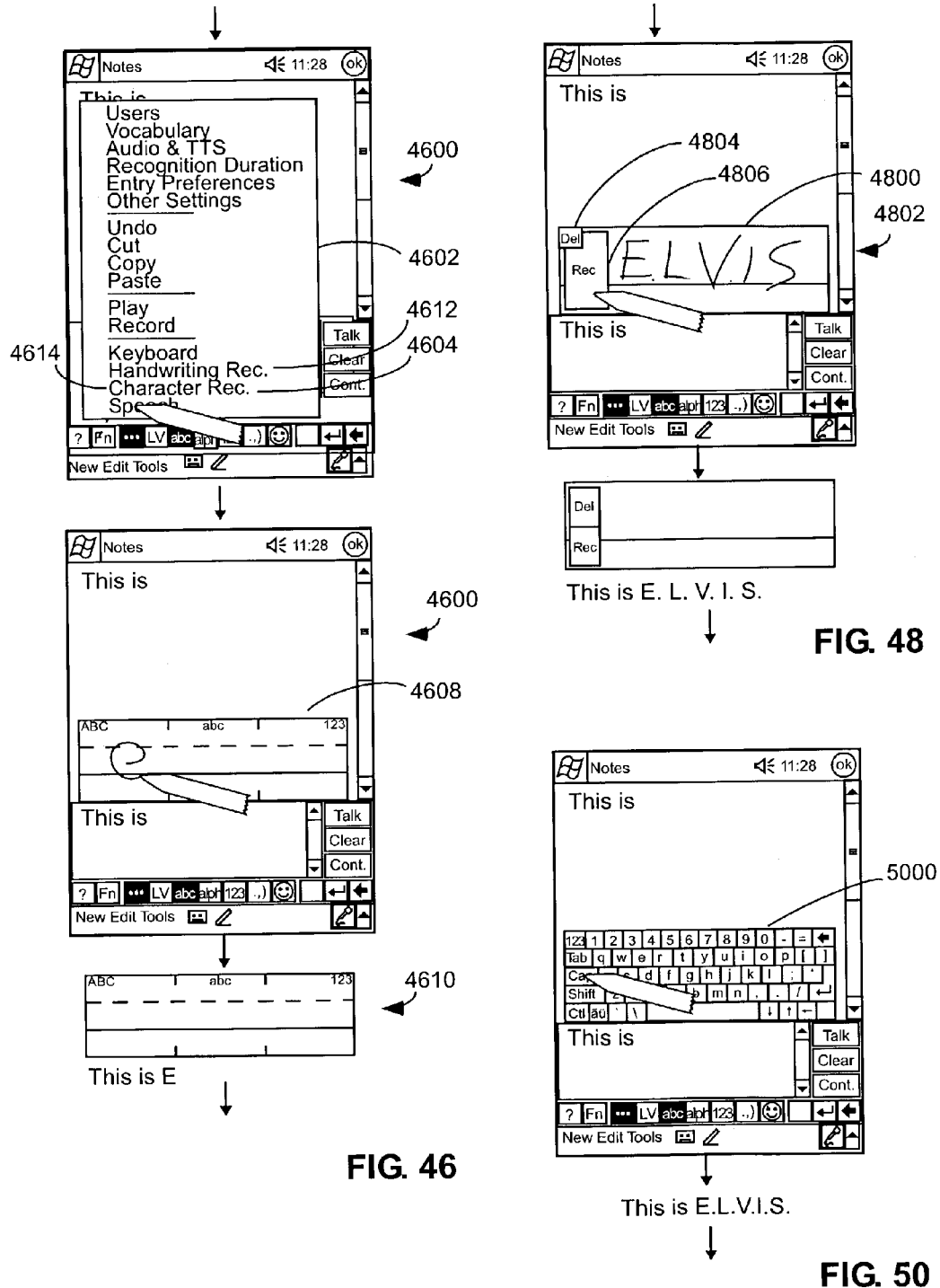

character rec mode~4700
    -display character recognition window~4702
    -loop until exit window~4704
        -if user touches window, record ink during touch (inless touch is in del. Button) ~4906
        -if user releases touch in window~4708
            -perform character recognition on ink in window~4710
            -clear window~4712
            -supply corresponding recognized output to SIP buffer and OS~4714

-FIG. 47

-handwriting recognition mode~4900
    -display handwriting recognition window~4902
    -loop until exit window~4903
        -if user touches window, record ink during touch (inless touch is in del. Button) ~4904
        -if user touches down in Rec. button~4905
            -perform handwriting recognition on ink previously in entry window~4906
            -supply recognized output to SIP buffer and OS~4908
            -clear window~4910
        -if user presses del. button~4912
            -clear window~4914

-FIG. 49

-displayChoiceList (selection, filterString, FilterRange, wordType, notChoiceList) [alt embodiment]
~2200A
    -call getChoices with filterString, FilterRange and selection's utteranceList~2202
    -if there is no filter, no reutterance, and selection is not in notChoiceList~2204
        -make selection first choice~2206
    -remove any strings in notChoiceList from candidate list~2210
    -if a first choice has not been selected, make best scoring candidate first choice~2212
    -indicate letters of first choice corresponding to filter~2218
    -place filter cursor before first character of first choice not corresponding to filter~2220
    -if getChoice returns any non-first-choice candidates~2222
        -create a score ordered choice list from a set of the best scoring such candidates entending up to multiple screens in length if enough choices~2224A
    -display correction window with first choice, showing a filter indication, if any, and the filter cursor, and with scrollable choice list, if any~2230A

-FIG. 58

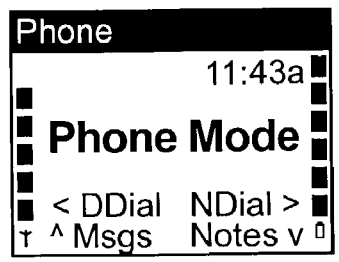
↓
⑦
⑦
⑧
①
⑨
⑦
↓
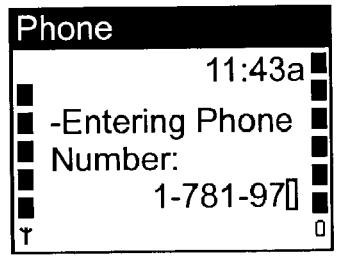
FIG. 62

-top level phone mode~6300
    -<
        -call digit dial~6302
    ->
        -call name dial~6304
    -^
        -call messages~6306
    -v
        -open editor for new item at end of note outline~6308
    -menu
        -call displayMenu for main menu~6312
    -menu-menu
        -call displayMenu for main menu~6316
        -set recognition vocabulary to displayed main menu's command vocabulary ~6318
        -treat last menu press as speech key for recognition duration purposes~6320
    -menu-press
        -call help for main menu~6324
    -talk
        -if phone is ringing~6328
            -answer it~6330
        -if there is a presently enter phone number~6332
            -dial it~6334
    -end
        -if not at top level phone mode~6338
            -go there~6340
    -basic phone pad key
        -If not already in phone number entry mode~6344
            -Enter number entry mode~6346
        -add key to current phone number~6348

-FIG. 63

-Main Menu~6500
    -display screen of menu items starting at item 1, with item one highlighted~6502
    -if user enters~6504
        -<> or page left/right
            -scroll menu choices up/down one screen, highlighting first item in new screen~6508
        -^v or item up/down
            -scroll highlight up/down by one item, scrolling display if necessary to show newly highlighted item on screen~6512
        -OK
            -selects current highlighted choice in menu, if any~6516
        -menu
            -if press is not part of double click~6520
                -return from all currently called menus~6522
        -menu-menu
            -set recognition vocabulary to displayed menu's command vocabulary~6526
            -treat last menu press as speech key for recognition duration purposes~6528
        -menu-press
            -call help for displayed menu~6532
        -talk
            -set recognition vocabulary to displayed menu's command vocabulary~6536
            -treat last menu press as speech key for recognition duration purposes~6538
        -end
            -save current state for a possible future resume~6542
            -go to phone mode~6544

-1-Name Dial
        -call name dial~6548
    -2-Digit Dial
        -call digit dial~6552
    -3-Speed Dial
        -call speed dial~6556

-FIG. 65

-4-Voice Messages
    -call voice messages~6604
-44-Email
    -call email~6608
-5-Editor
    -call editor with a blank file~6612
-55-Note Outline
    -call editor for new item at end of note outline~6616
-6-Contacts
    -call contacts~6620
-66-Schedule
    -call schedule~6624
-7-Web Browser
    -call web browser~6628
-8-Call History
    -call call history~6632
-9-Files
    -call file manage~6636
-*Escape
    -return from call to current menu~6640
-** or "Task List
    -go to Task List? ~6644
-0-Main Options Menu
    -call displayMenu for Main Options Menu~6648

-FIG. 66

FIG. 67 — Cmds: Editor <P^|
1-Entry Mode Menu
2-Choice List
22-Filter Choices
3-Nav. Mode Menu
4-Descret Recog.
5-Selection Strt/Stp
55-Select All
6-Play/Rec. Start/Stop
66-Record Start/Stop
7-Capitalize Menu
77-Capitlize Cycle
8-Word Form List
88-Word Type Menu
9-Basic Keys Menu
99-New Para
*-Escape
**-Task List
0-Edit Opt. Menu
00-Undo
-Backspace

FIG. 68 — MENU: Entry Mode
1-Large Vocab. Rec
2-ABC Rec
22-Ambig. ABC Rec
3-AlphaBravo Rec
33-KeyAlpha Rec
4-123 Rec
44-Key Numbers
5-Punctuation Rec
6-Name Rec
7-Key Characters
77-Ambiguous Key
8-Contin/Discrete
88-One@ATime Rec
9-Entry Preferences
*-Escape
**-Task List

FIG. 69 — Cmds: Corr.Wnd<P^|
1-Entry Mode Menu
2-Choice Nav
22-Filter Nav
3-Corr. Nav. Modes
4-Choose 4
5-Choose 5
6-Choose 6
7-Choose 7
*-Escape
**-Task List
0-Edit. Opt. Menu
00-Undo
-Backspace

FIG. 70 — MENU: Edit Nav.
1-Utterance Start
2-Word/Char
3-Word/Line
4-Doc/Page
5-Outline Lev./Item
6- Audio Item/5sec.
66-AudioItem/30Sec
7-Undo List/Item
8-File Lev/Item
9-Utterance End
*-Escape
**-Task List

FIG. 71 — MENU: Corr. Nav
2-Page/Item Nav.
22-Word/Char Nav.
3-Word/Char Nav.
4-Pre-Choice Filter
5-Choice Filter
6-PostChoice Filter
7-Capitalize
8-Word Form List
*-Escape
**-Task List

FIG. 72 — Cmds:KeyAlpha<P^|
1-Entry Mode Menu
2-abc
3-def
4-ghi
5-jkl
6-mno
7-pqrs
8-tuv
9-wzxy
*-Escape
**-Task List
0-KeyPunctuation
00-Space
-Backspace

FIG. 73 — MENU: Basic Keys
1-Punctuation menu
2-Question Mark
3-Colon
4-Semicolon
5-Comma
6-Period
7-Hyphen
8-Space
88-Tab
9-New Paragraph
*-Escape
**-Task List
-Backspace

FIG. 74 — MENU: Edit Options
1-Files Menu
2-Edit Menu
3-Entry Peferences
4-TTS Menu
44-TTS On/Off
5-Outline Menu
55-Expand Item
6-Audio Menu
7-User Menu
8-Find
88-Find Again
9-Vocab. Menu
*-Escape
**-Task List
0-Undo
00-Undo
-Redo -Editor mode~7600
    -if user selects~7602
        -<,>,^,v~7603
            -if in word/line nav~7604
                -if user selects Word Left/Right~7606
                      -if extended selection is on~7608
                          -move cursor one word to left/right and extend previous selection to that word~7610
                      -else~7612
                          -if prior input was a Word Left/Right command of different direction making a word the selection or if move would put cursor before/after end of text~7614
                              -place cursor to left/right of prior selection and remove prior selection~7615
                          -else~7616
                              -move cursor one word to left/right of current position and make that word the current selection~7617
                -if user selects Line Up/Down~7618
                    -move cursor to the nearest word on line up/down from current cursor position~7620
                    -if extended selection is on~7622
                        -extend selection through that current word~7624
            -if in ... nav~7626
                -...
    -OK
        -if editor has been called to enter text into another program~7630
            -enter content of editor to that other program and return~7632
        -else save editors content and return~7634
    -Menu
        -call displayMenu for editor commands~7638
    -MenuMenu
        -call displayMenu for editor commands~7642
        -set recognition vocabulary to displayed editor's command vocabulary~7644
        -treat last menu press as speech key for recognition duration purposes~7646
    -MenuPress
        -call help for editor ~7650
    -Talk
        -turn on recognition according to current recognition settings, treating press as speech key for recognition duration purposes~7654
    -End
        -go to phone mode~7658

-FIG. 76

-1 or "Entry Mode Menu"
    -call displayMenu for Entry Mode Menu~7702
-2 or "Choice List"
    -set correction window nav mode to Page/Item~7706
    -call Correction Window for current selection~7708
-22 or "Filter Choices"
    -set correction window nav mode to Word/Char~7712
    -call correctionWindow for current selection~7714
    -treat second press of double-click as speech key press for recognition duration purposes~7716
-3 or "Nav. Mode Menu"
    -call displayMenu for Nav Mode menu~7720
-4 or "Discrete Recog."
    -turn on discrete recognition according to current vocabulary using Press & Click To Utterance End as the recognition duration setting~7724
-5 or "Selection Start/Stop"
    -toggle extended selection between on and off~7728
    -if extended selection has just been turned of~7730
        -de-select any prior selection other than current cursor~7732
-55 or "Select All"
    -select all of current document~7736
-6 or "Play/Record Start/Stop"
    -if not recording audio~7740
        -toggle play between on and off~7742
            -if on phone call and Play Only to Me is Off~7744
                -send audio from play over phone line as well as to phone's speaker or headphone out~7746
    -else if recording audio~7748
        -turn recording off~7750
-66 or "Record"
    -turn audio recording on~7754
    -if on phone call and Record Only Me is Off~7756
        -record audio from other side of phone line as well as phone,s microphone~7758
-7 or "Capitalize Menu"
    -call displayMenu for Capitalize Menu~7762
-77 or "Capitalize Cycle"
    -call CapitalizeCycle~7766
-8 or "Word Form List"
    -call word form list~7770
-88 or "Word Type Menu"
    -call displayMenu for Word Type Menu~7774

-FIG. 77

-9 or "Basic Keys Menu"
    -call displayMenu for Basic Keys Menu~7802
-99 or "New Para"
    -enter a new paragraph character into text~7806
-* or "Escape"
    -if editor has been called to input or edit text in another program~7810
        -returns from call from editor with edited text for insertion into that program~7812
    -else~7818
        -prompt user with choice of exiting editor, saving its contents, or canceling escape~7820
        -if user selects to escape~7822
            -escape to phone mode~7824
-** or "Task List"
    -go to Task List~7828
-0 or Edit Options Menu
    -call displayMenu for Edit Options Menu~7832
-00 or Undo
    -undo last command~7836
-# or Backspace
    -if there is a selection~7840
        -delete it~7842
    -else~7844
        -if current smallest navigational unit is a character, word, or outline item~7846
            -delete backward by that unit~7848

-FIG. 78

-Entry Mode Menu~7900
   -if user selects~7902
      -...
         -1 or "Large Vocab. Rec"
            -set recognition vocabulary to Large vocabulary~7906
            -treat press selecting mode as speech key press for recognition duration purposes~7907
            -if in Correction Window~7908
                -set recognition mode to discrete~7910
                -add utterance (s) recognized in this mode to utterance list as a new utterance for selection, along with an indication of the vocabulary and continuous or discrete recognition setting in effect for the re-utterance~7912
                -call displayChoiceList~7914
         -2 or "ABC Rec"
            -set recognition to vocabulary letter vocabulary and indicates that recognition results are to be treated ambiguousli~7920
            -treat press selecting mode as speech key press for recognition duration purposes~7922
         -22 or "Ambiguous ABC"~7924
            -if in a correction window~7925
                -set recognition vocabulary to letter vocabulary and indicate that an output is to be treated as an ambiguous filter~7926
                -treat press selecting mode as speech key press for recognition duration purposes~7928
         -3 or "AlphaBravo Rec"
            -set recognition vocabulary to 79CA vocabulary~7932
            -treat press selecting mode as speech key press for recognition duration purposes~7934
         -33 or "KeyAlpha Rec"
            -call KeyAlpha mode~7938
         -4 or "123 Rec"
            -set recognition vocabulary to digit vocabulary~7942
            -treat press selecting mode as speech key press for recognition duration purposes~7944
         -44 or "Key Numbers"
            -respond to pressing of any numbered phone keys as the entry of corresponding number, with "*" escaping mode, and "#" backspacing~7948
         -5 or "Punctuation Rec"
            -set recognition vocabulary to punctuation vocabulary~7952
            -treat press selecting mode as speech key press for recognition duration purposes~7954

-FIG. 79

-6 or "Name Rec"
    -set recognition vocabulary to contact name vocabulary~8002
    -treat press selecting mode as speech key press for recognition duration purposes~8004
-7 or "Key Characters"
    -respond to pressing of phone keys as traditional non-ambiguous phone key spelling,
    with "1" calling Entry Mode Menu, "*" escaping mode, and "#" backspacing~8008
-77 or "Ambiguous Key"
    -respond to each press of phone key labeled with set of letters as corresponding to one
    of those letters, with "1" calling Entry Mode Menu, "*" escaping mode, and "#"
    backspacing~8012
-8 or "Continuous/Discrete Rec"
    -if in continuous mode~8016
        -switch to discrete mode~8018
        -sound de-de-de tone~8020
    -if in discrete mode~8022
        -switch to continuous mode~8024
        -sound deeeeeee tone~8026
-88 or One@Atime
    -enter One@Atime Mode~8030
-9 or "Entry Preferences"
    -call displayMenu for Entry Preferences~8034
    -return to Editor
-* or "Escape"
    -return to Editor~8040
-** or "Task List"
    -go to Task List~8044

-FIG. 80

-correctionWindow (selection)~8100
    -set recognition mode during call to that of filter default~8102
    -call displayChoiceList for selection~8104
    -loop~8106
        -if user inputs
            -in Page/Item nav~8108
                -<> or "Page Left/Right"~8112
                    -scroll choice lists by a page up/down, moving highlight by one page~8114
                -^v or "Item Up/Down"~8116
                    -scroll highlighted choice up/down by one choice, scrolling screen if necessary to display highlighted choice~8118
            -in Word/Char nav~8120
                -<> or "Word Left/Right"~8122
                    -if there is a first/last character of word with in 7 characters to left/right of filter cursor in best choice~8124
                        -move filter cursor to that first/last character~8126
                  -else if there is a character 5 characters to left/right of filter cursor in best choice~8128
                        -move filter cursor to that character~8130
                  -else if filter cursor is after last character in best choice~8132
                    -if scroll would not extend beyond rightmost character in all of the choices~8134
                        -scroll choice window left/right by 5 character's width~8135.
                -if the character moved to is an ambiguous character, call filterCharacterChoice~8136
              -^v or "Character Up/Down"~8142
                -if filter cursor is after last character in best choice~8144
                    -if scroll would not extend beyond rightmost character in all of the choices~8146
                        -scroll choice window left/right by one character's width~8147
                -else if filter cursor is not before/after start/end of best choice~8148
                    -move filter character cursor left/right by one character~8150
        -if the filter cursor has been moved to a new character~8151
            - call filterCharacterChoice for that character~8152
        -if a filter character choice list has been displayed and subsegent input is received ~8153
            -if the input is choice in the filter character choice window~8154
                -close filter choice window~8156
                -call FilterEdit for change to filter string with the selected value for the selected filter character as the input~8158
                -call displayChoiceList with new filter~8160
            -else remove filter character choice list~8162

-FIG. 81

-MENU
    -call displayMenu for Correction Window~8202
-MENU-MENU
    -call displayMenu for correctionWindow's commands~8206
    -set recognition vocabulary to displayed Correction Window's command vocabulary~8208
    -treat last menu press as speech key for recognition duration purposes~8210
-MenuPress
    -call help for correctionWindow ~8250
-TALK
    -turn on recognition according to current recognition settings, treating press as speech key for recognition duration purposes~8214
-END
    -save current state for a possible future resume~8218
    -go to phone mode~8220
-OK
    -if a choice is highlighted~8224
        -select it~8226
    -else~8228
        -select first choice~8230
    -return to editor and insert selected choice at current selection or cursor~8232
-1 or "Entry Mode Menu"
    -call displayMenu for Entry Mode Menu~8236
-2 or "Choice Nav"
    -remove display of any filter character choice lists~8240
    -set correction window nav mode to Page/Item nav~8242
    -play audio of selection's first utterance, if any~8244
-22 or "Filter Nav"
    -set correction window nav mode to Word/Char nav~8248
    -treat second press of double-click as speech key press for recognition duration purposes~8250
-3 or "Corr. Nav Modes"
    -call displayMenu for Correction Nav Modes~8254

-FIG. 82

-a choice number
- -if in Choice Filter Mode~8302
  - -call displayChoiceList with selected choice as filter string and enter word/char nav if not in it~8304
- -else if in Pre-Choice Filter Mode~8306
  - -and enter word/char nav if not in it~8308
  - -call displayChoiceList with selected choice as end of filterRange, and prior choice (or point before beginning of character ordering) as end of filterRange~8310
- -else if in Post-Choice Filter Mode~8312
  - -and enter word/char nav. In not in it~8314
  - -call displayChoiceList with selected choice as start of filterRange, and following choice (or point after end of character ordering) as end of filterRange~8316
- -else~8318
  - -return to editor and insert selected choice at current selection or cursor~8320

-double-click on a choice number
- -call displayChoiceList with selected choice as filter string and enter word/char nav. In not in it~8324

-*Escape
- -return to editor from correction window without any changes to editors selection or cursor, and with any selection existing before call to correction window still selected~8328

-** or "Task List"
- -go to Task List~8332

-0-Edit Options Menu
- -call displayMenu for Edit Options Menu~8336

-00-Undo
- -undo last command in correction window~8340

-#-backspace
- -call filterEdit any portion of the first choice before the filter cursor as the filter string, with the filter cursor, with backspace as input~8350
- -call displayChoiceList for selection with the new filter string~8352

-filtering characters
- -call filterEdit for input~8356

-re-utterance(s)
- -add new utterance to selection's utteranceList~8360
- -call displayChoiceList for selection~8362

-FIG. 83

-Edit Nav Menu~8400
    -if user enters~8402
       -...
        -1 or "Utterance Start"~8404
           -if a current last utterance~8406
              -select as cursor the text corresponding to first word in utterance and return~8408
        -2 or "Word/Char"~8410
           -change nav mode to Word/Char and return~8412
        -3 or "Word/Line"~8414
           -change nav mode to Word/Line and return~8416
        -4 or "Doc/Screen"~8418
           -change nav mode to Doc/Sreen and return~8420
        -5 or "Outline Lev./Item"~8422
           -change nav mode to Outline Lev/Item and return~8424
        -6 or "Audio Item/5sec"~8426
           -set sound display to high resolution~8428
           -change nav mode to Audio Item/5sec and return~8430
        -66 or "Autio Item/30sec"~8432
           -set sound display to low resolution~8434
           -change nav mode to Audio Item/30sec and return~8436
        -7 or "Undo List/Item"~8438
           -change nave mode to Undo List/Item and return~8440
        -8 or "File Lev/Item"~8442
           -change nav mode to File Lev/Item and return~8444
        -9 or "Utterance End"~8446
           -if a current last utterance~8448
              -select as cursor the text corresponding to last word in utterance and return~8450
        -* or "Escape"~8452
           -return to editor~8454
        -** or "Task List"~8456
           -go to Task List~8458

-FIG. 84

-Corr. Nav Menu~8500
 -if user enters~8502
  -...
   -2 or "Page/Item"~8504
    -change nav mode to Page/Item and return~8506
   -22 or "Word/Char"~8508
    -change nav mode to Word/Char and return~8510
   -3 or "Word/Char"~8512
    -change nav mode to Word/Char and return~8514
   -4 or "Pre-Choice Filter"~8516
    -set Correction Window to Pre-Choice Filter Mode~8518
    -change nav mode to Page/Item and return~8520
   -5 or "Choice Filter"~8522
    -set Correction Window to Choice Filter Mode~8524
    -change nav mode to Page/Item and return~8526
   -6 or "Post-Choice Filter"~8528
    -set Correction Window to Post-Choice Filter Mode~8530
    -change nav mode to Page/Item and return~8532
   -7 or "Capitalize"~8534
    -cycle capitization of best choice and return~8536
   -8 or "Word Form List"~8538
    -cause word form list to be displayed for best scoring word and return~8540
   -* or "Escape"~8542
    -return~8544
   -** or "Task List"~8546
    -go to Task List~8548

-FIG. 85

-KeyAlpha Mode~8600
    -set nav mode to Word/Char~8602
    -overlay following responses to following keys~8604
        -TALK
            -turn on recognition for alphabravo recognition according to current recognition settings, treating press as speech key for recognition duration purposes, outputting letters corresponding to recognized ICA word~8608
        -1 or "Entry Mode Menu"
            -call displayMenu for Entry Mode Menu~8612
        -2 through 9
            -during press of key~8616
                -prompt with alphabetical list of ICA words corresponding to key's letters~8618
                -substantially limit vocabulary to displayed ICA words~8620
                -turn on recognition~8622
                -output letter corresponding to recognized ICA word~8624
        -0
            -enter KeyPunctuation Mode~8628
        -00-Space
            -output space~8632
        -#-Backspace
            -if there is a selection~8636
                -delete it~8638
            -else~8640
                -if current smallest navigational unit is a character, word, or outline item~8642
                    -delete backward by that unit~8644

-FIG. 86

-KeyAlpha Mode(1st Alt Embodiment) ~8700
   -set nav mode to Word/Char~8602
   -overlay following responses to following keys~8604
      -TALK
         -turn on recognition for large vocabulary recognition according to current recognition settings, treating press as speech key for recognition duration purposes, outputting initial letter of each recognized word~8608A
      -1 or "Entry Mode Menu"
         -call displayMenu for Entry Mode Menu~8612
      -2 through 9
         -during press of key~8616
            -prompt use to say a word starting with desired one of key's letters~8618A
            -substantially limit vocabulary to words starting with one of the key's associated letters~8620A
            -turn on recognition~8622
            -output initial letter corresponding to recognized word~8624A
      -0
         -enter KeyPunctuation Mode~8628
      -00-Space
         -output space~8632
      -#-Backspace
         -if there is a selection~8636
            -delete it~8638
         -else~8640
            -if current smallest navigational unit is a character, word, or outline item~8642
               -delete backward by that unit~8644

-FIG. 87

-KeyAlpha Mode(2nd Alt Embodiment) ~8800
    -set nav mode to Word/Char~8602
    -overlay following responses to following keys~8604
        -TALK
            -turn on recognition for <u>vocabulary of 5 or fewer words starting with each letter of the alphabet</u> according to current recognition settings, treating press as speech key for recognition duration purposes, outputting <u>initial letter of each recognized word</u>~8608A
        -1 or "Entry Mode Menu"
            -call displayMenu for Entry Mode Menu~8612
        -2 through 9
            -during press of key~8616
                -prompt <u>use to say ont of the words starting with desired one of</u> key's letters~8618A
                -substantially limit vocabulary to <u>the limited vocabulary of words starting with one of the key's associated letters</u>~8620A
                -turn on recognition~8622
                -output <u>initial</u> letter corresponding to <u>recognized word</u>~8624A
        -0
            -enter KeyPunctuation Mode~8628
        -00-Space
            -output space~8632
        -#-Backspace
            -if there is a selection~8636
                -delete it~8638
            -else~8640
                -if current smallest navigational unit is a character, word, or outline item~8642
                    -delete backward by that unit~8644

-FIG. 88

-Edit Options Menu~8900
  -...
  -1 or "Files Menu"~8902
  -2 or "Edit Menu"~8904
  -3 or "Entry Preferences"~8906
  -4 or "TTS Menu"~8908
    -...
    -1-TTS Keys On/Off~8909
    -4 TTS On/Off~8910
      -toggle TTS on/off, using command TTS to inform user~8912
      -if toggling on~8914
        -if there is a selection~8916
          -use text TTS say "Selection:" and then the selection itself~8918
        -else~8920
          -use text TTS play starting at current cursor until the end of the document or user input other than cursor movement within the document~8922
    -5 TTS Selection~8924
      -use text TTS say "Selection:" and then the selection itself~8926
    -6 TTS Cont. Play on/off~8928
      -toggle TTS Continuous Play on/off, using command TTS to inform user~8930
    -...
-44 or "TTS On/Off"~8932
-5 or "Outline mode"~8934
-55 or "Expand/Collapse Item"~8936
-6 or "Audio Menu"~8938
  -1-Audio Navigation~8940
    -1-5sec/1sec~8942
    -2-10sec/2sec~8944
    -3-30sec/5sec~8946
    -4-Item/5sec~8948
    -...
  -2-playback settings~8950
    -1-volume~8952
    -2-speed~8954
    -3-all audio~8956
    -4-non-recognition audio~8958
    -5-recognition audio~8960

-FIG. 89

-3-Recognize audio options dialog~9000
    -give user options to select~9002
        -to recognize the audio in current selection~9004
        -to recognize the audio in current document~9006
        -if previously recognized audio is to be re-recognized~9008
        -to set quality of recognition~9010
    -provide estimate of recognition time with current quality setting~9012
    -provide status of current job, if any~9014
    -...
-4-delete from selection~9016
    -1-non-recognition audio~9018
    -2-recognition audio~9020
    -3-all audio~9022
    -4-text~9024
-5-show recognition audio>on/off~9026
-6-record recognition audio on/off~9028
-7-transcription mode dialog~9030
-7 or "User Menu"~9032
-8 or "Find"~9034
    -call search dialog box, with current selection, if any as the search string~9036
-88 or "Find Again"~9038
-9 or "Vocab. Menu"~9040
-* or "Escape"~9042
-** or "Task List"~9044
-0 or "Undo"~9046
-00 or "Undo"~9048
-# or "Redo"~9050

-FIG. 90

-Word Type Menu~9100
    -if current selection is not a single word~9102
        -prompt that Word Type only works on single word selections and return~9104
    -change active vocabulary during call to word type vocabulary~9106
    -if user selects~9108
        -...
        -1 or "Ends"~9110
            -call displayMenu with a menu offering option to change to a corresponding word with following ending type (where appropriate for selection)~9112
                -1-ed/not-ed~9114
                -2-s/not-s~9116
                -3-'s/s~9118
                -4-'s/not-'s~9120
                -5-ing/not-ing~9122
                -6-ly/not-ly~9124
                -7-ingly/not-ingly~9126
                -8-er/not-er~9128
            -...
        -2 or "Starts"~9130
            -call displayMenu with a menu offering option to change to a corresponding word with following prefix (where appropriate for selection)~9132
                -1-un-~9134
                -2-re-~9136
            -...
        -3 or Tense~9138
            -call displayMenu with a menu offering option to change to a corresponding word with following tense (where appropriate for selection)~9140
                -1-present~9142
                -2-past~9144
                -3-past perfect~9146
            -...

-FIG. 91

-4 or "Part Of Speech"~9200
    -call displayMenu with a menu offering option to call a displayChoiceList for selected word with wordType limited to a word with the following part of speech (where appropriate for selection)~9202
        -1-noun~9204
        -2-pronoun~9206
        -3-article~9208
        -4-adjective~9210
        -5-adverb~9212
        -6-verb~9214
        -7-conjunction~9216
        -8-preposition~9218
        -9-interjection~9220
-5 or "Possessive/Non-Possesive"~9222
    -replace selection with corresponding possessive/non-possesive form~9224
-6 or "Singular/Plural"~9226
    -replace selection with corresponding singular/plural noun form~9228
-7 or "Singular/Plural subject"~9230
    -replace selection with corresponding singular/plural verb form~9232
-8 or "Spelled/Non-Spelled"~9234
    -replace selection with corresponding spelled/non-spelled form~9236
-9 or "Homonym"~9238
    -if there is only one homonym~9240
        -replace selection with that homonym~9242
    -else if there are multiple homonyms~9244
        -display correction window with current word as first choice and any homonyms and alternate forms of selected word as alternate choices~9246

-FIG. 92

-Entry Preferences Menu~9300
    -...
        -1 or "Dictation Defaults"~9302
            -1-Continuous~9304
            -2-Descrete~9306
            -3-One@ATime~9308
            -4 or "Press Only"~9330
            -5 or "Press & Click To Utt. End"~9332
            -6 or "Press Contin, Click Discrete To Utt. End~9334
            -7 or "Click To Timeout"~9336
            -8 or "Set Timeout"~9338
        -2 or "Filter Defaults"~9310
            -1-Continous~9312
            -2-Descrete~9314
            -3-One@Atime~9316
            -4-Abc~9318
            -5-Ambig. Abc~9320
            -6-Keyalpha~9322
            -7 or "Press Only"~9330
            -8 or "Press & Click To Utt. End"~9332
            -9 or "Press Contin, Click Discrete To Utt. End~9334
        -3 or "Reutterance Defaults"~9324
            -1-Continuous~9326
            -2-Descrete~9328
            -3 or "Press Only"~9330
            -4 or "Press & Click To Utt. End"~9332
            -5 or "Press Contin, Click Discrete To Utt. End~9334
    -4 or "Press Only"~9330
    -5 or "Press & Click To Utt. End"~9332
    -6 or "Press Contin, Click Discrete To Utt. End~9334
    -7 or "Click To Timeout"~9336
    -8 or "Set Timeout"~9338
    -...

-FIG. 93

-TTS play rules~9400
    -when TTS is on~9402
        -if TTS keys in on~9404
            -if key has been pushed down~9406
                -if same key has not been pressed within TTSKeyTime~9408
                      -until key is let up~9410
                          -TTS number of key and its command and if has an associated double-click command, that commands name~9412
                -else respond to key as normally (including double-clicks)~9414
        -if recognize or otherwise receive command~9416
            -use command TTS to say name of recognized command~9418
        -if recognize a text utterance~9420
            -wait until end of utteranace~9422
            -use text TTS to say words recognized for utterance~9424
        -if recognize string of letters(such as for filtering)~9426
            -waits until end of utteranace~9428
            -use text TTS to say letters recognized for utterance~9430
        -if user moves cursor to select new word or character~9432
            -use text TTS to say new word or character~9434
            -if there is an extended selection~9436
                -after brief pause use text TTS to say "selection" and then the words in the selection itself~9438
        -if user moves cursor to position between or before or after character or word~9440
            -use text TTS to say "cursor" between <word before> and <word after>~9442
        -if a new correction window is displayed~9444
            -use text TTS to say first choice, to spell the filter, if any, and then each candidate in the first choice list and its associated selection number~9446
        -if user scrolls an item in correction window~9448
            -use text TTS to say currently highlighted choice and its selection numbers~9450
        -if user scrolls a page in correction window~9452
            -use text TTS to say newly displayed choices and associated selection numbers~9454
        -if enter a menu~9456
            -use menu TTS to say all of choices in menu and their selection numbers, indicating current selection~9458
        -if user scrolls up/down in menu~9460
            -use menu TTS to say highlighted choices, and then after a brief pause any following selections on page with selection numbers~9462

-FIG. 94

-TTS speech generation~9500
  -...
  -If word is in speech recognition's vocabulary of phonetically spelled words~9502
    -If word has different phonetic spellings for different parts of speech and if word has current linguistic context~9504
      -Use speech recognition's part of speech indicating code to select phonetic spelling of probable part of speech for word~9506
    -Else~9508
      -select the single or most common phonetic spelling for the word~9510
    -Use the phonetic spelling selected for word as phonetic spelling for TTS speech generation~9512
  -Else~9514
    -User pronunciation-guesser used by speech recognition to assign phonetic spelling to names and newly entered word for TTS speech generation~9516
  -...

-FIG. 95

-transcription mode~9600
-change navigation to audio 5sec/1sec~9602
-during transcription mode map following functions over play key~9604
        -if user clicks play key~9606
                -if play is off, turn it on~9607
                -else if play is on, turn it off~9608
                -if toggling play on~9610
                        -if there has been no sound navigation since last play~9612
                        -start play backLength before end of last play~9614
        -if user presses play key~9616
                -if play is on, turn it off~9618
                -turn on large vocabulary recognition during press in continuous or discrete mode according to current setting~9620
                -place recognized text into audio at location at which end of play~9622
        -if user double-clicks the play key~9624
                -prompt user that there is no record in transcription mode which can be turned off in Edit Options /Audio Menu~9626

-FIG. 96

- Dialog Box Editor (dialog box)~9700
    -display editor window for start of dialog box~9702
    -respond to commands as editor mode except~9704
        -if the user selects OK, execute dialog box with current setting~9706
        -if the user supplies a navigational input, ~9707
            -the cursor moves in a manner similar to that and in the editor except that can normally only move to a control that can be typed in~9708
        -if cursor is in field and user selects a text input command command~9710
            -display a separate editor window for field, showing its current contents if any~9712
            -if there are any limitations on vocabulary in field~9714
                -limit recognition vocabulary accordingly~9716
            -execute selected command for that new editor window~9718
        -if cursor is in choice list, and user selects a text input command~9720
            -display correction window for choice list showing current values in list box as best choice and which scrollable choice list for other selections~9722
        -if cursor is in check box or radio button and user selects a text input command~9724
            -change state of check box or radio button~9726

-FIG. 97

-help(state)~9800
    -display scrollable help menu for state, including description of state along with selectable list of help options and all of state's commands~9802
    -if user selects)~9804
        -any key except OK, Menu,<,>,^,v, and End)~9806
            -move to selection in menu and place selection highlight on it)~9808
            -call help with key's associated command as the state)~9810
        -Page Left/Right)~9812
            -scroll page up/down, moving selection highlight with scroll)~9814
        -Line Up/Down)~9816
            -scroll line up/down, moving selection highlight with scroll)~9818
        -OK)~9820
            -If current selection is Help Options)~9822
                -Display menu of help options)~9824
            -If current selection is a command of current help state)~9826
                -call help with key's associated command as the state)~9828
            -Select help or function for current selection, if any)~9830
        -if user selects Escape)~9832
            -return from current help call)~9834

-FIG. 98

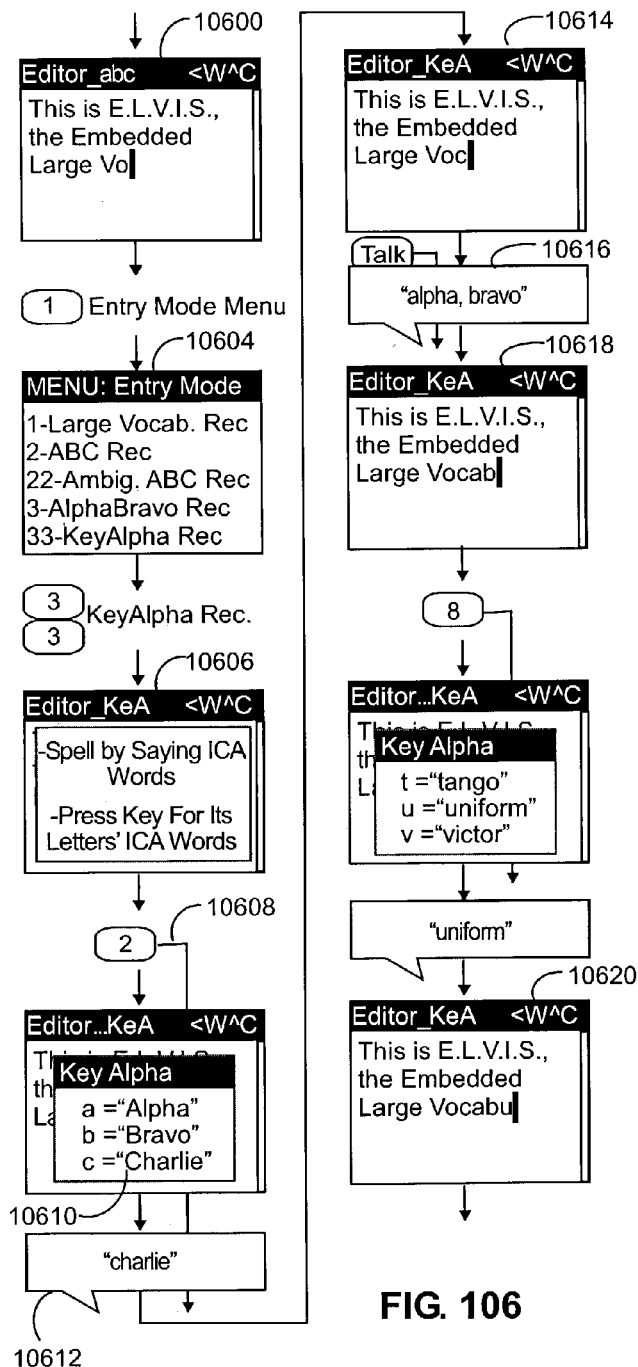
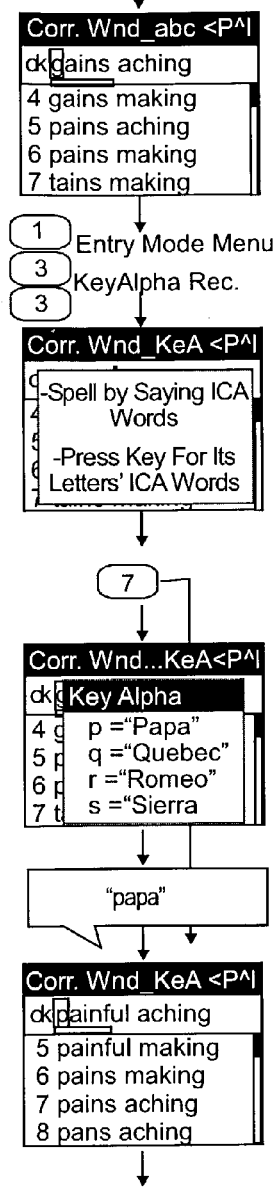
FIG. 106
FIG. 107

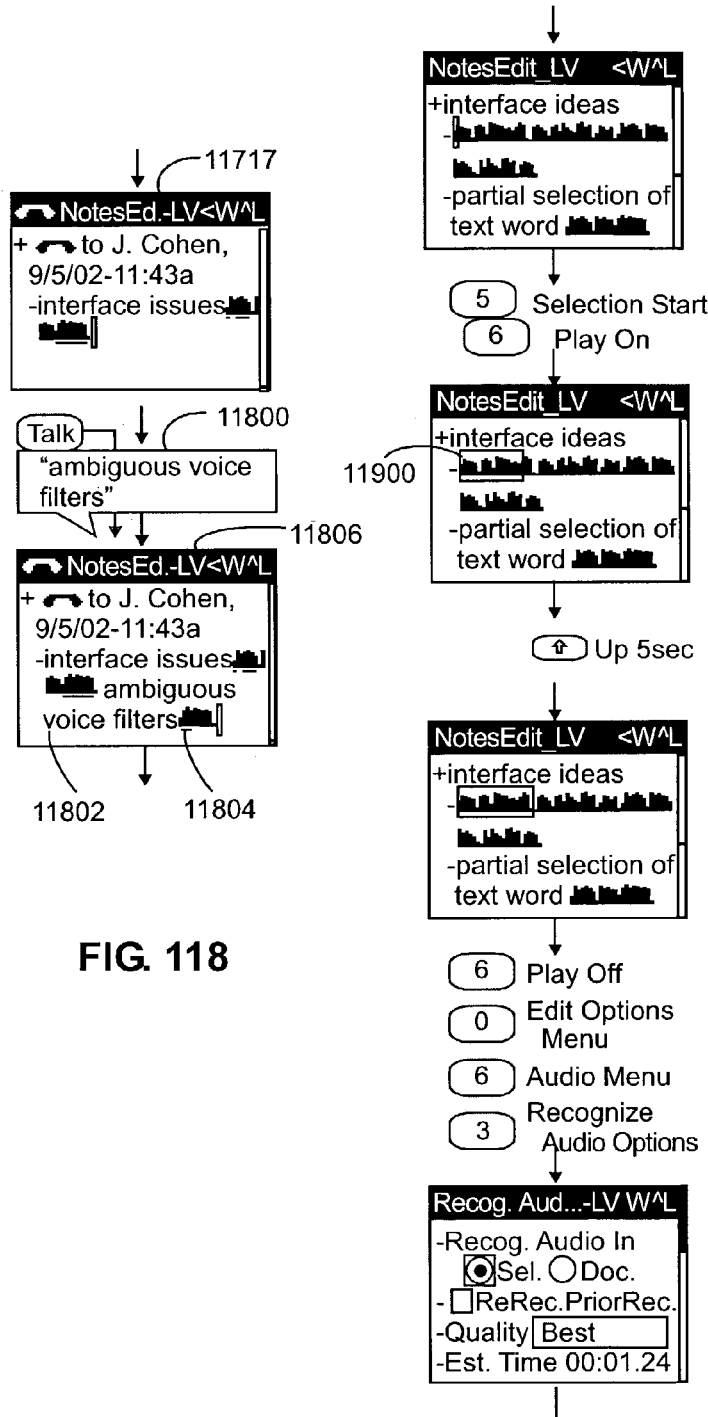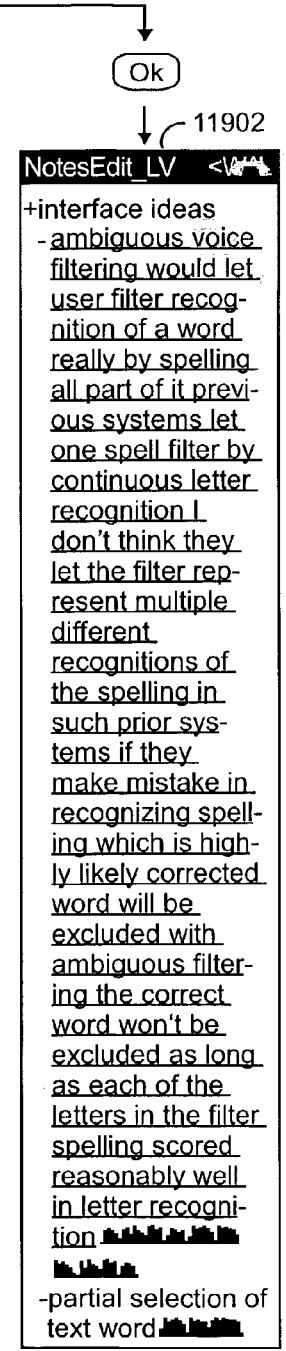
FIG. 118
FIG. 119

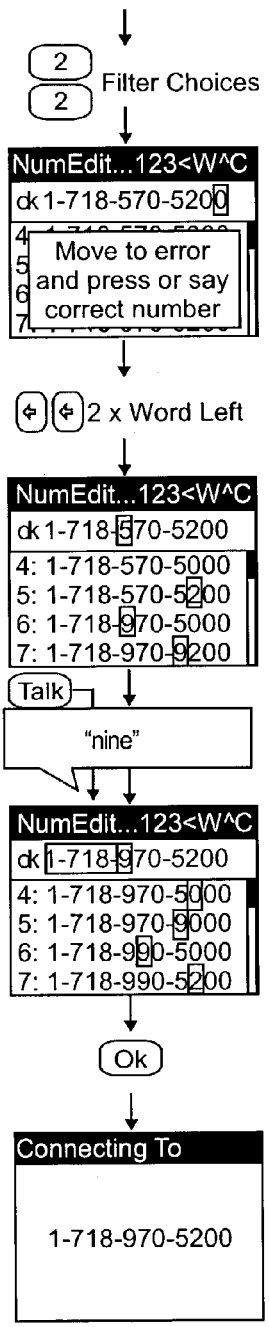
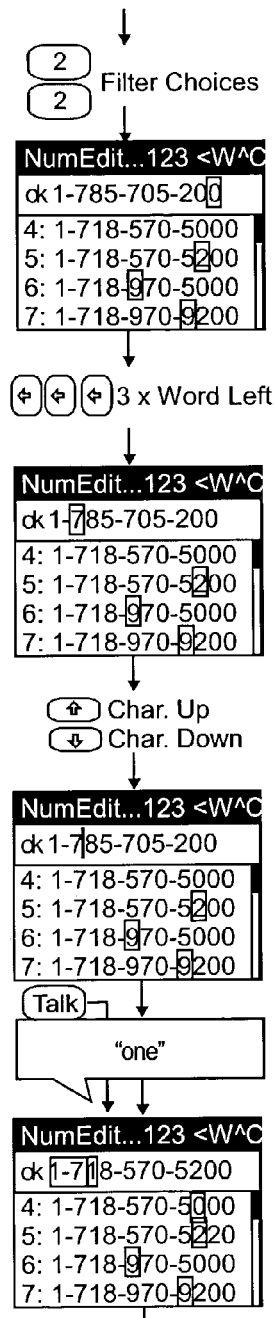
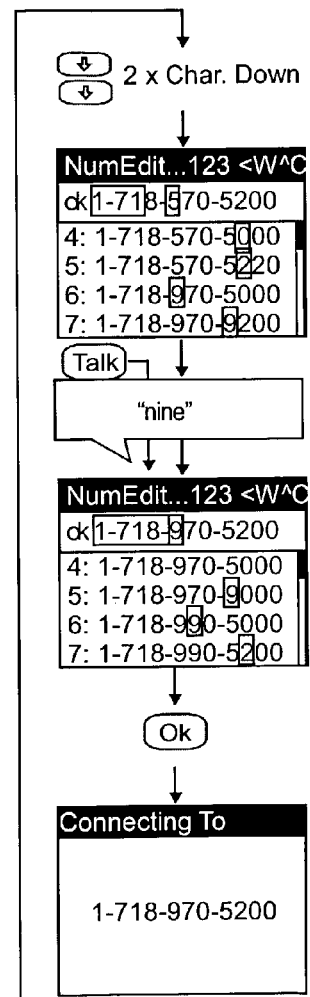
FIG. 124
FIG. 125

-Name dial~11900
    -until first input~11902
        -Prompt user to say or spell name from contact list~11904
    -loop~11906
        -if utterance of a name is recognized~11908
            -call getChoices with utterance and filter string to perform recognition on utterance with vocabulary limited to names from system's contact list and the filter string~11910
            -set nav. mode to Page/Item~11912
            -create first alphabetically ordered choice list (one screen) and a second second ordered choice list (up to multiple screens) from recognition results~11914
            -display best choice plus first ordered choice list with filter cursor before the first letter of first choice not corresponding to the filter string~11916
        -if a alphabetic filtering character for a character position is received~11918
            -call filterEdit with input~11920
            -call getChoices for filter string and any prior name utterance~11922
            -set nav. mode to Page/Item~11924
            -if there is no prior name utterance~11926
                -create one alphabetically ordered choice list of contact names which have initial letters corresponding to filter~11928
            -display choice list with first word in list as best choice and with filter cursor before the first letter of first choice not corresponding to the filter~11930
        -if user selects displayed choice candidate~11932
            -dial chosen name's phone number~11934
        -if user selects filter mode (2), set nav mode to Word/Char~11936
        -if user selects choice mode (22), set nav mode to Page/Item~11938
        -if in Page/Item nav~11940
            -if user selects page left/right~11942
                -scroll choice lists by a page up/down, moving highlight by one page~11944
            -if user selects item up/down~11946
                -scroll highlighted choice up/down by one choice, scrolling screen if necessary to display highlighted choice~11948
        -if in Word/Char nav~11950
            -if user selects word left/right~11952
                -move current character selection to before/after the first/last character of displayed best choice~11954
            -if user selects character up/down~11956
                -if filter cursor is not before/after best choice~11958
                    -move filter cursor left/right by one character~11960

-FIG. 129

-Digit dial~12600
    -Prompt user to say digits of phone number~12602
    -perform continuous digit recognition on utterance~12604
    -if confirmation is not required and confidence is above a required level~12606
        -dial recognized number~12608
    -if best choice has a score above a required level~12610
        -set nav. mode to Page/Item~12612
        -create first ordered choice list (one screen) and a second second ordered choice list (upto multiple screens) from recognition results~12614
        -display best choice plus first ordered choice list with current selection of first digit in best choice~12616
    -loop~12618
        -if user selects displayed choice candidate~12620
            -dial candidate number~12622
        -if user selects filter mode (2), set nav mode to Word/Char~12624
        -if user selects choice mode (22), set nav mode to Page/Item~12626
        -if in Page/Item nav~12628
            -if user selects page left/right~12630
                -scroll choice lists by a page up/down, moving highlight by one page~12632
            -if user selects item up/down~12634
                -scroll highlighted choice up/down by one choice, scrolling screen if necessary to display highlighted choice~12636
        -if in Word/Char nav~12638
            -if user selects word left/right~12640
                -move current character selection to first/last digit of displayed best choice~12642
            -if user selects character up/down~12644
                -if prior input was a character up/down command of different direction or if move would put character selection before/after end of best choice~12646
                    -change current character selection to an insertion cursor immediately before/after prior current character selection~12648
                -else~12650
                    -move current character selection left/right by one digit~12652
        -if user inputs one or more digits at a current cursor~12654
            -if current character selection is a digit,~12656
                -replace selection with new digit(s)~12658
            -if current character selection is an insertion cursor~12660
                -insert digit(s) at cursor~12662
        -filter number choices with all digits up to and including changed or inserted digit(s) as the filter string~12666
        -create a new first ordered choice list (one screen) and a new second ordered choice list from filtered recognition results~12668
        -redisplay new best choice and first choice list~12670

-FIG. 130

METHODS, SYSTEMS, AND PROGRAMMING FOR PERFORMING SPEECH RECOGNITION

RELATED APPLICATIONS

This application is a continuation-in-part of, and claims the priority of, a parent application, U.S. patent application Ser. No. 10/302,053, entitled "Methods, Systems, and Programming For Performing Speech Recognition", filed on Sep. 5, 2002 by Daniel L. Roth et al., now abandoned, which parent application claimed the benefit of the following U.S. provisional applications, all of which were filed on Sep. 5 2001:

U.S. Provisional Patent App. 60/317,333, entitled "Systems, Methods, and Programming For Speech Recognition Using Selectable Recognition Modes" by Daniel L. Roth et al.

U.S. Provisional Patent App. 60/317,433, entitled "Systems, Methods, and Programming For Speech Recognition Using Automatic Recognition Turn Off" by Daniel L. Roth et al.

U.S. Provisional Patent App. 60/317,431, entitled "Systems, Methods, and Programming For Speech Recognition Using Ambiguous Or Phone Key Spelling And/Or Filtering" by Daniel L. Roth et al.

U.S. Provisional Patent App. 60/317,329, entitled "Systems, Methods, and Programming For Phone Key Control Of Speech Recognition" by Daniel L. Roth et al.

U.S. Provisional Patent App. 60/317,330, entitled "Systems, Methods, and Programming For Word Recognition Using Choice Lists" by Daniel L. Roth et al.

U.S. Provisional Patent App. 60/317,331, entitled "Systems, Methods, and Programming For Word Recognition Using Word Transformation Commands" by Daniel L. Roth et al.

U.S. Provisional Patent App. 60/317,423, entitled "Systems, Methods, and Programming For Word Recognition Using Filtering Commands" by Daniel L. Roth et al.

U.S. Provisional Patent App. 60/317,422, entitled "Systems, Methods, and Programming For Speech Recognition Using Phonetic Models" by Daniel L. Roth et al.

U.S. Provisional Patent App. 60/317,421, entitled "Systems, Methods, and Programming For Large Vocabulary Speech Recognition In Handheld Computing Devices" by Daniel L. Roth et al.

U.S. Provisional Patent App. 60/317,430, entitled "Systems, Methods, and Programming For Combined Speech And Handwriting Recognition" by Daniel L. Roth et al.

U.S. Provisional Patent App. 60/317,432, entitled "Systems, Methods, and Programming For Performing Re-Utterance Recognition" by Daniel L. Roth et al.

U.S. Provisional Patent App. 60/317,435, entitled "Systems, Methods, and Programming For Combined Speech Recognition And Text-To-Speech Generation" by Daniel L. Roth et al.

U.S. Provisional Patent App. 60/317,434 entitled "Systems, Methods, and Programming For Sound Recording" by Daniel L. Roth et al.

FIELD OF THE INVENTION

The present invention relates to methods, systems, and programming for performing speech recognition.

BACKGROUND OF THE INVENTION

Discrete large-vocabulary speech recognition systems have been available for use on desktop personal computers for approximately 10 years by the time of the writing of this patent application. Continuous large-vocabulary speech recognition systems have been available for use on such computers for approximately five years by this time. Such speech recognition systems have proven to be of considerable worth. In fact, much of the text of the present patent application is being prepared by the use of a large vocabulary continuous speech recognition system.

As used in this specification and the claims that follow, when we refer to a large-vocabulary speech recognition system, we mean one that has the ability to recognize a given utterance as being any one of at least two thousand different vocabulary words, depending upon which of those words has corresponding phonetic models that most closely match the given spoken word As indicated by FIG. 1, large-vocabulary speech recognition typically functions by having a user 100 speak into a microphone 102, which in the example of FIG. 1 is a microphone of a cellular telephone 104. The microphone transduces the variation in air pressure over time caused by the utterance of words into a corresponding waveform represented by an electronic signal 106. In many speech recognition systems this waveform signal is converted by digital signal processing performed either by a computer processor or by a special digital signal processor 108, into a time domain representation. Often the time domain representation comprises a plurality of parameter frames 112, each of which represents properties of the sound represented by the waveform 106 at each of a plurality of successive time periods, such as every one-hundredth of a second.

As indicated in FIG. 2, the time domain, or frame, representation of an utterance to be recognized is then matched against a plurality of possible sequences of phonetic models 200 corresponding to different words in a large vocabulary. In most large-vocabulary speech recognition systems, individual words 202 are each represented by a corresponding phonetic spelling 204, similar to the phonetic spellings found in most dictionaries. Each phoneme in a phonetic spelling has one or more phonetic models 200 associated with it. In many systems the models 200 are phoneme-in-context models, which model the sound of their associated phoneme when it occurs in the context of the preceding and following phoneme in a given word's phonetic spelling. The phonetic models are commonly composed of the sequence of one or more probability models, each of which represents the probability of different parameter values for each of the parameters used in the frames of the time domain representation 110 of an utterance to be recognized.

One of the major trends in personal computing in recent years has been the increased use of smaller and often more portable computing devices.

Originally most personal computing was performed upon desktop computers of the general type represented by FIG. 3. Then there was an increase in usage of even smaller personal computers in the form of laptop computers, which are not shown in the drawings because laptop computers have roughly the same type of computational capabilities and user interface as desktop computers. Most current large-vocabulary speech recognition systems have been designed for use on such systems.

Recently there has been an increase in the use of new types of computers such as the tablet computer shown in FIG. 4, the personal digital assistant computer shown in FIG. 5, cell phones which have increased computing power, shown in FIG. 6, wrist phone computers represented in FIG. 7, and a wearable computer which provides a user interface with a screen and eyetracking and/or audio output provided from a head wearable device as indicated in FIG. 8.

Because of recent increases in computing power, such new types of devices can have computational power equal to that of the first desktops on which discrete large vocabulary recognition systems were provided and, in some cases, as much computational power as was provided on desktop computers that first ran large vocabulary continuous speech recognition. The computational capacities of such smaller and/or more portable personal computers will only grow as time goes by.

One of the more important challenges involved in providing effective large-vocabulary speech recognition on ever more portable computers is that of providing a user interface that makes it easier and faster to create, edit, and use speech recognition on such devices.

SUMMARY OF THE INVENTION

One aspect of the present invention relates to speech recognition using selectable recognition modes. This includes innovations such as: allowing a user to select between recognition modes with and without language context; allowing a user to select between continuous and discrete large-vocabulary speech recognition modes; allowing a user to select between at least two different alphabetic entry speech recognition modes; and allowing a user to select from among four or more of the following recognitions modes when creating text: a large-vocabulary mode, a letters recognizing mode, a numbers recognizing mode, and a punctuation recognizing mode.

Another aspect of the invention relates to using choice lists in large-vocabulary speech recognition. This includes innovations such as: providing character-ordered choice lists; providing vertically scrollable choice lists; providing horizontally scrollable choice lists; and providing choice lists on characters in an alphabetic filter used to limit recognition candidates.

Another aspect of the invention relates to enabling users to select word transformations. This includes innovations such as enabling a user to choose one from a plurality of transformations to perform upon a recognized word so as to change it in a desired way, such as to change from singular to plural, to give the word a gerund form, etc. It also includes innovations such as enabling a user to select to transform a selected word between an alphabetic and non-alphabetic form. It also includes innovations such as providing a user with a choice list of transformed words corresponding to a recognized word and allowing the user to select one of the transformed words as output.

Another aspect of the invention relates to speech recognition that automatically turns recognition off in one or more specified ways. This includes innovations such as a large-vocabulary speech recognition command that turns on recognition and then automatically turns such recognition off until receiving another command to turn recognition back on. It also includes the innovation of speech recognition in which pressing a button causes recognition for a duration determined by the length of time of such a press, and in which clicking the same button causes recognition for a length of time independent of the length of such a click.

Another aspect of the invention relates to phone key control of large-vocabulary speech recognition. This includes the innovations of using phone keys to select a word from a choice list; of using them to select a help mode that provides explanation about a subsequently pressed key; and of using them to select a list of functions currently associated with phone keys. It also includes the innovation of speech recognition of having a text navigation mode in which multiple numbered phone keys concurrently have multiple different key mappings associated with them, and the pressing of such a key causes the functions associated with the numbered phone keys to change to the mapping associated with the pressed key.

Another aspect of the invention relates to speech recognition using phone key alphabetic filtering and spelling. By alphabetic filtering we mean favoring the speech recognition of words including a sequence of letters normally an initial sequence of letters, corresponding to a sequence of letters indicated by user input. This aspect of the invention includes the innovation of using as filtering input the pressing of phone keys, where each key press is ambiguous in that it indicates that a corresponding character location in a desired word corresponds to one of a plurality of letters identified with that phone key. This aspect of the invention also includes the innovation of using as filtering input a sequence of phone key presses in which the number of zero or more repeated presses of a given key provides a non-ambiguous indication of which of multiple letters associated with the key are intended for use in the filter. This aspect of the invention also includes the innovation of using such ambiguous and non-ambiguous phone key input for spelling text that can be used in addition to text produced by speech recognition.

Another aspect of the invention relates to speech recognition that enables a user to perform re-utterance recognition, in which speech recognition is performed upon both a second saying of a sequence of one or more words and upon an early saying of the same sequence to help the speech recognition better select one or more best scoring text sequences for the utterances.

Another aspect of the invention relates to the combination of speech recognition and text-to-speech (TTS) generation. This includes the innovation of having speech recognition and TTS software sharing resources such as phonetic spellings and letter-to-sound rules. It also includes the innovation of a large vocabulary speech recognition system that has at least one mode which automatically uses TTS to say recognized text after its recognition and uses TTS or recorded audio to say the names of recognized commands after their recognition. This aspect of the invention also includes the innovation of a large vocabulary system that automatically repeats recognized text using TTS after each utterance. This aspect also includes the innovation of a large vocabulary system that enables a user to move back or forward in recognized text, with one or more words at the current location after each such move being said by TTS. This aspect also includes the innovation of a large vocabulary system that uses speech recognition to produce a choice list and provides TTS output of one or more of that list's choices.

Another aspect of the invention relates to the combination of speech recognition with handwriting and/or character recognition. This includes the innovation of selecting one or more best-scoring recognition candidates as a function of recognition of both handwritten and spoken representations of a sequence of one or more words to be recognized. It also includes the innovation of using character or handwriting recognition of one or more letters to alphabetically filter speech recognition of one or more words. It also includes the innovations of using speech recognition of one or more letter-identifying words to alphabetically filter handwriting recognition, and of using speech recognition to correct handwriting recognition of one or more words.

Another aspect of the invention relates to the combination of large-vocabulary speech recognition with audio recording and playback. It includes the innovation of a handheld device with both large-vocabulary speech recognition and audio recoding in which users can switch between at least two of the following modes of recording sound input: one which records audio without corresponding speech recognition output; one that records audio with corresponding speech recognition output; and-one that records the audio's speech recognition output without corresponding audio. This aspect of the invention also includes the innovation of a handheld device that has both large-vocabulary speech recognition and audio recoding capability and that enables a user to select a portion of previously recorded sound and to have speech recognition performed upon it. It also includes the innovation of a large-vocabulary speech recognition system that enables a user to use large-vocabulary speech recognition to provide a text label for a portion of sound that is recorded without corresponding speech recognition output, and the innovation of a system that enables a user to search for a text label associated with portions of unrecognized recorded sound by uttering the label's words, recognizing the utterance, and searching for text containing those words. This aspect of the invention also includes the innovation of a large vocabulary system that allows users to switch between playing back previously recorded audio and performing speech recognition with a single input, with successive audio playbacks automatically starting slightly before the end of prior playback. This aspect of the invention also includes the innovation of a cell phone that has both large vocabulary speech recognition and audio recording and playback capabilities.

BRIEF DESCRIPTION OF THE DRAWINGS

These and other aspects of the present invention will become more evident upon reading the following description of the preferred embodiment in conjunction with the accompanying drawings:

FIG. 1 is a schematic illustration of how spoken sound can be converted into acoustic parameter frames for use by speech recognition software.

FIG. 2 a schematic illustration of how speech recognition, using phonetic spellings, can be used to recognize words represented by a sequence of parameter frames such as those shown in FIG. 1, and how the time alignment between phonetic models of the word can be used to time align those words against the original acoustic signal from which the parameter frames have been derived.

FIGS. 13 through 17 provide a highly simplified pseudocode description of the responses that the speech recognition SIP makes to various inputs, particularly inputs received from its graphical user interface.

FIG. 18 is a highly simplified pseudocode description of the recognition duration logic used to determine the length of time for which speech recognition is turned on in response to the pressing of one or more user interface buttons, either in the speech recognition SIP shown in FIG. 9 or in the cellphone embodiment shown starting at FIG. 59.

FIG. 19 is a highly simplified pseudocode description of a help mode that enables a user to see a description of the function associated with each element of the speech recognition SIP of FIG. 9 merely by touching it.

FIG. 22 is a highly simplified pseudocode description of a display Choice List routine used in various forms by both the speech recognition SIP a FIG. 9 and the cellphone embodiment of FIG. 59 to display correction windows.

FIG. 23 is a highly simplified pseudocode description of the get Choices routine used in various forms by both the speech recognition SIP and the cellphone embodiment to generate one or more choice list for use by the display choice list routine of FIG. 22.

FIG. 26 is a highly simplified pseudocode description of a filter Match routine used by the get Choices routine to limit correction window choices to match filtering input, if any, entered by a user.

FIG. 27 is a highly simplified pseudocode description of a word Form List routine used in various forms by both the speech recognition SIP and the cellphone embodiment to generate a word form correction list that displays alternate forms of a given word or selection.

FIGS. 28 and 29 provided a highly simplified pseudocode description of a filter Edit routine used in various forms by both the speech recognition SIP and cellphone embodiment to edit a filter string used by the filter Match routine of FIG. 26 in response to alphabetic filtering information input from a user.

FIG. 30 provides a highly simplified pseudocode description of a filter Character Choice routine used in various forms by both the speech recognition SIP and cellphone embodiment to display choice lists for individual characters of a filter string.

FIG. 37 shows how a user of the SIP can correct such a mis-recognition by selecting part of an alternate choice in the correction window and using it as a filter for selecting the desired speech recognition output.

FIG. 38 shows how a user of the SIP can select two successive alphabetically ordered alternate choices in the correction window to cause the speech recognizer's output to be limited to output starting with a sequence of characters located between the two selected choices in the alphabetic.

FIG. 46 illustrates how the speech recognition SIP also enables a user to input characters by drawn character recognition.

FIG. 47 is a highly simplified pseudocode description of a character recognition mode used by the SIP when performing drawn character recognition of the type shown in FIG. 46.

FIG. 48 illustrates how the speech recognition SIP lets a user input text using handwriting recognition.

FIG. 49 is a highly simplified pseudocode description of the handwriting recognition mode used by the SIP when performing handwriting recognition of the type shown in FIG. 48.

FIG. 50 illustrates how the speech recognition system enables a user to input text with a software keyboard.

FIG. 58 is a highly simplified description of an alternate embodiment of the display choice list routine of FIG. 22 in which the choice list produced orders choices only by recognition score, rather than by alphabetical ordering as in FIG. 22.

FIG. 62 illustrates that the cellphone of FIG. 59 allows traditional phone dialing by the pressing of numbered phone keys.

FIG. 63 is a highly simplified pseudocode description of the command structure of the cellphone of FIG. 59 when in its top level phone mode, as illustrated by the screen shown in the top of FIG. 62.

FIGS. 65 and 66 provide a highly simplified pseudocode description of the operation of the main menu illustrated in FIG. 64.

FIGS. 67 through 74 illustrate command mappings of the cellphone's numbered keys in each of various important modes and menus associated with a speech recognition text editor that operates on the cellphone of FIG. 59.

FIGS. 76 through 78 provide a highly simplified pseudocode description of the responses of the cellphone's speech recognition program when in its text window, editor, mode.

FIGS. 79 and 80 provide a highly simplified pseudocode description of an entry mode menu, that can be accessed from various speech recognition modes, to select among various ways to enter text.

FIGS. 81 through 83 provide a highly simplified pseudocode description of the correction Window routine used by the cellphone to display a correction window and to respond to user input when such correction window is shown.

FIG. 84 is a highly simplified pseudocode description of an edit navigation menu that allows a user to select various ways of navigating with the cellphone's navigation keys when the edit mode's text window is displayed.

FIG. 85 is a highly simplified pseudocode description of a correction window navigation menu that allows the user to select various ways of navigating with the cellphone's navigation keys when in a correction window, and also to select from among different ways the correction window can respond to the selection of an alternate choice in a correction window.

FIGS. 86 through 88 provide highly simplified pseudocode descriptions of three slightly different embodiments of the key Alpha mode, which enables a user to enter a letter by saying a word starting with that letter and which responds to the pressing of a phone key by substantially limiting such recognition to words starting with one of the three or four letters associated with the pressed key.

FIGS. 89 and 90 provide a highly simplified pseudocode description of some of the options available under the edits options menu that is accessible from many of the modes of the cellphone's speech recognition programming.

FIGS. 91 and 92 provide a highly simplified description of a word type menu that can be used to limit recognition choices to a particular type of word, such as a particular grammatical type of word.

FIG. 93 provides a highly simplified pseudocode description of an entry preference menu that can be used to set default recognition settings for various speech recognition functions, or to set recognition duration settings.

FIG. 94 provides a highly simplified pseudocode description of text to speech playback operation available on the cellphone.

FIG. 95 provides a highly simplified pseudocode description of how the cellphone's text to speech generation uses programming and data structures also used by the cellphone's speech recognition.

FIG. 96 is a highly simplified pseudocode description of the cellphone's transcription mode that makes it easier for a user to transcribe audio recorded on the cellphone using the device's speech recognition capabilities.

FIG. 97 is a highly simplified pseudocode description of programming that enables the cellphone's speech recognition editor to be used to enter and edit text in dialogue boxes presented on the cellphone, as well as to change the state of controls such as list boxes check boxes and radio buttons in such dialog boxes.

FIG. 98 is a highly simplified pseudocode description of a help routine available on the cellphone to enable a user to rapidly find descriptions of various locations in the cellphone's command structure.

FIG. 106 illustrates how the KeyAlpha recognition mode can be used to enter alphabetic input into the cellphone's text editor window.

FIG. 107 illustrates operation of the key Alpha mode shown in FIG. 86.

FIG. 118 illustrates how speech recognition can be turned on and off when the cellphone is recording audio to insert text labels or text comments into recorded audio.

FIG. 119 illustrates how the cellphone enables a user to have speech recognition performed on portions of previously recorded audio.

FIGS. 122 through 125 illustrate how the cellphone speech recognition software allows the user to enter telephone numbers by speech recognition and to correct the recognition such numbers when wrong.

FIG. 129 provides a highly simplified pseudocode description of the name dialing programming of the cellphone embodiment, which is partially illustrated in FIG. 117.

FIG. 130 provides a highly simplified pseudocode description of the cellphone's digit dial programming illustrated in FIGS. 122 through 125.

DETAILED DESCRIPTION OF SOME PREFERRED EMBODIMENTS

Figure 9:
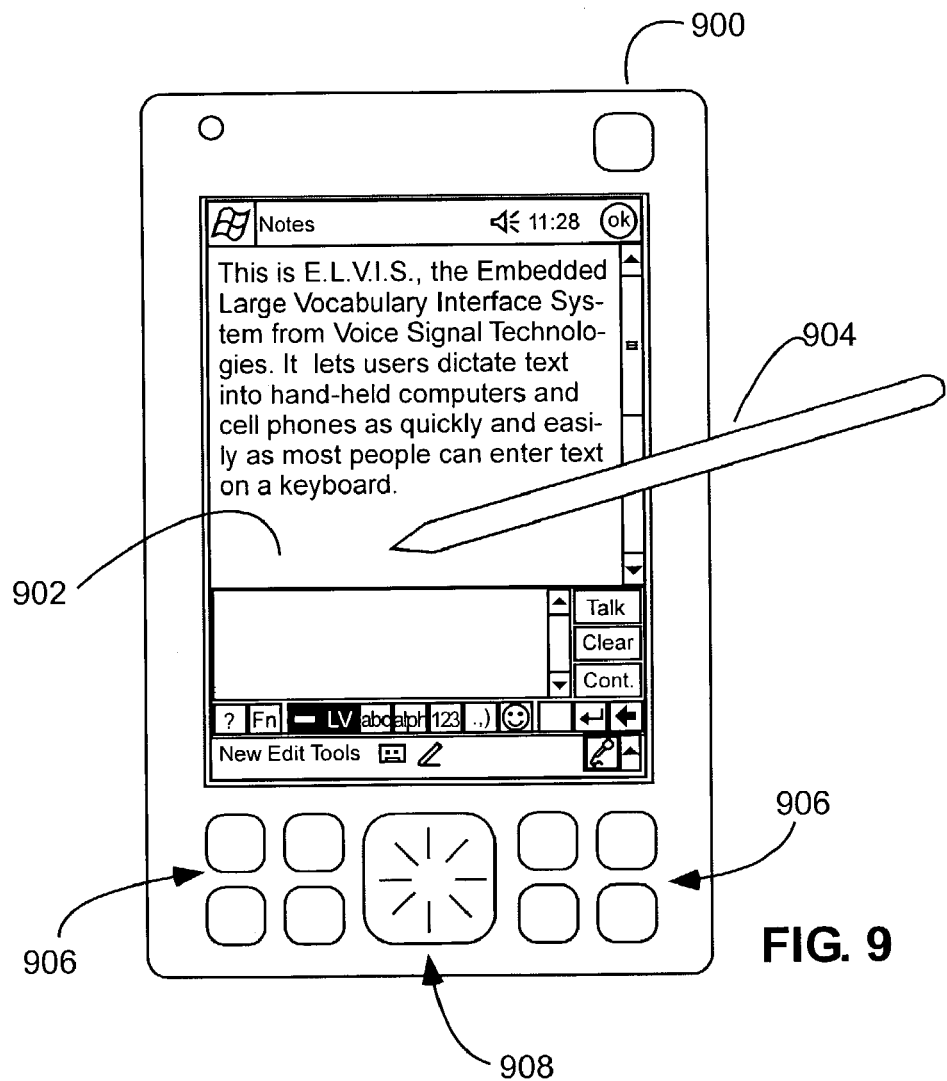
FIG. 9 illustrates a personal digital assistant, or PDA, device having a touch screen displaying a software input panel, or SIP, embodying many aspects of the present invention, that allows entry by speech recognition of text into application programs running on such a device.

FIG. 9 illustrates the personal digital assistant, or PDA, 900 on which many aspects of the present invention can be used. The PDA shown is similar to that currently being sold as the Compaq iPAQ H3650 Pocket PC, the Casio Cassiopeia, and the Hewlett-Packard Jornado 525.

The PDA 900 includes a relatively high resolution touch screen 902, which enables the user to select software buttons as well as portions of text by means of touching the touch screen, such as with a stylus 904 or a finger. The PDA also includes a set of input buttons 906 and a two-dimensional navigational control 908.

In this specification and the claims that follow, a navigational input device that allows a user to select discrete units of motion on one or more dimensions will often be considered to be included in the definition of a button. This is particularly true with regard to telephone interfaces, in which the up, down, left, and right inputs of a navigational device will be considered phone keys or phone buttons.

Figure 10:
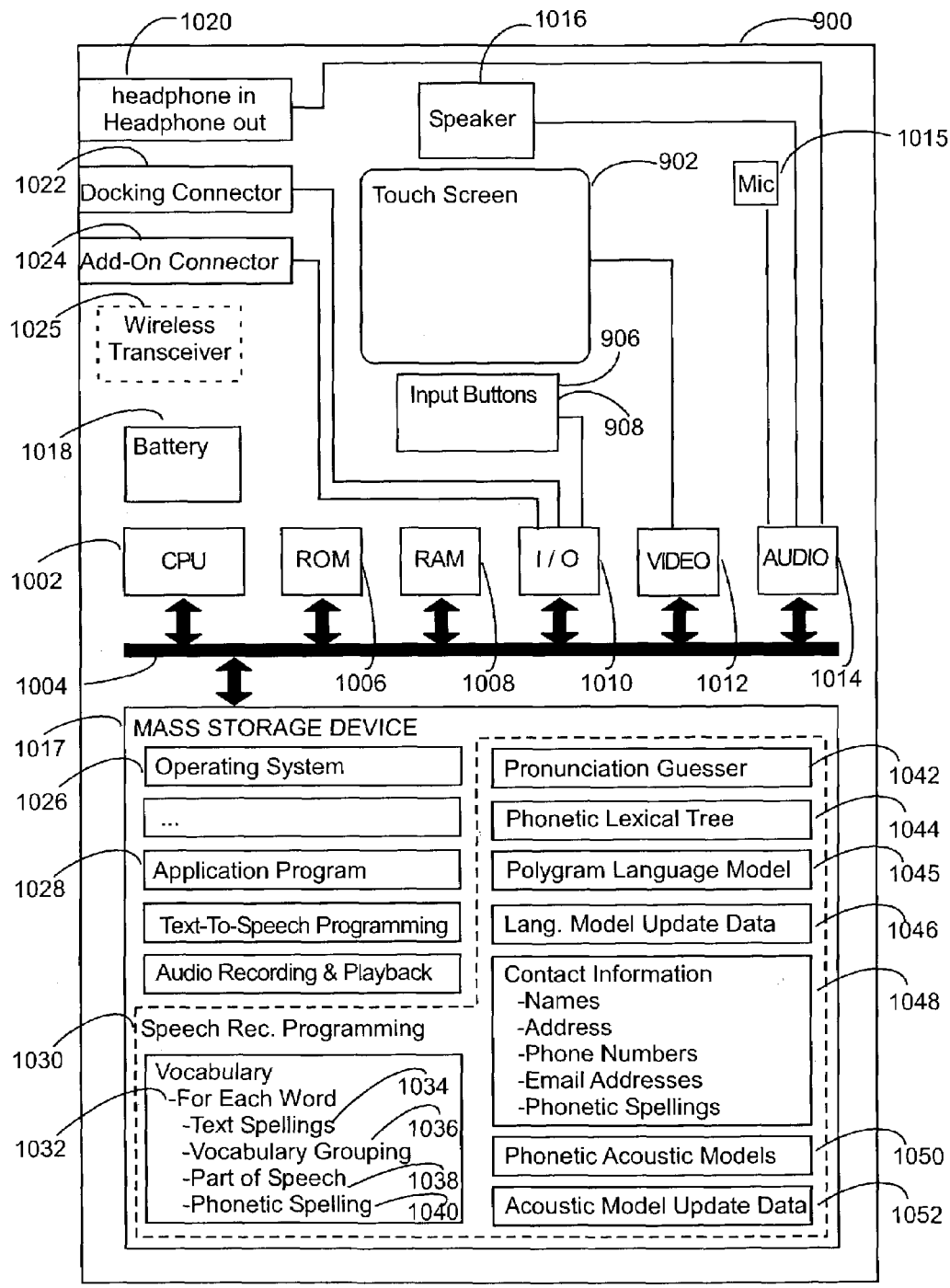
FIG. 10 is a highly schematic illustration of many of the hardware and software components that can be found in a PDA of the type shown in FIG. 9.

FIG. 10 provides a schematic system diagram of a PDA 900. It shows the touch screen 902 and input buttons 906 (which include the navigational input 908). It also shows that the device has a central processing unit such as a microprocessor 1002. The CPU 1002 is connected over one or more electronic communication buses 1004 with read-only memory 1006 (often flash ROM); random access memory 1008; one or more I/O devices 1010; a video controller 1012 for controlling displays on the touch screen 902; and an audio device 1014 for receiving input from a microphone 1015 and supplying audio output to a speaker 1016.

The PDA also includes a battery 1018 for providing it with portable power; a headphone-in and headphone-out jack 1020, which is connected to the audio circuitry 1014; a docking connector 1022 for providing a connection between the PDA and another computer such as a desktop; and an add on connector 1024 for enabling a user to add circuitry to the PDA such as additional flash ROM, a modem, a wireless transceiver 1025, or a mass storage device.

FIG. 10 shows a mass storage device 1017. In actuality, this mass storage device could be any type of mass storage device, including all or part of the flash ROM 1006 or a miniture hard disk. In such a mass storage device the PDA would normally store an operating system 1026 for providing much of the basic functionality of the device. Commonly it would include one or more application programs, such as a word processor, a spreadsheet, a Web browser, or a personal information management system, in addition to the operating system and in addition to the speech recognition related functionality explained next.

When the PDA 900 is used with the present invention, it will normally include speech recognition programming 1030. It includes programming for performing word matching of the general type described above with regard to FIGS. 1 and 2. The speech recognition programming will also normally include one or more vocabularies or vocabulary groupings 1032 including a large vocabulary that includes at least two thousand words. Many large vocabulary systems have a vocabulary of fifty thousand to several hundred thousand words. For each vocabulary word, the vocabulary will normally have a text spelling 1034 and one or more vocabulary groupings 1036 to which the word belongs (for example, the text output "." might actually be in both a large-vocabulary recognition vocabulary, a spelling vocabulary, and a punctuation vocabulary grouping in some systems). Each vocabulary word will also normally have an indication of the one or more parts of speech 1038 in which the word can be classified, and the phonetic spelling 1040 for the word for each of those parts of speech.

The speech recognition programming commonly includes a pronunciation guesser 1042 for guessing the pronunciation of new words that are added to the system and, thus, which do not have a predefined phonetic spelling. The speech recognition programming commonly includes one or more phonetic lexical trees 1044. A phonetic lexical tree is a tree-shaped data structure that groups together in a common path from the tree's root all phonetic spellings that start with the same sequence of phonemes. Using such lexical trees improves recognition performance because it enables all portions of different words that share the same initial phonetic spelling to be scored together.

Preferably the speech recognition programming will also include a PolyGram language model 1045 that indicates the probability of the occurrence of different words in text, including the probability of words occurring in text given one or more preceding and/or following words.

Commonly the speech recognition programming will store language model update data 1046, which includes information that can be used to update the PolyGram language model 1045 just described. Commonly this language model update data will either include or contain statistical information derived from text that the user has created or that the user has indicated is similar to the text that he or she wishes to generate. In FIG. 10 the speech recognition programming is shown storing contact information 1048, which includes names, addresses, phone numbers, e-mail addresses, and phonetic spellings for some or all of such information. This data is used to help the speech recognition programming recognize the speaking of such contact information. In many embodiments of the information such contact information will be included in an external program, such as one of the application programs 1028 or accessories to the operating system 1026, but, even in such cases, the speech recognition programming would normally need access to such names, addresses, phone numbers, e-mail addresses, and phonetic representations for them.

The speech recognition programming will also normally include phonetic acoustic models 1050 which can be similar to the phonetic models 200 shown in FIG. 2. Commonly the speech recognition programming also stores acoustic model update data 1052, which includes information from acoustic signals that have been previously recognized by the system. Commonly such acoustic model update data will be in the form of parameter frames, such as the parameter frames 110 shown in FIGS. 1 and 2, or in the form of statistical data that has been abstracted from such frames.

Figure 11:
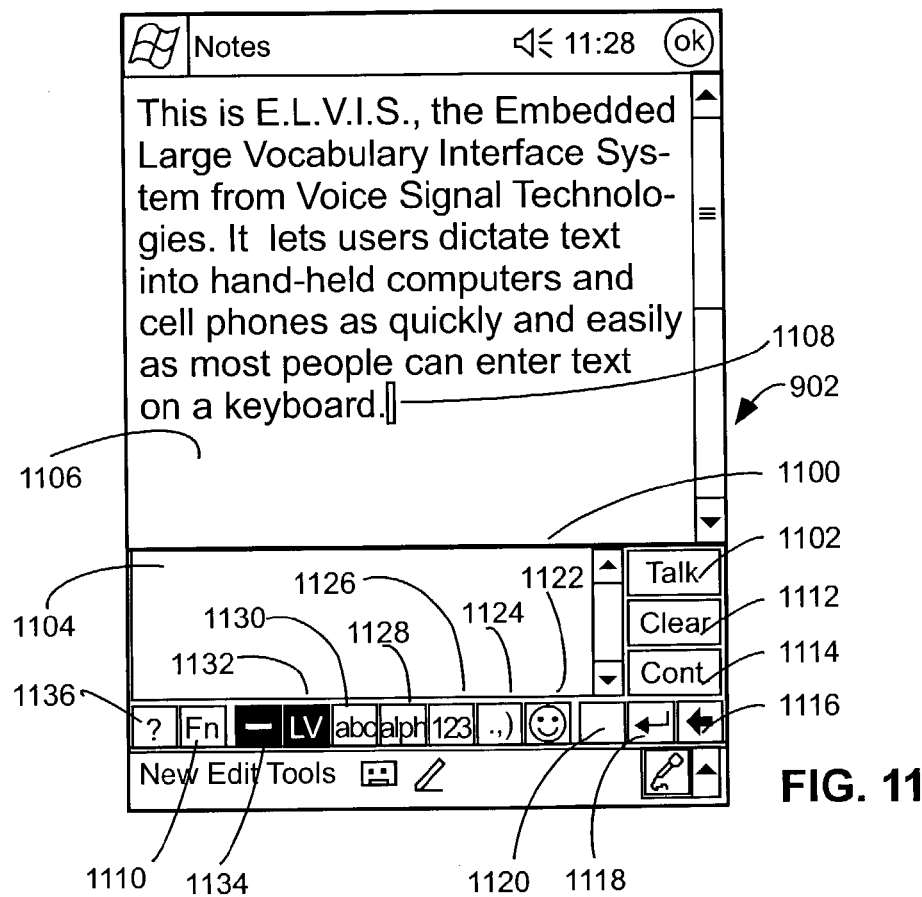
FIG. 11 is a blowup of the screen image shown in FIG. 9, used to point out many of the specific elements of the speech recognition SIP shown in FIG. 9.

FIG. 11 provides close-up views of the user interface provided by the touch screen 902 shown in FIG. 9 with the PDA using a software input panel (or SIP) 1100 embodying many aspects of the present invention.

Figure 12:
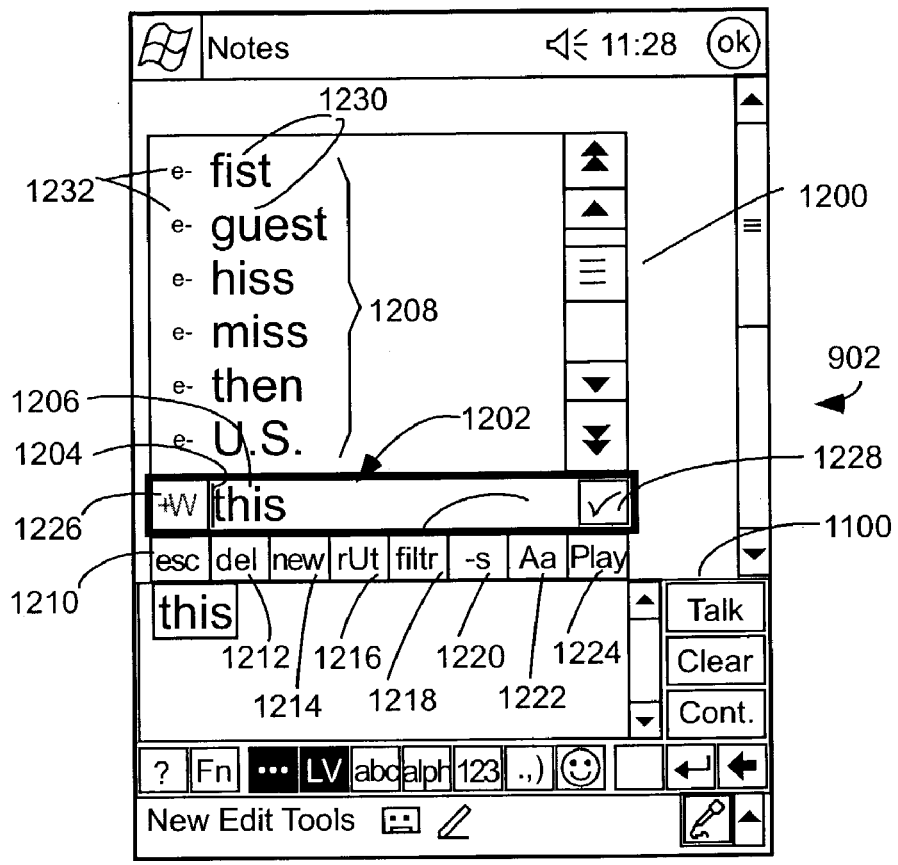
FIG. 12 is similar to FIG. 11 except that it also illustrates a correction window produced by the speech recognition SIP and many of its graphical user interface elements.

FIG. 12 is similar to FIG. 11 except it shows the touch screen 902 when the speech recognition SIP is displaying a correction window 1200.

FIGS. 13 through 17 represent successive pages of a pseudocode description of how the speech recognition SIP responds to various inputs on its graphical user interface. For purposes of simplicity this pseudocode is represented as one main event loop 1300 in the SIP program which responds to user input.

In FIGS. 13 through 17 this event loop is described as having two major switch statements: a switch statement 1301 in FIG. 13 that responds to inputs on the user interface that can be generated whether or not the correction window 1200 is displayed, and a switch statement 1542 in FIG. 15 that responds to user inputs that can only be generated when the correction window 1200 is displayed.

If the user presses the Talk button 1102 shown in FIG. 11, function 1302 of FIG. 13 causes functions 1304 through 1308 to be performed. Function 1304 tests to see if there is any text in the SIP buffer shown by the window 1104 in FIG. 11. In the SIP embodiment shown in the FIGS., the SIP buffer is designed to hold a relatively small number of lines of text, of which the SIP's software will keep track of the acoustic input and best choices associated with the recognition of each word, and the linguistic context created by such text. Such a text buffer is used because the speech recognition SIP often will not have knowledge about the text in the remote application shown in the window 1106 in FIG. 11 into which the SIP outputs text at the location of the current cursor 1108 in the application. In other embodiments of the invention a much larger SIP buffer could be used. In other embodiments many of the aspects of the present invention will be used as part of an independent speech recognition text creation application that will not require the use of a SIP for the inputting of text. The major advantage of using a speech recognizer that functions as a SIP is that it can be used to provide input for almost any application designed to run on a PDA.

Returning to FIG. 13, function 1304 clears any text from the SIP buffer 1104 because the Talk button 1102 is provided as a way for user to indicate to the SIP that he is dictating text in a new context. Thus, if the user of the SIP has moved the cursor 1108 in the application window 1106 of FIG. 11, he should start the next dictation by pressing the Talk button 1102.

Function 1306 in FIG. 13 responds to the pressing on the Talk button by testing to see if the speech recognition system is currently in correction mode. If so, it exits that mode, removing any correction window 1200 of the type shown in FIG. 12 that might be shown.

The SIP shown in the FIGS. is not in correction mode when a correction window is displayed, but has not been selected to receive input inputs from most buttons of the main SIP interface, and is in correction mode when the correction window is displayed and has been selected to receive inputs from many of such buttons. This distinction is desirable because the particular SIP shown can be selected to operate in a one-at-a-time mode in which words are spoken and recognized discreetly, and in which a correction window is displayed for each word as it is recognized to enable a user to more quickly see the choice list or provide correction input. In one-at-a-time mode most forms of user input not specifically related to making corrections are used to perform the additional function of confirming the first choice displayed in the current choice list as the desired word. When the system is not in one-at-a-time mode, the correction window is usually displayed only when the user has provided input indicating a desire to correct previous input. In such cases the correction window is displayed in correction mode, because it is assumed that, since the user has chosen to make a correction, most forms of input should be directed to the correction window.

It should be appreciated that in systems that only use one-at-a-time recognition, or those that do not use it at all, there would be no need to have the added complication of switching into and out of correction mode.

Returning to function 1306, it removes any current correction window because the pressing of the Talk button 1302 indicates a desire to start new dictation, rather than an interest in correcting old dictation.

Function 1308 of FIG. 13 responds to the pressing of the Talk button by causing SIP buffer recognition to start according to a previously selected current recognition duration mode. This recognition takes place without any prior language context for the first word. Preferably language model context will be derived from words recognized in response to one pressing of the Talk button and used to provide a language context for the recognition of the second and subsequent words in such recognition.

FIG. 18 is a schematic representation of the recognition duration programming 1800 that enables a user to select different modes of activating speech recognition in response to the pressing or clicking of any button in the SIP interface that can be used to start speech recognition. In the shown embodiment there is a plurality of buttons, including the Talk button, each of which can be used to start speech recognition. This enables a user to both select a given mode of recognition and to start recognition in that mode with a single pressing of a button.

Function 1802 helps determine which functions of FIG. 18 are performed, depending on the current recognition duration mode. The mode can have been set in multiple different ways, including by default and by selection under the Entry Preference option in the function menu shown in FIG. 46.

If the Press Only recognition duration type has been selected, function 1804 will cause functions 1806 and 1808 to recognize speech sounds that are uttered during the pressing of a speech button. This recognition duration type is both simple and flexible because it enables a user to control the length of recognition by one simple rule: recognition occurs during and only during the pressing of a speech button. Preferably utterance and/or end of utterance detection is used during any recognition mode, to decrease the likelihood that background noises will be recognized as utterances.

If the current recognition duration type is the Press And Click To Utterance End type, function 1810 will cause functions 1812 and 1814 to respond to the pressing of a speech button by recognizing speech during that press. In this case the "pressing" of a speech button is defined as the pushing of such a button for longer than a given duration, such as, for example, longer than one-quarter or one-third of a second. If the user pushes on a speech button for a shorter period of time, that push will be treated as a "click" rather than as a "press," and functions 1816 and 1818 will initiate recognition starting from the time of that click until the next end of utterance detection.

The Press And Click To Utterance End recognition duration type has the benefit of enabling the use of one button to rapidly and easily select between a mode that allows a user to select a variable length extended recognition, and a mode that recognizes only a single utterance.

If the current recognition duration type is the Press Continuous, Click Discrete To Utterances End type, function 1820 causes functions 1822 through 1828 to be performed. If the speech button is clicked, as just defined, functions 1822 and 1824 perform discrete recognition until the next end of utterance. If, on the other hand, the speech button is pressed, as previously defined, functions 1826 and 1828 perform continuous recognition as long as the speech button remains pressed.

This recognition duration type has the benefit of making it easy for users to quickly switch between continuous and discrete recognition merely by using different types of presses on a given speech button. In the SIP embodiment shown, the other recognition duration types do not switch between continuous and discrete recognition.

If the current recognition duration type is the Click To Timeout type, function 1830 causes functions 1832 to 1840 to be performed. If the speech button is clicked, functions 1833 through 1836 normally toggle recognition between off and on. Function 1834 responds to a click by testing to see whether or not speech recognition is currently on. If so, and if the speech button being clicked is other than one that changes vocabulary, it responds to the click by turning off speech recognition. On the other hand, if speech recognition is off when the speech button is clicked, function 1836 turns speech recognition on until a timeout duration has elapsed. The length of this timeout duration can be set by the user under the Entry Preferences option in the function menu 4602 shown in FIG. 46. If the speech button is pressed for longer than a given duration, as described above, functions 1838 and 1840 will cause recognition to be on during the press but to be turned off at its end.

This recognition duration type provides a quick and easy way for users to select with one button between toggling speech recognition on an off, and causing speech recognition to be turned on only during an extended press of a speech button.

Returning to function 1308 of FIG. 13, it can be seen that the selection of different recognition duration types can allow the user to select how the Talk button and other speech buttons initiate recognition.

If the user selects the Clear button 1112 shown in FIG. 11, functions 1309 through 1314 remove any correction window which might be displayed and clear the contents of the SIP buffer without sending any deletions to the operating system text input. As stated above, in the speech SIP shown, the SIP text window 1104, shown in FIG. 11, is designed to hold a relatively small body of text. As text is entered or edited in the SIP buffer, characters are supplied to the operating system of the PDA, causing corresponding changes to be made to text in the application window 1006 shown in FIG. 11. The Clear button enables a user to clear text from the SIP buffer, to prevent it from being overloaded, without causing corresponding deletions to be made to text in the application window.

The Continue button 1114 shown in FIG. 11 is intended to be used when the user wants to dictate a continuation of the last dictated text, or text which is to be inserted at the current location in the SIP buffer window 1104, shown in FIG. 11. When this button is pressed, function 1316 causes functions 1318 through 1330 to be performed. Function 1318 removes any correction window, because the pressing of the Continue button indicates that the user has no interest in using the correction window. Next, function 1132 tests if the current cursor in the SIP buffer window has a prior language context that can be used to help in predicting the probability of the first word or words of any utterance recognized as a result of the pressing of the Continue button. If so, it causes that language context to be used. If not, and if there is currently no text in the SIP buffer, function 1326 uses the last one or more words previously entered in the SIP buffer as the language context at the start of recognition initiated by the Continue button. Next, function 1330 starts SIP buffer recognition, that is, recognition of text to be output to the cursor in the SIP buffer, using the current recognition duration mode.

If the user selects the Backspace button 1116 shown in FIG. 11, functions 1132 through 1336 will be performed. Function 1134 tests if the SIP is currently in the correction mode. If so, it enters the backspace into the filter editor of the correction window. The correction window 1200 shown in FIG. 12 includes a first choice window 1202. As will be described below in greater detail, the correction window interface allows the user to select and edit one or more characters in the first choice window as being part of a filter string which identifies a sequence of initial characters belonging to the desired recognition word or words. If the SIP is in the correction mode, pressing backspace will delete from the filter string and characters currently selected in the first choice window, and if no characters are so selected, will delete the character to the left of the filter cursor 1204.

If the SIP is not currently in the correction mode, function 1136 will respond to the pressing of the Backspace button by entering a backspace character into the SIP buffer and outputting that same character to the operating system so that the same change can be made to the corresponding text in the application window 1106 shown in FIG. 11.

If the user selects the New Paragraph button 1118 shown in FIG. 11, functions 1338 through 1342 of FIG. 13 will exit correction mode, if the SIP is currently in it, and they will enter a New Paragraph character into the SIP buffer and provide corresponding output to the operating System.

As indicated by functions 1344 through 1338, the SIP responds to user selection of a Space button 1120 in substantially the same manner that it responds to a backspace, that is, by entering it into the filter editor if the SIP is in correction mode, and otherwise outputting it to the SIP buffer and the operating system.

If the user selects one of the Vocabulary Selection buttons 1122 through 1132 shown in FIG. 11, functions 1350 through 1370 FIG. 13, and functions 1402 through 1416 FIG. 14, will set the appropriate recognition mode's vocabulary to the vocabulary corresponding to the selected button and start speech recognition in that mode according to the current recognition duration mode and other settings for the recognition mode.

If the user selects the Name Recognition button 1122, functions 1350 and 1356 set the current mode's recognition vocabulary to the name recognition vocabulary and start recognition according to the current recognition duration settings and other appropriate speech settings. With all of the vocabulary buttons besides the Name and Large Vocabulary buttons, these functions will treat the current recognition mode as either filter or SIP buffer recognition, depending on whether the SIP is in correction mode. This is because these other vocabulary buttons are associated with vocabularies used for inputting sequences of characters that are appropriate for defining a filter string or for direct entry into the SIP buffer. The large vocabulary and the name vocabulary, however, are considered inappropriate for filter string editing and, thus, in the disclosed embodiment the current recognition mode is considered to be either re-utterance or SIP buffer recognition, depending on whether the SIP is in correction mode. In other embodiments, name and large vocabulary recognition could be used for editing a multi-word filter.

Figure 40:
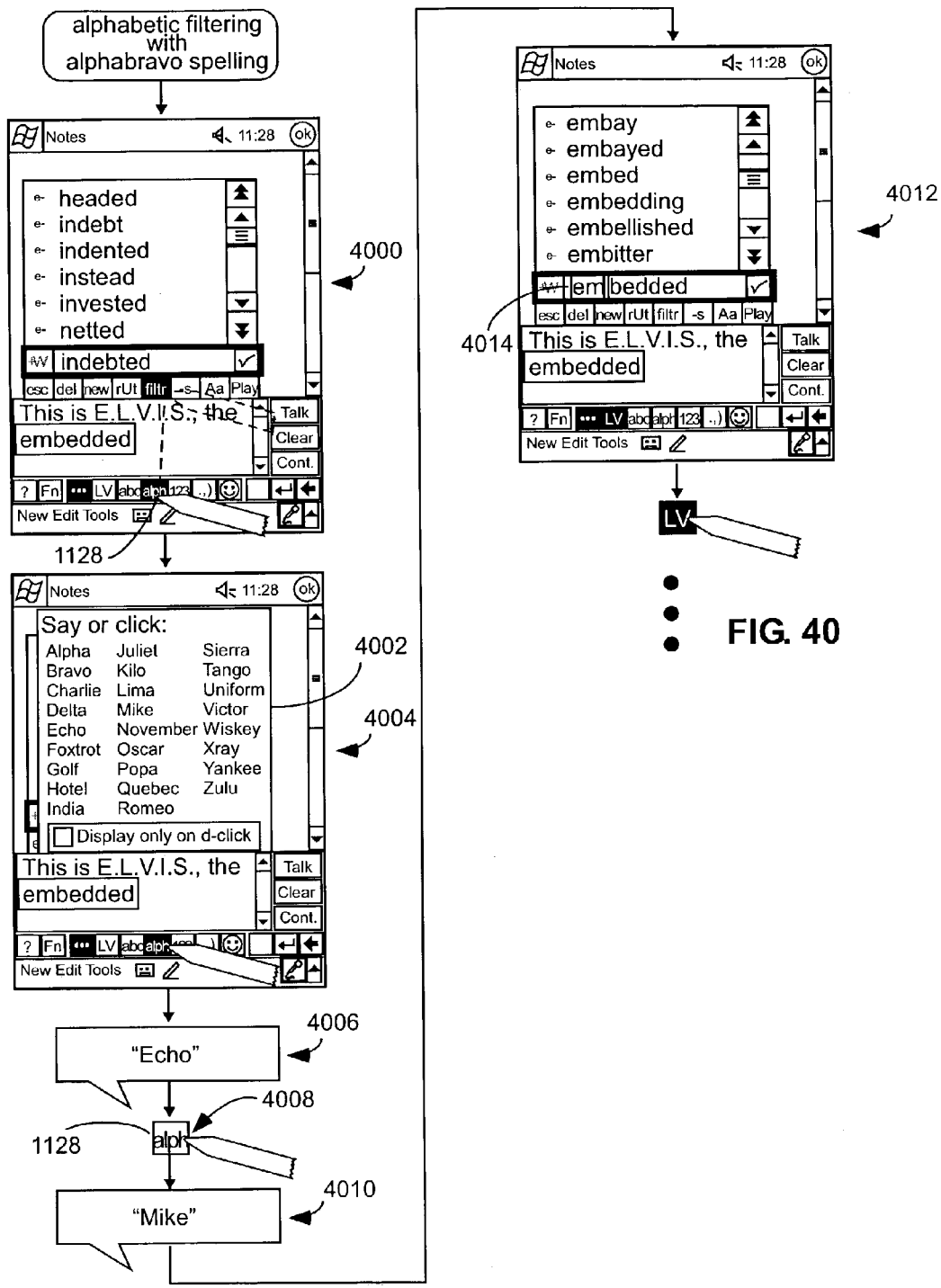
FIG. 40 illustrates how a user of the SIP recognizer can enter one or more characters of a filter string using the international communication alphabets and how the SIP interface can show the user the words out of that alphabet.

In addition to the standard response associated with the pressing of a vocabulary button, if the AlphaBravo Vocabulary button is pressed, functions 1404 through 1406 cause a list of all the words used by the International Communication Alphabet (or ICA) to be displayed, as is illustrated in numeral 4002 in FIG. 40.

If the user selects the Continuous/Discrete Recognition button 1134 shown in FIG. 11, functions 1418 through 1422 of FIG. 14 are performed. These toggle between continuous recognition mode, which uses continuous speech acoustic models and allows multiword recognition candidates to match a given single utterance, and a discrete recognition mode, which uses discrete recognition acoustic models and only allows single word recognition candidates to be recognized for a single utterance. The function also starts speech recognition using either discrete or continuous recognition, as has just been selected by the pressing of the Continuous/Discrete button.

If the user selects the function key 1110 by pressing it, functions 1424 and 1426 call the function menu 4602 shown in FIG. 46. This function menu allows the user to select from other options besides those available directly from the buttons shown in FIGS. 11 and 12.

If the user selects the Help button 1136 shown in FIG. 11, functions 1432 and 1434 of FIG. 14 call help mode.

Figure 20:
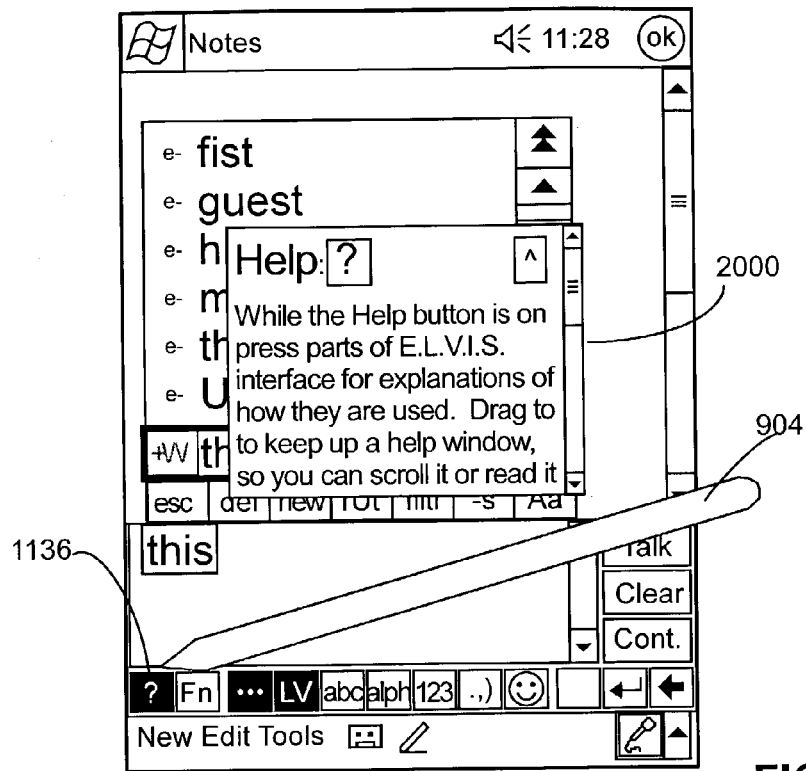
FIGS. 20 and 21 are screen images produced by the help mode described in FIG. 19.
Figure 21:
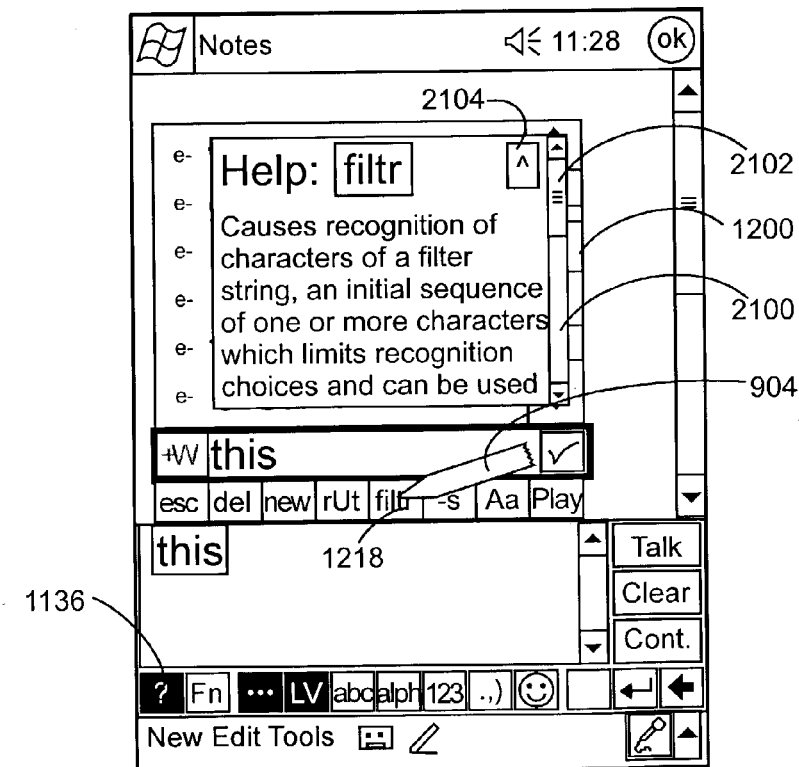

As shown in FIG. 19, when the help mode is entered in response to an initial pressing of the Help button, a function 1902 displays a help window 2000 providing information about using the help mode, as illustrated in FIG. 20. During subsequent operation of the help mode, if the user touches a portion of the SIP interface, functions 1904 and 1906 display a help window with information abut the touched portion of the interface that continues to be displayed as long as the user continues that touch. This is illustrated in FIG. 21, in which the user has used the stylus 904 to press the Filter button 1218 of the correction window. In response, a help window 2100 is shown that explains the function of the Filter button. If during the help mode a user double-clicks on a portion of the display, functions 1908 and 1910 display a help window that stays up until the user presses another portion of the interface. This enables the user to use the scroll bar 2102 shown in the help window of FIG. 21 to scroll through and read help information too large to fit on the help window 2102 at one time.

Although not shown in FIG. 19, help windows can also have a Keep Up button 2100 to which a user can drag from an initial down press on a portion of the SIP user interface of interest to also select to keep the help window up until the touching of a another portion of the SIP user interface.

When, after the initial entry of the help mode, the user again touches the Help button 1136 shown in FIGS. 11, 20, and 21, functions 1912 and 1914 remove any help windows and exit the help mode, turning off the highlighting of the Help button.

If a user taps on a word in the SIP Buffer, functions 1436 through 1438 of FIG. 14 make the selected word the current selection and call the display Choice List routine shown in FIG. 22 with the tapped word as the current selection and with acoustic data associated with the recognition of the tapped word, if any, the first entry in an utterance list, which holds acoustic data associated with the current selection.

As shown in FIG. 22, the display Choice List routine is called with the following parameters: a selection parameter; a filter string parameter; a filter range parameter; a word type parameter, and a Not Choice List flag. The selection parameter indicates the text in the SIP buffer for which the routine has been called. The filter string indicates a sequence of one or more characters indicating elements that define the set of one or more possible spellings with which the desired recognition output begins. The filter range parameter defines two character sequences, which bound a section of the alphabet in which the desired recognition output falls. The word type parameter indicates that the desired recognition output is of a certain type, such as a desired grammatical type. The Not Choice List flag indicates a list of one or more words that the user's actions indicate are not a desired word.

Function 2202 of the display Choice List routine calls a get Choices routine, shown in FIG. 23, with the filter string and filter range parameters with which the display Choice List routine has been called and with an utterance list associated with the selection parameter.

Figure 24:
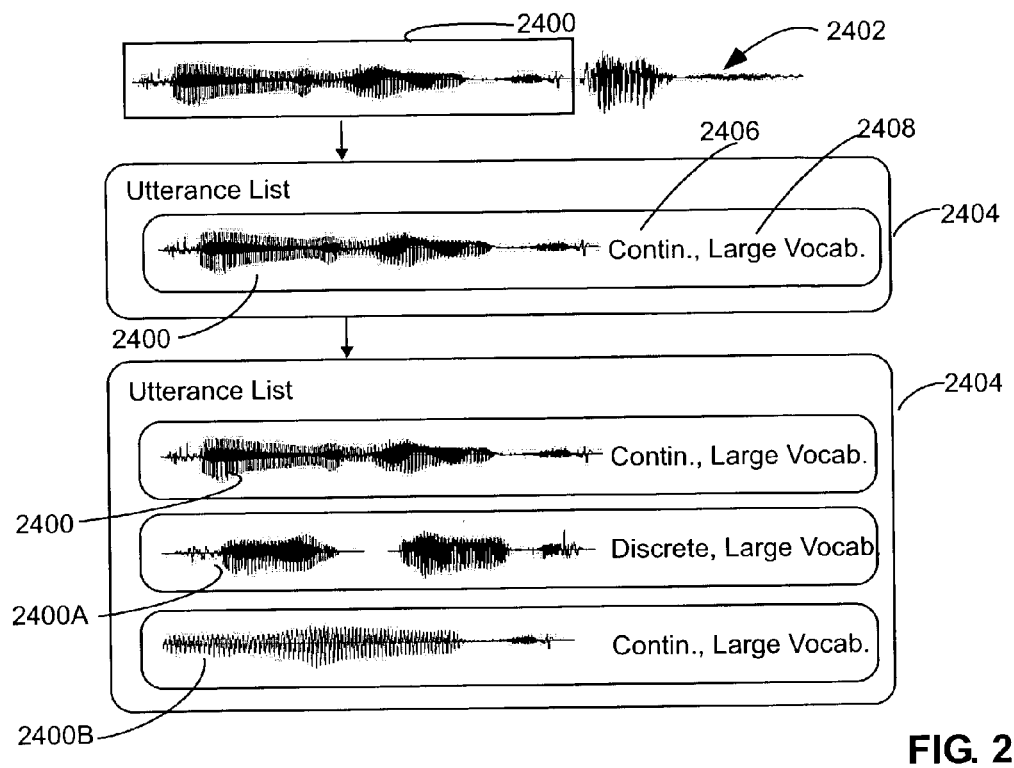
FIGS. 24 and 25 illustrate the utterance list data structure used by the get Choices routine of FIG. 23.
Figure 25:
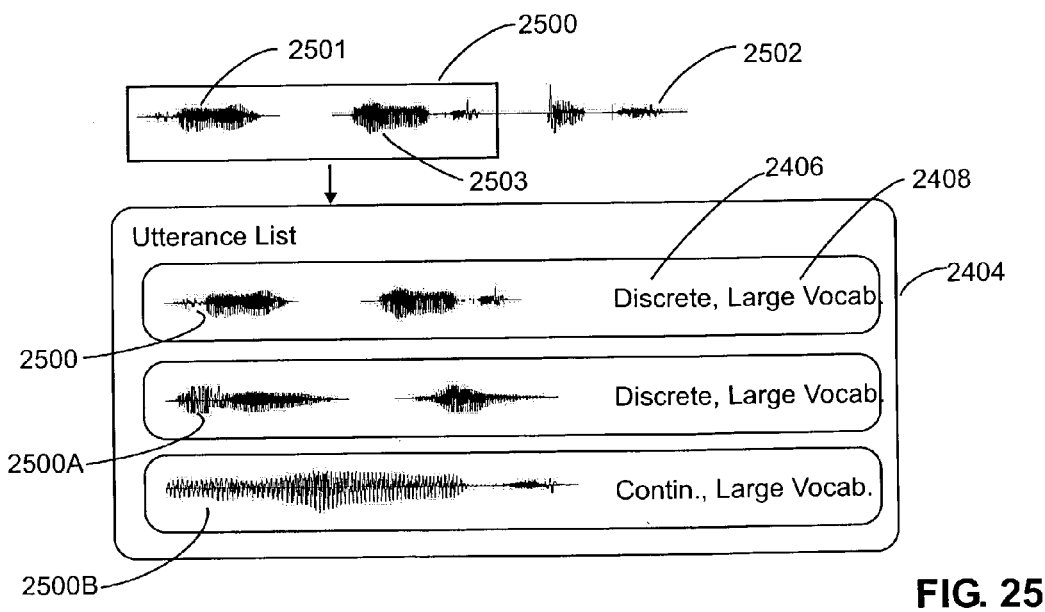

As shown in FIGS. 24 and 25, the utterance list 2404 stores sound representations of one or more utterances that have been spoken as part of the desired sequence of one or more words associated with the current selection. As previously stated, when function 2202 of FIG. 22 calls the get Choices routine, it places a representation 2400, shown in FIG. 24, of that portion of the sound 2402 from which the words of the current selection have been recognized. As was indicated in FIG. 2, the process of speech recognition time-aligns acoustic models against representations of an audio signal. The recognition system preferably stores these time alignments so that when corrections or playback of selected text are desired it can find the corresponding audio representations from such time alignments.

In FIG. 24 the first entry 2004 in the utterance list is part of a continuous utterance 2402. The present invention enables a user to add additional utterances of a desired sequence of one or more words to a selection's utterance list, and recognition can be performed on all these utterance together to increase the chance of correctly recognizing a desired output. As shown in FIG. 24, such additional utterances can include both discrete utterances, such as entry 2400A, as well as continuous utterances, such as entry 2400B. Each additional utterance contains information as indicated by the numerals 2406 and 2408 that indicates whether it is a continuous or discrete utterance and the vocabulary mode in which it was dictated.

In FIGS. 24 and 25, the acoustic representations of utterances in the utterance list are shown as waveforms. It should be appreciated that in many embodiments, other forms of acoustic representation will be used, including parameter frame representations such as the representation 110 shown in FIGS. 1 and 2.

FIG. 25 is similar to FIG. 24, except that in it, the original utterance list entry is a sequence of discrete utterances. It shows that additional utterance entries used to help correct the recognition of an initial sequence of one or more discrete utterances can also include either discrete or continuous utterances, 2500A and 2500B, respectively.

As shown in FIG. 23, the getChoices routine 2300 includes a function 2302 which tests to see if there has been a prior recognition for the selection for which this routine has been called that has been performed with the current utterance list and filter values (that is, filter string and filter range values). If so, it causes function 2304 to return with the choices from that prior recognition, since there have been no changes in the recognition parameters since the time the prior recognition was made.

If the test of function 2302 is not met, function 2306 tests to see if the filter range parameter is null. If it is not null, function 2308 tests to see if the filter range is more specific than the current filter string, and, if so, it changes the filter string to the common letters of the filter range. If not, function 2312 nulls the filter range, since the filter string contains more detailed information that it does.

As will be explained below, a filter range is selected when a user selects two choices on a choice list as an indication that the desired recognition output falls between them in the alphabet. When the user selects two choices that share initial letters, function 2310 causes the filter string to correspond to those shared letters. This is done so that when the choice list is displayed, the shared letters will be indicated to the user as one which has been confirmed as corresponding to the initial characters of the desired output.

It should be appreciated that when the user performs a command that selects either a new filter range or filter string, if the newly selected one of these two parameters has values that contradict values in the other, the value of the older of these two parameters will be nulled.

If there are any candidates from a prior recognition of the current utterance list, function 2316 causes function 2318 and 2320 to be performed. Function 2318 calls a filter Match routine shown in FIG. 26 for each such prior recognition candidate with the candidate's prior recognition score and the current filter definitions, and function 2320 deletes those candidates returned as a result of such calls that have scores below a certain threshold.

As indicated in FIG. 26, the filter Match routine 2600 performs filtering upon word candidates. In the embodiment of the invention shown, this filtering process is extremely flexible, since it allows filters to be defined by filter strings, filter range, or word type. It is also flexible because it allows a combination of word type and either filter string or filter range specifications, and because it allows ambiguous filtering, including ambiguous filters where elements in a filter string are not only ambiguous as to the value of their associative characters but also ambiguous as to the number of characters in their associative character sequences.

When we say a filter string or a portion of a filter string is ambiguous, we mean that a plurality of possible character sequences can be considered to match it. Ambiguous filtering is valuable when used with a filter string input, which, although reliably recognized, does not uniquely defined a single character, such as is the case with ambiguous phone key filtering of the type described below with regard to a cell phone embodiment of many aspects of the present invention.

Ambiguous filtering is also valuable with filter string input that cannot be recognized with a high degree of certainty, such as recognition of letter names, particularly if the recognition is performed continuously. In such cases, not only is there a high degree of likelihood that the best choice for the recognition of the sequence of characters will include one or more errors, but also there is a reasonable probability that the number of characters recognized in a best-scoring recognition candidate might differ from the number spoken. But spelling all or the initial characters of a desired output is a very rapid and intuitive way of inputting filtering information, even though the best choice from such recognition will often be incorrect, particularly when dictating under adverse conditions.

The filter Match routine is called for each individual word candidate. It is called with that word candidate's prior recognition score, if any, or else with a score of 1. It returns a recognition score equal to the score with which it has been called multiplied by the probability that the candidate matches the current filter values.

Functions 2602 through 2606 of the filter Match routine test to see if the word type parameter has been defined, and, if so and if the word candidate is not of the defined word type, it returns from the filter Match function with a score of 0, indicating that the word candidate is clearly not compatible with current filter values.

Functions 2608 through 2614 test to see if a current value is defined for the filter range. If so, and if the current word candidate is alphabetically between the starting and ending words of that filter range, they return with an unchanged score value. Otherwise they return with a score value of 0.

Function 2616 determines if there is a defined filter string. If so, it causes functions 2618 through 2653 to be performed. Function 2618 sets the current candidate character, a variable that will be used in the following loop, to the first character in the word candidate for which filter Match has been called. Next, a loop 2620 is performed until the end of the filter string is reached by its iterations. This loop includes functions 2622 through 2651.

The first function in each iteration of this loop is the test by step 2622 to determine the nature of the next element in the filter string. In the embodiment shown, three types of filter string elements are allowed: an unambiguous character, an ambiguous character, and an ambiguous element representing a set of ambiguous character sequences, which can be of different lengths.

An unambiguous character unambiguously identifies a letter of the alphabet or other character, such as a space. It can be produced by unambiguous recognition of any form of alphabetic input, but it is most commonly associated with letter or ICA word recognition, keyboard input, or non-ambiguous phone key input in phone implementations. Any recognition of alphabetic input can be treated as unambiguous merely by accepting a single best scoring spelling output by the recognition as an unambiguous character sequence.

An ambiguous character is one which can have multiple letter values, but which has a definite length of one character. As stated above, this can be produced by the ambiguous pressing upon keys in a telephone embodiment, or by speech or character recognition of letters. It can also be produced by continuous recognition of letter names in which all the best scoring character sequences have the same character length.

An ambiguous length element is commonly associated with the output of continuous letter name recognition or handwriting recognition. It represents multiple best-scoring letter sequences against handwriting or spoken input, some of which sequences can have different lengths.

If the next element in the filter string is an unambiguous character, function 2644 causes functions 2626 through 2606 to be performed. Function 2626 tests to see if the current candidate character matches the current unambiguous character. If not, the call to filter Match returns with a score of 0 for the current word candidate. If so, function 2630 increments the position of the current candidate character.

If the next element in the filter string is an ambiguous character, function 2632 causes functions 2634 through 2636 to be performed. Function 2634 tests to see if the current character fails to match one of the recognized values of the ambiguous character. If so, function 2636 returns from the call to filterMatch with a score of 0. Otherwise, functions 2638 through 2642 alter the current word candidate's score as a function of the probability of the ambiguous character matching the current candidate character's value, and then increment the current candidate character's position.

If the next element in the filter string is an ambiguous length element, function 2644 causes a loop 2646 to be performed for each character sequence represented by the ambiguous length element. This loop comprises functions 2648 through 2652. Function 2648 tests to see if there is a matching sequence of characters starting at the current candidate's character position that matches the current character sequence of the loop 2646. If so, function 2649 alters the word candidate's score as a function of the probability of the recognized matching sequence represented by the ambiguous length element, and then function 2650 increments the current position of the current candidate character by the number of the characters in the matching ambiguous length element sequence If there is no sequence of characters starting at the current word candidate's character position that match any of the sequences of characters associated with the ambiguous length element, functions 2651 and 2652 return from the call to filter Match with a score of 0.

If the loop 2620 is completed, the current word candidate will have matched against the entire filter string. In this case, function 2653 returns from filter Match with the current word's score produced by the loop 2620.

If the test of step 2616 finds that there is no filter string defined, step 2654 merely returns from filter Match with the current word candidate's score unchanged.

Returning now to function 2318 of FIG. 23, it can be seen that the call to filter Match for each word candidate will return a score for the candidate. These are the scores that are used to determine which word candidates to delete in function 2320.

Once these deletions have taken place, function 2322 tests to see if the number of prior recognition candidates left after the deletions, if any, of function 2320 is below a desired number of candidates. Normally this desired number would represent a desired number of choices for use in a choice list. If the number of prior recognition candidates is below such a desired number, functions 2324 through 2336 are performed. Function 2324 performs speech recognition upon every one of the one or more entries in the utterance list 2400, shown in FIGS. 24 and 25. As indicated by functions 2326 and 2328, this recognition process includes a test to determine if there are both continuous and discrete entries in the utterance list, and, if so, limits the number of possible word candidates in recognition of the continuous entries to a number corresponding to the number of individual utterances detected in one or more of the discrete entries. The recognition of function 2324 also includes recognizing each entry in the utterance list with either continuous or discrete recognition, depending upon the respective mode that was in effect when each was received, as indicated by the continuous or discrete recognition indication 2406 shown in FIGS. 24 and 25. As indicated by 2332, the recognition of each utterance list entry also includes using the filter Match routine previously described and using a language model in selecting a list of best-scoring acceptable candidates for the recognition of each such utterance. In the filter Match routine, the vocabulary indicator 2408 shown in FIGS. 24 and 25 for the most recent utterance in the utterance list is used as a word type filter to reflect any indication by the user that the desired word sequence is limited to one or more words from a particular vocabulary. The language model used is a PolyGram language model, such as a bigram or trigram language model, which uses any prior language contexts that are available in helping to select the best-scoring candidates.

After the recognition of one or more entries in the utterance list has been performed, if there is more than one entry in the utterance list, functions 2334 and 2336 pick a list of best scoring recognition candidates for the utterance list based on a combination of scores from different recognitions. It should be appreciated that in some embodiments of this aspect of the invention, combination of scoring could be used from the recognition of the different utterances so as to improve the effectiveness of the recognition using more than one utterance.

If the number of recognition candidates produced by functions 2314 through 2336 is less than the desired number, and if there is a non-null filter string or filter range definition, functions 2338 and 2340 use filter Match to select a desired number of additional choices from the vocabulary associated with the most recent entry in the utterance list, or the current recognition vocabulary if there are no entries in the utterance list.

If there are no candidates from either recognition or the current vocabulary by the time the get Choices routine of FIG. 23 reaches function 2342, function 2344 uses the best-scoring character sequences that matche the current filter string as choices, up to the desired number of choices. When the filter string contains nothing but unambiguous characters, only the single character sequence that matches those unambiguous characters will be selected as possible choices. However, where there are ambiguous characters and ambiguous length elements in the filter string, there will be a plurality of such character sequence choices. And where ambiguous characters with ambiguous length elements have different probabilities associated with different possible corresponding sequences of one or more characters, the choices produced by function 2344 will be scored correspondingly by a scoring mechanism corresponding to that shown in functions 2616 through 2606 the three of FIG. 26.

When the call to get Choices returns, a list of choices produced by recognition, by selection from a vocabulary according to filter, or select from a list of possible filters will normally be returned.

Returning now to FIG. 22, when the call to get Choices in function 2202 returns to the display Choice List routine, function 2204 tests to see if any filter has been defined for the current selection, if there has been any utterance added to the current selection's utterance list, and if the selection for which display Choice List has been called is not in the not Choice List, which includes a list of one or more words that the user's inputs indicate are not desired as recognition candidates. If these conditions are met, function 2206 makes that selection the first choice for display in the correction window, which the routine is to create. Next, function 2210 removes any other candidates from the list of candidates produced by the call to the get Choices routine that are contained in the not Choice List. Next, if the first choice has not already been selected by function 2206, function 2212 makes the best-scoring candidate returned by the call to get Choices the first choice for the subsequent correction window display. If there is no single best-scoring recognition candidate, alphabetical order can be used to select the candidate which is to be the first choice. Next, function 2218 selects those characters of the first choice which correspond to the filter string, if any, for special display. As will be described below, in the preferred embodiments, characters in the first choice which correspond to an unambiguous filter are indicated in one way, and characters in the first choice which correspond to an ambiguous filter are indicated in a different way so that the user can appreciate which portions of the filter string correspond to which type of filter elements. Next, function 2220 places a filter cursor before the first character of the first choice that does not correspond to the filter string. When there is no filter string defined, this cursor will be placed before the first character of the first choice.

Next, function 2222 causes steps 2224 through 2228 to be performed if the getChoices routine returned any candidates other than the current first choice. In this case, function 2224 creates a first-character-ordered choice list from a set of the best-scoring such candidates that will all fit in the correction window at one time. If there are any more recognition candidates, functions 2226 and 2228 create a second-character-ordered choice list of up to a preset number of screens for all such choices from the remaining best-scoring candidates.

When all this has been done, function 2230 displays a correction window showing the current first choice, an indication of which admits characters that the any or in the filter, an indication of the current filter cursor location, and with the first choice list. In FIG. 12 the first choice 1206 is shown in the first choice window 1202 and the filter cursor 1204 is shown before the first character of the first choice, since there currently has not been any filter defined.

It should be appreciated that the display Choice List routine can be called with a null value for the current selection as well as for a text selection which has no associated utterances. In this case, it will respond to alphabetic input by performing word completion based on the operation of functions 2338 and 2340. It allows to select choices for the recognition of an utterance without the use of filtering or re-utterances, to use filtering and/or re-utterances to help correct a prior recognition, to perform word completion upon alphabetic filtering input, and, if desired, to help such alphabetic completion process by the entering of a subsequent utterance, to spell a word which is not in the current vocabulary with alphabetic input, to mix and match different forms of alphabetic input including forms which are unambiguous, ambiguous with regard to character, and ambiguous with regard to length.

Returning now to FIG. 14, we've explained how functions 1436 and 1438 respond to a tap on a word in the SIP buffer by calling the display Choice List routine, which in turn, causes a correction window such as the correction window

1200 shown in FIG. 12 to be displayed. The ability to display a correction window with its associated choice list merely by tapping on a word provides a fast and convenient way for enabling a user to correct single word errors.

If the user double taps on a selection in the SIP buffer, functions 1440 through 1444 escape from any current correction window that might be displayed, and start SIP buffer recognition according to current recognition duration modes and settings using the current language context of the current selection. The recognition duration logic responds to the duration of the key press type associated with such a double-click in determining whether to respond as if there has been either a press or a click for the purposes described above with regard to FIG. 18. The output of any such recognition will replace the current selection. Although not shown in the FIGS., if the user double taps on a word in the SIP buffer, it is treated as the current selection for the purpose of function 1444

If the user taps in any portion of the SIP buffer which does not include text, such as between words or before or after the text in the buffer, function 1446 causes functions 1448 to 1452 to be performed. Function 1448 plants a cursor at the location of the tap. If the tap is located at any point in the SIP buffer window which is after the end of the text in the SIP buffer, the cursor will be placed after the last word in that buffer. If the tap is a double tap, functions 1450 1452 start SIP buffer recognition at the new cursor location according to the current recognition duration modes and other settings, using the duration of the second touch of the double tap for determining whether it is to be responded to as a press or a click.

FIG. 15 is a continuation of the pseudocode described above with regard to FIGS. 13 and 14.

If the user drags across part of one or more words in the SIP buffer, functions 1502 and 1504 call the display Choice List routine described above with regard to FIG. 22 with all of the words that are all or partially dragged across as the current selection and with the acoustic data associated with the recognition of those words, if any, as the first entry in the utterance list.

If the user drags across an initial part of an individual word in the SIP buffer, functions 1506 and 1508 call the display Choice List function with that word as the selection, with that word added to the not Choice List, with the dragged initial portion of the word as the filter string, and with the acoustic data associated with that word as the first entry in the utterance list. This programming interprets the fact that a user has dragged across only the initial part of a word as an indication that the entire word is not the desired choice, as indicated by the fact that the word is added to the not Choice List.

If a user drags across the ending of an individual word in the SIP buffer, functions 1510 and 1512 call the display Choice List routine with the word as a selection, with the selection added to be not Choice List, with the undragged initial portion of the word as the filter string, and with the acoustic data associative with a selected word as the first entry in the utterance list.

If an indication is received that the SIP buffer has more than a certain amount of text, functions 1514 and 1516 display a warning to the user that the buffer is close to full. In the disclosed embodiment this warning informs the user that the buffer will be automatically cleared if more than an additional number of characters are added to the buffer, and requests that the user verify that the text currently in the buffer is correct and then press talk or continue, which will clear the buffer.

If an indication is received that the SIP buffer has received text input, function 1518 causes steps 1520 through 1528 to be performed. Function 1520 tests to see if the cursor is currently at the and of the SIP buffer. If not, function 1522 outputs to the operating system a number of backspaces equal to the distance from the last letter of the SIP buffer to the current cursor position within that buffer. Next, function 1526 causes the text input, which can be composed of one or more characters, to be output into the SIP buffer at its current cursor location. Steps 1527 and 1528 output the same text sequence and any following text in the SIP buffer to the text input of the operating system.

The fact that function 1522 feeds backspace to the operating system before the recognized text is sent to the OS as well as the fact that function 1528 feed any text following the received text to the operating system causes any change made to the text of the SIP buffer that corresponds to text previously supplied to the application window to also be made to that text in the application window.

If the SIP program is in one-at-a-time mode when an indication of new SIP buffer text input is received, function 1536 tests to see if the text input has been generated in response to speech recognition. If so, function 1537 calls the display Choice List routine for the recognized text, and function 1538 turns off correction mode. Normally, the calling of the display Choice List routine switches the system to correction mode, but function 1538 prevents this from being the case when one-at-a-time mode is being used. As has been described above, this is because in one-at-a-time mode, a correction window is displayed automatically each time speech recognition is performed upon an utterance of the word, and thus there is a relatively high likelihood that a user intends input supplied to the non-correction window aspects of the SIP interface to be used for purposes other than input into the correction window. On the other hand, the correction window is being displayed as a result of specific user input indicating a desire to correct one or more words, correction mode is entered so that certain non-correction window inputs will be directed to the correction window.

Function 1539 tests to see if the following set of conditions is met: the SIP is in one-at-a-time mode, a correction window is displayed, but the system is not in correction mode. This is the state of affairs which normally exists after each utterance of the word in one-at-a-time mode. If the said conditions exist, functions 1540 responds to any of the inputs above in FIGS. 13, 14, and 15 by confirming recognition of the first choice in the correction window for purposes of causing that choice to be introduced as text output into the SIP buffer and to the operating system for purposes of updating the current language context for the recognition of one or more subsequent words, for the purpose of providing data for use in updating the language model, and for the purpose of providing data for updating acoustic models. This enables a user to confirm the prior recognition of the word in one-at-a-time mode by any one of a large number of inputs which can be used to also advance the recognition process.

It should be appreciated that if the user is in one-at-a-time mode and generates inputs indicating a desire to correct the word shown in a choice list, the SIP will be set to the correction mode, and subsequent input during the continuation of that mode will not cause operation of function 1540.

Function 1542 in FIG. 15 indicates the start of the portion of the main response loop of the SIP program, which relates to inputs received when a correction window is displayed. This portion extends through the remainder of FIG. 15 and all of FIGS. 16 and 17.

If the Escape button 1210 of a correction window shown in FIG. 12 is pressed, functions 1544 and 1546 cause the SIP program to exit the correction window without changing the current selection.

If the Delete button 1212 of the correction window shown in FIG. 12 is pressed, functions 1548 and 1550 delete the current selection in the SIP buffer and send an output to the operating system, which causes a corresponding change to be made to any text in the application window corresponding to that in the SIP buffer.

If the New button 1214 shown in FIG. 12 is pressed, functions 1552 causes functions 1553 to 1556 to be performed. Function 1553 deletes the current selection in the SIP buffer corresponding to the correction window and sends output to the operating system so as to cause a corresponding change to text in the application window. Function 1554 sets the recognition mode to the new utterance default, which will normally be the large vocabulary recognition mode, and can be set by the user to be either continuous or discrete recognition mode. Function 1556 starts SIP buffer recognition using the current recognition duration mode and other recognition settings. SIP buffer recognition is recognition that provides an input to the SIP buffer, according to the operation of functions 1518 to 1538, described above.

FIG. 16 continues the illustration of the response of the main loop of the SIP program to input received during the display of a correction window.

If the re-utterance button 1216 of FIG. 12 is pressed, function 1602 causes functions 1603 through 1610 to be performed. Function 1603 sets the SIP program to the correction mode if it is not currently in it. This will happen if the correction window has been displayed as a result of a discrete word recognition in one-at-a-time mode and the user responds by pressing a button in the correction window, in this case the Re-utterance button, indicating an intention to use the correction window for correction purposes. Next, function 1604 sets the recognition mode to the current recognition mode associated with re-utterance recognition. Then function 1606 receives one or more utterances according to the current re-utterance recognition duration mode and other recognition settings, including vocabulary. Next function 1608 adds the one or more utterances received by function 1606 to the utterance list for the correction window selection, along with an indication of the vocabulary mode at the time of those utterances, and whether continuous or discrete recognition is in effect. This causes the utterance list 2004 shown in FIGS. 24 and 25 to have an additional utterance.

Then function 1610 calls the display Choice List routine of FIG. 22, described above. This in turn will call the get Choices function described above regarding FIG. 23 and will cause functions 2306 through 2336 to perform re-utterance recognition using the new utterance list entry.

[If the Filter button 1218 shown in FIG. 12 is pressed, function 1612 of FIG. 16 and cause Functions 1613 to 1620 to be performed Function 1613 enters the correction mode and if the SIP program is not currently in it, as described above with regard to Function 1603 function 1614 tests to see whether the current entry mode is a speech recognition mode and if so causes function 1616 to start filter recognition and according to the current filter recognition duration mode and settings. This causes any input generated by such recognition to be directed to the cursor of the current filter string. If on the other hand the current filter entry mode is an non-speech recognition entry window mode functions 1618 and 1620 call the appropriate entry window. As described below, in the embodiment of the invention shown, these non-speech entry window modes correspond to a character recognition entry mode, a handwriting recognition entry mode and a keyboard entry mode.

If the user presses the Word Form button 1220 shown in FIG. 12, functions 1622 through 1624 cause the correction mode to be entered if the SIP program is not currently in it, and cause the word form list routine of FIG. 27 to be called for the current first choice word. Until a user provides input to the correction window that causes a redisplay of the correction window, the current first choice will normally be the selection for which the correction window has been called. This means that by selecting one or more words in the SIP buffer and by pressing the Word Form button in the correction window, a user can rapidly select a list of alternate forms for any such a selection.

FIG. 25 illustrates the function of the word form list routine. If a correction window is already displayed when it is called, functions 2702 and 2704 treat the current best choice as the selection for which the word form list will be displayed. If the current selection is one word, function 2706 causes functions 2708 through 2714 to be performed. If the current selection has any homonyms, function 2708 places them at the start of the word form choice list. Next, step 2710 finds the root form of the selected word, and function 2712 creates a list of alternate grammatical forms for the word. Then function 2714 alphabetically orders all these grammatical forms in the choice list after any homonyms, which may have been added to the list by function 2708.

If, on the other hand, the selection is composed of multiple words, function 2716 causes functions 2718 through functions 2728 to be performed. Function 2718 tests to see if the selection has any spaces between its words. If so, function 2720 adds a copy of the selection to the choice list, which has no such spaces between its words, and function 2222 adds a copy of the selection with the spaces replaced by hyphens. Although not shown in FIG. 27, additional functions can be performed to replace hyphens with spaces or with the absence of spaces. If the selection has multiple elements subject to the same spelled/non spelled transformation function, 2726 adds a copy of the selection and all prior choices transformations to the choice list. For example, this will transform a series of number names into a numerical equivalent, or reoccurrences of the word "period" into corresponding punctuation marks. Next, function 2728 alphabetically orders the choice list.

Once the choice list has been created either for a single word or a multiword selection, function 2730 displays a correction window showing the selection as the first choice, the filter cursor at the start of the first choice, and a scrollable choice list and a scrollable list. In some embodiments where the selection is a single word, the filter of which has a single sequence of characters that occurs in all its grammatical forms, the filter cursor could be placed after that common sequence with the common sequence indicated as an unambiguous filter string.

In some embodiments of the invention, the word form list provides one single alphabetically ordered list of optional word forms. In other embodiments, options can be ordered in terms of frequency of use, or there could be a first and a second alphabetically ordered choice list, with the first choice list containing a set of the most commonly selected optional forms which will fit in the correction window at one time, and the second list containing less commonly used word forms.

As will be demonstrated below, the word form list provides a very rapid way of correcting a very common type of speech recognition error, that is, an error in which the first choice is a homonym of the desired word or is an alternate grammatical form of it.

If the user presses the Capitalization button 1222 shown in FIG. 12, functions 1626 through 1628 will enter the correction mode if the system is currently not in it and will call the capitalized cycle function for the correction window's current first choice. The capitalized correction cycle will cause a sequence of one or more words which do not all have initial capitalization to have initial capitalization of each word, will cause a sequence of one or more words which all have initial capitalization to be changed to an all capitalized form, and will cause a sequence of one or more words which have an all capitalized form to be changed to an all lower case form. By repeatedly pressing the Capitalization button, a user can rapidly select between these forms.

If the user selects the Play button 1224 shown in FIG. 12, functions 1630 and 1632 cause an audio playback of the first entry in the utterance list associated with the correction window's associated selection, if any such entry exists. This enables a user to hear exactly what was spoken with regard to a mis-recognized sequence of one or more words. Although not shown, the preferred embodiments enable a user to select a setting which automatically causes such audio to be played automatically when a correction window is first displayed.

If the Add Word button 1226 shown in FIG. 12 is pressed when it is not displayed in a grayed state, function 1634 and 1636 call a dialog box that allows a user to enter the current first choice word into either the active or backup vocabulary. In this particular embodiment of the SIP recognizer, the system uses a subset of its total vocabulary as the active vocabulary that is available for recognition during the normal recognition using the large vocabulary mode. Function 1636 allows a user to make a word that is normally in the backup vocabulary part of the active vocabulary. It also allows the user to add a word that is in neither vocabulary but which has been spelled in the first choice window by use of alphabetic input, to be added to either the active or backup vocabulary. It should be appreciated that in other embodiments of the invention having greater hardware resources, there would be no need for distinction between an active and a backup vocabulary.

The Add Word button 1226 will only be in a non-grayed state when the first choice word is not currently in the active vocabulary. This provides an indication to the user that he or she may want to add the first choice to either the active or backup vocabulary.

If the user selects the Check button 1228 shown in FIG. 12, functions 1638 through 1648 remove the current correction window and output its first choice to the SIP buffer and feed to the operating system a sequence of keystrokes necessary to make a corresponding change to text in the application window.

If the user taps one of the choices 1230 shown in the correction window of FIG. 12, functions 1650 through 1653 remove the current correction window, and output the selected choice to the SIP buffer and feed the operating system a sequence of keystrokes necessary to make the corresponding change in the application window.

If the user taps on one of the Choice Edit buttons 1232 shown in FIG. 12, function 1654 causes functions 1656 through 1658 to be performed. Function 1656 changes to correction mode if the system is not already currently in it. Function 1656 makes the choice associated with the tapped Choice Edit button to be the first choice and to be the current filter string, then function 1658 calls the display Choice List with a new filter string. As will be described below, this enables a user to select a choice word or sequence of words as the current filter string and then to edit that filter string, normally by deleting any characters from its end which disagree with the desired word.

If the user drags across one or more initial characters of any choice, including the first choice, functions 1664 through 1666 change the system to correction mode if it is not in it, and call the display Choice List with the dragged choice added to the choice list and with the dragged initial portion of the choice as the filter string. These functions allow a user to indicate that a current choice is not the desired first choice but that the dragged initial portion of it should be used as a filter to help find the desired choice.

FIG. 17 provides the final continuation of the list of functions which the SIP recognizer makes in response to correction window input.

If the user drags across the ending of a choice, including the first choice, functions 1702 and 1704 enter the correction mode if the system is currently not already in it, and call display Choice List with the partially dragged choice added to the not Choice List and with the undragged initial portion of the choice as the filter string.

If the user drags across two choices in the choice list, functions 1706 through 1708 enter the correction mode if the system is not currently in it, and call display Choice List with the two choices added to the not Choice List and with the two choices as the beginning and ending words in the definition of the current filter range.

If the user taps between characters on the first choice, functions 1710 through 1712 enter the correction mode if the SIP is not already in it, and move the filter cursor to the tapped location. No call is made to display Choice List at this time because the user has not yet made any change to the filter.

If the user enters a backspace by pressing the Backspace button 1116 when in correction mode, as described above with regard to function 1334 of FIG. 13, function 1714 causes functions 1718 through 1720 to be performed. Function 1718 calls the filter edit routine of FIGS. 28 and 29 when a backspace is input.

As will be illustrated with regard to FIG. 28, the filter edit routine 2800 is designed to give the user flexibility in the editing of a filter with a combination of unambiguous, ambiguous, and/or ambiguous length filter elements.

This routine includes a function 2802, a test to see if there are any characters in the choice with which it has been called before the current location of the filter cursor. If so, it causes functions 2804 to define the filter string with which the routine has been called as the old filter string, and function 2806 makes the characters in the choice with which the routine has been called before the location of the filter cursor, the new filter cursor, and all the characters in that string to be unambiguously defined. This enables a user to define any part of a first choice because of the location of an edit to be automatically confirmed as a correct filter character.

Next, the function 2807 tests to see if the input with which the filter edits have been called is a backspace. If so, it causes functions 2808 through 2812 to be performed. Functions 2808 and 2810 delete the last character of the new filter string if the filter cursor is a non-selection cursor. If the filter cursor corresponds to a selection of one or more characters in the current first choice, these characters were already not to be included in the new filter by the operation of function 2806 just described. Then function 2812 clears the old filter string because when the input to the filter edit is a backspace it is assumed that no portions of the prior filter to the right of the location of the backspace are intended for future inclusion in the filter. This deletes any ambiguous as well as unambiguous elements in the filter string which might have been previously to the right of the location of the filter cursor.

If the input with which the filter edit routine is called is one or more unambiguous characters, functions 2814 and 2816 add the one or more unambiguous characters to the end of the new filter string.

If the input to the filter edit routine is a sequence of one or more ambiguous characters of fixed length, function 2818 and function 2820 place an element representing each ambiguous character in the sequence at the end of the new filter.

If the input to the filter edit routine is an ambiguous length element, function 2822 causes functions 2824 through 2832 to be performed. Function 2824 selects the best-scoring sequence of letters associated with the ambiguous input, which, if added to the prior unambiguous part of the filter, would correspond to all or an initial part of a vocabulary word. It should be remembered that when this function is performed, all of the prior portions of the new filter string will have been confirmed by the operation of function 2806, described above. Next, function 2826 tests to see if there are any sequences selected by function 2824 above a certain minimum score. If so, it will cause function 2828 to select the best-scoring letter sequences independent of vocabulary. This is done because if the condition of the test in function 2826 is met, it indicates that the ambiguous filter is being used to spell out a vocabulary word. Next, functions 2830 and 2832 associate the character sequences selected by the operation of functions 2824 through function 2828 with a new ambiguous filter element, and they add that new ambiguous filter element to the end of the new filter string.

Next, a loop 2834 is performed for each filter element in the old filter string. This loop comprises the functions 2836 through 2850 shown in the remainder of FIG. 28 and the functions 2900 through 2922 shown in FIG. 29.

If the current old filter string element of the loop 2834 is an ambiguous, fixed length element that extends beyond a new fixed length element which has been added to the new filter string by functions 2814 through 2820, functions 2836 and 2838 add the old element to the end of the new filter string if it extends beyond those new elements. This is done because editing of a filter string other than by use of the Backspace button does not delete previously entered filter information that corresponds to part of the prior filter to the right of the new edit.

If the current old element of the loop 2834 is an ambiguous, fixed length element that extends beyond some sequences in a new ambiguous length element that has been added to the end of the new filter string by operation of functions 2822 through 2832, function 2840 causes functions 2842 through 2850 to be performed. Function 2842 performs a loop for each character sequence represented by the new ambiguous length element that has been added to the filter string. The loop performed for each such character sequence of the new ambiguous length element includes a loop 2844 performed for each character sequence which agrees with the current old ambiguous fixed length element of the loop 2834. This inner loop 2844 includes a function 2846, which test to see if the old element matches and extends beyond the current sequence in the new element. If so, function 2848 adds to the list of character sequences represented by the new ambiguous length element a new sequence of characters corresponding to the current sequence from the new element plus the portion of the sequence from the old element that extends beyond that current sequence from the new element.

If the current old element is an ambiguous length element that contains any character sequences that extend beyond a new fixed length element that has been added to the new filter, function 2900 of FIG. 29 causes functions 2902 through 2910 to be performed.

Function 2902 is a loop which is performed for each sequence represented by the old ambiguous length element. It is composed of a test 2904 that checks to see if the current sequence from the old element matches and extends beyond the new fixed length element. If so, function 2906 creates a new character sequence corresponding to that extension from the old element that extends beyond the new. After this loop has been completed, a function 2908 tests to see if any new sequences have been created by the function 2906, and if so, they cause function 2910 to add that new ambiguous length element to the end of the new filter, after the new element. This new ambiguous length element represents the possibility of each of the sequences created by function 2906. Preferably a probability score is associated with each such new sequence based on the relative probability scores of each of the character sequences which were found by the loop 2902 to match the current new fixed length element.

If the current old element is an ambiguous length element that has some character sequences that extend beyond some character sequences in a new ambiguous length element, function 2912 causes functions 2914 through 2920 to be performed. Function 2914 is a loop that is performed for each character sequence in the new ambiguous length element. It is composed of an inner loop 2916 which is performed for each character sequence in the old ambiguous length element. This inner loop is composed of functions 2918 and 2920, which test to see if the character sequence from the old element matches and extends beyond the current character sequence from the new element. If so, they associate with the new ambiguous length element, a new character sequence corresponding to the current sequence from the new element plus the extension from the current old element character sequence.

Once all the functions in the loop 2834 are completed, function 2924 returns from the call to filter edit with the new filter string which has been created by that call.

It should be appreciated that in many embodiments of various aspects of the invention a different and often more simple filter-editing scheme can be used. But it should be appreciated that one of the major advantages of the filter edit scheme shown in FIGS. 28 and 29 is that it enables one to enter an ambiguous filter quickly, such as by continuous letter recognition, and then to subsequently edit it by more reliable alphabetic entry modes, or even by subsequent continuous letter recognition. For example, this scheme would allow a filter entered by the continuous letter recognition to be all or partially replaced by input from discrete letter recognition, ICA word recognition, or even handwriting recognition. Under this scheme, when a user edits an earlier part of the filter string, the information contained in the latter part of the filter string is not destroyed unless the user indicates such an intent, which in the embodiment shown is by use of the backspace character.

Returning now to FIG. 17, when the call to filter edit in function 1718 returns, function 1724 calls display Choice List for the selection with the new filter string that has been returned by the call to filter edit.

Whenever filtering input is received, either by the results of recognition performed in response to the pressing of the filter key described above with regard to function 1612 of FIG. 16, or by any other means, functions 1722 through 1738 are performed.

Figure 39:
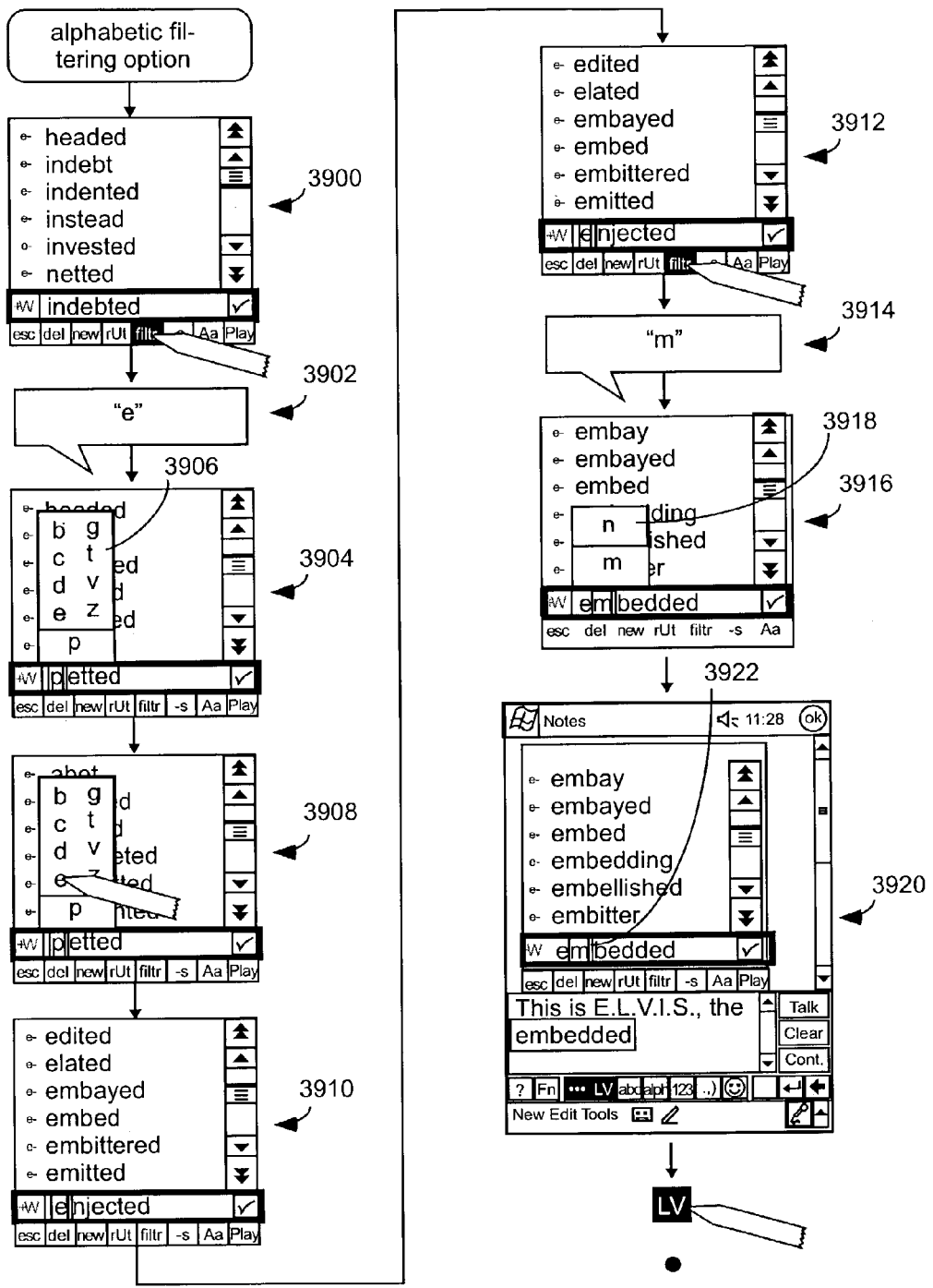
FIG. 39 illustrates how a user of the sip can use the speech recognition of letter names to input filtering characters and how a filter character choice list can be used to correct errors in the recognition of such filtering characters.

Function 1724 tests to see if the system is in one-at-a-time recognition mode and if the filter input has been produced by speech recognition. If so, it causes functions 1726 to 1730 to be performed. Function 1726 tests to see if a filter character choice window, such as window 3906 shown in FIG. 39, is currently displayed. If so, function 1728 closes that filter choice window and function 1730 calls filter edit with the first choice filter character as input. This causes all previous characters in the filter string to be treated as an unambiguously defined filter sequence. Regardless of the outcome of the test of function 1726, a function 1732 calls filter edit for the new filter input which is causing operation of function 1722 and the functions listed below it. Then, function 1734 calls display Choice List for the current selection and the new filter string. Then, if the system is in one-at-a-time mode, functions 1736 and 1738 call the filter character choice routine with the filter string returned by filter edit and with the newly recognized filter input character as the selected filter character.

FIG. 30 illustrates the operation of the filter character choice subroutine 3000. It includes a function 3002 which tests to see if the selected filter character with which the routine has been called corresponds to an either an ambiguous character or an unambiguous character in the current filter string having multiple best choice characters associated with it. If this is the case, function 3004 sets a filter character choice list equal to all characters associated with that character. If the number of characters is more than will fit on the filter character choice list at one time, the choice list can have scrolling buttons to enable the user to see such additional characters. Preferably the choices are displayed in alphabetical order to make it easier for the user to more rapidly scan for a desired character. The filter character choice routine of FIG. 30 also includes a function 3006 which tests to see if the selected filter character corresponds to a character of an ambiguous length filter string element in the current filter string. If so, it causes functions 3008 through 3014 to be performed. Function 3008 tests to see if the selected filter character is the first character of the ambiguous length element. If so, function 3010 sets the filter character choice list equal to all the first characters in any of the ambiguous element's associated character sequences. If the selected filter character does not correspond to the first character of the ambiguous length element, functions 3012 and 3014 set the filter character choice list equal to all characters in any character sequences represented by the ambiguous element that are preceded by the same characters as in the selected filter character in the current first choice. Once either functions 3002 and 3004 or functions 3006 though 3014 have created a filter character choice list, function 3016 displays that choice list in a window, such as the window 3906 shown in FIG. 39

If the SIP program receives a selection by a user of a filter character choice in a filter character choice window, function 1740 causes functions 1742 through 1746 to be performed. Function 1742 closes the filter choice window in which such a selection has been made. Function 1744 calls the filter edit function for the current filter string with the character that has been selected in the filter choice window as the new input. Then function 1746 calls the display Choice List routine with the new filter string returned by filter edit.

Figure 45:
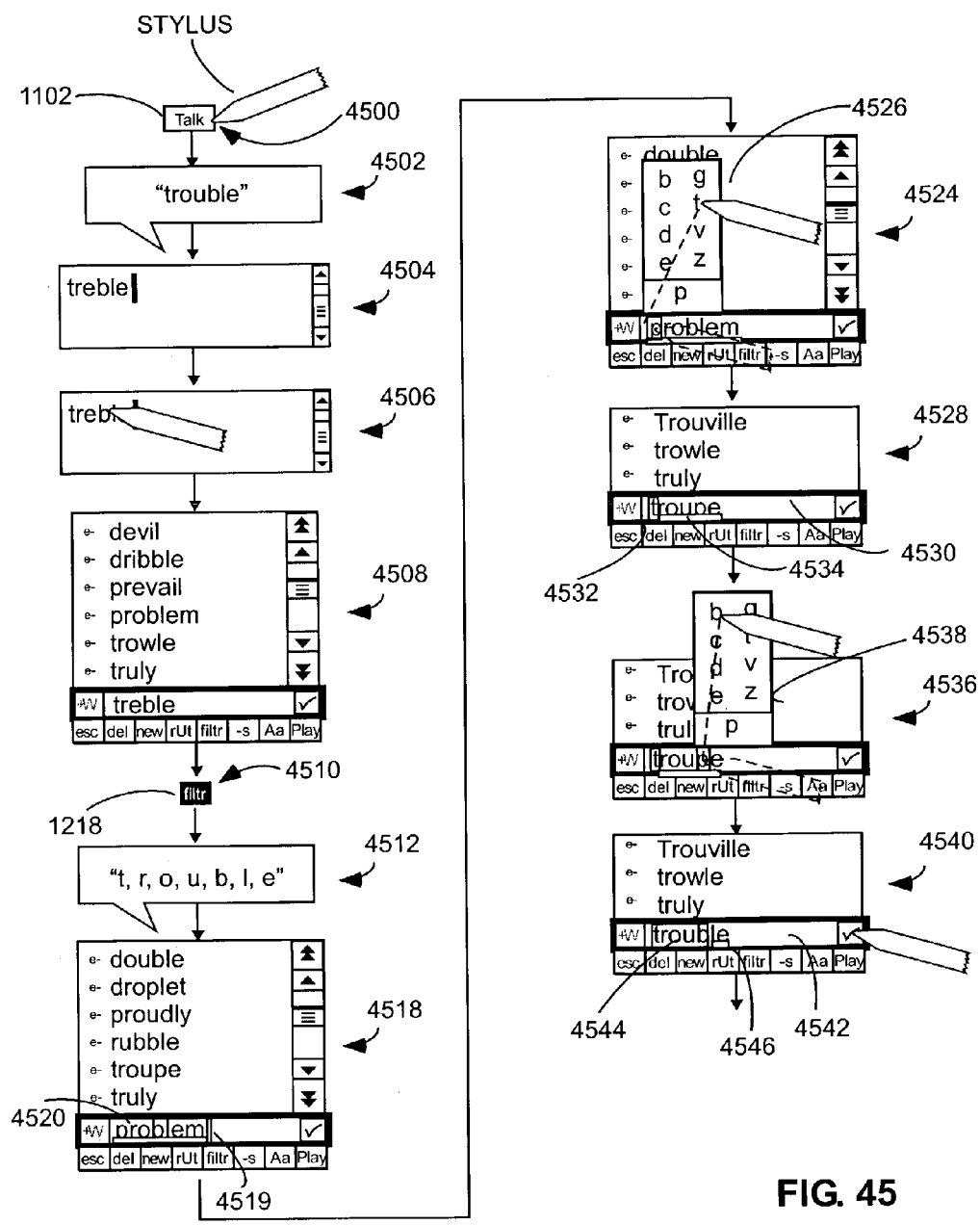
FIG. 45 illustrates how the user can correct a misrecognition by spelling all or part of the desired output using continuous letter name recognition as an ambiguous (or multivalued) filter, and how the user can use filter character choice lists to rapidly correct errors produced in such continuous letter name recognition.

If a drag upward from a character in a filter string, of the type shown in the correction windows 4526 and 4538 of FIG. 45, function 1747 causes functions 1748 through 1750 to be performed. Function 1748 calls the filter character choice routine for the character which has been dragged upon, which causes a filter character choice window to be generated for it if there are any other character choices associated with that character. If the drag is released over a filter choice character in this window, function 1749 generates a selection of the filter character choice over which the release takes place. Thus it causes the operation of the functions 1740 through 1746 which have just been described. If the drag is released other than on a choice in the filter character choice window, function 1750 closes the filter choice window.

If a re-utterance is received other than by pressing of the Re-utterance button, as described above with regard to functions 1602 and 1610, such as by pressing the Large Vocabulary button or the Name Vocabulary button during correction mode, as described above with regard to functions 1350, 1356 and 1414 and 1416 of FIGS. 13 and 14, respectively, function 1752 of FIG. 17 causes functions 1754 and 1756 to be performed. Function 1754 adds any such new utterance to the correction window's selections utterance list, and function 1756 calls the display Choice List routine for the selection so as to perform re-recognition using the new utterance.

Turning now to FIGS. 31 through 41, we will provide an illustration of how the user interface which has just been described can be used to dictate a sequence of text. In this particular sequence, the interface is illustrated as being in the one-at-a-time mode, which is a discrete recognition mode that causes a correction window with a choice list to be displayed every time a discrete utterance is recognized.

Figure 31:
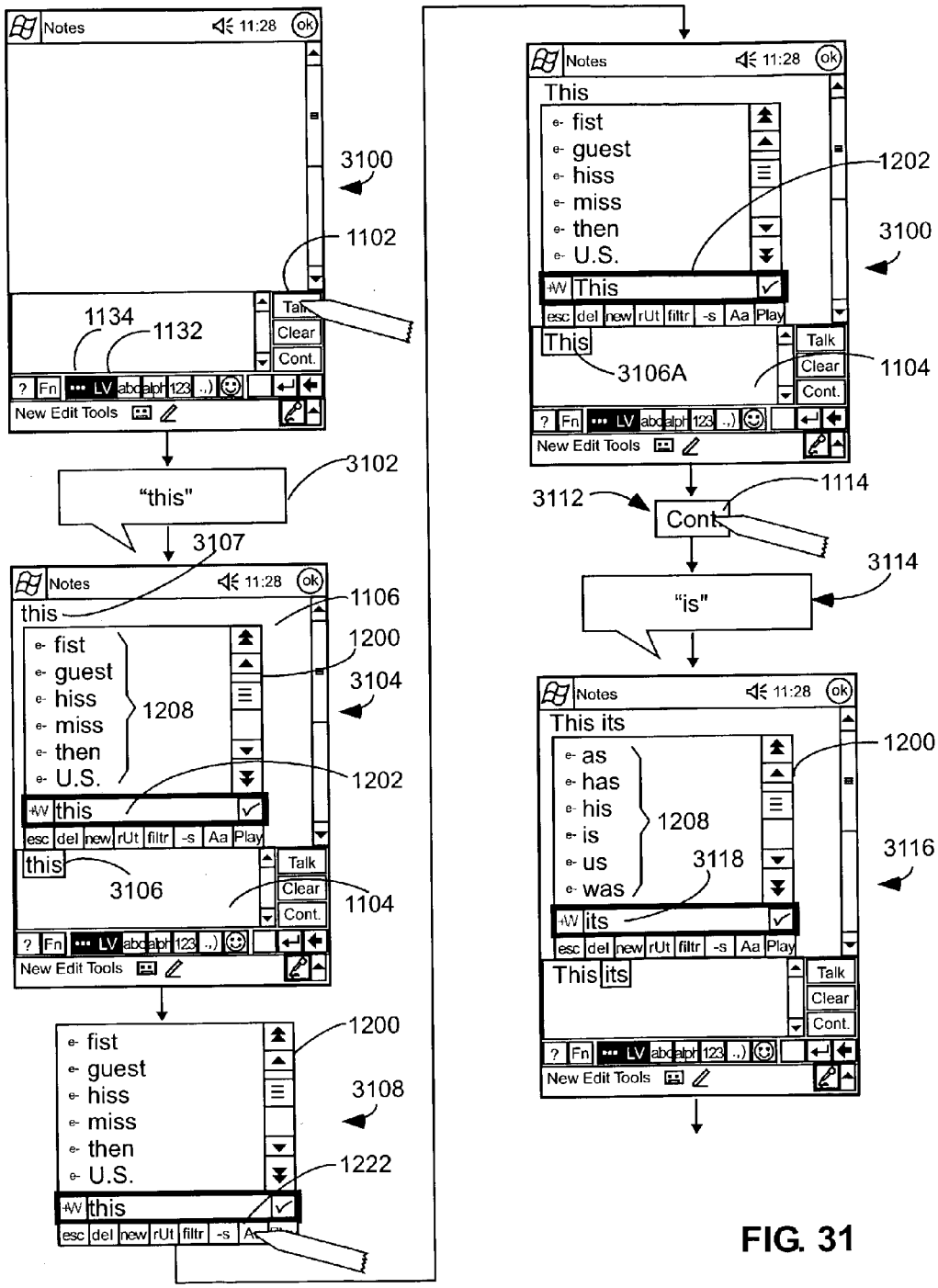
FIGS. 31 through 35 illustrate a sequence of interactions between a user and the speech recognition SIP, in which the user enters and corrects the recognition of words using a one-at-a-time discrete speech recognition method.

In FIG. 31, numeral 3100 points to the screenshot of the PDA screen showing the user tapping the Talk button 1102 to commence dictation starting in a new linguistic context. As indicated by the highlighting of the Large Vocabulary button 1132, the SIP recognizer is in the large vocabulary mode. The sequence of separated dots on the Continuous/Discrete button 1134 indicates that the recognizer is in a discrete recognition mode. It is assumed the SIP is in the Press And Click To End Of Utterance Recognition duration mode described with regard to numerals 1810 to 1816 of FIG. 18. As a result, the click of the Talk button causes recognition to take place until the end of the next utterance. Numeral 3102 represents an utterance by the user of the word "this". Numeral 3104 points to an image of the screen of the PDA after a response to this utterance by placing the recognized text 3106 in the SIP text window 1104, outputting this text to the application window 1106, and by displaying a correction window 1200 which includes the recognized word in the first choice window 1202 and a first choice list 1208.

In the example of FIG. 31, the user taps the Capitalization button 1222 as pointed to by the numeral 3108. This causes the PDA screen to have the appearance pointed to by 3110 in which the current first choice and the text output in the SIP buffer and the application window is changed to having initial capitalization.

In the example the user clicks the Continue button 1104 as pointed to by numeral 3102 and than utters the word "is" as pointed to by numeral 3114. In the example, it is assumed this utterance is mis-recognized as the word "its" causing the PDA screen to have the appearance pointed to by numeral 3116, in which a new correction window 1200 is displayed having the mis-recognized word as its first choice 3118 and a new choice list for that recognition 1208.

Figure 32:
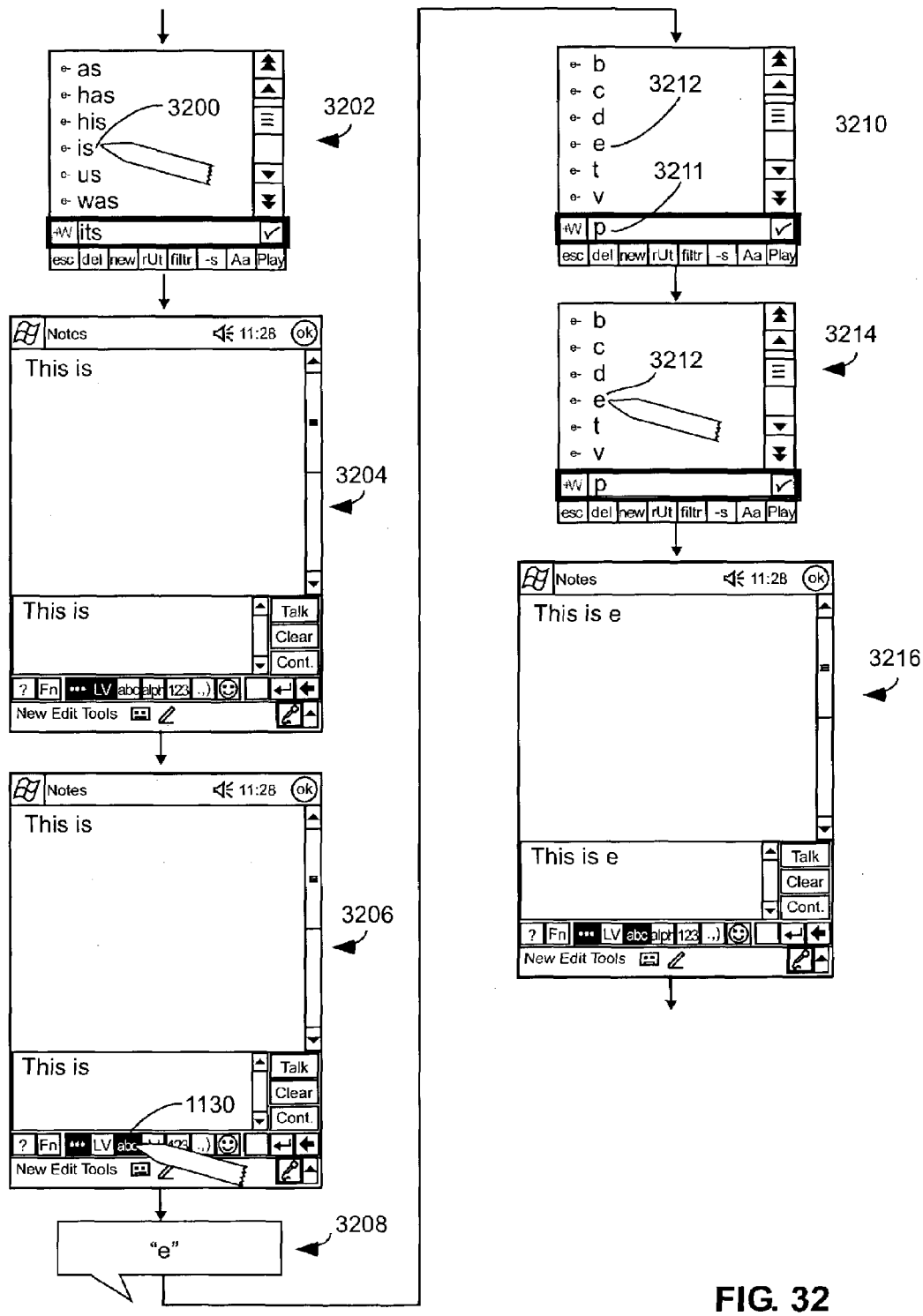

FIG. 32 represents a continuation of this example, in which the user clicks the choice word "is" 3200 in the image pointed to by numeral 3202. This causes the PDA screen to have the appearance indicated by the numeral 3204 in which the correction window has been removed, and corrected text appears in both the SIP buffer window and the application window.

In the screenshot pointed to by numeral 3206 the user is shown tapping the letter name vocabulary button 1130, which changes the current recognition mode to the letter name vocabulary as is indicated by the highlighting of the button 1130. As is indicated above with regard to functions 1410 and 1412, the tapping of this button commences speech recognition according to the current recognition duration mode. This causes the system to recognize the subsequent utterance of the letter name "e" as pointed to by numeral 3208

In order to emphasize the ability of the present interface to quickly correct recognition mistakes, the example assumes that the system mis-recognizes this letter as the letter "p" 3211, as indicated by the correction window that is displayed in one-at-a-time mode in response to the utterance 3208. As can be seen in the correction window pointed to by 3210, the correct letter "e" is, however, one of the choices shown in the correction window. In the view of the correction window pointed to by numeral 3214, the user taps on the choice 3212, which causes the PDA screen to have the appearance pointed to by numeral 3216 in which the correct letter is entered both in the SIP buffer and the application window.

Figure 33:
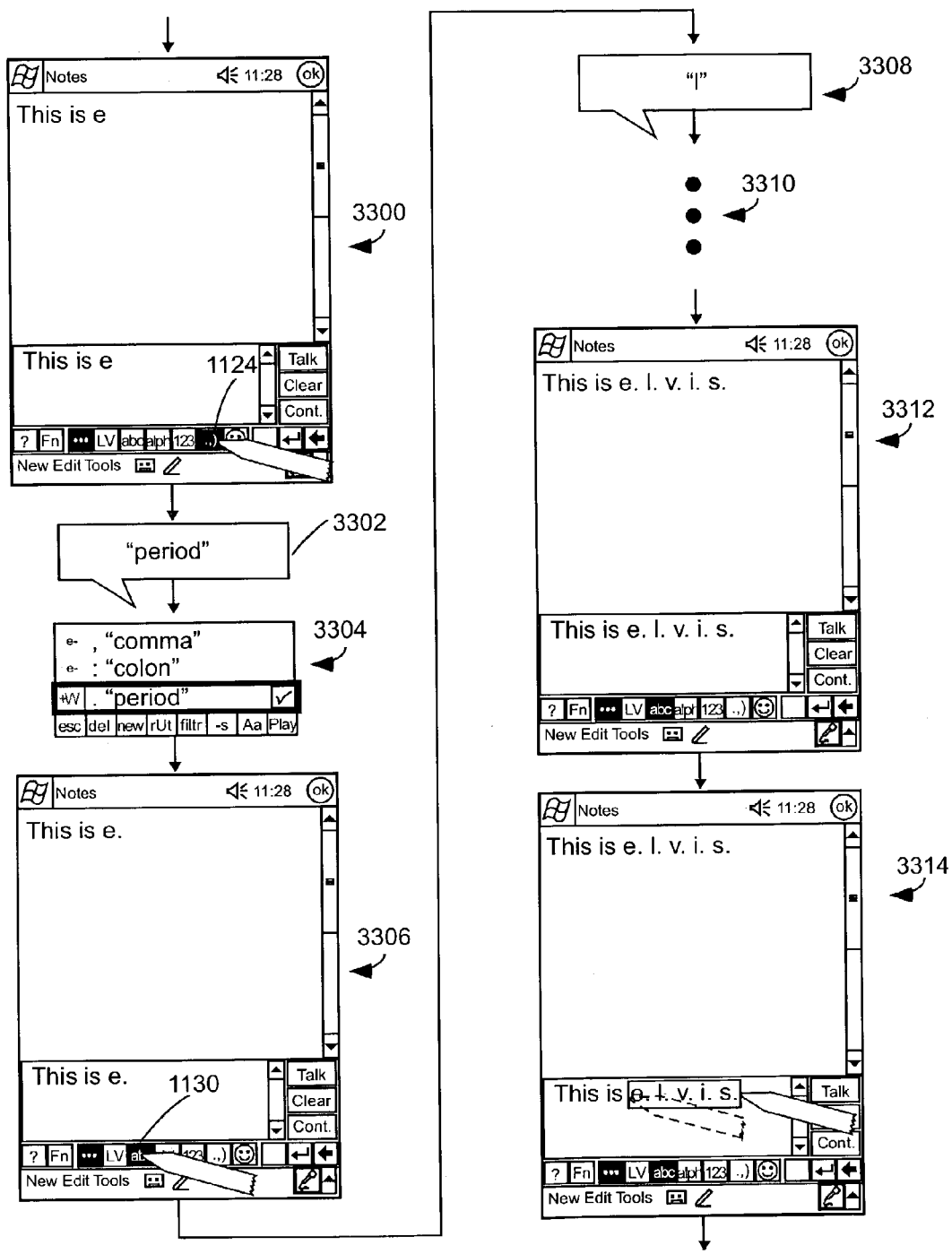
Figure 34:
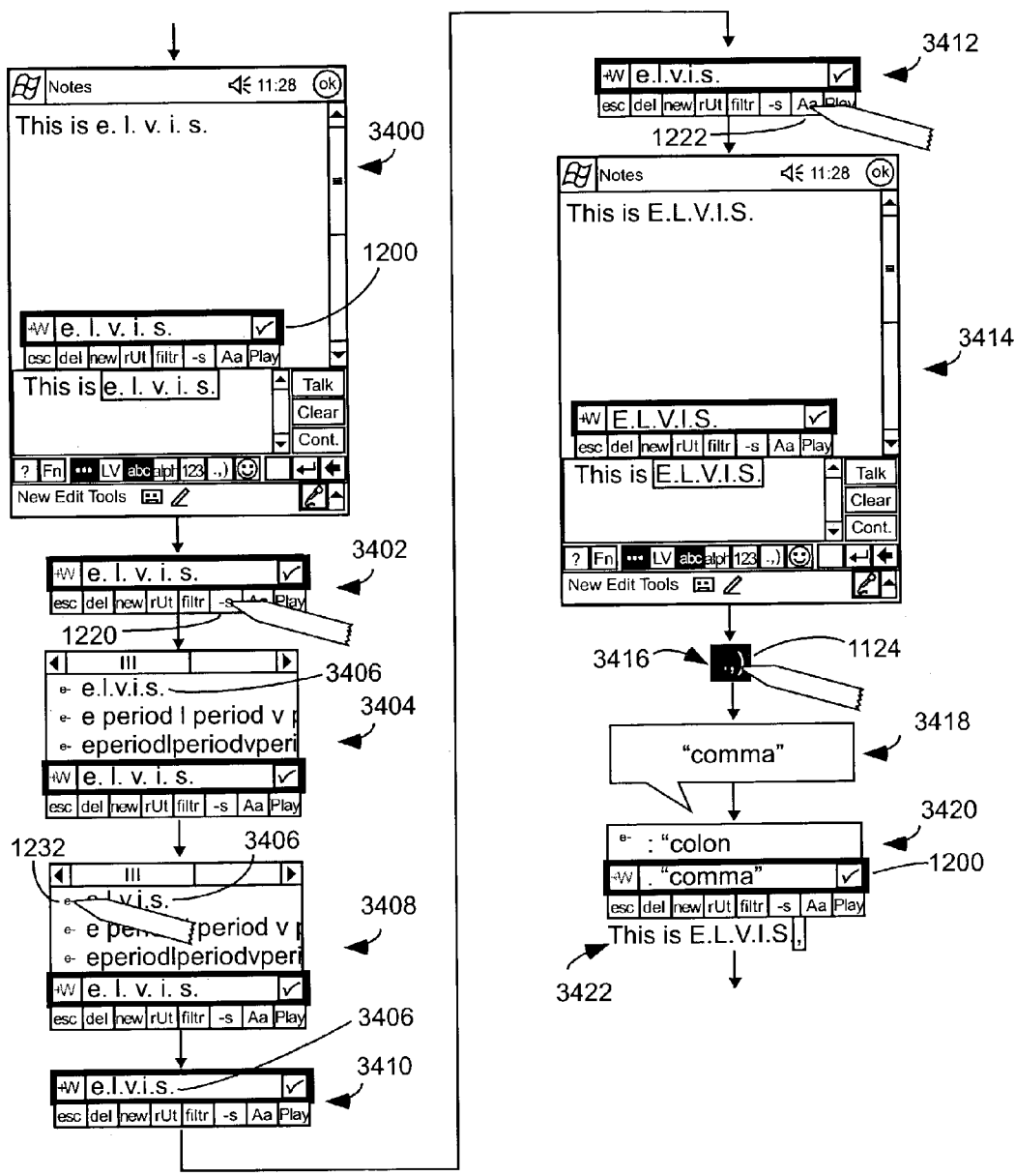

FIG. 33 illustrates a continuation of this example, in which the user taps on the Punctuation Vocabulary button 11,024 as indicated in the screenshot pointed to by button 11,024. This starts utterance recognition causing the utterance of the word "period" pointed to by the numeral 3300, which changes the recognition vocabulary to the punctuation vocabulary as indicated by the highlighting numeral 3302 to give rise to the correction pointed to by 3304 in which the punctuation mark "." is shown in the first choice window followed by that punctuation mark's name to make it easier for the user to recognize.

Since, in the example, this is the correct recognition, the user confirms it and starts recognition of a new utterance using the letter name vocabulary by pressing the button 1130, as shown in the screenshot numeral 3306, and saying the utterance 3308 of the letter "l." This process of entering letters followed by periods is repeated until the PDA screen has the appearance shown by numeral 3312. At this point it is assumed the user drags across the text "e. l.v.i.s." as shown in the screenshot 3314 which causes that text to be selected and which causes the correction window 1200 in the screenshot 3400 near the upper left-hand corner of FIG. 34 to be displayed. Since it is assumed that the selected text string is not in the current vocabulary, there are no alternate choices displayed in this choice list. In the view of the correction window pointed to by 3402, the user taps the Word Form button 1220, which calls the word form list routine described above with regard to FIG. 27. Since the selected text string includes spaces, it is treated as a multiple-word selection causing the portion of the routine shown in FIG. 27 illustrated by functions 2716 through 2728 to be performed. This includes a choice list such as that pointed to by 3404 including a choice 3406 in which the spaces have been removed from the correction window's selection. In the example, the user taps the Edit button 1232 next to the closest choice 3406. As indicated in the view of the correction window pointed to by numeral 3410, this causes the choice 3406 to be selected as the first choice, as indicated in the view of the correction window pointed to by 3412. The user taps on the Capitalization button 1222 until the first choice becomes all capitalized at which point the correction window has the appearance indicated in the screenshot 3414. At this point the user clicks on the Punctuation Vocabulary button 1124 as pointed to by 3416 and says the utterance "comma" pointed to by 3418. In the example it is assumed that this utterance is correctly recognized causing a correction window 1200 pointed to by the numeral 3420 to be displayed and the former first choice "e.l.v.i.s." to be outputted as text.

Figure 35:
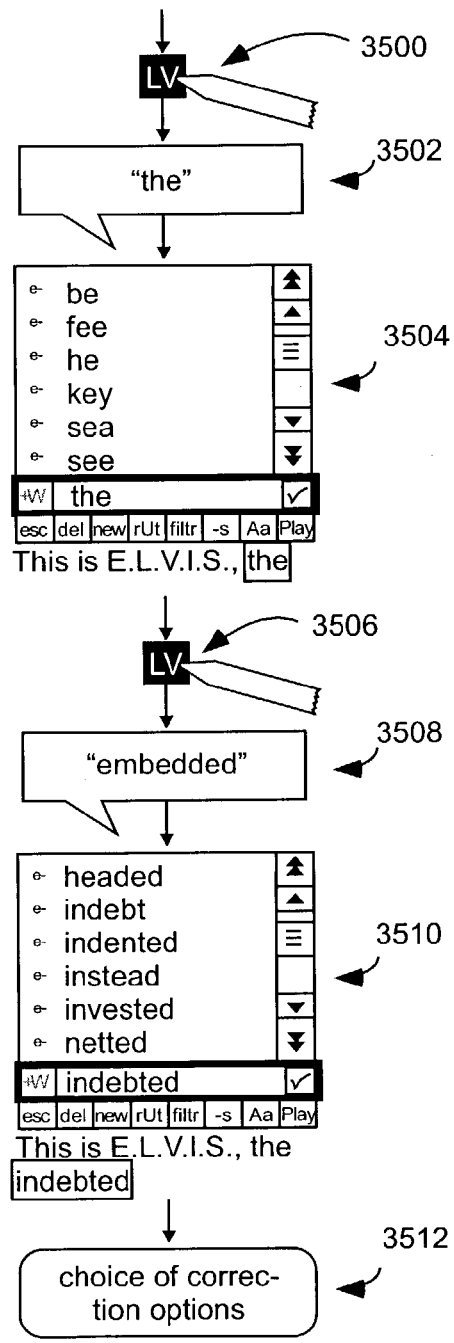

FIG. 35 is a continuation of this example. In it, it is assumed that the user clicks the Large Vocabulary button as indicated by numeral 3500, and then says the utterance "the" 3502. This causes the correction window 3504 to be displayed. The user responds by confirming this recognition by again pressing the large vocabulary button as indicated by 3506 and saying the utterance "embedded" pointed to by 3508. In the example, this causes the correction window 3510 to be displayed in which the utterance has been mis-recognized as the word "imbedded" and in which the desired word is not shown on the first choice list. Starting at this point, as is indicated by the comment 3512, a plurality of different correction options will be illustrated.

Figure 36:
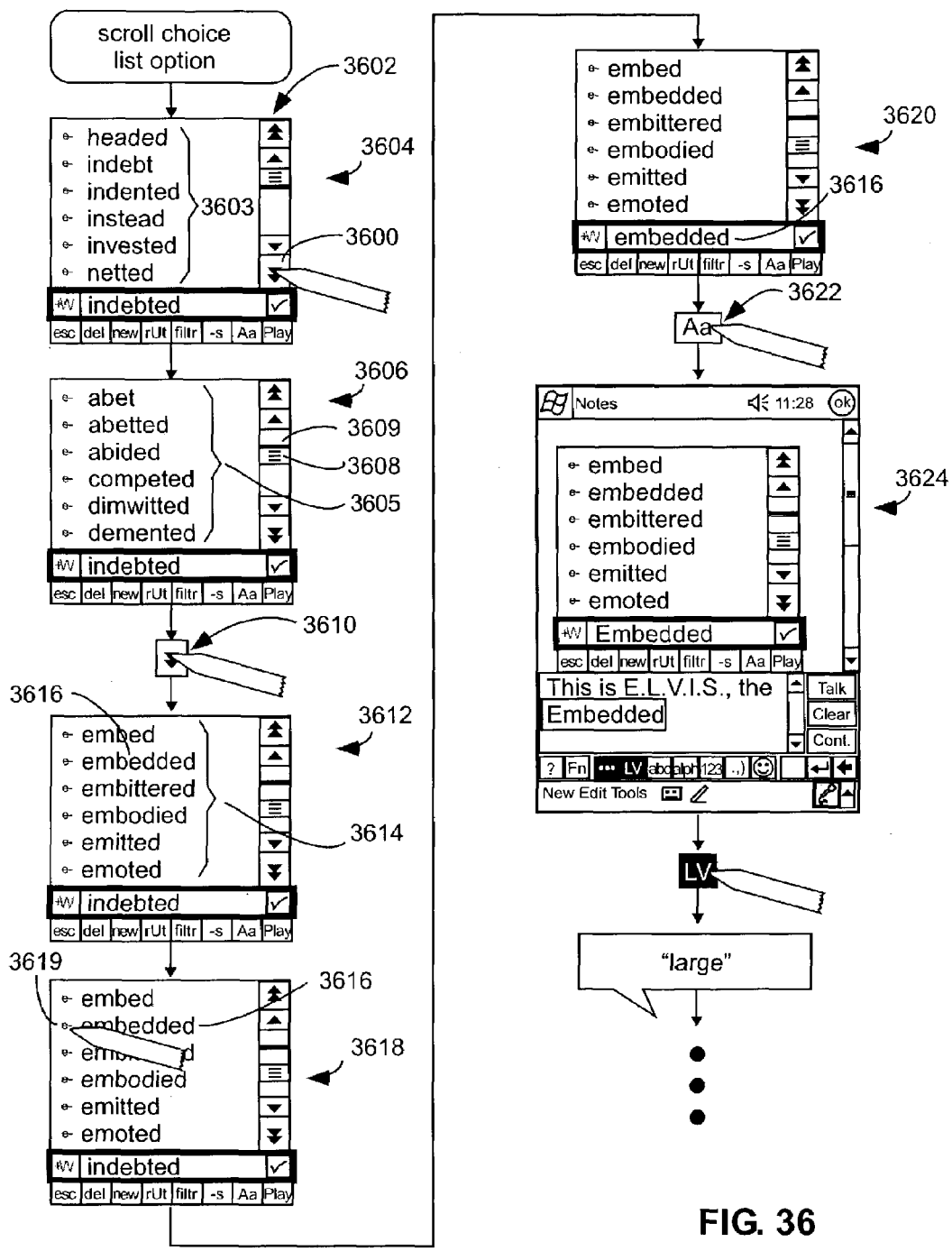
FIG. 36 shows how a user of the SIP can correct a mis-recognition shown at the end of FIG. 35 by a scrolling through the choice list provided in the correction window until finding a desired word and then using a capitalized button to capitalize it before entering it into text.

FIG. 36 illustrates the correction option of scrolling through the first and second choice list associated with the mis-recognition. In the view of the correction window pointed to by 3604, the user shown tapping the page down scroll button 3600 in the scroll bar 3602 of the correction window causes the first choice list 3603 to be replaced by the first screenful of the second choice list 3605 as indicated in the view of the correction window 3606. As can be seen in this view, the slide bar 3608 of the correction window has moved down below a horizontal bar 3609, which defines the position in the scroll bar associated with the end of the first choice list. In the example, the desired word is not in the portion of the alphabetically ordered second choice list shown in view 3606, and thus the user presses the Page Down button of the scroll bar as indicated by 3610. This causes the correction window to have the appearance shown in view 3612 in which a new screenful of alphabetically listed choices is shown. In the example, the desired word "embedded" is shown on this choice list as is indicated by the 3616. In the example, the user clicks on this choice button 3619 associated with this desired choice as shown in the view of the correction window pointed to by 3618. This causes the correction window to have the view pointed to by 3620 in which this choice is displayed in the first choice window. In the example, the user taps the Capitalized button as pointed to by numeral 3622 which causes this first choice to have initial capitalization as shown in the screenshot 3624.

Thus it can be seen that the SIP user interface provides a rapid way to allow a user to select from among a relatively large number of recognition choices. In the embodiment shown, the first choice list is composed of up to six choices, and the second choice list can include up to three additional screens of up to 18 additional choices. Since the choices are arranged alphabetically and since all four screens can be viewed in less than a second, this enables the user to select from among up to 24 choices very quickly.

FIG. 37 illustrates the method of filtering choices by dragging across an initial part of a choice, as has been described above with regard to functions 1664 through 1666 of FIG. 16. In the example of this figure, it is assumed that the first choice list includes a choice 3702 shown in the view of the correction window pointed to by 3700, which includes the first six characters of the desired word "embedded". As is illustrated in the correction window 3704, the user drags across these initial six letters and the system responds by displaying a new correction window limited to recognition candidates that start with an unambiguous filter corresponding to the six characters, as is displayed in the screenshot 3706. In this screenshot the desired word is the first choice and the first six unambiguously confirmed letters of the first choice are shown highlighted as indicated by the box 3708, and the filter cursor 3710 is also illustrated.

FIG. 38 illustrates the method of filtering choices by dragging across two choices in the choice list that has been described above with regard to functions 1706 through 1708 of FIG. 17. In this example, the correction window 3800 displays the desired choice "embedded" as it occurs alphabetically between the two displayed numeral 3802 and 3804. As shown in the view 3806, the user indicates that the desired word falls in this range of the alphabet by dragging across these two choices. This causes a new correction window to be displayed in which the possible choices are limited to words which occur in the selected range of the alphabet, as indicated by the screenshot 3808. In this example, it is assumed that the desired word is selected as a first choice and as a result of the filtering caused by the selection shown in 3806. In this screenshot the portion of the first choice which forms an initial portion of the two choices selected in the view 3806 is indicated as unambiguously confirmed portion of the filter string 3810 and the filter cursor 3812 is placed after that confirmed filter portion.

FIG. 39 illustrates a method in which alphabetic filtering is used in one-at-a-time mode to help select the desired word choice. In this example, the user presses the Filter button as indicated in the correction window view 3900. It is assumed that the default filter vocabulary is the letter name vocabulary. Pressing the Filter button starts speech recognition for the next utterance and the user says the letter "e" as indicated by 3902. This causes the correction window 3904 to be shown in which it is assumed that the filter character has been mis-recognized as in "p." In the embodiment shown, in one-at-a-time mode, alphabetic input also has a choice list displayed for its recognition. In this case, it is a filter character choice list window 3906 of the type described above with regard to the filter character choice subroutine of FIG. 30. In the example, the user selects the desired filtering character, the letter "e," as shown in the view 3908, which causes a new correction window 3900 to be displayed. In the example, the user decides to enter an additional filtering letter by again pressing the Filter button as shown in the view 3912, and then says the utterance "m" 3914. This causes the correction window 3916 to be displayed, which displays the filter character choice window 3918. In this correction window, the filtering character has been correctly recognized and the user could either confirm it by speaking an additional filtering character or by selecting the correct letter as is shown in the window 3916. This confirmation of the desired filtering character causes a new correction window to be displayed with the filter strain "em" treated as an unambiguously confirmed filter's string. In the example shown in screenshot 3920, this causes the desired word to be recognized.

FIG. 40 illustrates a method of alphabetic filtering with AlphaBravo, or ICA word, alphabetic spelling. In the screenshot 4000, the user taps on the AlphaBravo button 1128. This changes the alphabet to the ICA word alphabet, as described above by functions 1402 through 1408 of FIG. 14. In this example, it is assumed that the Display_Alpha_On_Double_Click variable has not been set. Thus the function 1406 of FIG. 14 will display the list of ICA words

4002 shown in the screenshot 4004 during the press of the AlphaBravo button 1128. In the example, the user enters the ICA word "echo," which represents the letter "e" followed by a second pressing out of the AlphaBravo key as shown at 4008 and the utterance of a second ICA word "Mike" which represents the letter "m". In the example, the inputting of these two alphabetic filtering characters successfully creates an unambiguous filter string composed of the desired letters "em" and produces recognition of the desired word, "embedded".

Figure 41:
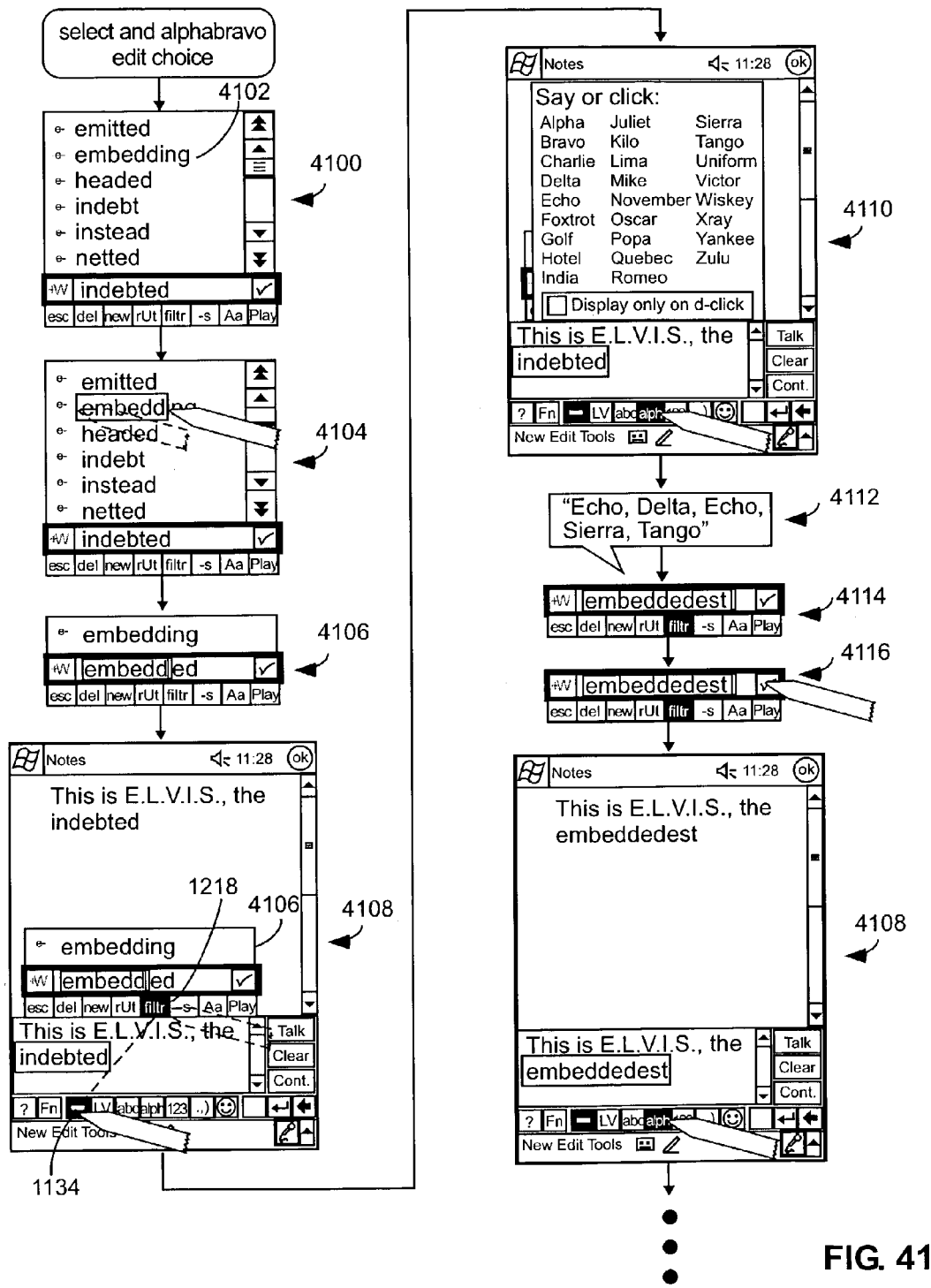
FIG. 41 shows how a user can select an initial sequence of characters from an alternate choice in the correction window and then use international communication alphabets to add characters to that sequence so as to complete the spelling of a desired output.

FIG. 41 illustrates a method in which the user selects part of a choice as a filter and then uses AlphaBravo spelling to complete the selection of a word which is not in the system's vocabulary, in this case the made up word "embedded".

In this example, the user is presented with the correction window 4100 which includes one choice 4100, and which includes the first six letters of the desired word. As shown in the correction window 4104, the user drags across these first six letters causing those letters to be unambiguously confirmed characters of the current filter string. This results in a correction window 4106. The screenshot 4108 shows the display of this correction window in which the user drags from the filter button 1218 and releases on the Discrete/Continuous button 1134, changing it from the discrete filter dictation mode to the continuous filter dictation mode, as is indicated by the continuous line on that button shown in the screenshot 4108. In screenshot 4110, the user presses the alpha button again and says an utterance containing the following ICA words "Echo, Delta, Echo, Sierra, Tango". This causes the current filter string to correspond to the spelling of the desired word. Since there are no words in the vocabulary matching this filter string, the filter string itself becomes the first choice as is shown in the correction window 4114. In the view of this window shown at 4116, the user taps on the check button to indicate selection of the first choice, causing the PDA screen to have the appearance shown at 4108.

Figure 42:
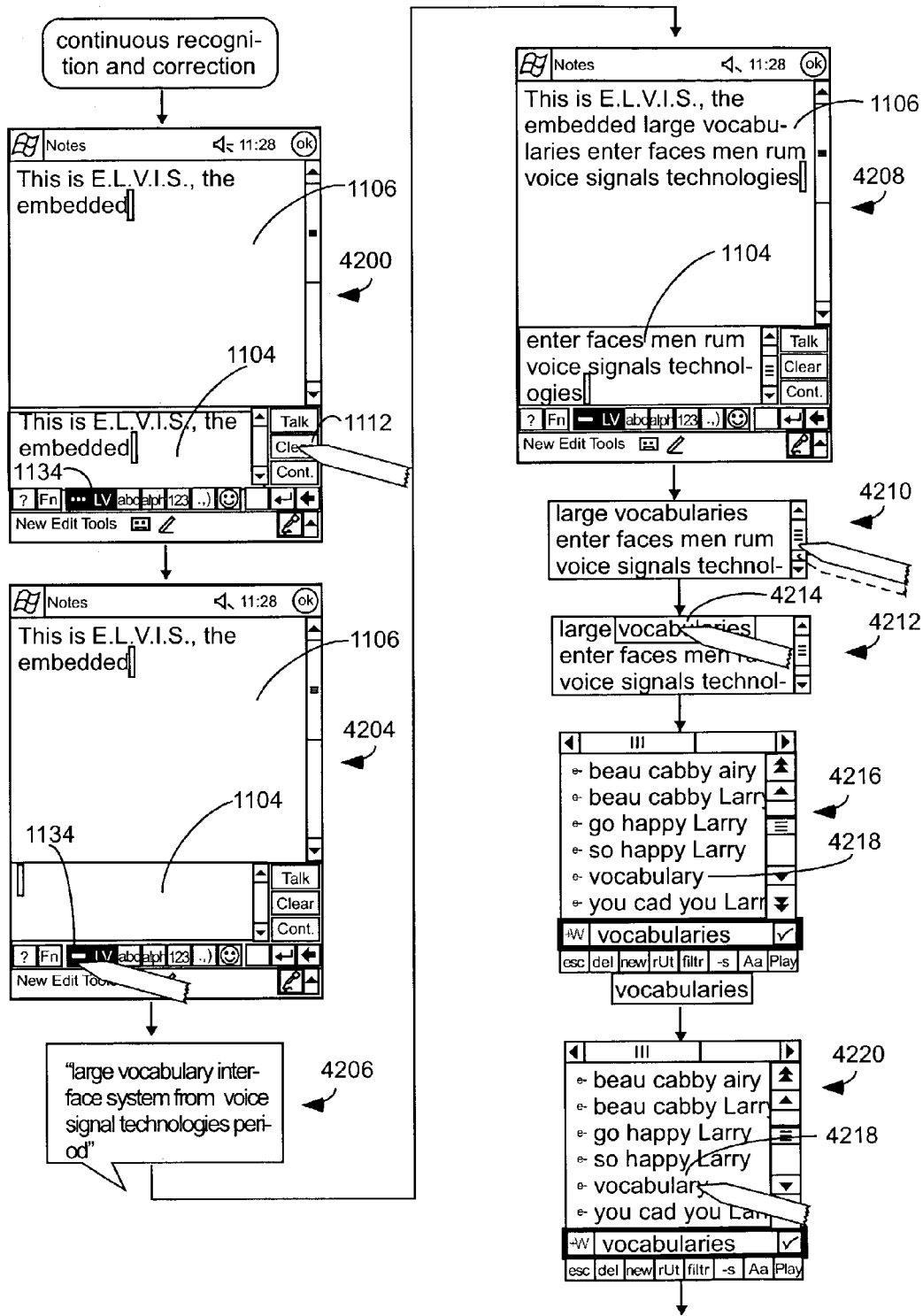
FIGS. 42 through 44 illustrate a sequence of user interactions in which the user enters and edits text into the SIP using continuous speech recognition.
Figure 43:
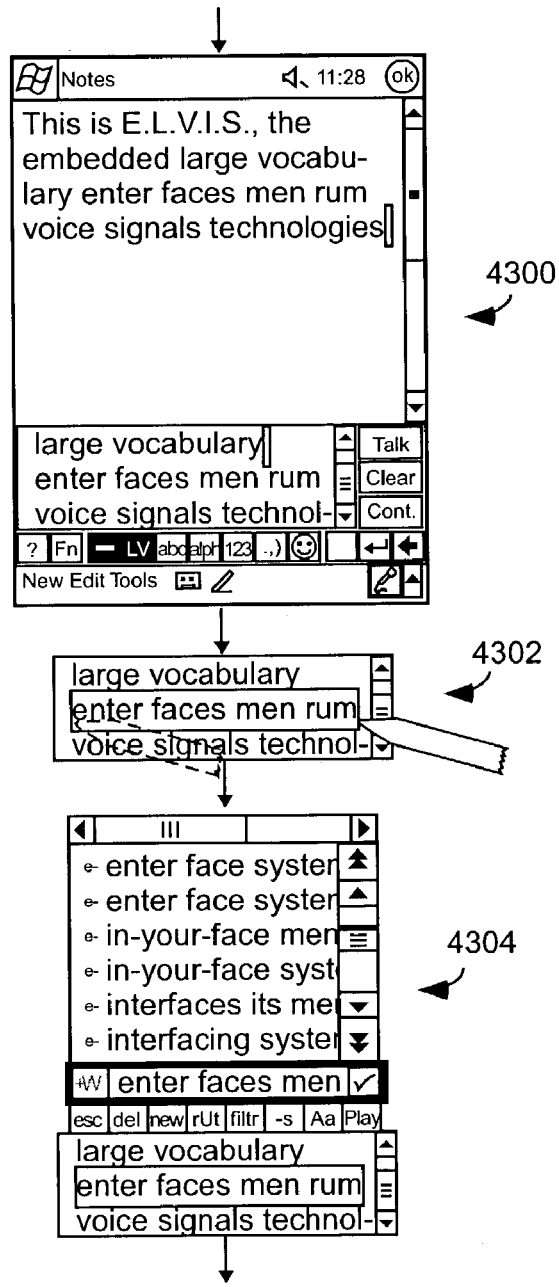
Figure 44:
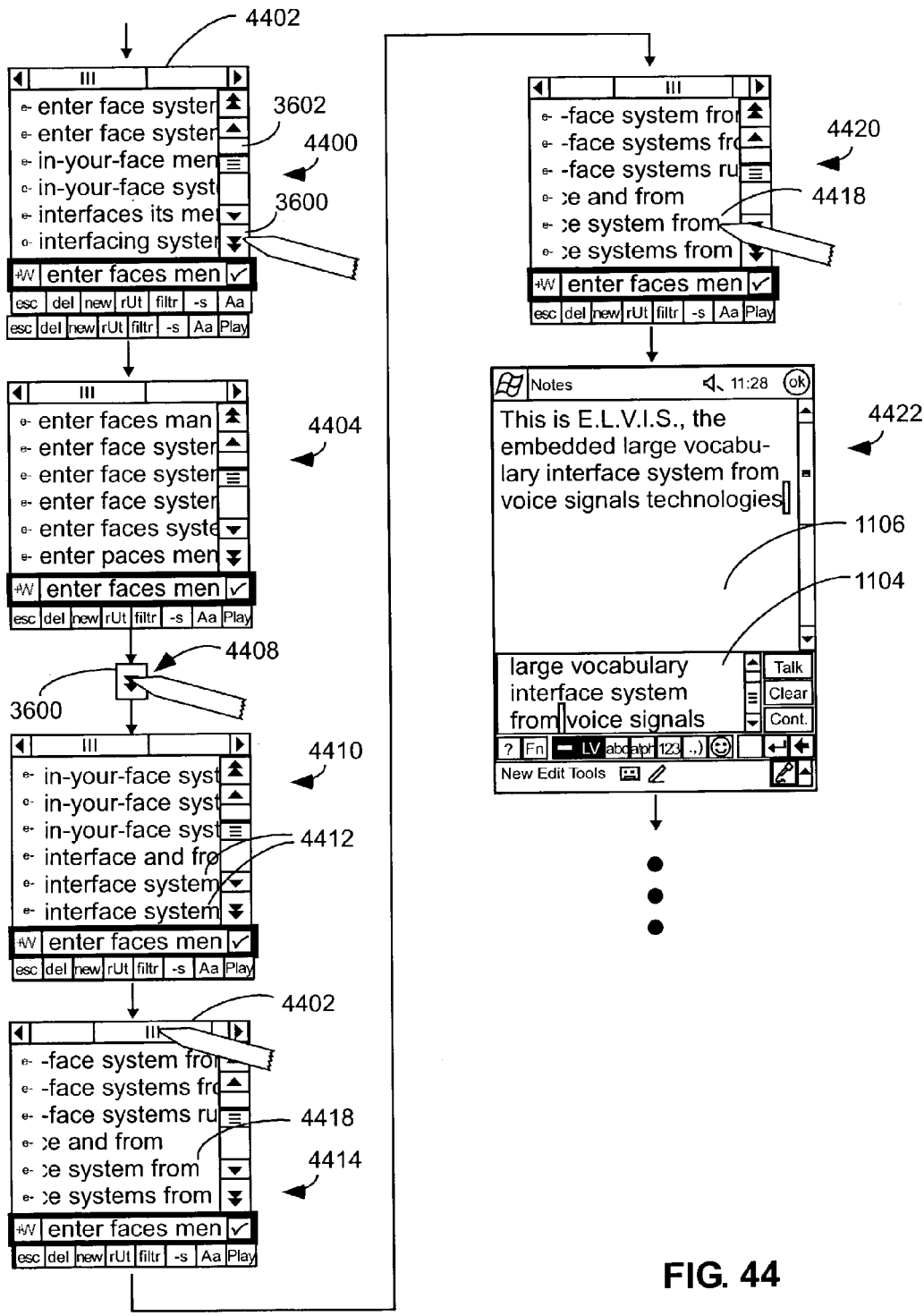

FIGS. 42 through 44 demonstrate the dictation, recognition, and correction of continuous speech. In the screenshot 4200 the user clicks the Clear button 1112 described above with regard to functions 1310 through 1314 of FIG. 13. This causes the text in the SIP buffer 1104 to be cleared without causing any associated change with the corresponding text in the application window 1106, as is indicated by the screenshot 4204. In the screenshot 4204 the user clicks the Continuous/Discrete button 1134, which causes it to change from discrete recognition indicated on the button by a sequence of dots in the screenshot 4002 to do a continuous line shown in screenshot 4204. This starts speech recognition according to the current recognition duration mode, and the user says a continuous utterance of the following words "large vocabulary interface system from voice signal technologies period", as indicated by numeral 4206. The system responds by recognizing this utterance and placing a recognized text in the SIP buffer 1104 and through the operating system to the application window 1106, as shown in the screenshot 4208. Because the recognized text is slightly more than fits within the SIP window at one time, the user scrolls in the SIP window as shown at numeral 4210 and then taps on the word "vocabularies" 4214, to cause functions 1436 through 1438 of FIG. 14 to select that word and generate a correction window for it. In response the correction window 4216 is displayed. In the example the desired word "vocabulary" 4218 is on the choice list of this correction window and in the view of the correction window 4220 user taps on this word to cause it to be selected, which will replace the word "vocabularies" in both the SIP buffer in the application window with that selected word.

Continuing now in FIG. 43, this correction is shown by the screenshot 4300. In the example, the user selects the four mistaken words "enter faces men rum" by dragging across them as indicated in view 4302. This causes functions 1502 and 1504 to display a choice window with the dragged words as the selection, as is indicated by the view 4304.

FIG. 44 illustrates how the correction window shown at the bottom of FIG. 43 can be corrected by a combination of horizontal and vertical scrolling of the correction window and choices that are displayed in it. Numeral 4400 points to a view of the same correction window shown at 4304 in FIG. 43. In it is not only a vertical scroll bar 4602 that is displayed but also a horizontal scroll bar 4402 in this view. The user is shown tapping the page down button 3006 in the vertical scroll bar which causes the portion of the choice list displayed to move from the display of the one page alphabetically ordered first choice list shown in the view 4400 to the first page of the second alphabetically ordered choice list shown in the view 4404. In the example none of the recognition candidates in this portion of the second choice list start with a character sequence matching the desired recognition output, which is "interface system from." Thus the user again taps the page down scroll button 3600 as is indicated by numeral 4408. This causes the correction window to have the appearance shown at 4410 in which two of the displayed choices 4412 start with a character sequence matching the desired recognition output. In order to see if the ending of these recognition candidates matched the desired output the user scrolls a like word on the horizontal scroll bar 4402 as shown at 4414. This allows the user to see that the choice 4418 matches the desired output. As is shown at is 4420, the user taps on this choice and causes it to be inserted into the dictated text both in the SIP window 1104 and in the application window 1106 as is shown in the screenshot 4422.

FIG. 45 illustrates how the use of an ambiguous filter created by the recognition of continuously spoken letter names and edited by filter character choice windows can be used to rapidly correct an erroneous dictation. In this example, the user presses the talk button 1102 as shown at 4500 and then utters the word "trouble" as indicated at 4502. In the example it is assumed that this utterance is miss-recognized as the word "treble" as indicated at 4504. In the example, the user taps on the word "treble" as indicated 4506, which causes the correction window shown at 4508 to be shown. Since the desired word is not shown as any of the choices the user caps the filter button 1218 as shown at 4510 and makes a continuous utterance 4512 containing the names of each of the letters in the desired word "trouble." In this example it is assumed that the filter recognition mode is set to include continuous letter name recognition.

In the example the system responds to recognition of the utterance 4512 by displaying the choice list 4518. In this example it is assumed that the result of the recognition of this utterance is to cause a filter strain to be created that is comprised of one ambiguous length element. As has been described above with regard to functions 2644 through 2652, an ambiguous length filter element allows any recognition candidate that contains in the corresponding portion of its initial character sequence one of the character sequences that are represented by that ambiguous element. In the correction window 4518 the portion of the first choice word 4519 that corresponds to an ambiguous filter element is indicated by the ambiguous filter indicator 4520. Since the filter uses an ambiguous element, the choice list displayed contains best scoring recognition candidates that start with different initial character sequences including ones with length less than the portion of the first choice that corresponds to a matching character sequence represented by the ambiguous element.

In the example, the user drags upward from the first character of the first choice, which causes operation of functions 1747 through 1750 described above with regard to FIG. 17. This causes a filter choice window 4526 to be display. As shown in the correction window 4524, the user drags up to the initial desired character the letter "t," and releases the drag at that location which causes functions 1749 and 1740 through 1746 to be performed. These close the filter choice window, callfilter added with the selected character as an unambiguous correction to the prior ambiguous filter element and causes a new correction window to be displayed with the new filter as is indicated at 4528. As is shown in this correction window the first choice 4530 is shown with an unambiguous filter indicator 4532 for its first letter "t" and an ambiguous filter indicator 4534 for its remaining characters. Next, as is shown in the view of the same correction window shown at 4536 the user drags upward from the fifth letter "p" of the new first choice which causes a new correction window 4538 to be displayed. When the user releases this drag on the character "p" that causes that character and all the characters that preceded in the first choice to be defined unambiguously in the current filter strain this is indicated in the new correction window 4540, which is shown as a result of the selection in which the first choice 4542 is the desired word, and the unambiguous portion of the filter is indicated by the unambiguous filter indicator 4544 and the remaining portion of the ambiguous filter element, which stays in the filter string by operations of functions 2900 through 2910 as shown in FIG. 29.

FIG. 46 illustrates that the SIP recognizer allows the user to also input text and filtering information by use of a character recognizer similar to the character recognizer that comes standard with that Windows CE operating system.

As shown in the screenshot 4600 of this figure, if the user drags up from the function key functions 1428 and 1430 of FIG. 14 it will display a punch and menu 4602 and if the user releases on the menu's character recognition entry 4604 the character recognition mode described in FIG. 47 will be turned on.

As shown in FIG. 47, this causes function 4702 to display the character recognition window 4608, shown in FIG. 46, and then to enter an input loop 4704 which is repeated until the user selects to exit the window by selecting another input option on the function menu 4602. When in this loop, if the user touches the character recognition window, function 4906 records "ink" during the continuation of such a touch which records the motion if any of the touch across the surface of the portion of the display touch screen corresponding to the character recognition window. If the user releases a touch in this window, functions 4708 through 4714 are performed. Function 4710 performance character recognition on the "ink" currently in the window. Function 4712 clears the character recognition window, as indicated by the numeral 4610 in FIG. 46. And function 4708 supplies the corresponding recognized character to the SIP buffer and the operating system.

FIG. 48 illustrates that if the user selects the handwriting recognition option in the function menu shown in the screenshot 4600, a handwriting recognition entry window 4008 will be displayed in association with the SIP as is shown in screenshot 4802.

The operation of the handwriting mode is provided in FIG. 49. When this mode is entered function 4902 displays the handwriting recognition window, and then a loop 4903 is entered until the user selects to use another input option. In this loop, if the user touches the handwriting recognition window in any place other then the delete button 4804 shown in FIG. 48, the motion if any during the touch is recorded as "ink" by function 4904. If the user touches down in the right button area 4806 shown in FIG. 48 function 4905 causes functions 4906 through 4910 to be performed. Function 4906 performs handwriting recognition on any "ink" previously entered in the handwriting recognition window. Function 4908 supplies the recognized output to the SIP buffer and the operating system, and function 4910 clears the recognition window. If the user presses the Delete button 4804 shown in FIG. 48 functions 4912 and 4914 clear the recognition window of any "ink."

It should be appreciated that the use of the recognition button 4806 allows the user to both instruct the system to recognize the "ink" that was previously in the handwriting recognition and also starts the writing of a new word to be recognized.

FIG. 50 shows the keypad 5000, which can also be selected from the function menu.

Having character recognition, handwriting recognition, and keyboard input methods rapidly available as part of the speech recognition SIP is often extremely advantageous because it lets the user switch back and forth between these different modes in a fraction of a second depending upon which is most convenient at the current time. And it allows the outputs of all of these modes to be used in editing text in the SIP buffer.

Figure 51:
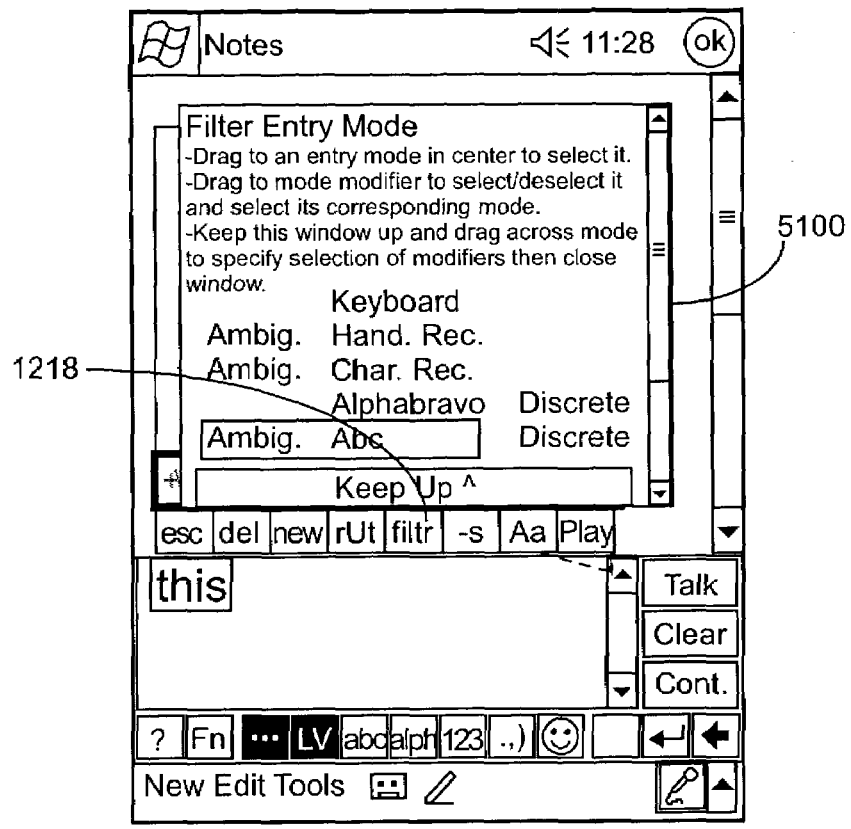
FIG. 51 illustrates a filter entry mode menu that can be selected to choose from different methods of entering filtering information, including speech recognition, character recognition, handwriting recognition, and software keyboard input.

As shown in FIG. 51, in one embodiment of the SIP buffer, if the user drags up from the filter button 1218 a window 5100 is display that provides the user with optional filter entry mode options. These include options of using a letter-name speech recognition, AlphaBravo speech recognition, character recognition, handwriting recognition, and the keyboard window, as alternative methods of entering filtering spellings. It also enables a user to select whether any of the speech recognition modes are discrete or continuous and whether the letter name recognition character recognition and handwriting recognition entries are to be treated as ambiguous in the filter string. This user interface enables the user to quickly select that filter entry mode which is appropriate for the current time and place. For example, in a quiet location where one does not have to worry about offending people by speaking, continuous letter name recognition is often very useful. However, in a location where there's a lot of noise, but a user feels that speech would not be offensive to neighbors, AlphaBravo recognition might be more appropriate. In a location such as a library where speaking might be offensive to others silent filter entry methods such as character recognition, handwriting recognition or keyboard input might be more appropriate.

Figure 52:
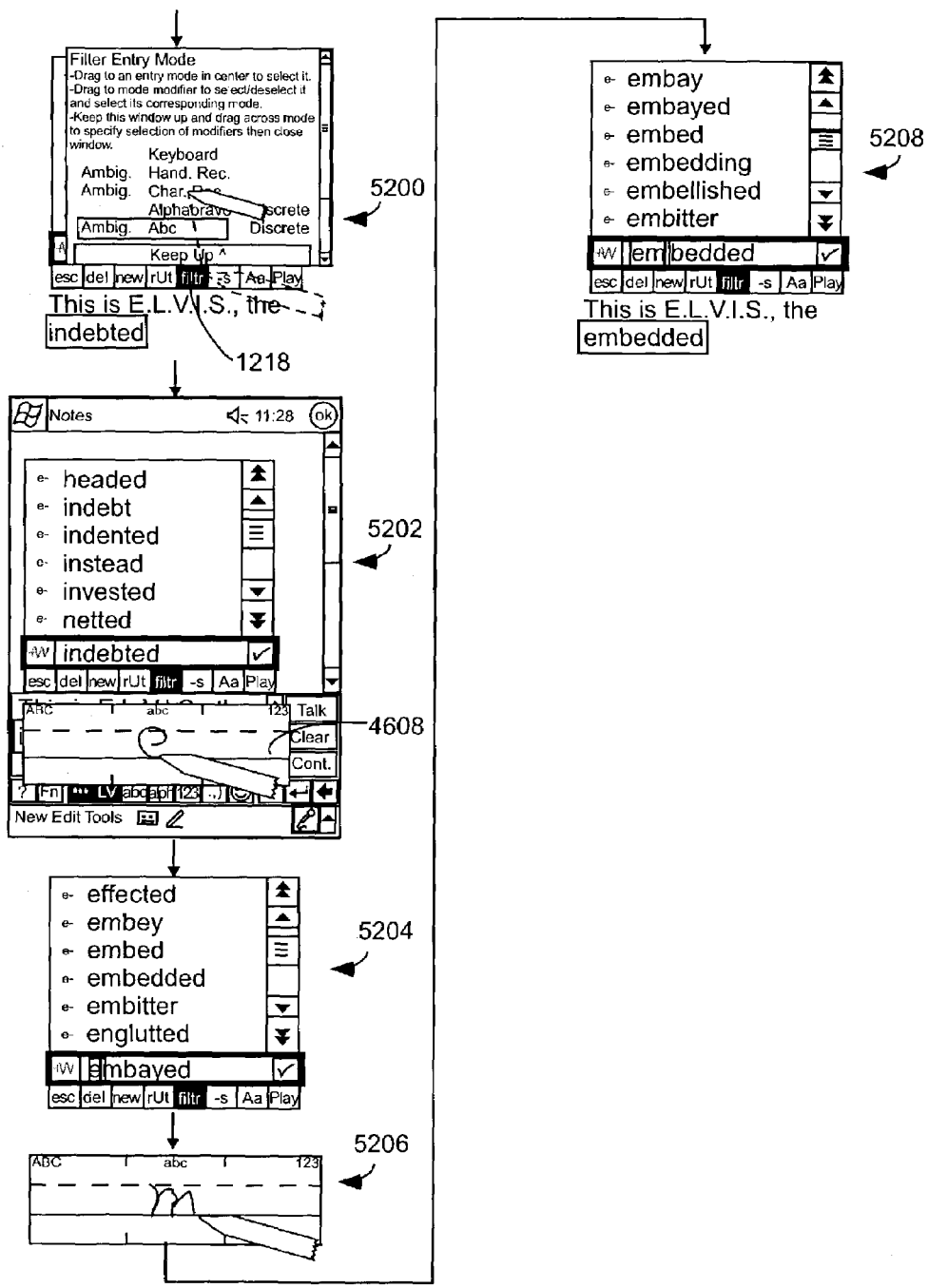
FIGS. 52 through 54 illustrates how either character recognition, handwriting recognition, or software keyboard input can be used to filter speech recognition choices produced by in the SIP's correction window.

FIG. 52 provides an example of how character recognition can be quickly selected to filter a recognition. 5200 shows a portion of a correction window in which the user has pressed the filter button and dragged up, causing the filter entry mode menu 5100 shown in FIG. 51 to be displayed, and then selected the character recognition option. As is shown in screenshot 5202 this causes the character recognition entry window 4608 to be displayed in a location that allows the user to see the entire correction window. In the screenshot 5202 the user has drawn the character "e" and when he releases his stylus from the drawing of that character the letter "e" will be entered into the filter string causing a correction window 5204 to be displayed in the example. The user then enters an additional character "m" into the character recognition window as indicated at 5206, and when he releases his stylus from the drawing of this letter the recognition of the character "m" causes the filter string to include "e" as shown at 5208.

Figure 53:
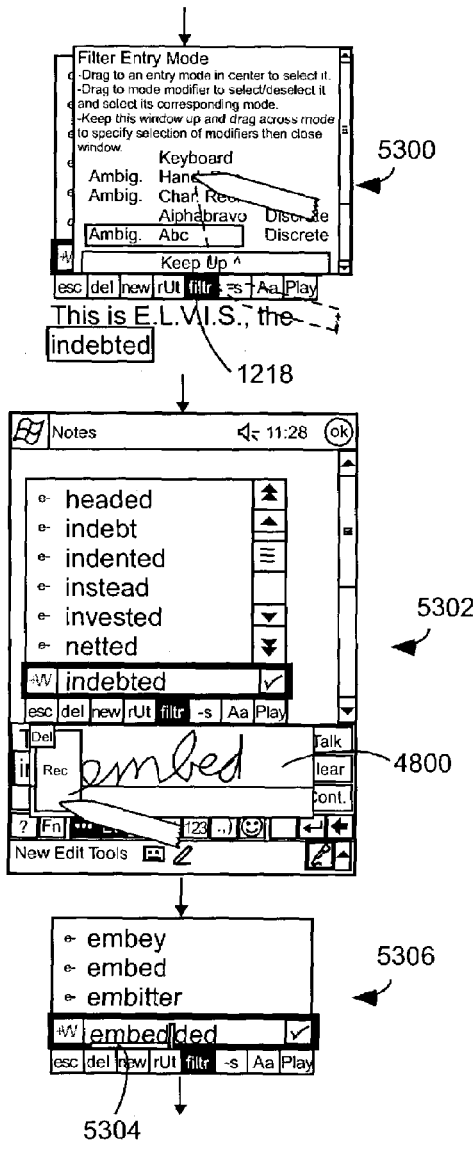
Figure 54:
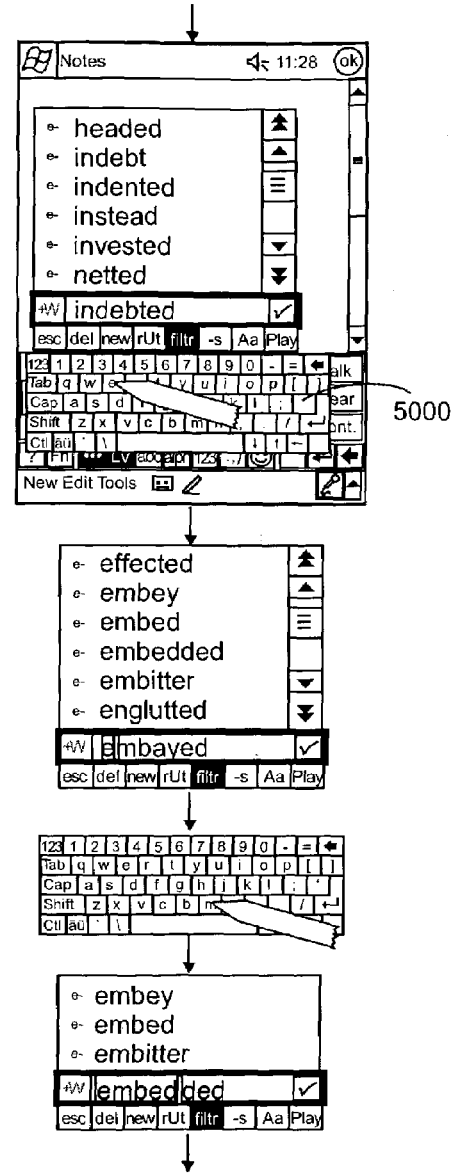

FIG. 53 starts with a partial screenshot 5300 where the user has tapped and dragged up from the filter key 1218 to cause the display of the filter entry mode menu, and has selected the handwriting option. This displays a screen such as 5302 with a handwriting entry window 4800 displayed at a location that does not block a view of the correction window. In the screenshot 5302 the user has handwritten in a continuous cursive script the letters "embed" and then presses the "REC" button to cause recognition of those characters. Once he has tapped that button an ambiguous filter string indicated by the ambiguous filter indicator 5304 is displayed in the first choice window corresponding to the recognized characters as shown by the correction window 5306. FIG. 54 shows how the user can use a keypad window 5000 to enter alphabetic filtering information.

Figure 55:
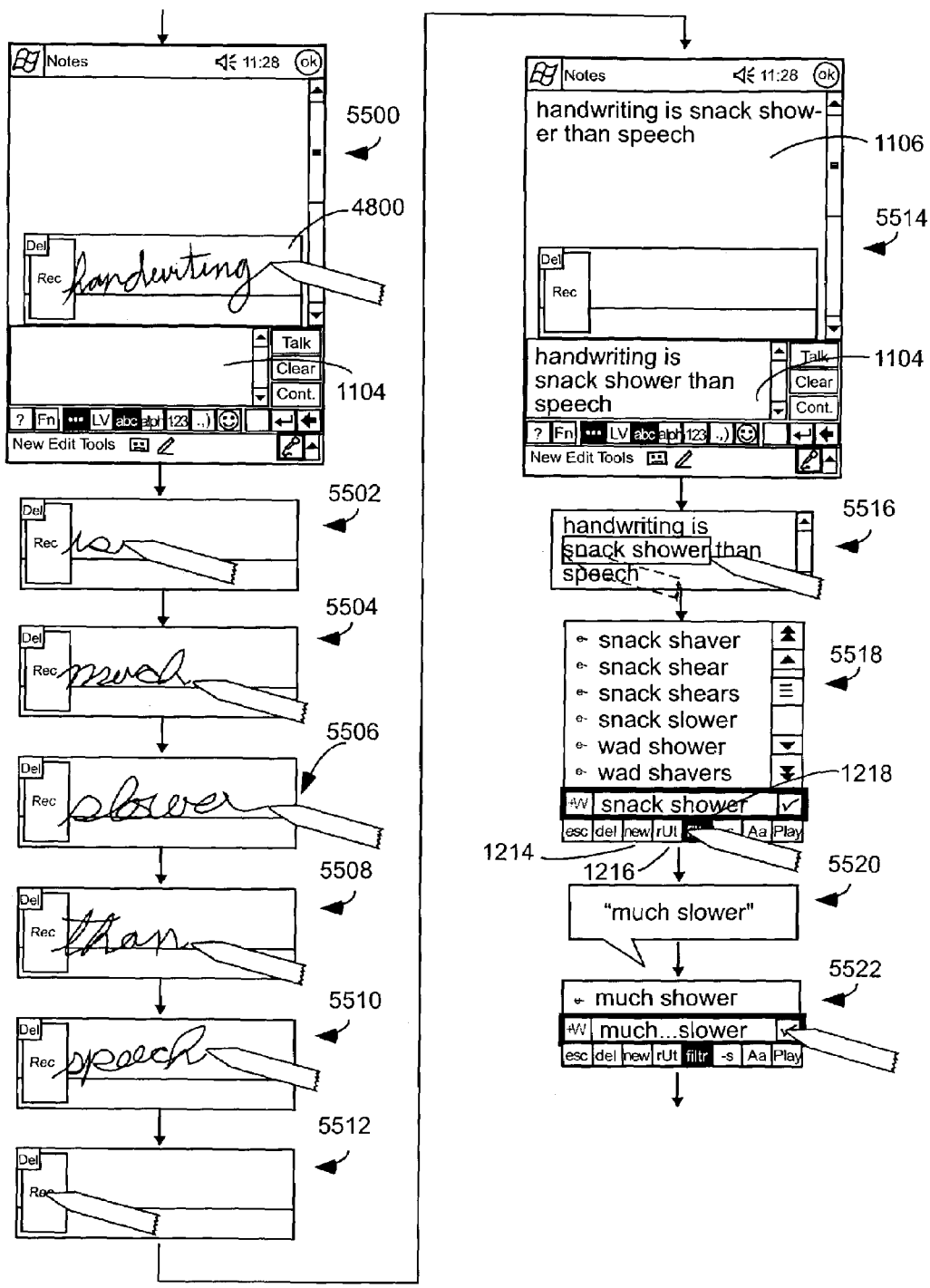
FIGS. 55 and 56 illustrate how the SIP allows speech recognition of words or filtering characters to be used to correct handwriting recognition input.

FIG. 55 illustrates how speech recognition can be used to collect handwriting recognition. Screenshot 5500 shows a handwriting entry window 4800 displayed in a position for entering text into the SIP buffer window 1104. In this screenshot the user has just finished writing a word. Numerals 5502 through 5510 indicate the handwriting of five additional words. The word in each of these views is started by a touchdown in the "REC" button so as to cause recognition of the prior written word. Numeral 5512 points to a handwriting recognition window where the user makes a final tap on the "REC" button to cause recognition of the last handwritten word "speech". In the example of FIG. 55, after this sequence of handwriting input has been recognized, the SIP buffer window 1104 in the application window 1106 had the appearance shown in the screenshot 5514 as indicated by 5516. The user drags across the miss recognized words "snack shower." This causes the correction window 5518 to be shown. In the example, the user taps the re-utterance button 1216 and discretly re-utters the desired words "much . . . slower." By operation of a slightly modified version of the "get" choices function described above with regard to FIG. 23 this will cause the recognition scores from recognizing the utterance 5520 to be combined with the recognition results from combining the handwritten "REC" in the input pointed to by numerals 5504 and 5506 to select a best scoring recognition candidate, which in the case of the example is the desired words as shown at numerals 5522.

It should also be appreciated that the user could have pressed the new button in the correction window 5518 instead of the Re-Add button in which case the utterance 5520 would have used the output of speech recognition to replace the handwriting outputs that had been selected as shown at 5516.

Figure 56:
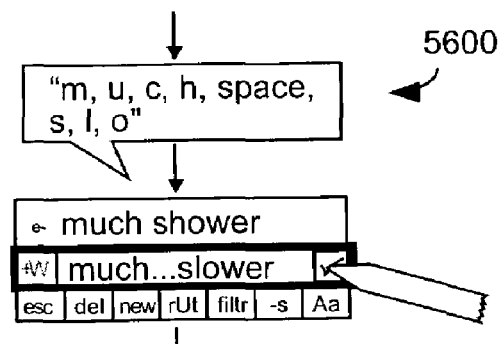

As indicated in FIG. 56, if the user had pressed the filter button 1218 instead of the re-utterance button in the correction window 5518, the user could have used the speech recognition of a known word, such as the utterance 5600 shown in FIG. 56, to alphabetically filter the handwriting recognition of the two words selected at 5516 in FIG. 55.

Figure 57:
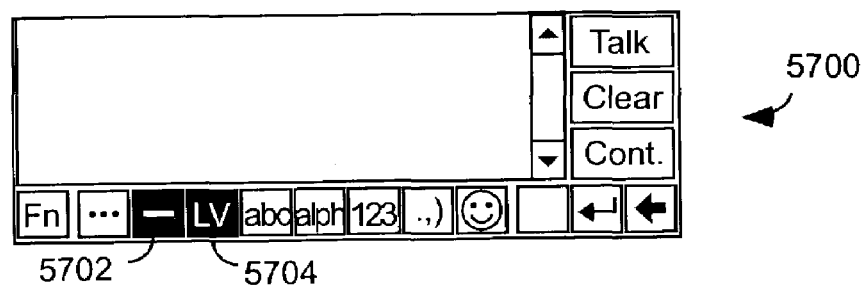
FIG. 57 illustrates an alternate embodiment of the SIP in which there are two separate top-level buttons to select between discrete and continous speech recognition.
Figure 59:
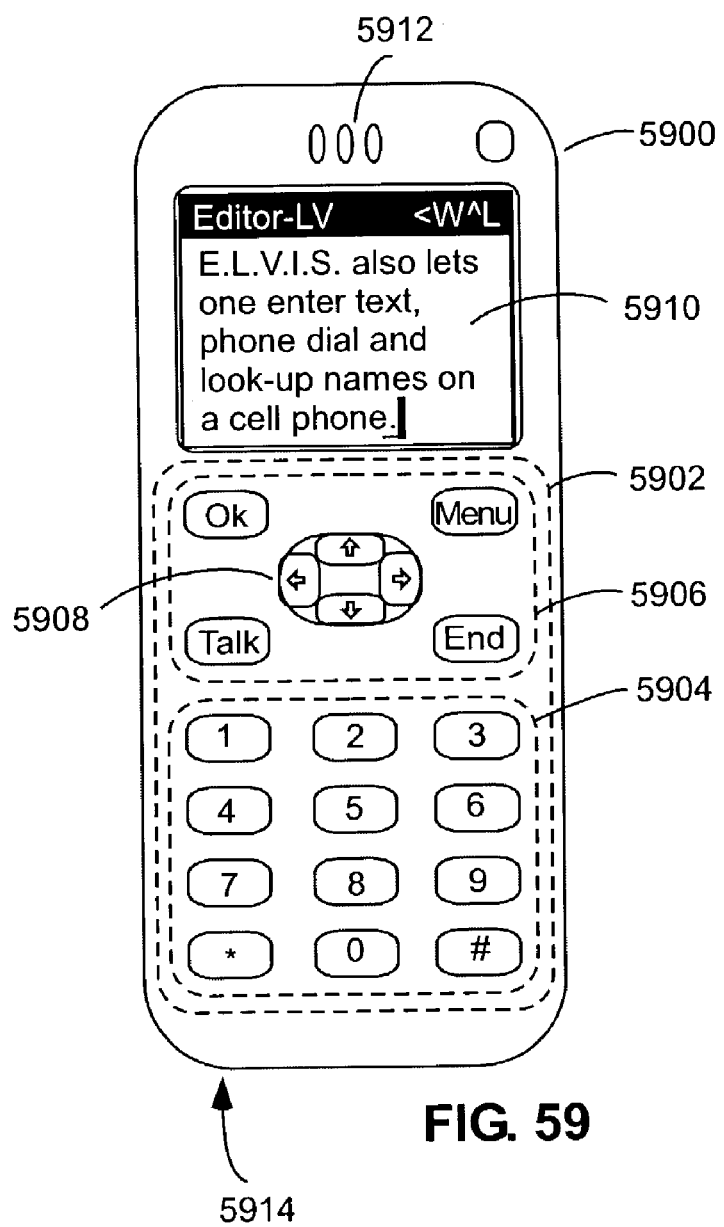
FIG. 59 illustrates a cellphone that embodies many aspects of the present invention.
Figure 60:
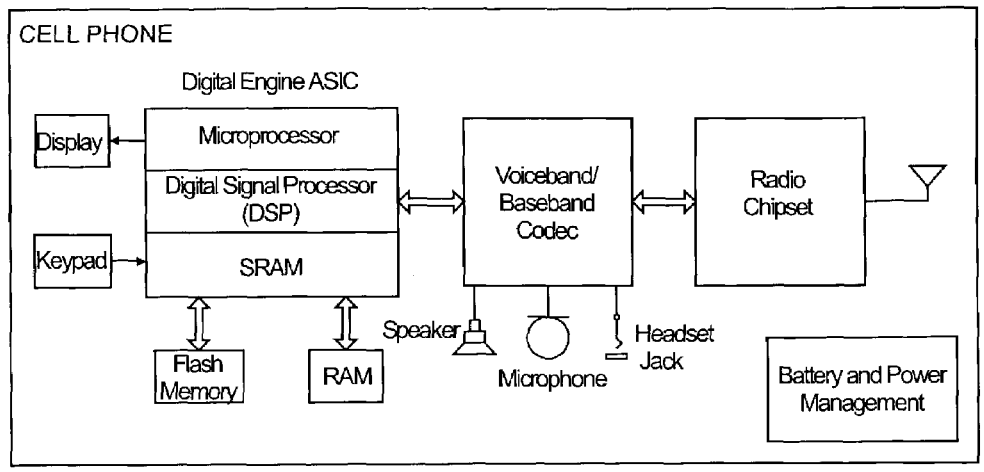
FIG. 60 provides a highly simplified block diagram of the major components of a typical cellphone such as that shown in FIG. 59.
Figure 61:
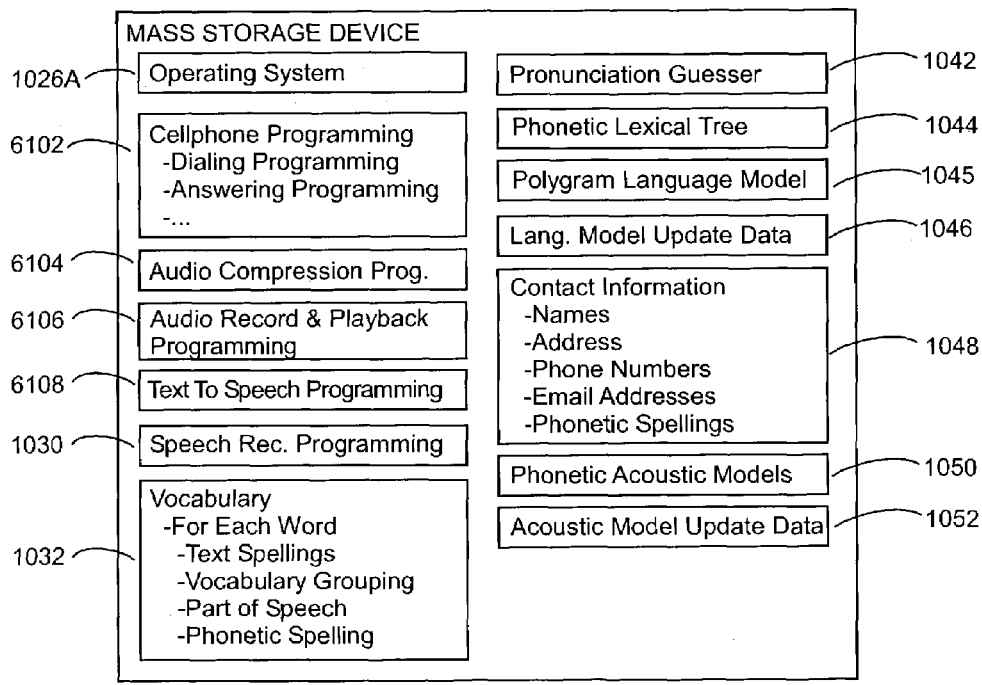
FIG. 61 is a highly simplified block diagram of various programming and data structures contained in one or more mass storage devices on the cellphone of FIG. 59.

FIG. 57 illustrates an alternate embodiment 5700 of the SIP speech recognition interface in which there are two separate top-level buttons 5702 and 5704 to select between discrete and continuous speech recognition, respectively. It will be appreciated that it is a matter of design choice which buttons are provided at the top level of a speech recognizes user interface. However, the ability to rapidly switch between the more rapid and more natural continuous speech recognition versus the more reliable although more halting and slow discrete speech recognition is something that can be very desirable, and in some embodiments justifies the allocation of a separate top-level key for the selection of discrete and the selection of continuous recognition.

FIG. 58 displays an alternate embodiment of the display choice list routine shown in FIG. 22 except that it creates a single scrollable score ordered choice list rather than the two alphabetically ordered choice lists created by the routine in FIG. 22. The only portions of its language that differs from the language contained in FIG. 22 is underlined, with the exception of the fact that functions 2226 and 2228 have also been deleted in the version of the routine shown in FIG. 58.

FIGS. 67 through 74 displayed various mapping of a basic phone number keypad to functions that are used in various modes or menus of the disclosed cell phone speech recognition editor. The main numbered phone key mapping in the editor mode is shown in FIG. 67 and FIG. 68 shows the phone key portion of the entry mode menu which is selected if the user presses the one key when in the editor mode. The entry mode menu is used to select among various text and alphabetic entry modes available on the system. FIG. 69 displays the functions that are available on the numerical phone key pad when the user has a correction window displayed, which can be caused from the editor mode by pressing the "2" key. FIG. 70 displays the numerical phone key commands available from an edit menu selected by pressing the "3" key when in the edit mode illustrated in FIG. 67. This menu is used to change the navigational functions performed by pressing the navigation keys of the phone keypad. FIG. 71 illustrates a somewhat similar correction navigation menu that displays navigational options available in the correction window by pressing the "3" key. In addition to changing navigational modes while in a correction window it also allows the user to vary the function that is performed when a choice is selected.

FIG. 72 illustrates the numerical phone key mapping during a key Alpha mode, in which the pressing of a phone key having letters associated with it will cause a prompt to be shown on the cell phone display asking the user to say the ICA word associated with the desired one of the sets of letters associated with the pressed key. This mode is selected by double-clicking the "3" phone key when in the entry mode menu shown in FIG. 68.

FIG. 73 shows a basic keys menu, which allows the user to rapidly select from among a set of the most common punctuation and function keys used in text editing, or by pressing the "1" key to see a menu that allows a selection of less commonly used punctuation marks. The basic keys menu is selected by pressing a "9" in the editor mode illustrated in FIG. 67. FIG. 74 illustrates the edit option menu that is selected by pressing "0" in the editor shown in FIG. 67. This contains a menu which allows a user to perform basic tasks associated with use of the editor that are not available in the other modes or menus.

Figure 75:
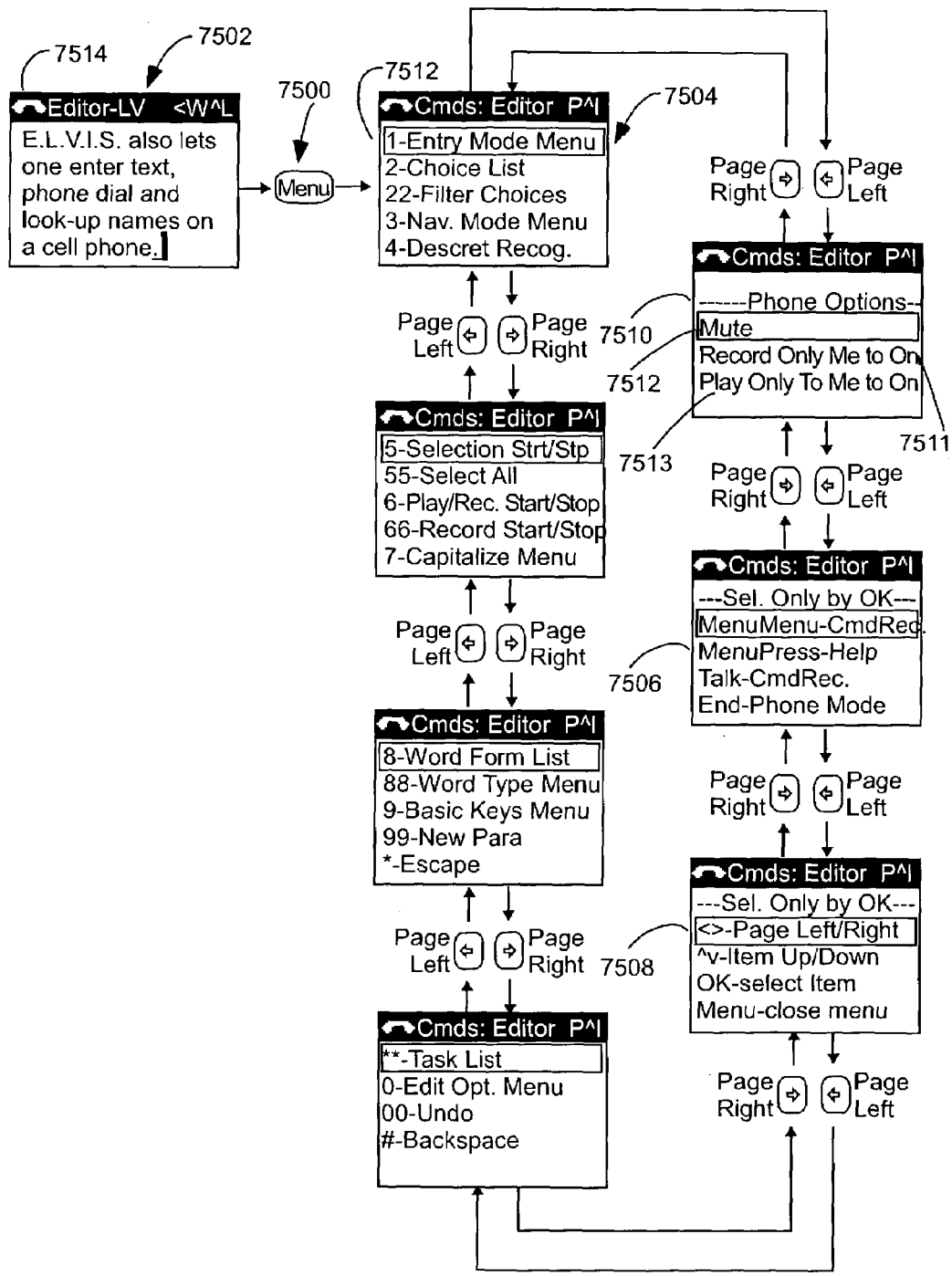
FIG. 75 illustrates how user of the cellphone's text editing software can rapidly see the function associated with one or more keys in a non-menu mode by pressing the menu button and scrolling through a command list that can be used substantially in the same manner as a menu of the type shown in FIG. 64.

At the top of each of the numerical phone key mappings shown in FIGS. 67 through 74 is a title bar that is shown at the top of the cell phone display when that menu or command list is shown. As can be seen from these FIG.s the title bar is illustrated in FIGS. 67, 69 and 72 start with the letters "Cmds" to indicate that the displayed options are part of a command list, where as FIGS. 68, 70, 71, 73 and 74 have title bars i start with "MENU." This is used to indicate a distinction between the command lists shown in FIGS. 67, 69 and 72 and the menus shown in the others of these figures. A command list displays commands that are available in a mode even when that command list is not display. When in the editor mode associated with the command list of FIG. 67 or the key Alpha mode associated with FIG. 72, normally the text editor window will be displayed even though the phone keys have the functional mappings shown in those figures. Normally when in the correction window mode associated with the command list shown in FIG. 69, a correction window is shown on the cell phones display. In all these modes, the user can access the command list to see the current phone key mapping as is illustrated in FIG. 75 by merely pressing the menu key, as is pointed to by the numerals 7500 in that figure. In the example shown in FIG. 75, a display screen 7502 shows a window of the editor mode before the pressing of the Menu button. When the user presses the Menu button the first page of the editor command list is shone as indicated by 7504, the user then has the option of scrolling up or down in the command list to see not only the commands that are mapped with the numerical phone keys but also the commands that are mapped with the menu "talk" and "end" key as shown in screen 7506 as well as the navigational key buttons "OK" and "Menu" as shown in 7508 and by screen 7510, if there are additional options associated with the current mode at the time the command list is entered, they can also be selected from the command list by means of scrolling the highlight 7512 and using the "OK" key. In the example shown in FIG. 75 a phone call indicator 7514 having the general shape of a telephone handset is indicated at the left of each title bar to indicate to the user that the cell phone is currently in a telephone call. In this case extra functions are available in the editor that allow the user to quickly select to mute the microphone of the cell found, to record only audio from the user side of the phone conversation and to play the playback only to the user side of the phone conversation.

FIGS. 76 through 78 provide a more detailed pseudocode description of the functions of the editor mode than is shown by the mere command listings shown in FIGS. 67 and 75. This pseudocode is represented as one input loop 7602 in which the editor responds to various user inputs.

If the user inputs one of the navigational commands indicated by numeral 7603, by either pressing one of the navigational keys or speaking a corresponding navigational command, the functions invented under it as in FIG. 76 are performed.

These include a function 7604 that tests to see if the editor is currently in word/line navigational mode. This is the most common mode of navigation in the editor, and it can be quickly selected by pressing the "3" key twice from the editor. The first press selects the navigational mode menu shown in FIG. 70 and the second press selects the word/line navigational mode from that menu. If the editor is in word-line mode function 7606 through 7624 are performed.

If the navigational input is a word-left or word-right command, function 7606 causes function 7608 through 7617 to be performed. Functions 7608 and 7610 test to see if extended selection is on, and if so, they move the cursor one word to the left or right, respectively, and extend the previous selection to that word. If extended selection is not on, function 7612 causes functions 7614 to 7617 to be performed. Functions 7614 and 7615 test to see if either the prior input was a word left/right command of a different direction than the current command or if the current command would put the cursor before or after the end of text. If either of these conditions is true, the cursor is placed to the left or right out of the previously selected word, and that previously selected word is unselected. If the conditions in the test of function 7614 are not met then function 7617 will move the cursor one word to the left or the right out of its current position and make the word that has been moved to the current selection.

The operation of function 7612 through 7617 enable word left and word right navigation to allow a user to not only move the cursor by a word but also to select the current word at each move if so desired. It also enables the user to rapidly switch between the cursor that corresponds to a selected word or cursor that represents an insertion point before or after a previously selected word.

If the user input has been a line up or a line down command, function 7620 moves the cursor to the nearest word on the line up or down from the current cursor position, and if extended selection is on, function 7624 extends the current selection through that new current word.

As indicated by numeral 7626 the editor also includes programming for responding to navigational inputs when the editor is in other navigation modes that can be selected from the edit navigation menu shown in FIG. 70.

If the user selects "OK" either by pressing the button or using voice command, function 7630 tests to see if the editor has been called to enter text into another program, such as to enter text into a field of a Web document or a dialog box, and if so function 7632 enters the current context of the editor into that other program at the current text entry location in that program and returns. If the test 7630 is not met, function 7634 exits the editor saving its current content and state for possible later use.

If the user presses the Menu key when in the editor, function 7638 calls the display menu routine for the editor commands which causes a command list to be displayed for the editor as has been described above with regard to FIG. 75. As has been described above, this allows the user to scroll through all the current command mappings for the editor mode within a second or two. If the user double-clicks on the Menu key when in the editor functions 7642 through 7646 call the display menu to show the command list for the editor, set the recognition vocabulary to the editor's command vocabulary, and command speech recognition using the last press of the double-click to determine the duration of that recognition.

If the user makes a sustained press of the menu key, function 7650 enters help mode for the editor. This will provide a quick explanation of the function of the editor mode and allow the user to explore the editor's hierarchical command structure by pressing its keys and having a brief explanation produced for the portion of that hierarchical command structure reached as a result of each such key pressed.

If the user presses the Talk button when in the editor, function 7654 turns on recognition according to current recognition settings, including vocabulary and recognition duration mode. The talk button will often be used as the major button used for initiating speech recognition in the cellphone embodiment.

If the user selects the End button, function 7658 goes to the phone mode, such as the quickly make or answer a phone call. It saves the current state of the editor so that the user can return to it when such a phone call is over.

A shown in FIG. 77, if the user selects the entry mode menu illustrated in FIG. 68, function 7702 causes that menu to be displayed. As will be described below in greater detail, this menu allows the user to quickly select between dictation modes somewhat as buttons 1122 through 1134 shown in FIG. 11 did in the PDA embodiment. In the embodiment shown, the entry mode menu has been associated with the "1" key because of the "1" key's proximity to the talk key. This allows the user to quickly switch dictation modes and then continue dictation using the talk button.

If the user selects "choice list," functions 7706 and 7708 set the correction window navigational mode to be page/item navigational mode, which is best for scrolling through and selecting recognition candidate choices. They then can call the correction window routine for the current selection, which causes a correction window somewhat similar to the correction window 1200 shown in FIG. 12 to be displayed on the screen of the cellphone. If there currently is no cursor, the correction window will be called with an empty selection. If this is the case, it can be used to select one or more words using alphabetic input, word completion, and/or the addition of what are more utterances. The correction window routine will be described in greater detail below.

If the user selects "filter choices" such as by double-clicking on the "2" key, function 7712 through 7716 set the correction window navigational mode to the word/character mode used for navigating in a first choice or filter string. They than call the correction window routine for the current selection and treat the second press of the double-click, if one has been entered, as the speech key for recognition duration purposes.

In most cellphones, the "2" key is usually located directly below the navigational key. This enables the user to navigate in the editor to a desired word or words that need correction and then single press the nearby "2" key to see a correction window with alternate choices for the selection, or to double-click on the "2" key and immediately start entering filtering information to help the recognizer selects a correct choice.

If the user selects the navigational mode menu shown in FIG. 70, function 7720 causes it to be displayed. As will be described in more detail below, this function enables the user to change the navigation that is accomplished by pressing the left and right and the up-and-down navigational buttons. In order to make such switches more easily to make the navigational button has been placed in the top row of the numbered phone keys.

If the user selects the discrete recognition input, function 7724 turns on discrete recognition according to current vocabulary using the press and click to utter and send duration mode as the current recognition duration setting. This button is provided to enable the user to quickly shift to discrete utterance recognition whenever desired by the pressing of the "1" button. As has been stated before, discrete recognition tends to be substantially more accurate than continuous recognition, although it is more halting. The location of this commands key has been selected to be close to the talk button and the entry mode menu button. Because of the availability of the discrete recognition key, the recognition modes normally mapped to the Talk button will be continuous. Such a setting allows the user to switch between continuous and discrete recognition by altering between pressing the Talk button and the "4" key.

If the user selects selections start or selections stop as by toggling the "5" key, function 7728 toggles extended selection on and off, depending whether that mode was currently on or off. Then function 7730 tests to see whether extended selection has just been turned off any if so, function 7732 de-selects any prior selection other than one, if any, at the current cursor. In the embodiment described, the "5" key was selected for the extended selection command because of its proximity to the navigational controls and the "2" key which is used for bringing up correction windows.

If the user chooses the select all command, such as by double-clicking on the "5" key function 7736 selects all the text in the current document.

If the user selects the "6" key or any of the associated commands which are currently active, which can include play start, play stop or records stop, function 7740 tests to see if the system is currently not playing audio. If so, function 7742 toggles between an audio play mode and a mode in which audio play is off. If not, function 7742 toggles between an audio play mode and a mode in which audio play is off. If the cellphone is currently on a phone call and the play only to me option 7513 shown in FIG. 75 has been set to the off mode, function 7746 sends audio from the play over the phone line to the other side of the phone conversation as well as to the speaker or headphone of the cellphone itself.

If, on the other hand the system is recording audio when the "6" button is pressed, function 7750 turns recording off.

If the user double-click on the "6" key or enters a record command, function 7754 turns audio recording on. Then function 7756 tests to see if the system is currently on a phone call and if the record only me setting 7511 shown in FIG. 75 is in the off state. If so, function 7758 records audio from the other side of the phone line as well as from the phone's microphone or microphone input jack.

If the user presses the "7" key or otherwise selects the capitalized menu command, function 7762 displays a capitalized menu that offers the user the choice to select between modes that cause all subsequently entered text to be either in all lowercase, all initial caps, or all capitalized. It also allows the user to select to change one or more words currently selected, if any, to all lowercase, all initial caps, or all capitalized form.

If the user double-clicks on the "7" key or otherwise selects the capitalized cycle key, the capitalized cycle routine which can be called one or more times to change the current selection, if any, to all initial caps, all capitalized, or all lowercase form.

It the user presses the "8" key or otherwise selects the word form list, function 7770 calls the word form list routine described above with regard to FIG. 27.

If the user double-click on the "8" key or selects the word type command, function 7774 displays the word type menu. The word type menu allows the user to select a word type limitations as described above with regard to the filter match routine of FIG. 26 upon a selected word. In the embodiment shown, this menu is a hierarchical menu having the general form shown in FIG. 91, which allows the user to specify word ending types, word start types, word tense types, word part of speech types and other word types such as possessive or non-possessive form, singular or plural nominative forms, singular or plural verb forms, spelled or not spelled forms and homonyms, if any exist.

As shown in FIG. 78, if the user presses the "9" key or selects the basic key's menu command, function 7802 displays the basic key's menu shown in FIG. 73, which allows the user to select the entry of one of the punctuation marks or input character that can be selected from that menu as text input.

If the user double-clicks on the "9" key or selects the New Paragraph Command, function 7806 enters a New Paragraph Character into the editor's text.

If the user selects the "*" key or the escape command, functions 7810 to 7824 are performed. Function 7810 tests to see if the editor has been called to input or edit text in another program, in which case function 7812 returns from the call to the editor with the edited text for insertion to that program. If the editor has not been called for such purpose, function 7820 prompts the user with the choice of exiting the editor, saving its contents and/or canceling escape. If the user selects to escape, functions 7822 and 7824 escape to the top level of the phone mode described above with regard to FIG. 63. If the user double-clicks on the "*" key or selects the task list function, function 7828 goes to the task list, as such a double-click does in most of the cellphones, operating modes and menus.

It the user presses the "0" key or selects the edit options menu command, function 7832 is the edited options menu described above briefly with regard to FIG. 74. If the user double-clicks on the "0" key or selects the undo command, function 7836 undoes the last command in the editor, if any.

It the user presses the "#" key or selects the backspace command, function 7840 tests to see if there's a current selection. If so, function 7842 deletes it. If there is no current selection and if the current smallest navigational unit is a character, word, or outline item, functions 7846 and 7848 delete backward by that smallest current navigational unit.

FIGS. 79 and 80 illustrate the options as provided by the entry mode menu discussed above with regard to FIG. 68.

When in this menu, if the user presses the "1" key or otherwise selects large vocabulary recognition, functions 7906 through 7914 are performed. These set the recognition vocabulary to the large vocabulary. They treat the press of the "1" key as a speech key for recognition duration purposes. They also test to see if a correction window is displayed. If so, they set the recognition mode to discrete recognition, based on the assumption that in a correction window, the user desires the more accurate discrete recognition. They add any new utterance or utterances received in this mode to the utterance list of the type described above, and they call to the display the choice list routine of FIG. 22 to display a new correction window for any re-utterance received.

In the cellphone embodiment shown, the "1" key has been selected for large vocabulary in the entry mode menu because it is the most common recognition vocabulary and thus the user can easily select it by clicking the "1" key twice from the editor. The first click selects the entry mode menu and the second click selects the large vocabulary recognition.

If the user presses the "2" key when in entry mode, the system will be set to a letter-name recognition of the type described above. If the user double-clicks on that key when the entry mode menu is displayed at a time when the user is in a correction window, function 7926 sets the recognition vocabulary to the letter-name vocabulary and indicates that the output of that recognition is to be treated as an ambiguous filter. In the preferred embodiment, the user has the capability to indicate under the entry preference option associated with the "9" key of the menu whether or not such filters are to be treated as ambiguous length filters or not. The default setting is to let such recognition be treated as an ambiguous length filter in continuous letter-name recognition, and a fixed length ambiguous filter in response to the discrete letter-name recognition.

At the user presses the "3" key, recognition is set to the AlphaBravo mode. If the user double-clicks on the "3" key, recognition is set to the key "Alpha" mode as described above with regard to FIG. 72. This mode is similar to AlphaBravo mode except that pressing one of the number keys "2" through "9" will cause the user to be prompted to one of the ICA words associated with the letters on the pressed key and the recognition will favor recognition of one from that limited set of ICA words, so as to provide very reliable alphabetic entry even under relatively extreme noise conditions.

It the user presses the "4" key, the vocabulary is changed to the digit vocabulary. If the user double-click on the "4" key, the system will respond to the pressing of numbered phone keys by entering the corresponding numbers into the editors text.

If the user presses the "5" key, the recognition vocabulary is limited to a punctuation vocabulary.

If the user presses the "6" key, the recognition vocabulary is limited to the contact name vocabulary described above.

FIG. 86 illustrates the key Alpha mode which has been described above to some extent with regard to FIG. 72. As indicated in FIG. 86, when this note is entered the navigation mode is set to the word/character navigation mode normally associated with alphabetic entry. Then function 8604 overlays the keys listed below it with the functions indicated with each such key. In this mode, pressing the talk key turns on recognition with the AlphaBravo vocabulary according to current recognition settings and responding to key press according to the current recognition duration setting. The "1" key continues to operate as the entry edit mode so that the user can press it to exit the key Alpha mode. A pressing of the numbered phone keys "2" through "9" causes functions 8618 through 8624 to be performed during such a press displaying a prompt of the ICA words corresponding to the phone key's letters. This causes recognition to substantially favor the recognition of one of those three or four ICA words, it turns on recognition for the duration of the press, and it outputs the letter corresponding to the recognized ICA word either into the text of the editor if in editor mode or into the filter string if in filter edit mode.

If the user presses the zero button, function 8628 enters a key punctuation mode that responds to the pressing of any phone key having letters associated with it by displaying a scrollable list of all punctuation marks that start with one of the set of letters associated with that key, and which favors the recognition of one of those punctuation words.

FIG. 87 represents an alternate embodiment of the key Alpha mode which is identical to that of FIG. 86 except for portions of the pseudocode which are underlined in FIG. 87. In this mode, if the user presses the top button, large vocabulary recognition will be turned on but only the initial letter of each recognized word will be output, as indicated in function 8608A. As functions 8618A and 8620A indicate, when the user presses a phone key having a set of three or four letters associated with it, the user is prompted to say a word starting with the desired letter and the recognition vocabulary is substantially limited to words that started with one of the key's associated letters, and function 8624A outputs the initial letter corresponding to the recognized word.

In some embodiments of the invention, a third alternative key Alpha mode can be used in which a limited set of words is associated with each letter of the alphabet and during the pressing of the key, recognition is substantially limited to recognition of one of the sets of words associated with the key's associated letters. In some such embodiments, a set of five or fewer words would be associated with each such letter.

FIGS. 89 and 90 represent some of the options available in the thought edit options menu which is accessed by pressing the 0 button in the editor and correction window modes. In this menu, if the user presses the 1 key, he gets a menu of file options as indicated at function 8902. If the user presses the 2 key, he gets a menu of edit options, such as those that are common in most editing programs as indicated by function 8904. If the user presses the 3 button, function 8906 displays the same entry preference menu that is accessed by pressing a 9 in the entry mode menu described above with regard to FIGS. 68 and 79.

If the user presses the "4" key when in the edit options menu, a text-to-speech or TTS menu will be displayed. In this menu, the "4" key toggles TTS play on or off. If this key toggles text-to-speech on if there's a current selection, functions 8916 and 8918 cause the TTS to say the selection, preferably preceding it by a TTS or pre-recorded saying of the word "selection." If there is no selection when TTS is toggled on, TTS saying the current text at the current cursor location until the end of the current document or until the user provides input other than cursor movement within the document. As will be explained below with regard to FIG. 99, when TTS mode is on, the user will be provided with audio prompts and text-to-speech playback of text so as to enable a substantial portion of the systems functionality to be used without requiring being able to see the cell phones screen.

The TTS submenu also includes a choice that allows the user to play the current selection whenever he or she desires to do so as indicated by functions 8924 and 8926 and functions 8928 and 8930 that allow the user to toggle continuous play on or off whether or not the machine is in a TTS on or TTS off mode. As indicated by the top-level choices in the edit options menu at 8932, a double-click of the "4" key toggles text-to-speech on or off as if the user had pressed the "4" key, then waited for the text-to-speech menu to be displayed and then again pressed the "4" key.

The "5" key in the edit options menu selects the outline menu that includes a plurality of functions that let a user navigate in an expand and contract headings and an outline mode. If the user double-clicks on the "5" key, the system toggles between totally expanding and totally contracting the current outline element in which the editor's cursor is located.

If the user selects the "6" key and audio menu is displayed as a submenu, some of the options of which are displayed indented under the audio menu item 8938 in the combination of FIGS. 89 and 90. This audio menu includes an item selected by the "1" key which gives the user finer control over audio navigation speed that is provided by use of the "6" button in the edit now menu described above with regard to FIGS. 84 and 70. If the user selects the "2" key, he or she will see a submenu that allows the user to call audio playback settings such as volume and speed and whether audio associated with recognized words is to be played and/or audio recorded without associated recognized words.

FIG. 90 starts with items selected by the "3", "4", "5", "6" and "7" keys under the audio menu described above, starting with numeral 8938 in FIG. 89. If the user presses the "3" key, a recognized audio options dialog box 9000 will be displayed that, as is described by numerals 9002 through 9014, gives the user the option to select to perform speech recognition on any audio contained in the current selection in the editor, to recognize all audio in the current document, to decide whether or not previously recognized audio is to be read recognized, and to set parameters to determine the quality of, and time required by, such recognition. As indicated at function 9012, this dialog box provides an estimate of recognizing the current selection with the current quality settings and, if a task of recognizing a selection is currently underway, status on the current job. This dialog box allows the user to perform recognitions on relatively large amounts of audio as a background task or at times when a phone is not being used for other purposes, including times when it is plugged into an auxiliary power supply.

If the user selects the "4" key in the audio menu, the user is provided with a submenu that allows him to select to delete certain information from the current selection. This includes allowing the user to select to delete all audio that is not associated with recognized words, to delete all audio that is selected with recognized words, to delete all audio, or to delete text from the desired selection. Deleting recognition audio from recognized text greatly reduces the memory associated with the storage of such text and is often a useful thing to do once the user has decided that he does not need the text-associated audio to help him her determine its intended meaning. Deleting text but not audio from a portion of media is often useful where the text has been produced by speech recognition from the audio but is sufficiently inaccurate to be of little use.

In the audio menu, the "5" key allows the users to select whether or not text that has associated recognition audio is marked, such as by underlining to allow the user to know if such text has playback that can be used to help understand it or, in some embodiments, will have an acoustic representation from which alternate recognition choices can be generated. The "6" key allows the user to choose whether or not recognition audio is to be capped for recognized text. In many embodiments, even if the recording of recognition audio is turned off, such audio will be capped for some number of the most recently recognized words so that it will be available for correction playback purposes.

In the audio menu, the "7" key selects a transcription mode dialog box. This causes the dialog box to be displayed, that allows the user to select settings to be used in a transcription mode that is described below with regard to FIG. 94. This is a mode that is designed to make it easy for user to transcribe prerecorded audio by speech recognition.

If the user presses the "8" key, function 9036 will be performed, call a search dialog box with the current selection, if any, as the search string. As will be illustrated below, the speech recognition text editor can be used to enter a different search string, if so desired. If the user double-clicks on the "8" key, this will be interpreted as a find again command which will search again for the previously entered search string.

If the user selects the "9" key in the edit options menu, a vocabulary menu is displayed that allows the user to determine which words are in the current vocabulary, to select between different vocabularies, and to add words to a given vocabulary. If the user either presses or double-clicks the "0" button when in the edit options menu, an undo function will be performed. A double click accesses the undo function from within the edit options menu so as to provide similarity with the fact that a double-click on "0" accesses the undo function from the editor or the correction window. In the edit options menu, the pound key operates as a redo button.

FIG. 94 illustrates the TTS play rules. These are the rules that govern the operation of TTS generation when TTS operation has been selected through the text-to-speech options described above with regard to functions 8908 to 8932 of FIG. 89.

If a TTS keys mode has been turned on by operation of the 1 key when in the TTS, as indicated by function 1909 above, function 9404 causes functions 9406 to 9414 to be performed. These functions enable a user to safely select phone keys without being able to see them, such as when the user is driving a car or is otherwise occupied. Preferably this mode is not limited to operation in the speech recognition editor that can be used in any mode of the cell phones operation. When any phone key is pressed, function 9408 tests to see if the same key has been pressed within a TTS Key Time, which is a short period of time such as a quarter or a third of a second. For purposes of this test, the time is measured since the release of the last key press of the same key. If the same key has not been pressed within a short period of time, functions 9410 and 9412 will cause a text to speech, or in some embodiments recorded audio playback, saying of the number of the key and its current command name. This audio feedback continues only as long as the user continues to press the key. If the key has a double-click command associated with it, it also will be said if the user continues to press the key long enough. If the test of function 9408 finds that the time since the release of the last key press of the same key is less than the TTS key time function 9414 the cellphones software responds to the key press, including any double-clicks, the same as it would as if the TTS key mode were not on.

Thus it can be seen that the TTS keys mode allows the user to find a cell phone key by touch, to press it to determine if it is the desired key and, if so, to quickly press it again one or more times to achieve the key's desired function. Since the press of the key that is responded to by functions 9410 and 9412 does not cause any response other than the saying of its associated function, this mode allows the user to search for the desired key without causing any undesired consequences.

In some cell phone embodiments, the cell phone keys are designed so that they are merely touch rather than pushed audio feedback as to which key they are and their current function, similar to that provided by function 9412, will be provided. This can be provided, for example, by having the material of the phone keys made of the conductive material, or by having other portions of the phone that are separated from those keys generate a voltage that if conducted through a user's body to a key, can be detected by circuitry associated with the key. Such a system would provide an even faster way for a user to find a desired key by touch, since with it a user could receive feedback as to which keys he was touching merely by scanning a finger over the keypad in the vicinity of the desired key. It would also allow a user to rapidly scan for desired command name by likewise scanning his fingers over successive keys until the desired command was found.

When TTS is on, if the system recognizes or otherwise receives a command input, functions 9416 and 9418 cause TTS or recorded audio playback to say the name of the recognized command. Preferably such audio confirmation of commands have an associated sound quality, such as in the form of the different tone of voice or different associated sounds, that distinguish the saying of command words from the saying of recognized text.

When TTS is on, when a text utterance is recognized, functions 9420 through 9424 can tell the end of the utterance, and the completion of its recognition and then use TTS to say the words that have been recognized as the first choice for the utterance.

As indicated in functions 9426 through 9430, TTS responds to the recognition of a filtering utterance in a similar manner.

When in TTS, if the user moves the cursor to select a new word or character, functions 9432 to 9438 use TTS to say that newly selected word or character. If such a movement of a cursor to a new word or character position extends an already started selection, after the saying of the new cursor position, functions 9436 and 9438 will say the word "selection" in a manner that indicates that it is not part of recognized text, and then proceeds to say the words of the current selection. If the user moves the cursor to be a non-selection cursor, such as is described above with regard to functions 7614 and 7615 of FIG. 76, functions 9440 and 9442 of FIG. 94 use TTS to say the two words that the cursor is located between.

When in TTS mode, if a new correction windows is displayed, functions 9444 and 9446 use TTS to say the first choice in the correction window, dispel the current filter if any, indicating which parts of it are unambiguous and which parts of it are ambiguous, and then use TTS to say each candidate in the currently displayed portion of the choice list. For purposes of speed, it is best that differences in tone or sound be used to indicate which portions of the filter are absolute or ambiguous.

If the user scrolls an item in the correction window, functions 9448 and 9450 use TTS to say the currently highlighted choice and its selection number in response to each such scroll. If the user scrolls a page in a correction window, functions 9452 and 9454 use TTS to say that newly displayed choices as well as indicating the currently highlighted choice.

When in correction mode, if the user enters a menu, functions 9456 and 9458 use TTS or free recorded audio to say the name of the current menu and all of the choices in the menu and their associated numbers, indicating the current selection position. Preferably this is done with audio cues that indicate to a user that the words being said are menu options.

If the user scrolls up or down an item in a menu, functions 9460 and 9462 use TTS or pre-recorded audio to say the highlighted choice and then, after a brief pause, any following selections on the currently displayed page of the menu.

FIG. 95 illustrates some aspects of the programming used in TTS generation. If a word to be generated by text-to-speech is in the speech recognition programming's vocabulary of phonetically spelled words, function 9502 causes functions 9504 through 9512 to be performed. Function 9504 tests to see if the word has multiple phonetic spellings associated with different parts of speech, and if the word to be set using TTS has a current linguistic context indicating its current part of speech. If both these conditions are met, function 9506 uses speech recognition programming's part of speech indicating code to select the phonetic spelling associated with a part of speech found most probable by that part of speech indicating code as the phonetic spelling in the TTS generation for the current word. If, on the other hand, there is only one phonetic spelling associated with the word or there is no context sufficient to identify the most probable part of speech for the word, function 9510 selects the single phonetic spelling for the word or its most common phonetic spelling. Once a phonetic spelling has been selected for the word to be generated either by function 9506 or function 9510, function 9512 uses the phonetic spelling selected for the word as a phonetic spelling to be used in the TTS generation. If, as is indicated at 9514, the word to be generated by text-to-speech does not have a phonetic spelling, function 9514 and 9516 use pronunciation guessing software that is used by the speech recognizer to assign a phonetic spelling to names and newly entered words for the text-to-speech generation of the word.

FIG. 96 describes the operation of the transcription mode that can be selected by operation of the transcription mode dialog box that is activated under the audio menu option of the edits options menu described above in association with the number "7" in FIG. 90 under the audio menu of the edits options menu shown in FIGS. 89 and 90.

When the transcription mode is entered, function 9602 normally changes navigation mode to an audio navigation mode that navigates forward or backward five seconds and an audio recording in response to left and right navigational key input and forward and backward one second in response to up and down navigational input. These are default values which can be changed in the transcription mode dialog box. During this mode, if the user clicks the play key, which is the "6" key in the editor, functions 9606 through 9614 are performed. Functions 9607 and 9608 toggle play between on and off. Function 9610 causes functions 9612 to be performed if the toggle is turning play on. If so, if there has been no sound navigation since the last time sound was played, function 9614 starts playback a set period of the time cbefore the last end of play. This is performed so that if the user is performing transcription, each successive playback will start slightly before the last one ended so the user will be able to recognize words that were only partially said in the prior playback and so that the user will better be able to interpret speech sounds as words by being able to perceive a little bit of the preceding language context. If the user presses the play key for more than a specified period of time, such as a third of the second, function 9616 causes functions 9618 through 9622 to be performed. These functions test to see if play is on, and if so they turn it off. They also turn on large vocabulary recognition during the press, in either continuous or discrete mode, according to present settings. They then insert the recognize text into the editor in the location in the audio being transcribed at which the last end of play took place. If the user double-clicks the play button, functions 9624 and 9626 prompt the user that audio recording is not available in transcription mode and that transcription mode can be turned off in the audio menu under the added options menu.

It can be seen that its transcription mode enables the user to alternate between playing a portion of previously recorded audio and then transcribing it by use of speech recognition by merely alternating between clicking and making sustained presses of the play key, which is the number "6" phone key. The user is free to use the other functionality of the editor to correct any mistakes that have been made in the recognition during the transcription process, and then merely return to it by again pressing the "6" key to play the next segment of audio to be transcribed Of course, it should be understood that the user will often not desire to perform a literal transcription out of the audio. For example, the user may play back a portion of a phone call and merely transcribe a summary of the more noteworthy portions.

FIG. 97 illustrates the operation of a dialogue box editing programming that uses many features of the editor mode described above to enable users to enter text and other information into a dialogue box displayed in the cell phones screen.

When a dialogue box is first entered, function 9702 displays an editor window showing the first portion of the dialog box. If the dialog box is too large to fit on one screen at one time, it will be displayed in a scrollable window. As indicated by function 9704, the dialog box responds to all inputs in the same way that the editor mode described above with regard to FIGS. 76 through 78 does, except as is indicated by the functions 9704 through 9726. As indicated at 9707 and 9708, if the user supplies navigational input when in a dialog box, the cursor movement responds in a manner similar to that in which it would in the editor except that it can normally only move to a control into which the user can supply input. Thus, if the user moved left or right of a word, the cursor would move left or right to the next dialog box control, moving up or down lines if necessary to find such a control. If the user moves up or down a line, the cursor would move to the nearest of the lines above or below the current cursor position. In order to enable the user to read extended portions of text that might not contain any controls, normally a cursor will not move more than a page even if there are no controls within that distance.

As indicated by functions 9700 and through 9716, if the cursor has been moved to a field and the user provides any input of a type that would input text into the editor, function 9712 displays a separate editor window for the field, which displays the text currently in that field, if any. If the field has any vocabulary limitations associated with it, functions 9714 and 9716 limit the recognition in the editor to that vocabulary. For example, if the field were limited to state names, recognition in that field would be so limited. As long as this field-editing window is displayed, function 9718 will direct all editor commands to perform editing within it. The user can exit this field-editing window by selecting OK, which will cause the text currently in the window at that time to be entered into the corresponding field in the dialog box window.

If the cursor in the dialog box is moved to a choice list and the user selects a text input command, function 9722 displays a correction window showing the current value in the list box as the first choice and other options provided in the list box as other available choices shown in a scrollable choice list. In this particular choice lists, the scrollable options are not only accessible by selecting an associated number but also are available by speech recognition using a vocabulary limited to those options.

If the cursor is in a check box or a radio button and the user selects any editor text input command, functions 9724 and 9726 change the state of the check box or radio button, by toggling whether the check box or radio button is selected.

Figures 99, 100:
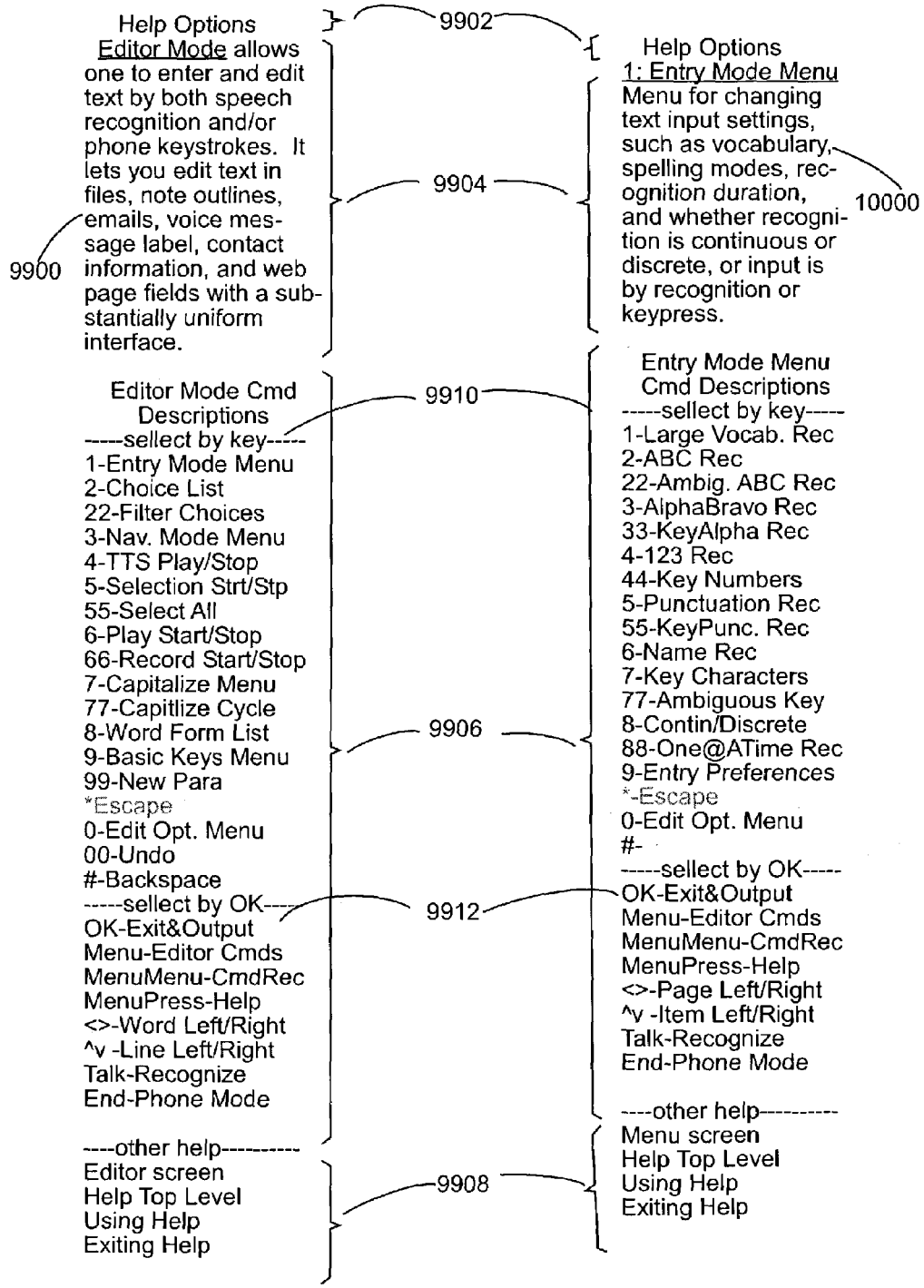
FIGS. 99 and 100 illustrate examples of help menus of the type that displayed by the programming of FIG. 98.

FIG. 98 illustrates a help routine 9800 which is the cell phone embodiment analog of the help mode described above with regard to FIG. 19 in the PDA embodiments. When this help mode is called when the cell phone is in a given state or mode of operation, function 9802 displays a scrollable help menu for the state that includes a description of the state along with a selectable list of help options and of all of the state's commands. FIG. 99 displays such a help menu for the editor mode described above with regard to FIGS. 67 and 76 through 78. FIG. 100 illustrates such a help menu for the entry mode menu described above with regard to FIG. 68 and FIGS. 79 and 80. As his shown in FIGS. 99 and 100, each of these help menus includes a help options selection, which can be selected by means of a scrollable highlight and operation of the help key, which will allow the user to quickly jump to the various portions of the help menu as well as the other help related functions. Each help menu also includes a brief statement, 9904, of the current command state the cell phone is in. Each help menu also includes a scrollable, selectable menu 9906 listing all the options accessible by phone key. It also includes a function 9908 which allows the user to access other help functions, including a description of how to use the help function and in some cases help about the function of different portions of the screen that is available in the current mode.

Figure 101:
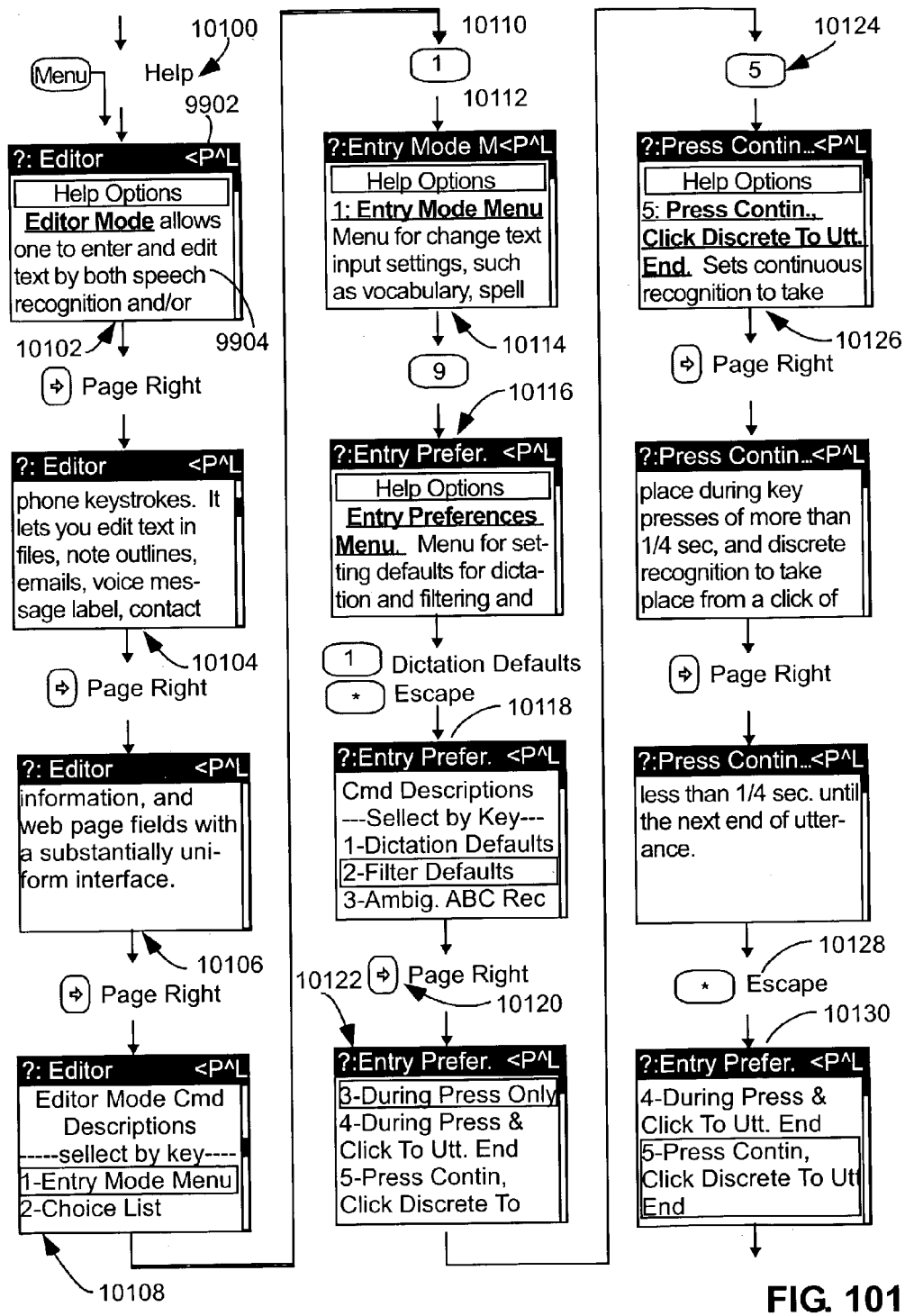
FIGS. 101 and 102 illustrate how a user can use the help programming of FIG. 98 to rapidly search for, and received descriptions of, the functions associated with various portions of the cellphone's command structure.

As shown in FIG. 101, if the user in the editor mode makes a sustained press on the menu key as indicated at 10100, the help mode will be entered for the editor mode, causing the cell phone to display the screen 10102. This displays the selectable help options, option 9902, and displays the beginning of the brief description of the operation of the other mode 9900 as shown in FIG. 99. If the user presses the right arrow key of the cell phone, which functions as a page right button, since, in help mode, the navigational mode is a page/line navigational mode as indicated by the characters "<P^L" shown in screen 1102, the display will scroll down a page as indicated by screen 10104. If the user presses the page right key again, the screen will again scroll down a page, causing the screen to have the appearance shown at 10106. In this example, the user has been able to read the summary of the function of the editor mode 9904 shown in FIG. 99 with just two clicks of the page right key.

If the user clicks the page right key again causing the screen to scroll down a page as is shown in the screen shot 10108, the beginning of the command list associated with the editor mode can be seen. The user can use the navigational keys to scroll the entire length of the help menu if so desired. In the example shown, when the user finds the key number associated with the entry mode menu, he presses that key as shown at 10110 to cause the help mode to display the help menu associated with the entry mode menu as shown at screen 10112.

It should be appreciated that whenever the user is in a help menu, he can immediately select the commands listed under the "select by key" line 9910 shown in FIG. 99. Thus, there is no need for a user to scroll down to the portion of the help menu in which commands are listed in order to press the key associated with a command in order to see its function. In fact, a user who thinks he understands the function associated with the key can merely make a sustained press of the menu key and then type the desired key to see a brief explanation of its function and a list of the commands that are available under it.

The commands listed under the "select by OK" line 9912 shown in FIGS. 99 and 100 have to be collected by scrolling the highlight to the commands line in the menu and selecting by use of the OK command. This is because the commands listed below the line 9912 are associated with keys that are used in the operation of the help menu itself. This is similar to the commands listed in screen 7506 of the editor mode command list shown in FIG. 75, which are also only selectable by selection with the OK command in that command list.

In the example of FIG. 101, it is assumed that the user knows that the entry preference menu can be selected by pressing and a "9" in the entry mode menu, and presses that key as soon as he enters help for the entry mode menu as indicated by 10114. This causes the help menu for the entry preference menu to be shown as illustrated at 10116.

In the example, the user presses the "1" key followed by the escape key. The "1" key briefly calls the help menu for the dictation defaults option and the escape key returns to the entry preference menu at the location and menu associated with the dictation defaults option, as shown by screen 10118. Such a selection of a key option followed by an escape allows the user to rapidly navigate to a desired portion of the help menu's command list merely by pressing the number of the key in that portion of the command and list followed by an escape.

In the example, the user presses the page right key as shown at 10120 to scroll down a page in the command list as indicated by screen 1122. In the example, it is assumed the user selects the option associated with the "5" key, by pressing that key as indicated at 10124 to obtain a description of the press continuous, click discrete to utterance option. This causes a help menu for that option to be displayed as shown in screen 10126. In the example, the user scrolls down two more screens to read the brief description of the function of this option and then presses the escape key as shown at 10128 to return back to the help menu for the entry preference menu as shown at screen 10130.

Figure 102:
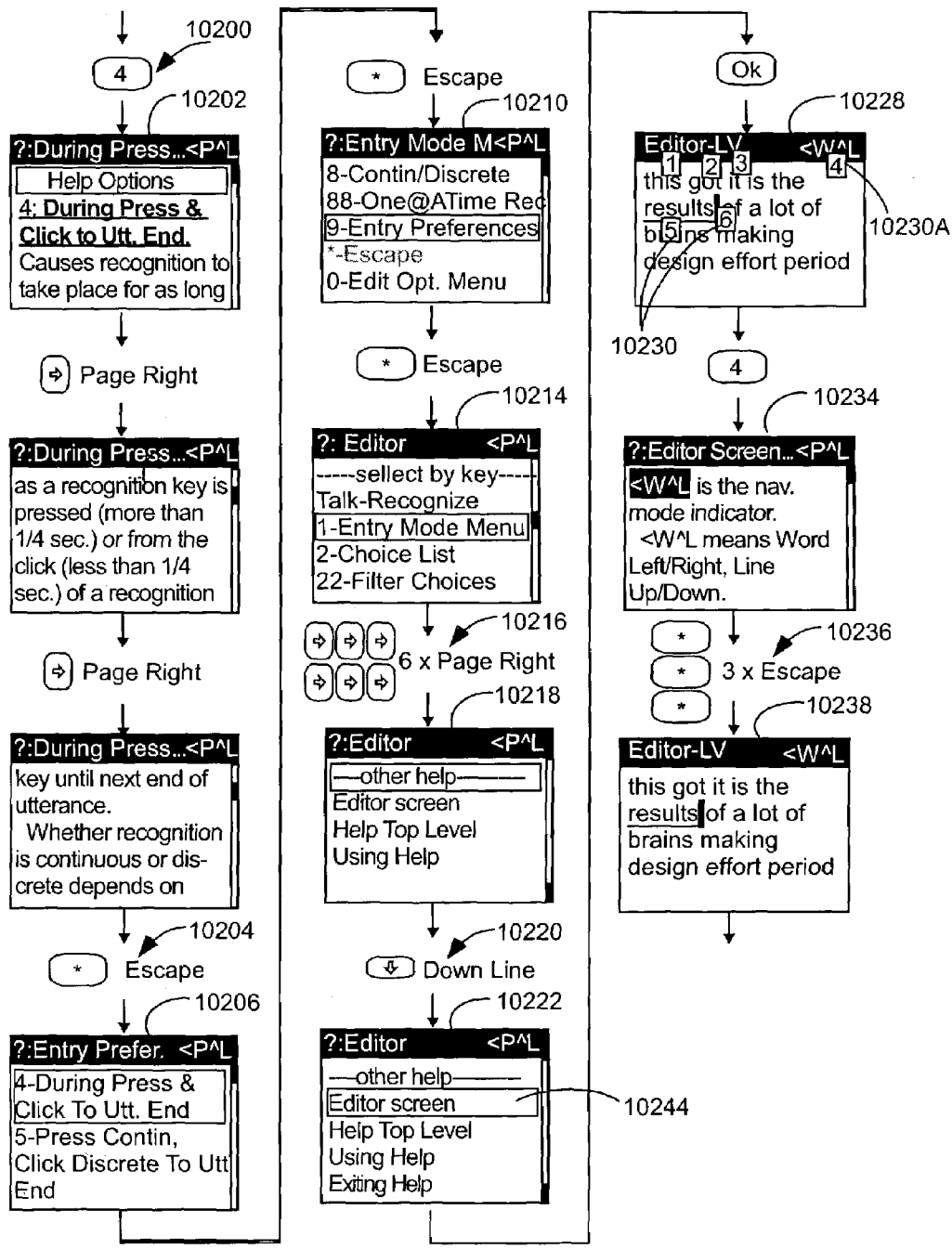

As shown in FIG. 102, in the example, when the user returns to help for the entry preference menu, he or she selects the "4" key as indicated by numeral 10200 which causes the help menu for the During Press and Click to utterance and option, as shown at screen 10202. The user then scrolls down two more screens to read enough of the description of this mode to understand its function and then, as shown at 10204, escapes back up to help for the entry preference menu as shown at screen 10206. The user then presses escape again to return to the help menu from which the entry preference menu had been called, which is help for the entry mode menu as shown at screen 10210. The user presses escape again to return to the help menu from which help for entry mode had been called, which is the help menu for the editor mode as shown in screen 10214.

In the example, it is assumed that the user presses the page right key six times to scroll down to the bottom portion, 9908, shown in FIG. 99 of the help menu for the editor mode. If the user desires he can use a place command to access options in this portion of the help menu more rapidly. Once in the "other help" portion of the help menu, the user presses the down line button as shown at 10220 to select the editor screen option 10224 shown in the screen 10222. At this point, the user selects the OK button causing the help for the editor screen itself to be displayed as is shown in screen 10228. In the mode in which this screen is shown, phone key member indicators 10230 are used to label portions of the editor screen. If the user presses one of these associated phone numbers, a description of the corresponding portion of the screen will be displayed. In the example of FIG. 102, the user presses the "4" key, which causes an editor screen help screen 10234 to be displayed, which describes the function of the navigation mode indicator "<W^L" shown at the top of the editor screen help screen 10228.

In the example, the user presses the escape key three times as is shown to numeral 10236. The first of these escapes from the screen 10234 back to the screen 10228, giving the user the option to select explanations of other of the numbered portions of the screen being described. In the example, the user has no interest in making such other selections, and thus has followed the first press of the escape key with two other rapid presses, the first of which escapes back to the help menu for the editor mode and the second of which escapes back to the editor mode itself.

As can be seen in the FIGS. 101 and 102, the hierarchical operation of help menus enables the user to rapidly explore the command structure on the cell phone. This can be used either to search for a command that performs a desired function, or to merely learn the command structure in a linear order.

Figure 103:
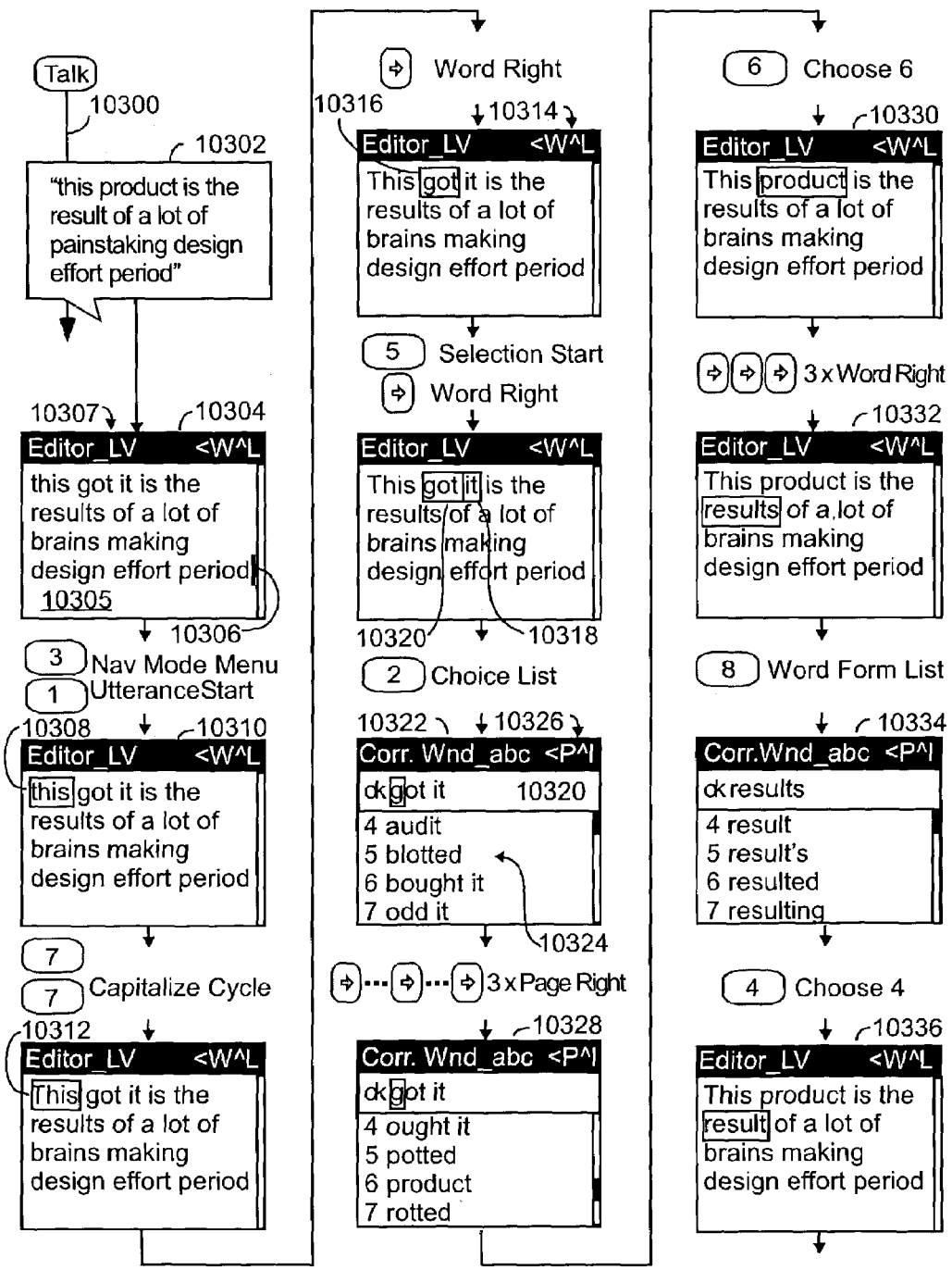
FIGS. 103 and 104 illustrate a sequence of interactions between a user and the cellphone's speech recognition editor's user interface in which the user enters and corrects text using continuous speech recognition.
Figure 104:
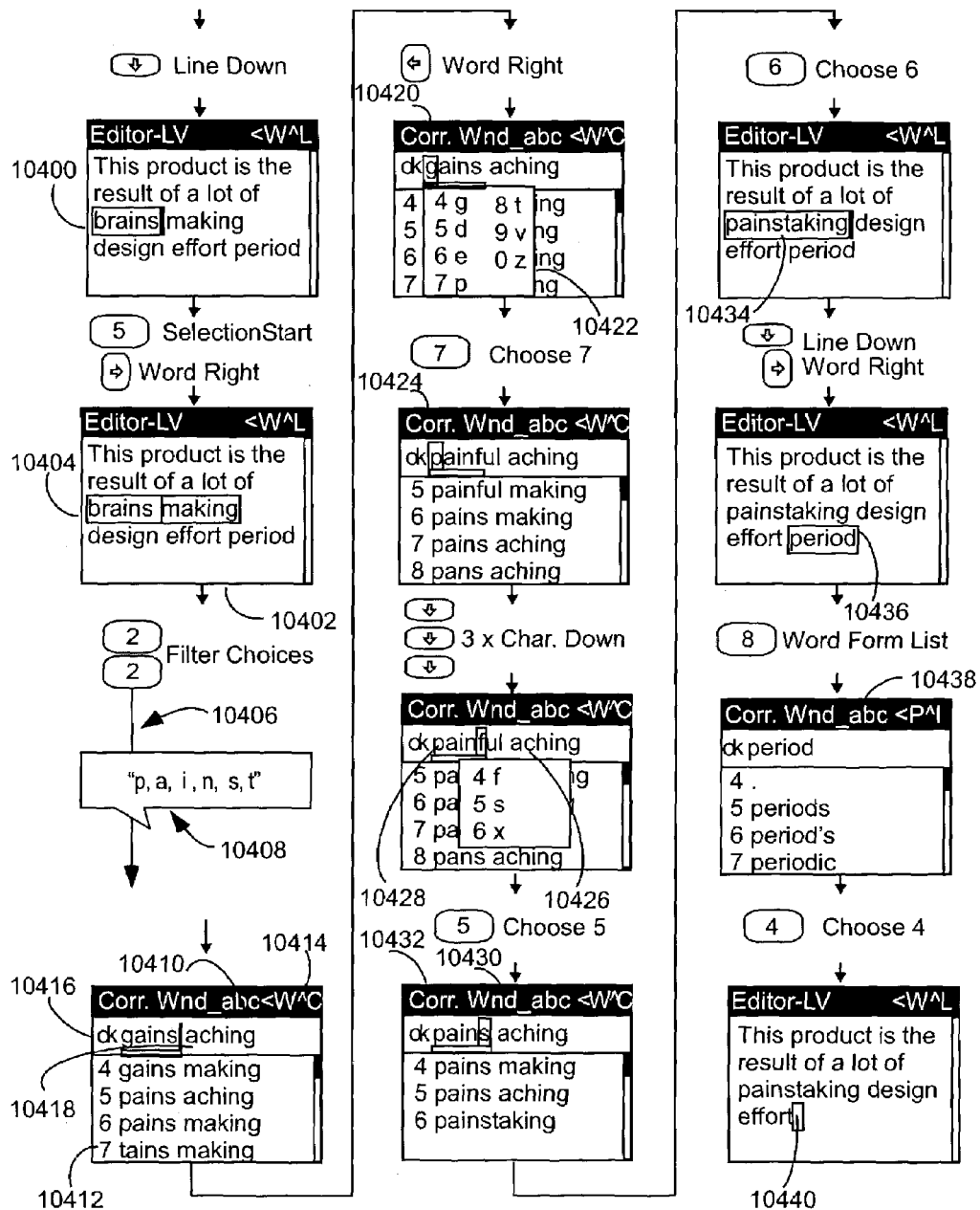

FIGS. 103 and 104 describe an example of a user continuously dictating some speech in the editor mode and then using the editor's interface to correct the resulting text output.

The sequence starts in FIG. 103 with the user making a sustained press of the talk button as indicated at 10300 during which he says the utterance 10302. This results in the recognition of this utterance, which in the example causes the text shown in screen 10304 to be displayed in the editor's text window 10305. The numeral 10306 points to the position of the cursor at the end of this recognized text, which is a non-selection cursor at the end of the continuous dictation.

It is assumed that the system has been set in a mode that will cause the utterance to be recognized using continuous large vocabulary speech recognition. This is indicated by the characters "_LV" 10306 in the title bar of the editor window shown in screen 10304.

In the example, the user presses the "3" key to access the added navigation menu illustrated in FIGS. 70 and 84 and then presses the "1" button to select the utterance option shown in those FIG.s. This makes the cursor correspond to the first word of the text recognized for the most recent utterance as indicated at 10308 in screen 10310. Next, the user double-clicks the "7" key to select the capitalized cycle function described in FIG. 77. This causes the selected word to be capitalized as shown at 10312.

Next, the user presses the right button, which in the current word/line navigational mode, indicated by the navigational mode indicator 10314, functions as a word right button. This causes the cursor to move to the next word to the right, 10316. Next the user presses the "5" key to set the editor to an extended selection mode as described above with regard to functions 7728 through 7732 of FIG. 77. Then the user presses the word right again, which causes the cursor to move to the word 10318 and the extended selection 10320 to include the text "got it".

Next, the user presses the "2" key to select the choice list command of FIG. 77, which causes a correction window 10322 to be displayed for the selection 10320 as the first choice and with a first alphabetically ordered choice list shown as displayed at 10324. In this choice list, each choice is shown with an associated phone key number that can be used to select it.

In the example, it is assumed that the desired choice is not shown in the first choice list, so the user presses the right key three times to scroll down to the third screen of the second alphabetically ordered choice list, shown in 10328, in which the desired word "product" is located.

As indicated by function 7706 in FIG. 77, when the user enters the correction window by a single press of the choice list button, the correction window's navigation of the set to the page/item navigational mode, as is indicated by the navigational mode indicator 10326 shown in screen 10332.

In the example, the user presses the "6" key to select the desired choice, which causes it to be inserted into the editor's text window at the location of the cursor selection, causing the editor text window to appear as shown at 10330.

Next, the user presses the word right key three times to place the cursor at the location 10332. In this case, the recognized word is "results" and a desired word is the singular form of that word "result." For this reason, the user presses the word form list button, which causes a word form list correction window, 10334, to be displayed, which has the desired alternate form as one of its displayed choices. The user data selects the desired choice by pressing its associated phone key, causing the editor's text window to have the appearance shown at 10336.

As shown in FIG. 104, the user next presses the line down button to move the cursor down to the location 1400. The user then presses the "5" key to start an extended selection and presses the word key to move the cursor right one word to the location 10402, causing the current selection 10404 to be extended rightward by one word.

Next, the user double-clicks the "2" key to select a filter choices option described above with regard to function 7712 through 7716, in FIG. 77. The second click of the "2" key is an extended click, as indicated by the down arrow 10406. During this extended press, the user continuously utters the letter string, "p, a, i, n, s, t," which are the initial letters of the desired word, "painstaking."

In the example, it is assumed that the correction window is in the continuous letter name recognition mode as indicated by the characters "_abc" in the title bar of the correction 10412.

In the example, the recognition of the utterance 10408 as filter input causes the correction window 10412 to show a set of choices that have been filtered against an ambiguous length filter corresponding to the recognition results from the recognition of that continuously spoken string of letter names. The correction window has a first choice, 10414, that starts with one of the character sequences associated with the ambiguous filter element. The portion of the first choice that corresponds to a sequence of characters associated with the ambiguous filter is indicated by the ambiguous filter indicator 10416. The filter cursor, 10418, is located after the end of this portion of the first choice.

At this point, the user presses the word right key which, due to the operation of functions 8124 and 8126 at FIG. 81, causes a filter cursor to be moved to and to select the first character, 10420, of the current word. Functions 8151 and 8162 of FIG. 81 cause a filter character choice window, 10422, to be displayed. Since the desired character is a "p," the user presses the "7" key to choose it, which causes that character to be made an unambiguous character of the filter string, and causes a new correction window, 10424, to be displayed as a result of that change in the filter.

Next, the user presses the character down button four times, which due to the operation of function 8150 in FIG. 81, causes the filter cursor's selection to be moved four characters to the right in the first choice, which in the example is the letter "f," 10426. Since this is a portion of the first choice that still corresponds to the ambiguous portion of the filter strength as indicated by the ambiguous filter marker 10428, the call to filter character choice in line 8152 of FIG. 81 will cause another character choice window to be displayed, as shown.

In the example, the desired character, the letter "s," is associated with the "5" phone key in the choice list, and the user presses that key to cause the correct character, 10430, to be inserted into the current filter strength and all the characters before it to be unambiguously confirmed, as indicated by numeral 10432.

At this time, the correct choice is shown associated with the phone key "6," and the user presses that phone key to cause the desired word to be inserted into the editor's text window as shown at 10434.

Next, in the example, the user presses the line down and word right keys to move the cursor selection down a line and to the right so as to select the text "period" shown at 10436. The user then presses the "8," or word form list key, which causes a word form list correction window 10438, to be displayed. The desired output, a period mark, is associated with the "4" phone key. The user presses that key and causes the desired output to be inserted into the text of the editor window as shown at 10440.

Figure 105:
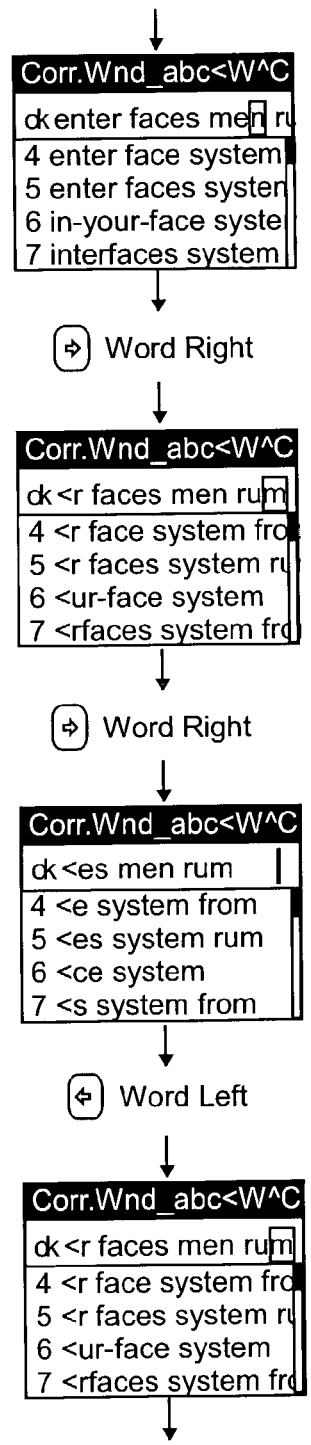
FIG. 105 illustrates how a user can scroll horizontally in one a correction window displayed on the cellphone.

FIG. 105 illustrates how the user can scroll a choice list horizontally by operation of functions 8132 and 8135 described above with regard to FIG. 81.

FIG. 106 illustrates how the Key Alpha recognition mode can be used to enter alphabetic input into the editor's text window. Screen 10600 shows an editor text window in which the cursor 10602 is shown. In this example, the user presses the "1" key to open the entry mode menu described above with regard to FIGS. 79 and 68, resulting in the screen 10604. Once in this mode, the user double-clicks the "3" key to select the Key Alpha recognition mode described above with regard to function 7938 of FIG. 79. This causes the system to be set to the Key Alpha mode described above with regard to FIG. 86, and the editor window to display the prompt 10606 shown in FIG. 106.

In the example, the user makes an extended press of the phone key as indicated at 10608, which causes a prompt window, 10610 to display the ICA words associated with each of the letters on the phone key that has been pressed. In response, the user makes the utterance "charley," 10612. This causes the corresponding letter "c" to be entered into the text window at the former position of the cursor and causes the text window to have the appearance shown in screen 10614.

In the example, it is next assumed that the user presses the talk key while continuously uttering two ICA words, "alpha" and "bravo" as indicated at 10616. This causes the letters "a" and "b" associated with these two ICA words to be entered into the text window at the cursor as indicated by screen 10618. Next in the example, the user presses the 8 key, is prompted to say one of the three ICA words associated with that key, and utters the word "uniform" to cause the letter "u" to be inserted into the editor's text window as shown at 10620.

Figure 3:
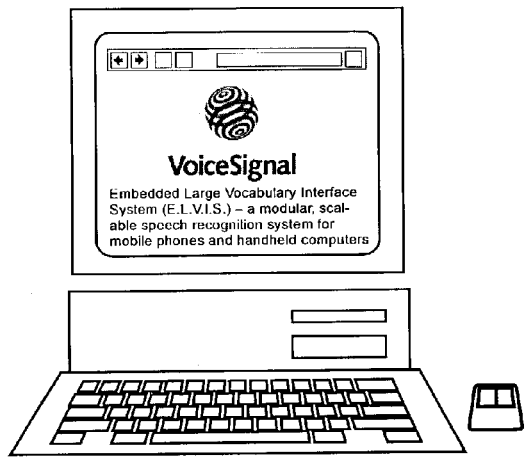
FIGS. 3 through 8 show a progression of different types of computing platforms upon which many aspects of the present invention can be used, and illustrating the trend toward smaller and/or more portable computing devices.
Figure 6:
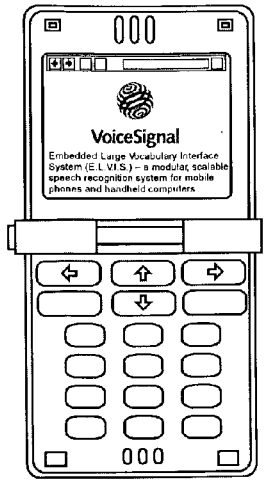
Figure 4:
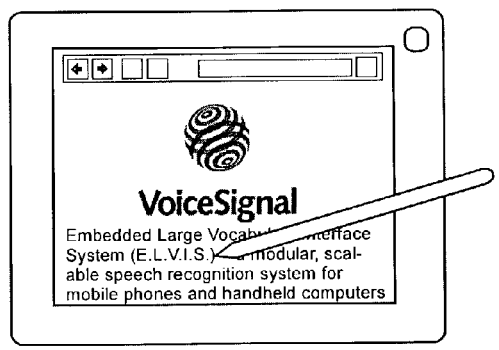
Figure 7:
Figure 5:
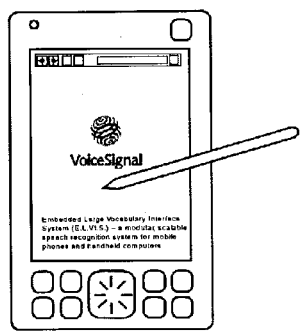
Figure 8:
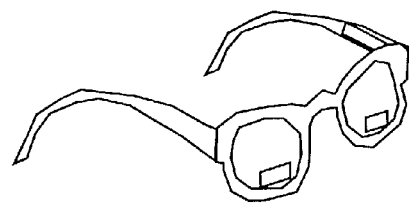

FIG. 7 provides an illustration of the same Key Alpha recognition mode being used to enter alphabetic filtering input. It shows that the Key Alpha mode can be entered when in the correction window by pressing the "1" key followed by a double-click on the "3" key in the same way it can be from the text editor, as shown in FIG. 106.

Figures 109, 110:
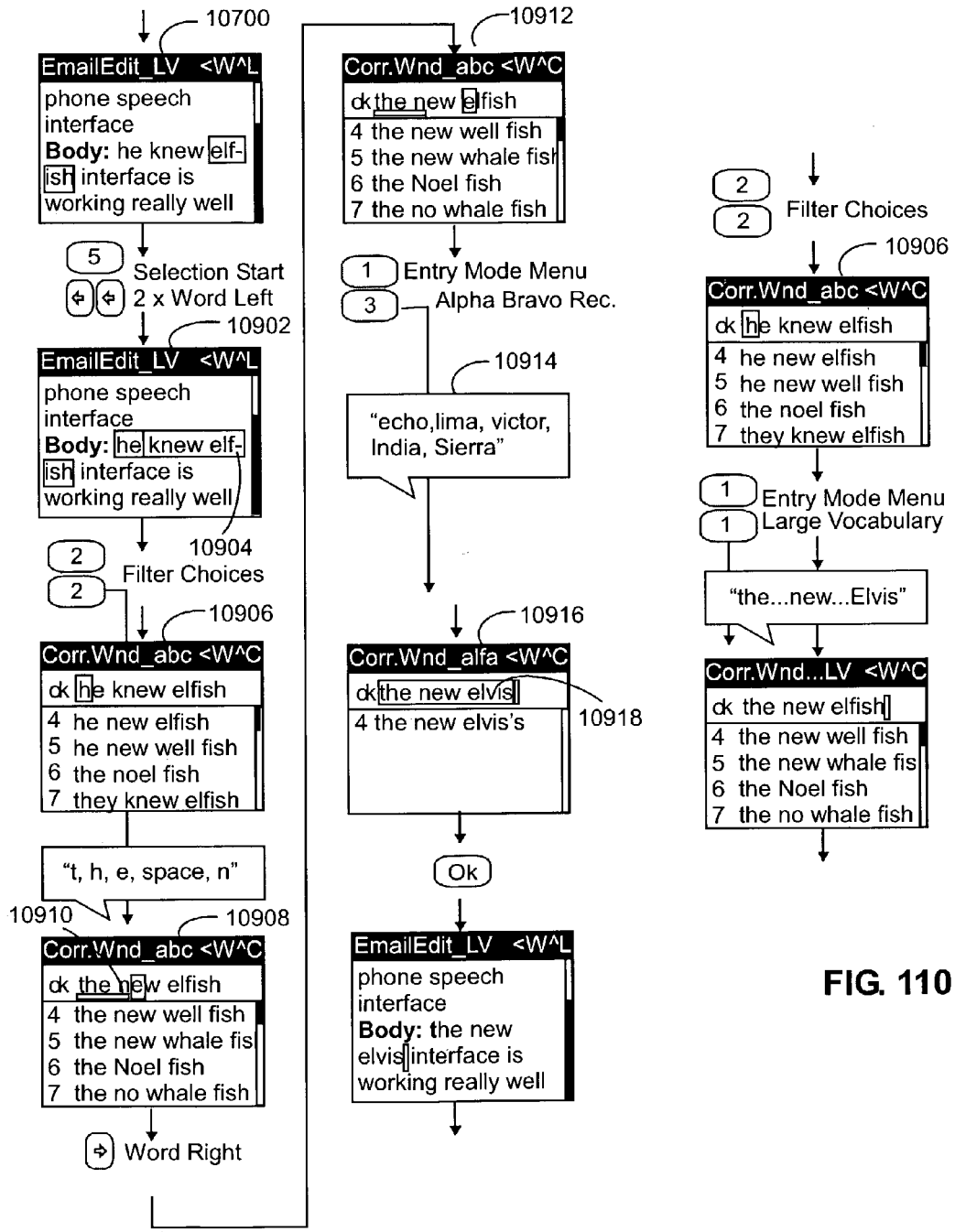
FIG. 110 illustrates how the cellphone's speech recognition can combine scores from the discrete recognition of one or more words with scores from a prior continuous recognition of those words to help produce the desired output.
Figure 111:
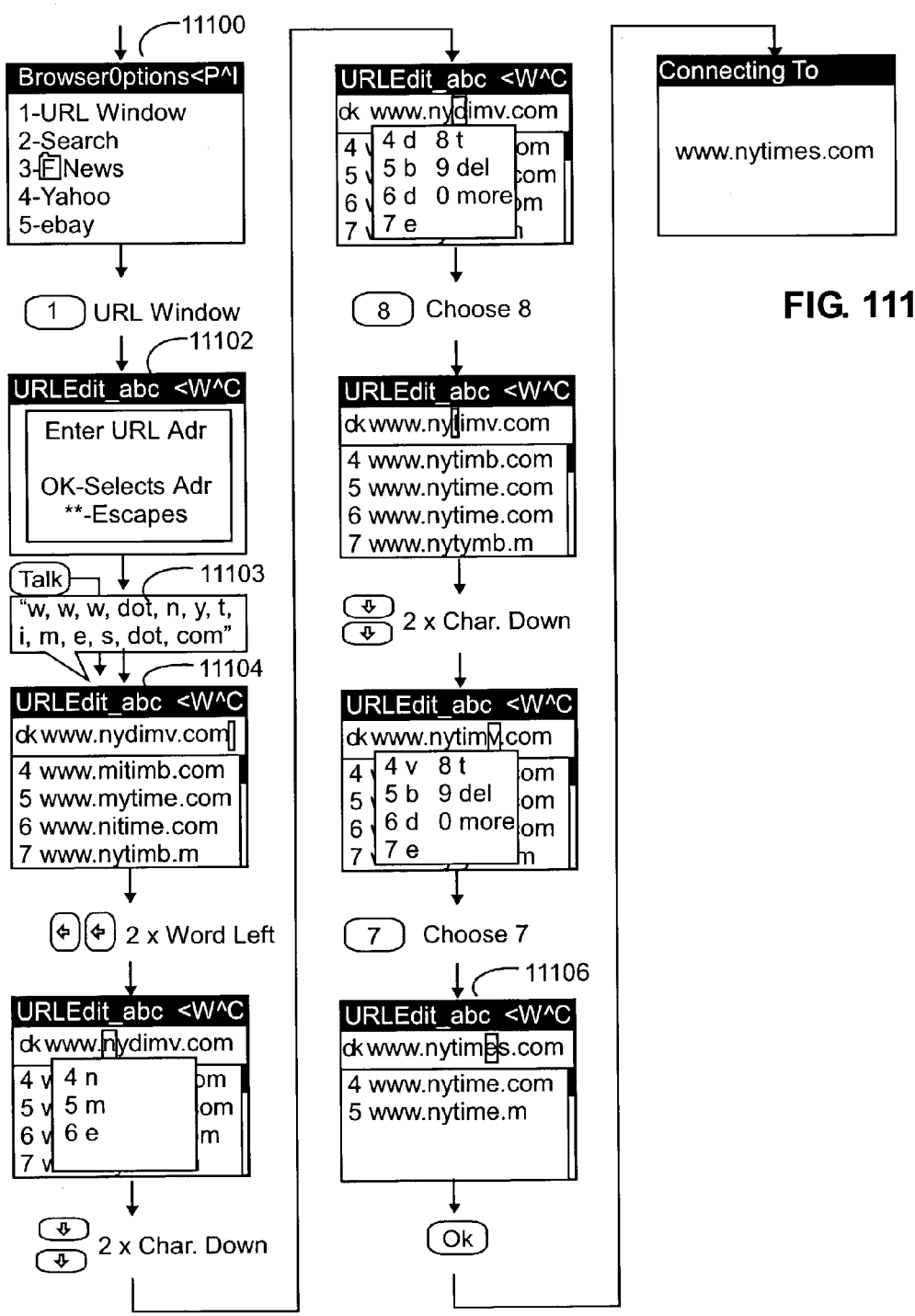
FIG. 111 illustrates how the cellphone speech recognition software can be used to enter a URL for the purposes of accessing a World Wide Web site using the wireless communication capabilities of the cellphone.

FIGS. 106 and 109 show how a user can use the interface of the voice recognition text editor described above to address and to enter and correct text and e-mails in the cell phone embodiment.

Figure 108:
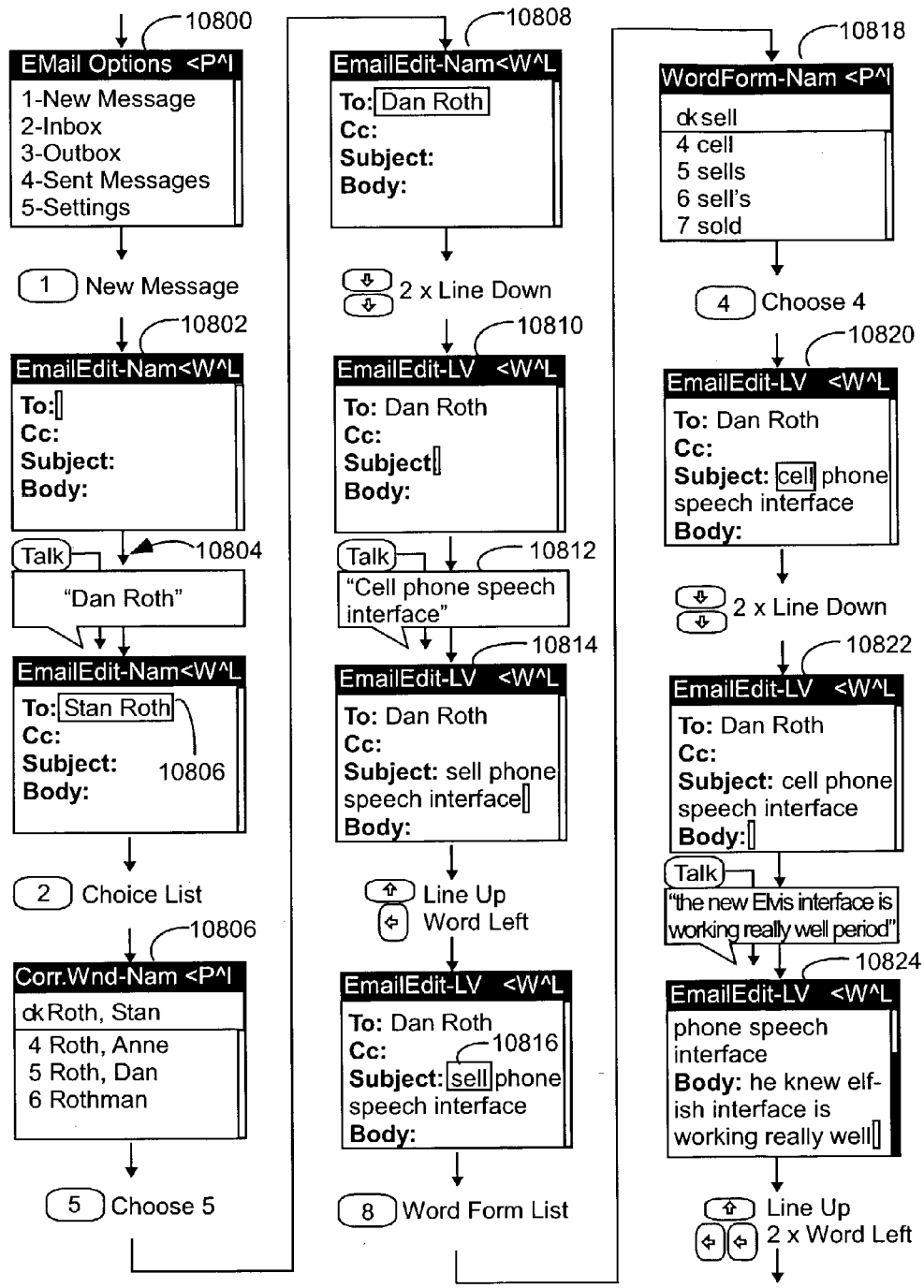
FIGS. 108 and 109 illustrate how the cellphone's speech recognition editor allows the user to address and enter and edit text in an e-mail message that can be sent by the cellphone's wireless communication capabilities.

In FIG. 108, screen 10800 shows the e-mail option screen which a user accesses if he selects the e-mail option by double-clicking on the "4" key when in the main menu, as illustrated in FIG. 66.

In the example shown, it is assumed that the user wants to create a new e-mail message and thus selects the "1" option. This causes a new e-mail message window, 10802, to be displayed with the cursor located at the first editable location in that window. This is the first character in the portion of the e-mail message associated with the addressee of the message. In the example, the user makes an extended press of the talk button and utters the name "Dan Roth" as indicated by the numeral 10804.

In the example, this causes the slightly incorrect name, "Stan Roth," to be inserted into the message's addressee line as a shown at 10806. The user responds by pressing the "2" key to select a choice list, 10806, for the selection. In the example, the desired name is shown on the choice list and the user presses the "5" key to select it, causing the desired name to be inserted into the addressee line as shown at 10808.

Next, the user presses the down line button twice to move the cursor down to the start of the subject line, as a shown in screen 10810. The user then presses the talk button while saying the utterance "cell phone speech interface," 10812. In the example, this is slightly mis-recognized as "sell phone speech interface," and this text is inserted at the cursor location on the subject line to cause the e-mail edit window to have the appearance shown at 10814. In response, the user presses the line up button and the word left button to position the cursor selection at the position 10816. The user then presses the "8" key to cause a word form list correction window, 10818, to be displayed. In the example, the desired output is associated with the "4" key, the user selects that key and causes the desired output to be placed in the cursor's position as indicated in screen 10820.

Next, the user presses the line down button twice to place the cursor at the beginning of the body portion of the e-mail message as shown in screen 10822. Once this is done, the user presses the talk button while continuously saying the utterance "the new Elvis interface is working really well". This causes the somewhat mis-recognized string, "he knew elfish interface is working really well", to be inserted at the cursor position as indicated by screen 10824.

In response, the user presses the line up key once and the word left key twice to place the cursor in the position shown by screen 10900 of FIG. 199. The user then presses the "5" key to start an extended selection and presses the word left key twice to place the cursor at the position 10902 and to cause the selection to be extended as is shown by 10904. At this point, the user double-clicks on the "2" key to enter the correction window, 10906, for the current selection and, during that press, continuously says the characters "t, h, e, space, n". This causes a new correction window, 10908, to be displayed with unambiguous filter 10910 corresponding to be continuously entered letter name character sequence.

Next, the enter presses the word right key, which moves the filter cursor to the first character of the next word to the right, as indicated by numeral 10912. The user then presses the "1" key to enter the entry mode menu and presses the "3" key to select to select the AlphaBravo, or ICA word, input vocabulary. During the continuation of the press of the "3" key, the user says the continuous utterance, "echo, lima, victor, india, sierra" 10914. This is recognized as detector sequence "ELVIS," which is inserted, starting with the prior filter cursor position, into the first choice window of the correction window, 10916. In the example shown, it is assumed that AlphaBravo recognition is treated as unambiguous because of its reliability, causing the entered characters and all the characters before it in the first choice window to be treated as unambiguously confirmed, as is indicated by the unambiguous confirmation indication 10918 shown in screen 10916.

In the example, the user presses the "OK" key to select the current first choice because it is the desired output.

FIG. 110 illustrates how re-utterance can be used to help obtain the desired recognition output. It starts with the correction window in the same state as was indicated by screen 10906 and FIG. 109. But in the example of FIG. 110, the user responds to the screen by pressing the "1" key twice, once to enter the entry menu mode, and a second time to select a large vocabulary recognition. As indicated by function 7908 through 7914 in FIG. 79, if large vocabulary recognition is selected in the entry mode menu when a correction window is displayed, the system interprets this as an indication that the user wants to perform a re-utterance, that is, to add a new utterance for the desired output into the utterance list for use in helping to select the desired output. In the example, the user continues the second press of the "1" key while using discrete speech to say the three words "the," "new," "Elvis" corresponding to the desired output. In the example above, it is assumed that the additional discrete utterance information provided by this new utterance list entry causes the system to correctly recognize the first two of the three words. In the example it is assumed that the third of the three words is not in the current vocabulary, which will require the user to spell that third word with filtering input, such as was done by the utterance 10914 in FIG. 109.

FIG. 110 illustrates how the editor functionality can be used to enter a URL text string for purposes of accessing a desired web page on a Web browser that is part of the cell phone's software.

The browser option screen, 11100, shows the screen that is displayed if the user selects the Web browser option associated with the "7" key in the main menu, as indicated on FIG. 66. In the example, it is assumed that the user desires to enter the URL of a desired web site and selects the URL window option associated with the "1" key by pressing that key. This causes the screen 11102 to display a brief prompt instructing the user. The user responds by using continuous letter-name spelling to spell the name of a desired web site during a continuous press of the talk button. In the embodiment shown, the URL editor is always in correction mode so that the recognition of the utterance, 11103, causes a correction window, 11104, to be displayed. The user then uses filter string editing techniques of the type which have been described above to correct the originally mis-recognized URL to the desired spelling as indicated at screen 11106, at which time he selects the first choice, causing the system to access the desired web site.

Figure 112:
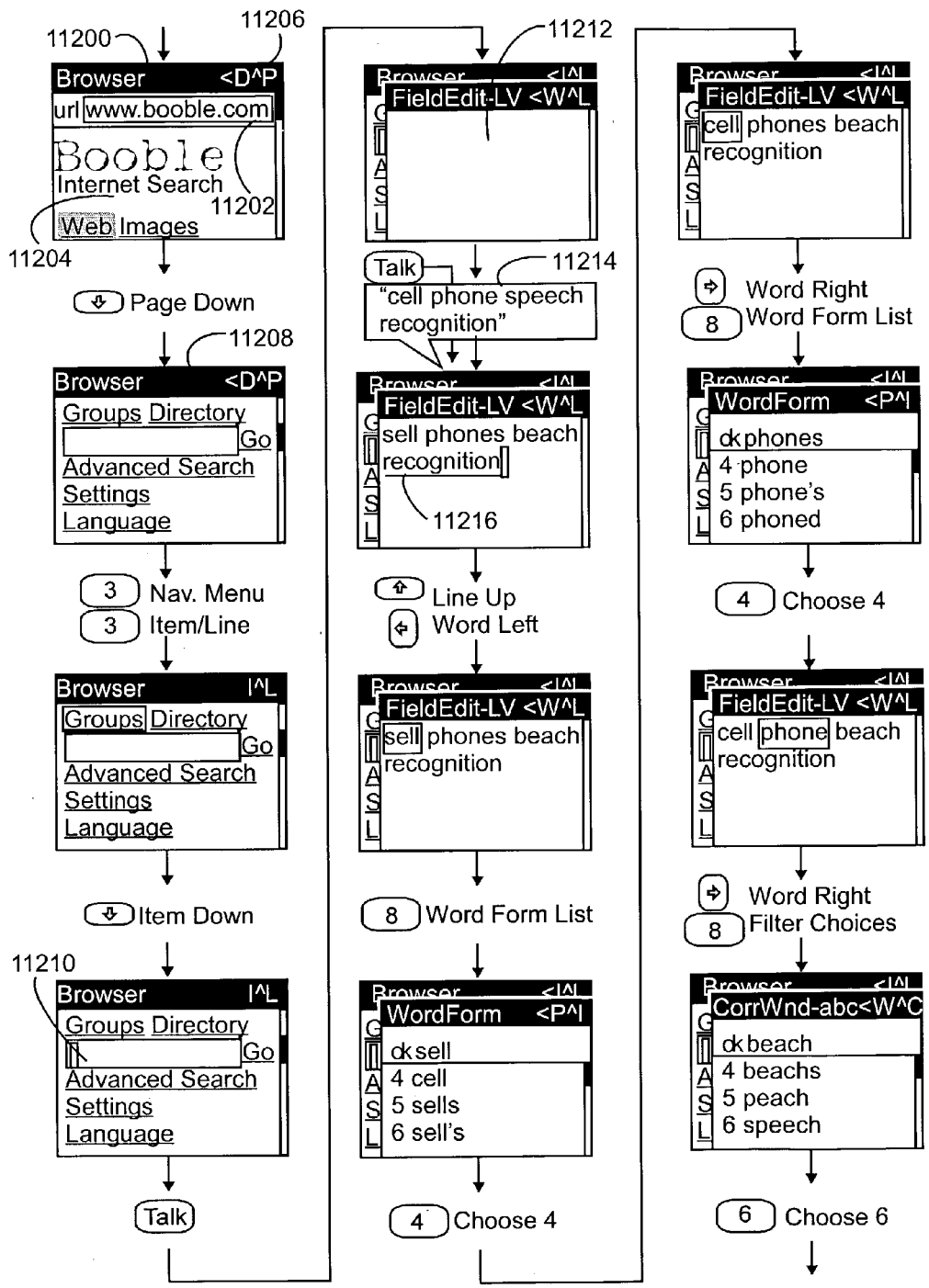
FIGS. 112 and 113 illustrate how elements of the cellphone's speech recognition user interface can be used to navigate World Wide Web pages and to select items and enter and edit text in the fields of such web pages.
Figures 113, 114:
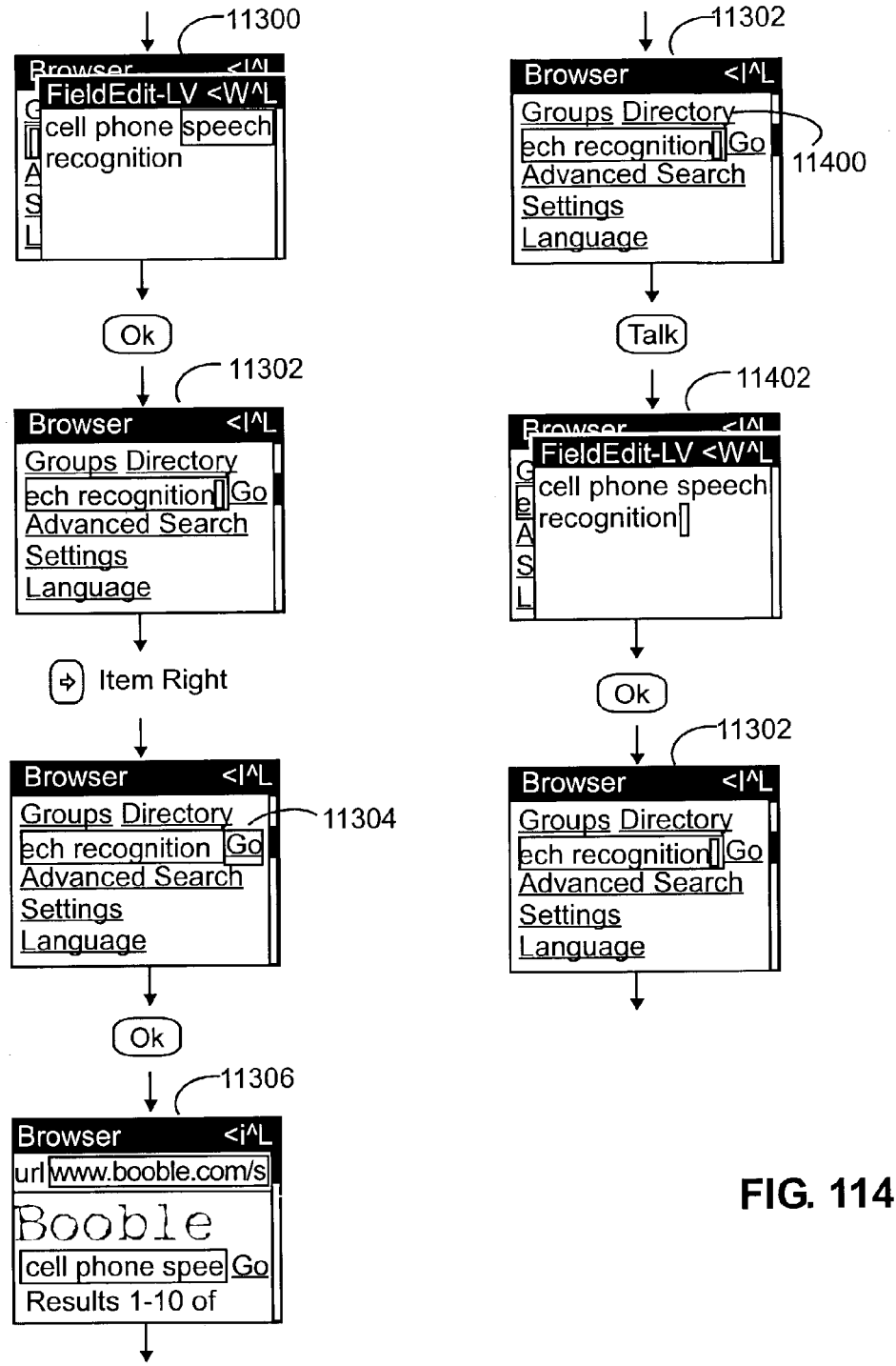
FIG. 114 illustrates how elements of the cellphone speech recognition user interface can be used to enable a user to more easily read text strings too large to be seen at one time in a text field displayed on the cellphone screens, such as a text fields of a web page or dialogue box.

FIGS. 112 through 114 illustrate how the editor interface can be used to navigate and enter text into the fields of Web pages.

Screen 11200 illustrates the appearance of the cell phone's Web browser when it first accesses a new web site. A URL field, 11201, is shown before the top of the web page, 11204, to help the user identify the current web page. This position can be scrolled back to at any time if the user wants to see the URL of the currently displayed web page. When web pages are first entered, they are in a document/page navigational mode in which moving the left and right key will act like the page back and page forward controls on most Web browsers. In this case, the word "document" is substituted for "page" because the word "page" is used in other navigational modes to refer to a screen full of media on the cell phone display. If the user presses the up or down keys, the web page's display will be scrolled by a full display page (or screen).

Figures 115, 116:
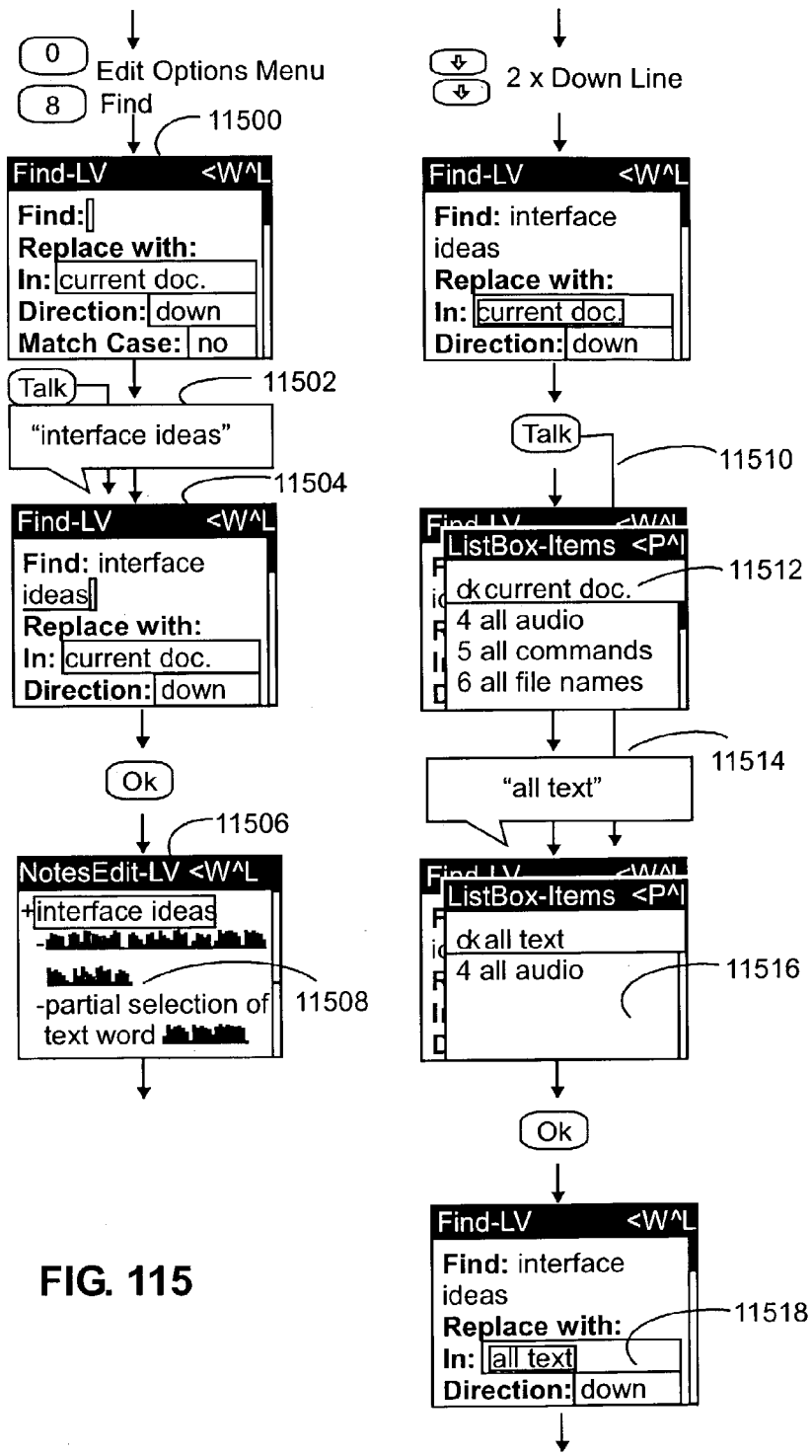
FIG. 115 illustrates the cellphone's find dialog box, how a user can enter a search string into that dialog box by speech recognition, how the find function then performs a search for the entered string, and how the found text can be text used to label audio recorded on the cellphone.
FIG. 116 illustrates how the dialog box editor programming shown in FIG. 97 enable speech recognition to be used to select from among possible values associated with a list boxes.

FIG. 116 illustrates how the cell phone embodiment shown allows a special form of correction window to be used as a list box when editing a dialog box of the type described above with regard to FIG. 115.

The example of FIG. 116 starts from the find dialog box being in the state shown at screen 11504 in FIG. 15. From this state, the user presses the down line key twice to place the cursor in the "In:" list box, which defines in which portions of the cell phone's data the search conducted in response to the find dialog box is to take place. When the user presses the talk button with the cursor in this window, a list box correction window, 11512, is displayed that shows the current selection in the list box as the current first choice and provides a scrollable list of the other list box choices, with each such other choice being shown with associated phone key number. The user could scroll through this list and choose the desired choice by phone key number or by using a highlighted selection. In the example, the user continues the press of the talk key and says the desired list box value with the utterance, 11514. In list box correction windows, the active vocabulary is substantially limited to list values. With such limited vocabulary correct recognition is fairly likely, as is indicated in the example where the desired list value is the first choice. The user responds by pressing the OK key, which causes the desired list value to be placed in the list box of the dialog box as is indicated, 11518.

Figure 117:
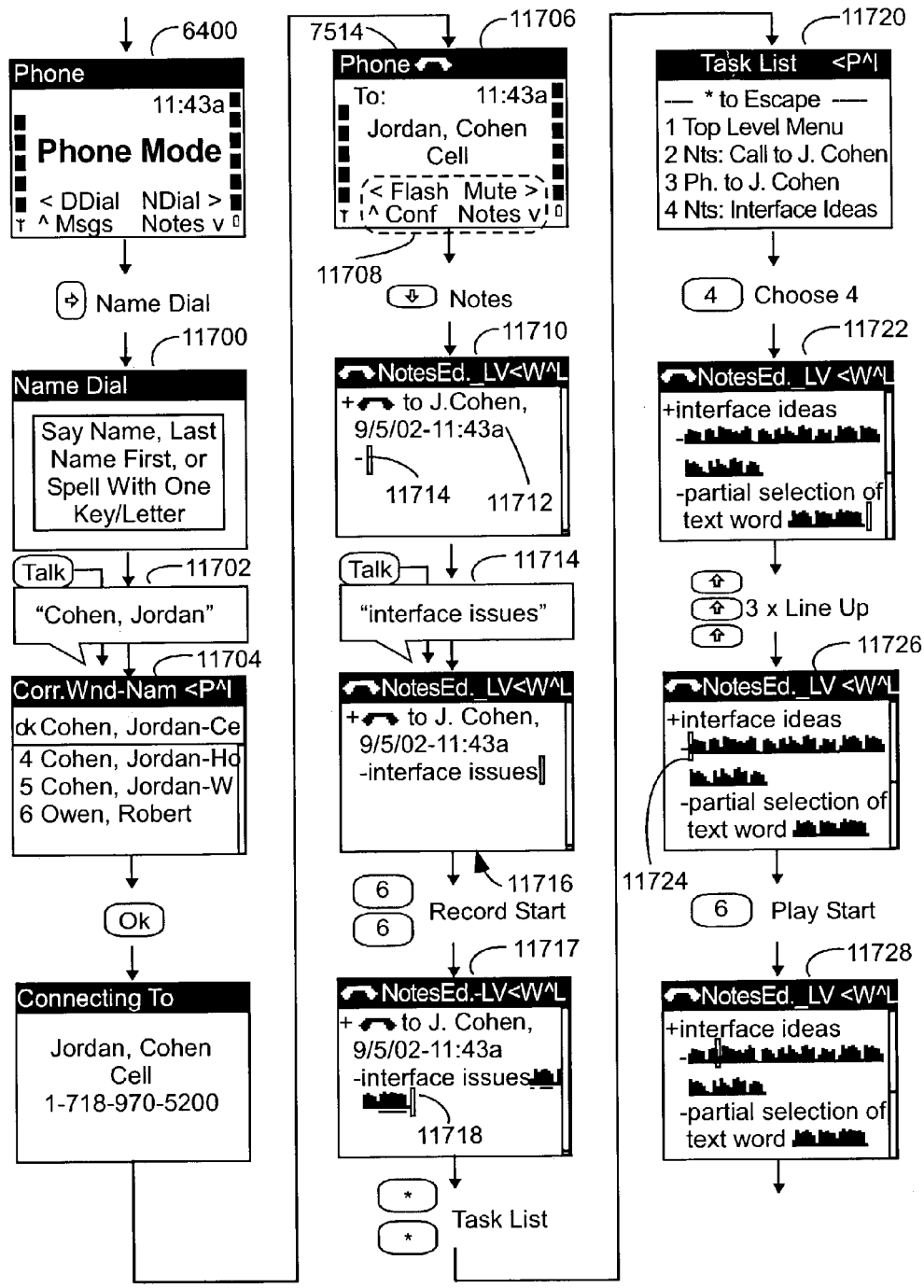
FIG. 117 illustrates how speech recognition can be used to dial people by name, and how the audio playback and recording capabilities of the cellphone can be used during such a cellphone call.

FIG. 117 illustrates a series of interactions between a user and the cell phone interface, which display some of the functions that the interface allows the user to perform when making phone calls.

Figure 64:
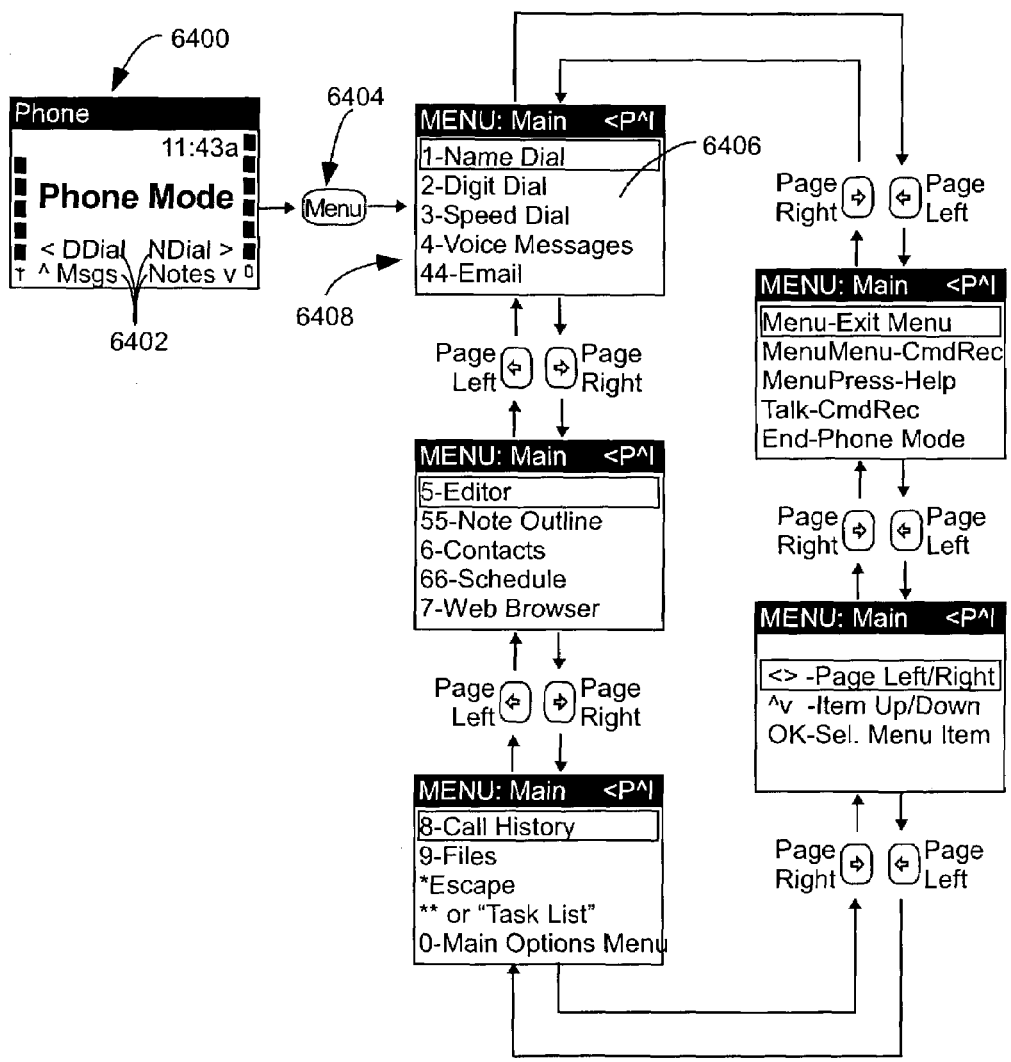
FIG. 64 illustrates how a user of the cellphone of FIG. 59 can access and quickly view the commands of a main menu by pressing the menu key on the cellphone.

The screen 6400 at FIG. 117 is the same top-level phone mode screen described above with regard to FIG. 64. If when it is displayed the user selects the last navigation button, which is mapped to be name dial command, the system will enter the name dial mode, the basic functions of which are those illustrated in the pseudocode of FIG. 119. As can be seen from that figure, this mode allows a user to select names from a contact list by adding them, and if there is a mis-recognition, to correct it by alphabetic filtering by selecting choices from a potentially scrollable choice list in a correction window that is similar to those of the described above.

When the cell phone enters the name dial mode, an initial prompt screen, 11700, is shown as indicated in FIG. 117. In the example, the user utters a name, 11702, during the pressing of the talk key. In name dial, such utterances are recognized with the vocabulary automatically limited to the name vocabulary, and the resulting recognition causes a correction window, 11704, to be displayed. In the example, the first choice is correct, so the user selects the "OK" key, causing the phone to initiate a call to the phone number associated with the named party in the user's contact list.

When the phone call is connected, a screen, 11706, is displayed having the same ongoing call indicator, 7414, described above with regard to FIG. 75. At the bottom of the screen, as indicated by the numeral 11708, an indication is given of the functions associated with each of the navigation keys during the ongoing call. In the example, the user selects the down button, which is associated with the same Notes function described above with regard to FIG. 64. In response, an editor window, 11710, is displayed for the Notes outline with an automatically created heading item, 11712, being created in the Notes outline for the current call, labeling the party to whom it is made and its start and ultimately its end time. A cursor, 11714, is then placed at a new item indented under the calls heading.

In the example, the user says a continuous utterance, 11714, during the pressing of the talk button because recognized text corresponding to that utterance to be inserted into the notes outline at the cursor as indicated in screen 11716. Then the user double-clicks the "6" key to start recording, which causes an audio graphic representation of the sound to be placed in the notes to editor window at the current location of the cursor. As indicated at 11718, audio from portions of the phone call in which the cell phone operator is speaking is underlined in the audio graphics to make it easier for the user to keep track of who's been talking how long in the call and, if desired, to be able to better search for portions of the recorded audio in which one or the other of the phone call's to parties was speaking.

In the example of FIG. 117, the user next double-clicks on the star key to select the task list. This shows a screen, 11720, that lists the currently opened tasks, on the cell phone. In the example, the user selects the task associated with the "4" phone key, which is another notes editor window displaying a different location in the notes outline. In response, the phone keys display shows a screen, 11722, of that portion of the notes outlined.

In the example, the user presses the up key three times to move the cursor to location 11724 and then presses the "6" key to start playing the sound associated with the audio graphics representation at the cursor, as indicated by the motion between the cursors of screens 11726 and 11728.

Unless the play only to me option, 7513, described above with regard to FIG. 75 is on, the playback of the audio in screen 11728 will be played to both sides of the current phone call, enabling the user of the cell phone to share audio recording with the other party during the cell phone call.

FIG. 118 illustrates that when an edit window is recording audio, such as is shown in screen 11717 near the bottom middle of FIG. 117, the user can turn on speech recognition during the recording of such an audio to cause the audio recorded during that portion to also have speech recognition performed upon it. In the example shown during the recording shown in screen 11717, the user presses the talk button and speaks the utterance, 11800. This causes the text associated with that utterance, 11802, to be inserted in the editor window, 11806. Audio recorded after the duration of the recognition is recorded merely with audio graphics. Normally this would be used in the methods in which the user tries to speak clearly during an utterance, such as the utterance 11800, which is to be recognized, and then would feel free to talk more casually during portions of conversation or dictation that are being recorded only with audio. Normally audio is recorded in association with speech recognition so that the user could later go back, listened to and correct any dictation such as the dictation 11802, which was incorrectly recognized during a recording.

FIG. 119 illustrates how the system enables the user to select a portion of audio, such as the portion 11900 shown in that figure by a combination of the extended selection key and play or navigation keys, and then to select the recognized audio dialog box discussed above with regard to functions 9000 through 9014 of FIG. 90 to have the selected text recognized as indicated at 11902. In the example of FIG. 119, the user has selected the show recognized audio option, 9026, shown in FIG. 90, which causes the recognized text, 11902, to be underlined, indicating that it has a playable audio associated with it.

Figure 120:
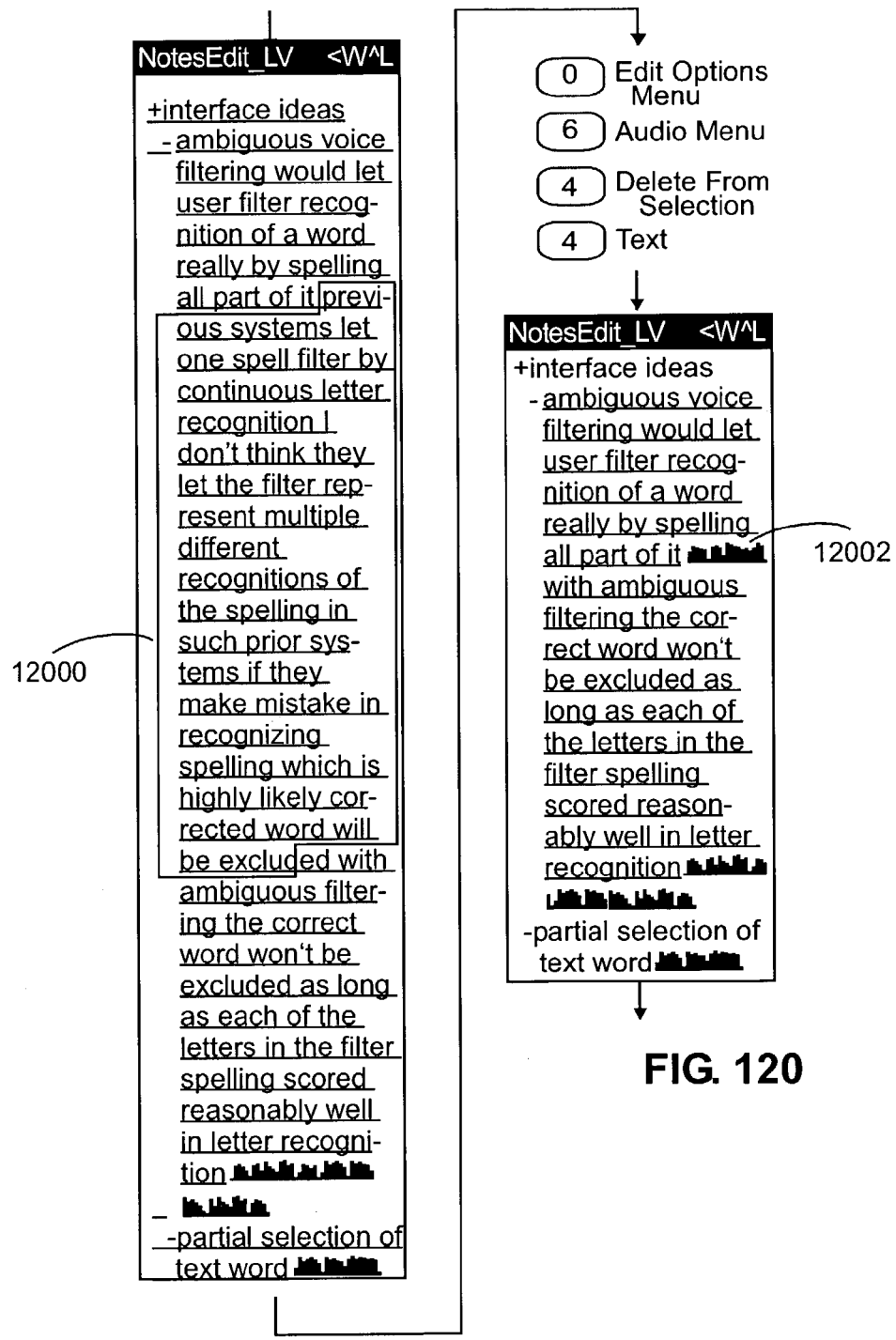
FIG. 120 illustrates how the cellphone enables a user to strip text recognized for a given segment of sound from the audio recording of that sound.

FIG. 120 illustrates how a user can select a portion, 12,000, of recognized text that has associated recorded audio, and then select to have that text stripped from its associated recognized audio by selecting the option 9024, shown in FIG. 90, in a submenu under the editor options menu. This leaves just the audio, 12002, and its corresponding audio graphic representation, remaining in the portion of media where the recognized text previously stood.

Figure 121:
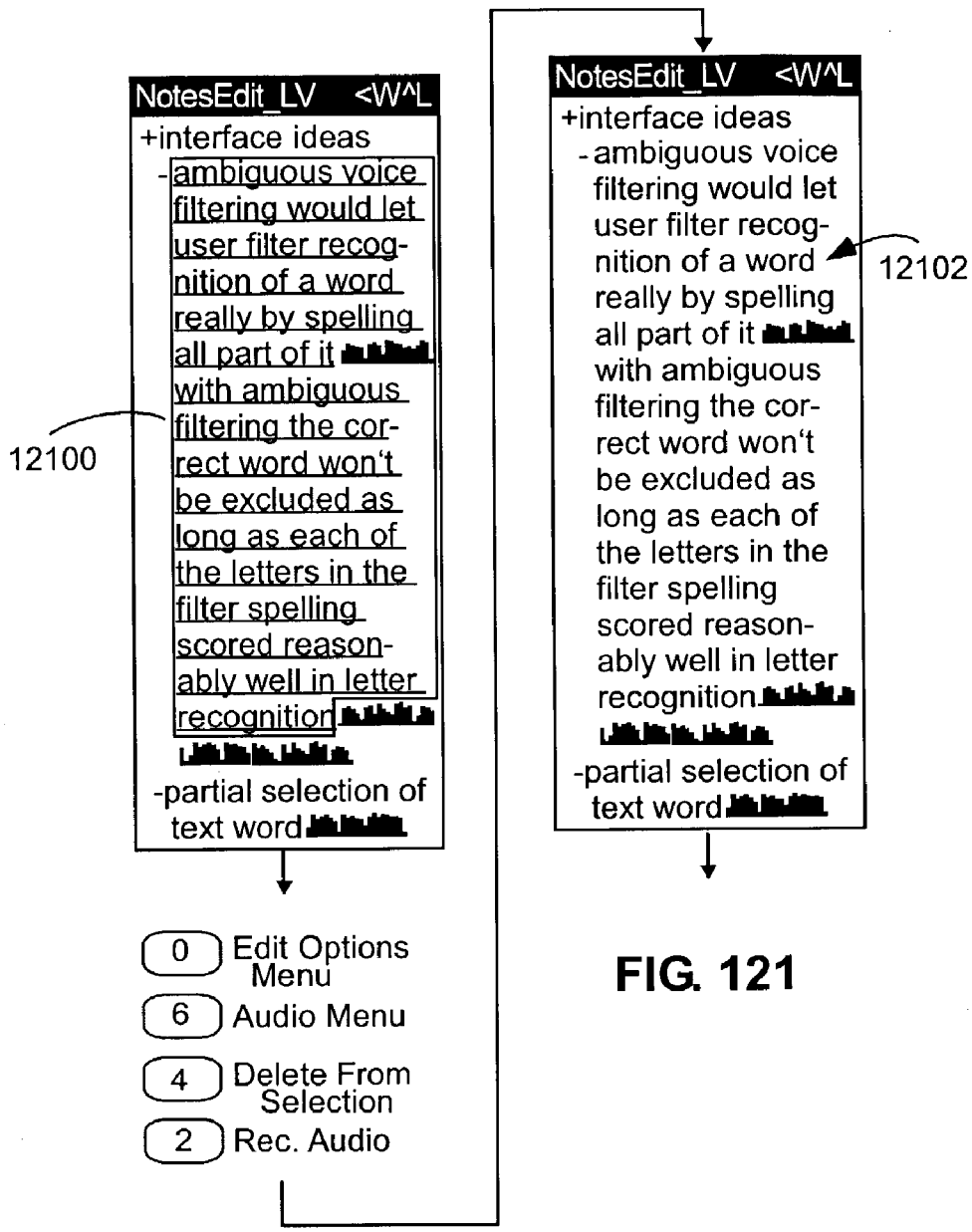
FIG. 121 illustrates how the cellphone enables the user to either turned on or off an indication of which portions of a selected segment of text have been associated audio recording.
Figure 122:
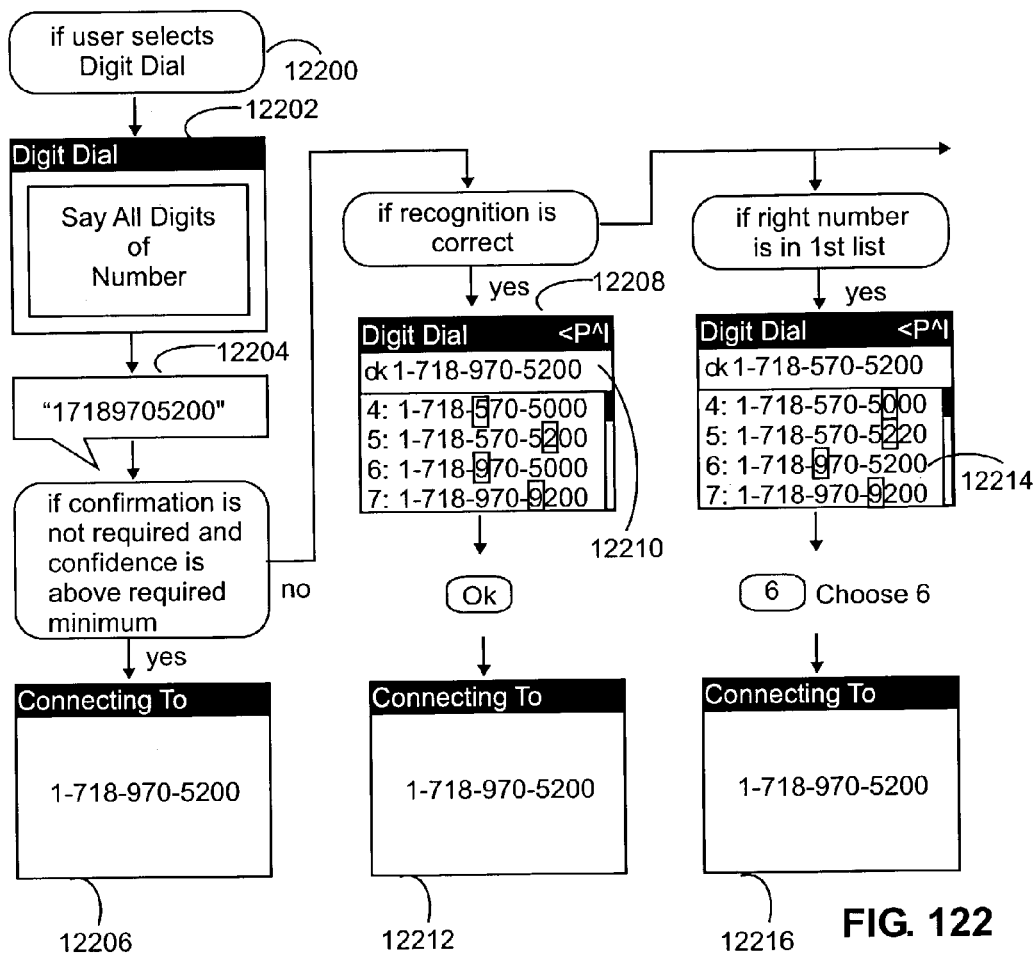

FIG. 121 illustrates how the function 9020, of FIG. 90, from under the audio menu of the edit options menu allows the user to strip the recognition audio that has been associated with a portion, 12100, of recognized text from that text as indicated at 12102 in FIG. 21.

Figure 126:
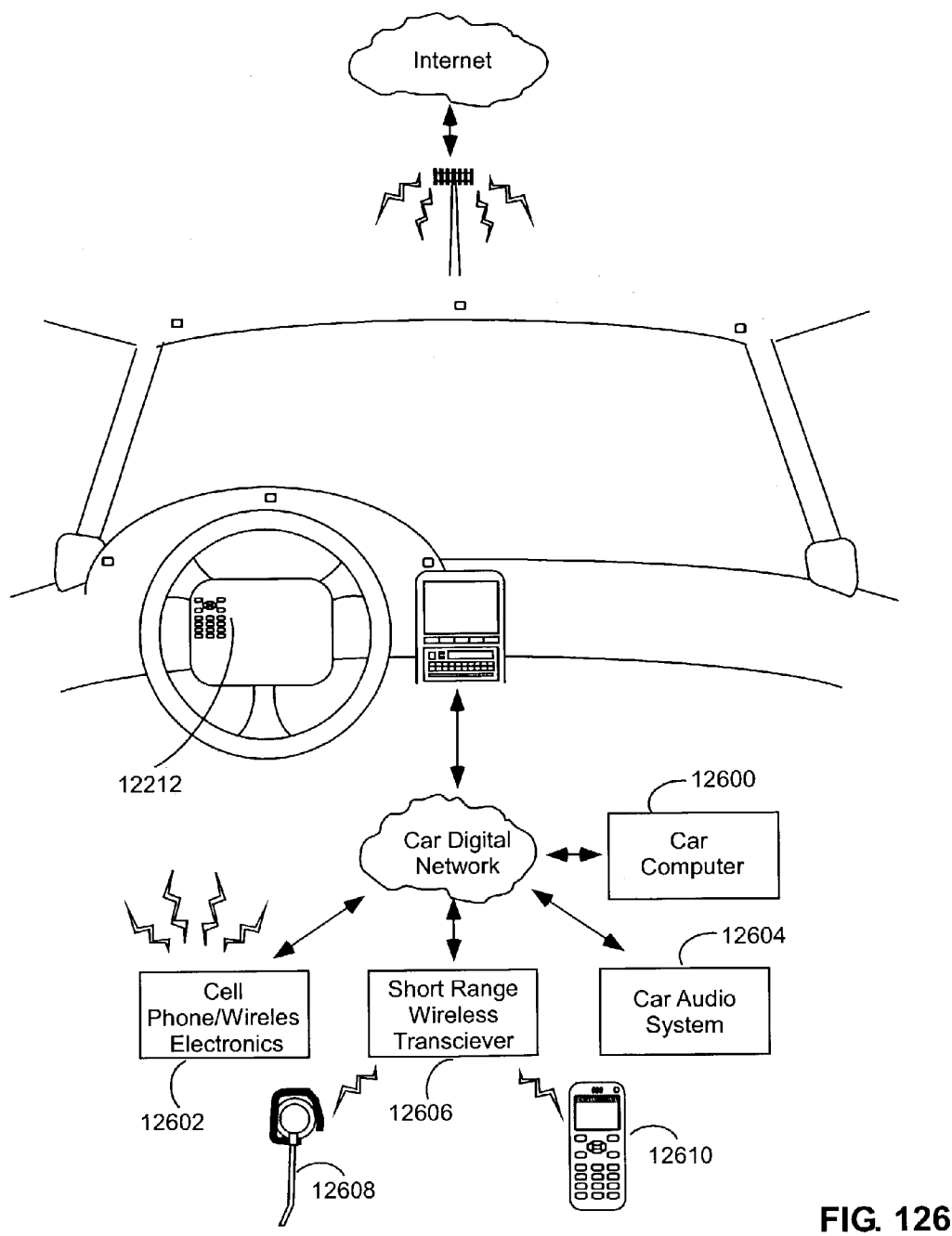
FIG. 126 is provided to illustrate how many aspects of the cellphone embodiment shown in FIGS. 59 through 125 can be used in an automotive environment, including the TTS and duration logic aspects of the cellphone embodiment.

FIGS. 122 through 125 provide illustrations of the operation of the digital dialed mode described in pseudocode in FIG. 126. If the user selects the digit dial mode, such as by pressing the 2 phone key when in the main menu, as illustrated at function 6552 of FIG. 65 or by selecting the left navigational button when the system is in the top-level phone mode shown in screen 6400 and FIG. 64, the system will enter the digital dial mode shown in FIG. 126 and will display a prompt screen, 12202, which prompts the user to say a phone number. When the user says an utterance of a phone number, as indicated at 12204, that utterance will be recognized. If the system is quite confident that the recognition of the phone number is correct, it will automatically dial the recognized phone number as indicated at 12206. If the system is not that confident of the phone number's recognition, it will display a correction window 12208. If the correction window has the desired number as the first choice as is indicated 12210, the user can merely select it by pressing the OK key, which causes the system to dial the number as indicated at 12212. If the correct choice is on the first choice list as is indicated at 12214, the user can merely press the phone key number associated with that choice because the system to dial the number as is indicated at 12216.

Figure 123:
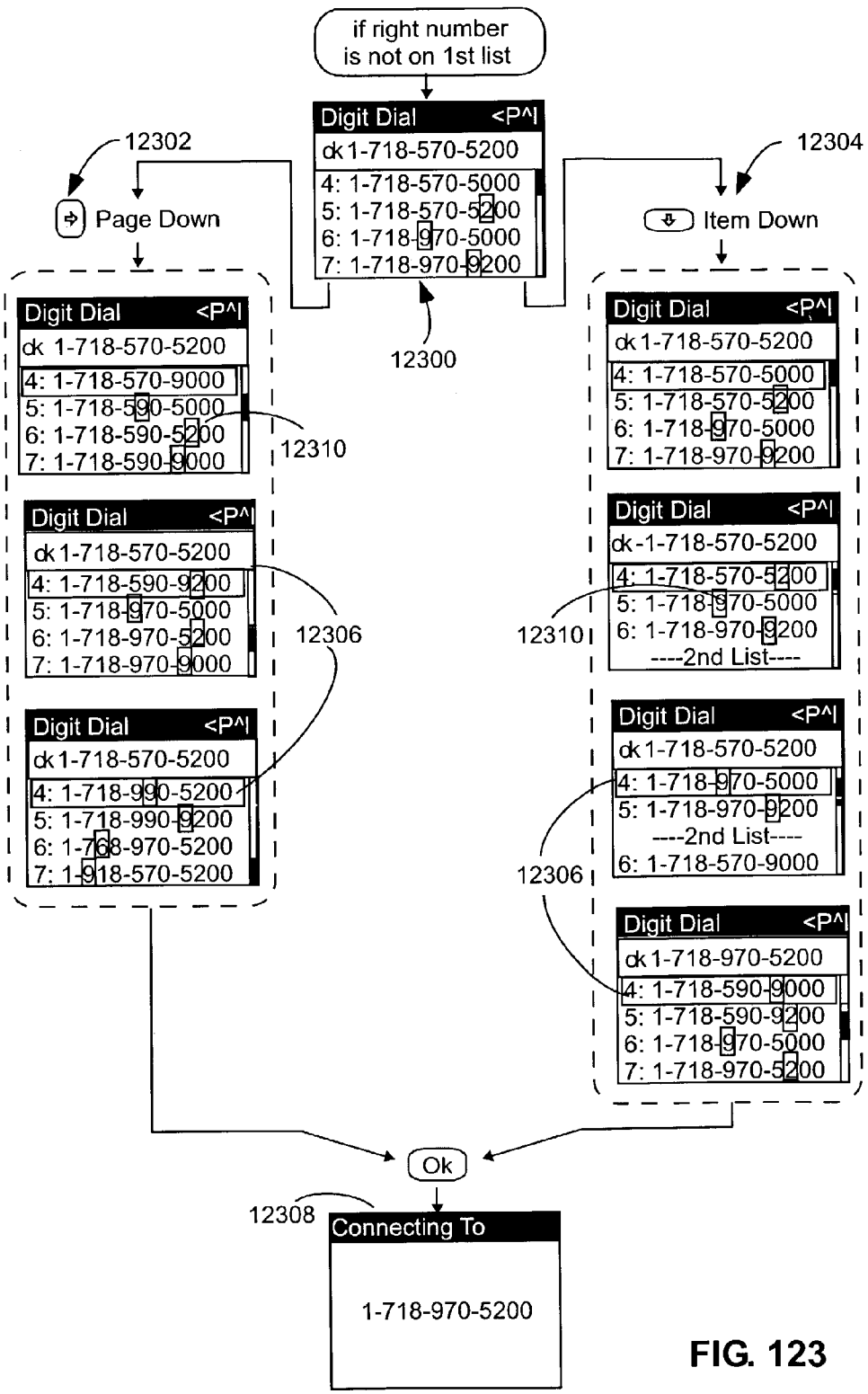

If the correct number is neither the first choice nor in the first choice list as indicated in the screen 12300, shown at the top of FIG. 123, the user can check to see if the desired number is on one of the screens of the second choice list by either repeatedly pressing the page down key as indicated by the number 12302, or repeatedly pressing the item down key as is indicated at 12304. If by scrolling through the choice list in either of these methods the user sees the desired number, the user can select it either by pressing its associated phone key or by moving the choice highlight to it and then pressing the OK key. This will cause the system to dial the number as indicated at screen 12308. It should be appreciated that because the phone numbers in the choice list are numerically ordered, the user is able to find the desired number rapidly by scrolling through the list. In the embodiment shown in these figures, digit change indicators, 12310, are provided to indicate the digit column of the most significant digit by which any choice differs from the choice ahead of it on the list. This makes it easier for the eye to scan for the desired phone number.

FIG. 124 illustrates how the digit dial mode allows the user to navigate to a digit position in the first choice and correct any error that exists within it. In FIG. 124, this is done by speaking the desired number, but the user is also allowed to correct the desired number by pressing the appropriate phone key.

As illustrated in FIG. 125, the user is also able to edit a misperceived phone number by inserting a missing digit as well as by replacing a mis-recognized one.

The invention described above has many aspects that can be used for the entering and correcting of speech recognition as well as other forms of recognition on many different types of computing platforms, including all those shown in FIGS. 3 through 8. A lot of the features of the invention described with regard to FIG. 94 can be used in situations where a user desires to enter and/or edit text without having to pay close visual attention to those tasks. For example, this could allow a user to listen to e-mail and dictate responses while walking in a Park, without the need to look closely at his cell phone or other dictation device. One particular environment in which such audio feedback is useful for speech recognition and other control functions, such as phone dialing and phone control, is in an automotive arena, such as is illustrated in FIG. 126.

In the embodiment by shown in FIG. 126, the car has a computer, 12600, which is connected to a cell cellular wireless communication system, 12602, into the cars audio system, 12604. In many embodiments, the car's electronic system will have a short range wireless transceiver such as a Blue Tooth or other short range transceiver, 12606. These can be used to communicate to a wireless headphone, 2608, or the user's cell phone, 12610, so that the user can have the advantage of accessing information stored on his normal cell phone while using his car.

Preferably, the cell phone/wireless transceiver, 12602, can be used not only to send and receive cell phone calls but also to send and receive e-mail, digital files, such as text files that can be listened to and edited with the functionality described above, and audio Web pages.

The input device for controlling many of the functions described above with regard to the shown cell phone embodiment can be accessed by a phone keypad, 12212 which is preferably located in a position such as on the steering wheel of the automobile, which will enable a user to a access its keys without unduly distracting him from the driving function. In fact, with a keypad having a location similar to that shown in FIG. 126, a user can have the forefingers of one hand around the rim of the steering wheel while selecting keypad buttons with the thumb of the same hand. In such an embodiment, preferably the system would have the TTS keys function described above with regard to 9404 through 9414 of FIG. 94 to enable the user to determine which key he is pressing and the function of that key without having to look at the keypad. In other embodiments, the touch sensitive keypad that responds to a mere touching of its phone keys with such information could also be provided that would be even easier and more rapid to use.

Figure 127:
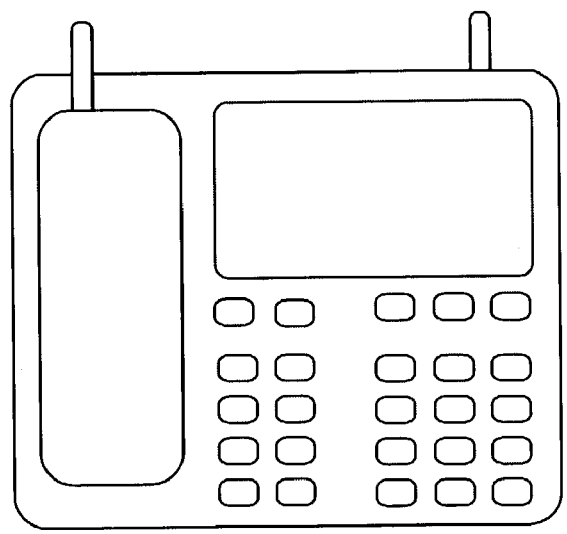
FIGS. 127 and 128 illustrate that most of the aspects of the cellphone embodiment shown in FIGS. 59 through 125 can be used either on cordless phones or landline phones.
Figure 128:
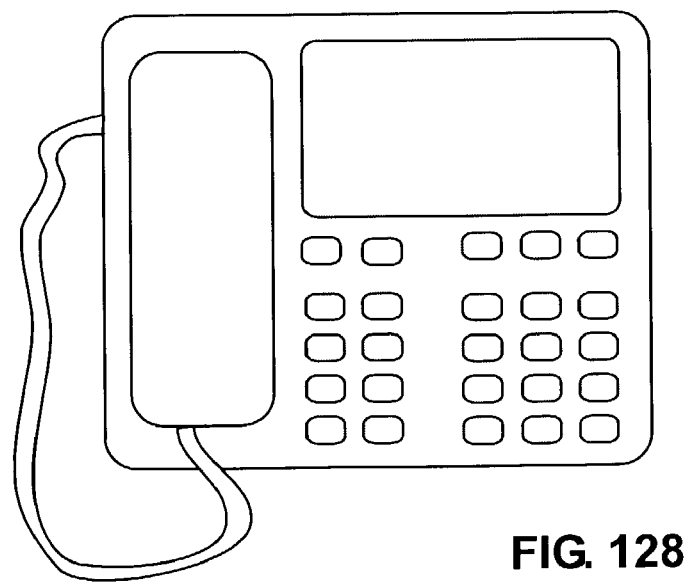

FIGS. 127 and 128 illustrate that most of the capabilities described above with regard to the cell phone embodiment can be used on other types of phones, such as on the cordless phone shown in FIG. 127 or on the landline found indicated at FIG. 128.

It should be understood that the foregoing description and drawings are given merely to explain and illustrate, and that the invention is not limited thereto except insofar as the interpretation of the appended claims are so limited. Those skilled in the art who have the disclosure before them will be able to make modifications and variations therein without departing from the scope of the invention.

The invention of the present application, as broadly claimed, is not limited to use with any one type of operating system, computer hardware, or computer network, and, thus, other embodiments of the invention could use differing software and hardware systems.

Furthermore, it should be understood that the program behaviors described in the claims below, like virtually all program behaviors, can be performed by many different programming and data structures, using substantially different organization and sequencing. This is because programming is an extremely flexible art in which a given idea of any complexity, once understood by those skilled in the art, can be manifested in a virtually unlimited number of ways. Thus, the claims are not meant to be limited to the exact functions and/or sequence of functions described in the figures. This is particularly true since the pseudo-code described in the text above has been highly simplified to let it more efficiently communicate that which one skilled in the art needs to know to implement the invention without burdening him or her with unnecessary details. In the interest of such simplification, the structure of the pseudo-code described above often differs significantly from the structure of the actual code that a skilled programmer would use when implementing the invention. Furthermore, many of the programmed behaviors that are shown being performed in software in the specification could be performed in hardware in other embodiments.

In the many embodiment of the invention discussed above, various aspects of the invention are shown occurring together which could occur separately in other embodiments of those aspects of the invention.

It should be appreciated that the present invention extends to methods, apparatus systems, and programming recorded in machine-readable form, for all the features and aspects of the invention which have been described in this application is filed including its specification, its drawings, and its original claims.

We claim:

1. A computing system for performing speech recognition comprising:
one or more memory devices for storing information, including programming information;
one or more processors for processing information in response to said programming information;
one or more input devices for receiving inputs from a user that can be supplied to one or more of said processors;
wherein said programming information includes programming, including both speech recognition programming and programming external to said speech recognition programming, for causing said computing system, under control of said one or more processors, to perform the following functions:
using said speech recognition programming for:
providing a user interface which allows a user to select, using said one or more input devices, between generating a first and a second user input;
responding to the generation of the first user input by performing large vocabulary speech recognition on one or more utterances in a prior language context dependent mode, which recognizes at least the first word of an utterance depending in part on a language model context created by a previously recognized word from the previous utterance, if any; and
responding to the generation of the second user input by performing large vocabulary speech recognition on one or more utterances in a prior language context independent mode, which recognizes at least the first word of an utterance substantially independently of any language model context created by a previously recognized word from the previous utterance, if any;
wherein:
as words are recognized by said speech recognition programming in both of said recognition modes such words are output to said programming external to said speech recognition programming for use by said external programming; and
the response by said speech recognition programming to said first and second inputs by switching recognition modes is independent of the state of said external programming.

2. A computer system as in claim 1 wherein:
the one or more input devices include a first button and a second button, where said buttons can be either hardware or software buttons;
the first user input is generated by pressing the first button; and
the second user input is generated by pressing the second button.

3. A computer system as in claim 1 wherein the prior language context independent mode uses language context probabilities within an utterance, by causing the recognition of a word in a given utterance to depend on the identity of the one or more words, if any, recognized before it in said given utterance.

4. A computer system as in claim 1 wherein said function are performed by a software input panel in Microsoft Windows CE.

5. A computing system for performing speech recognition comprising:
one or more memory devices for storing information, including programming information;
one or more processors for processing information in response to said programming information;
one or more input devices for receiving inputs from a user that can be supplied to one or more of said processors;
wherein said programming information includes programming for causing said computing system, under control of said one or more processors, to perform the following functions:
providing a user interface which allows a user to select, using said one or more input devices, between generating a first and a second user input;
responding to the generation of the first user input by selecting a continuous speech recognition mode which performs continuous speech recognition on speech sounds using given vocabulary
responding to the generation of the second user input by selecting a discrete recognition mode which performs discrete recognition on speech sounds using substantially the same given vocabulary; and
responding to speech sounds by performing recognition upon them using the currently selected speech recognition mode;
wherein:
the user can switch between the use of continuous and discrete recognition by selecting one of said user inputs
the one or more input devices include a first button and a second button;
the first user input is generated by pressing the first button; and
the second user input is generated by pressing the second button.
touching the first or second button causes its respective recognition mode to start from substantially the start of the touching of such a button and to terminate by the next detection of an end of utterance;
the discrete recognition is limited to the recognition of the one or more vocabulary word candidates with the best scoring match against the utterance whose end is detected after the touching of said button; and
the continuous recognition mode is not so limited;
so that said discrete recognition mode is limited to outputting only one single vocabulary word as the best scoring recognition candidate for the recognition of the given utterance and the continuous recognition mode can output a sequence of multiple words for the recognition of the given utterance.

6. A computer system as in claim 5 wherein the given vocabulary is a large vocabulary.

7. A computer system as in claim 5 wherein the given vocabulary is an alphabetic input vocabulary.

8. A computer system as in claim 5 wherein:
said user interface allows a user to select between generating a third and a fourth input independently from the selection of the first and second input; and
said method further includes responding to said third and fourth inputs, respectively, by selecting as said given vocabulary a first vocabulary or a second vocabulary;
whereby the user can separately switch between recognition vocabularies and between the discrete and continuous recognition modes.

9. A computer system as in claim 8 wherein said first and second vocabulary are a large vocabulary of words and an alphabetic input vocabulary, respectively.

10. A computer system as in claim 8 wherein said first and second vocabulary are two different alphabetic entry vocabularies that contain different letter identifying words for individual letters of the alphabet.

11. A computer system as in claim 5 wherein acoustic models used to represent words in the discrete recognition mode are different than the acoustic models used to represent the same words in the continuous recognition mode.

12. A computing system for performing speech recognition comprising:
one or more memory devices for storing information, including programming information;
one or more processors for processing information in response to said programming information;
one or more input devices for receiving inputs from a user that can be supplied to one or of said processors;
wherein said programming information includes programming for causing said computing device, under control of said one or more processors, to perform the following functions:
providing a user interface which allows a user to select, using said one or more input devices, between generating a first and a second user input;
responding to the generation of the first user input by switching to a first recognition mode that recognizes one or more utterances as one or more words in a first alphabetic entry vocabulary; and
responding to the generation of the second user input by switching to a second recognition mode that recognize one or more utterances as one or more words in a second, different, alphabetic entry vocabulary;
wherein the first and second alphabetic entry vocabularies contain different letter-identifying words for individual letters of the alphabet.

13. A computer system as in claim 12 wherein:
the first alphabetic entry vocabulary includes the names of each letter of the alphabet and the second alphabetic entry vocabulary does not; and
the second alphabetic entry vocabulary includes one or more words that start with each letter of the alphabet and the first alphabetic entry vocabulary does not.

14. A computer system as in claim 12 wherein said one or more input devices include separate buttons for generating said first and second inputs.

15. A computer system as in claim 14 wherein touching of each of said buttons turns on recognition in the button's associated alphabetic entry mode.

16. A computer system as in claim 12 wherein
said user interface enables:
a user to select a filtering mode in which word choices for the recognition of a given word are limited to word's whose spelling matches a sequence of one or more characters input by the user;
a user to enter said one or more filtering characters by voice recognition using either said first or second alphabetic entry modes; and
said first and second inputs select between whether such recognition of filtering characters is performed using said first or second alphabetic entry modes, respectively.

17. A computing system for performing speech recognition comprising:
one or more memory devices for storing information, including programming information;
one or more processors for processing information in response to said programming information;
one or more input devices for receiving inputs from a user that can be supplied to one or more of said processors;
wherein said programming information includes programming for causing said computing system, under control of said
one or more processors, to perform the following functions:
providing a user interface which allows a user to select, using said one or more input devices, between generating a first and a second user input;
responding to the generation of the first user input by selecting a continuous speech recognition mode which performs continuous speech recognition on speech sounds using a given vocabulary;
responding to the generation of the second user input by selecting a discrete recognition mode which performs discrete recognition on speech sounds using substantially the same given vocabulary; and
responding to speech sounds by performing recognition upon them using the currently selected speech recognition mode;
wherein:
the user can switch between the use of continuous and discrete recognition by selecting one of said user inputs
said user interface allows a user to select between generating a third and a fourth input independently from the selection of the first and second input; and
said method further includes responding to said third and fourth inputs, respectively, by selecting as said given vocabulary a first vocabulary or a second vocabulary;
whereby the user can separately switch between recognition vocabularies and between the discrete and continuous recognition modes; and
wherein said first and second vocabulary are two different alphabetic entry vocabularies that contain different letter-identifying words for individual letters of the alphabet.

18. A computing system for performing speech recognition comprising:
one or more processors for processing information in response to programming instructions;
one or more input devices for receiving inputs from a user that can be supplied to one or more of said processors;
one or more memory devices for storing processor readable information, including said programming instructions;
processor readable programming instructions stored in said memory for:
a speech recognition program that responds to speech sounds by outputting a sequence of one or more words recognized as matching said speech sounds;
a programs external to the speech recognition program capable of receiving an input comprised of a sequence of one or more words; and
supplying a sequence of one or more of said words output from the speech recognition program as said input to said external program substantially as said words are recognized by said speech recognition program;
wherein said programming instructions for said speech recognition program further include instructions for:
providing a user interface which allows a user to select between generating a first and a second user input, using said one or more input devices;
responding to the generation of the first user input by performing large vocabulary speech recognition on one or more utterances in a prior language-contextdependent mode, which recognizes at least the first word of such recognition depending in part on a language model context created by a previously recognized word from the previous utterance, if any; and responding to the generation of the second user input by performing large vocabulary speech recognition on one or more utterances in a prior language-context-independent mode, which recognizes at least the first word of such recognition independently of any language model context created by a previously recognized word from the previous utterance, if any;

wherein said programming instructions for said external program further includes instructions for providing a user interface which allows a user to selectively change the context in which successive words of said input are processed by said external program; and wherein the response by said speech recognition programming to said first and second inputs by switching recognition modes is independent of said context in which successive words input to the external program are processed.

* * * * *